United States Patent
Skjaeret et al.

(10) Patent No.: US 12,473,249 B2
(45) Date of Patent: Nov. 18, 2025

(54) AROMATIC COMPOUNDS AND PHARMACEUTICAL USES THEREOF

(71) Applicant: BASF AS, Oslo (NO)

(72) Inventors: Tore Skjaeret, Oslo (NO); David Alan Fraser, Blommenholm (NO); Hilde Hermansen Steineger, Oslo (NO)

(73) Assignee: BASF AS, Oslo (NO)

( * ) Notice: Subject to any disclaimer, the term of this patent is extended or adjusted under 35 U.S.C. 154(b) by 893 days.

(21) Appl. No.: 17/284,022

(22) PCT Filed: Oct. 10, 2019

(86) PCT No.: PCT/IB2019/001139
§ 371 (c)(1),
(2) Date: Apr. 9, 2021

(87) PCT Pub. No.: WO2020/074964
PCT Pub. Date: Apr. 16, 2020

(65) Prior Publication Data
US 2021/0380521 A1    Dec. 9, 2021

Related U.S. Application Data

(60) Provisional application No. 62/744,461, filed on Oct. 11, 2018.

(51) Int. Cl.
C07C 63/64    (2006.01)
C07C 63/04    (2006.01)

(52) U.S. Cl.
CPC ............. C07C 63/64 (2013.01); C07C 63/04 (2013.01)

(58) Field of Classification Search
CPC ......... C07C 63/64; C07C 63/04; C07C 59/64; C07C 65/21; C07C 65/28; C07C 65/32; C07C 229/54; C07C 233/54; C07C 317/44; C07C 323/62; C07C 235/46; C07C 69/76; C07C 233/46; A61P 1/16; A61P 3/00; A61P 3/04; A61P 3/06; A61P 3/10; A61K 31/135; A61K 31/192
See application file for complete search history.

(56) References Cited

U.S. PATENT DOCUMENTS

| | | | |
|---|---|---|---|
| 5,210,266 A * | 5/1993 | Mimura | C07D 265/30 548/557 |
| 7,705,169 B2 | 4/2010 | Duceppe et al. | |
| 7,745,488 B2 | 6/2010 | Gagnon et al. | |
| 8,071,580 B2 | 12/2011 | Penney et al. | |
| 8,487,001 B2 | 7/2013 | Gagnon et al. | |
| 8,946,190 B2 | 2/2015 | Gagnon et al. | |
| 9,447,016 B2 | 9/2016 | Boulos et al. | |
| 9,532,962 B2 | 1/2017 | Pichette et al. | |
| 9,682,054 B2 | 6/2017 | Penney et al. | |
| 9,884,802 B2 | 2/2018 | Gagnon et al. | |
| 2006/0223842 A1 * | 10/2006 | Moriconi | A61P 1/04 514/300 |
| 2008/0090848 A1 | 4/2008 | Penney et al. | |
| 2009/0270470 A1 | 10/2009 | Jonasson et al. | |

(Continued)

FOREIGN PATENT DOCUMENTS

| | | |
|---|---|---|
| EP | 1 535 915 A1 | 6/2005 |
| JP | 2013-100289 A | 5/2013 |
| WO | WO 93/21912 | 11/1993 |

(Continued)

OTHER PUBLICATIONS

Thuy-Boun et al. Ligand-Accelerated ortho-C—H Alkylation of Arylcarboxylic Acids using Alkyl Boron Reagents, (Journal of the American Chemical Society, 135, p. 17508-17513). (Year: 2013).*
CAS Registry No. 1555822-28-0, which entered the STN database on Feb. 25, 2014. (Year: 2014).*
STN Database Registry 1157326-48-1. Entered STN: Jun. 14, 2009. Supplier: UkrOrgSynthesis.
STN Database Registry 1157422-82-6. Entered STN: Jun. 14, 2009. Supplier: UkrOrgSynthesis.
STN Database Registry 1534116-65-8. Entered STN: Jan. 30, 2014. Supplier: Aurora Fine Chemicals.
STN Database Registry 1551031-18-5. Entered STN: Feb. 20, 2014. Supplier: Aurora Fine Chemicals.

(Continued)

*Primary Examiner* — Joseph K McKane
*Assistant Examiner* — Meghan C Heasley
(74) *Attorney, Agent, or Firm* — Finnegan, Henderson, Farabow, Garrett & Dunner, LLP

(57) ABSTRACT

The present disclosure relates to compounds of the general formula (I):

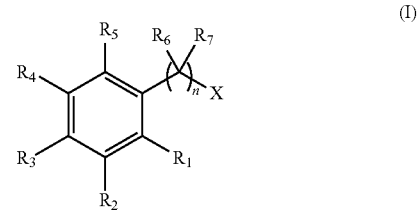

wherein $R_1$, $R_2$, $R_3$, $R_4$, $R_5$, $R_6$, and $R_7$ may be chosen from different substituents; n is 0, 1, or 2; and X is a hydroxymethyl or a carboxylic acid or a derivative thereof, such as a carboxylate, such as a carboxylic ester, a glyceride, an anhydride, a phospholipid, a carboxamide, a phospholipid, or a prodrug thereof; or a pharmaceutically acceptable salt, solvate, solvate of such salt or a prodrug thereof. The present disclosure also relates to pharmaceutical compositions and lipid compositions comprising at least one compound according to the present disclosure, and to such compounds for use as medicaments or for use in therapy, in particular for the treatment of diseases related to metabolic diseases and liver diseases, such as non-alcoholic fatty liver disease and cholestasis diseases.

19 Claims, 31 Drawing Sheets

(56) References Cited

U.S. PATENT DOCUMENTS

| | | |
|---|---|---|
| 2013/0281413 A1 | 10/2013 | Mian et al. |
| 2017/0305943 A1 | 10/2017 | Brown et al. |

FOREIGN PATENT DOCUMENTS

| | | |
|---|---|---|
| WO | WO 02/083120 A2 | 10/2002 |
| WO | WO 02/100341 A2 | 12/2002 |
| WO | WO 2004/069237 A1 | 8/2004 |
| WO | WO 2005/012217 A2 | 2/2005 |
| WO | WO 2005/054243 A1 | 6/2005 |
| WO | WO 2006/024174 A1 | 3/2006 |
| WO | WO 2006/066894 A1 | 6/2006 |
| WO | WO 2006/086871 A1 | 8/2006 |
| WO | WO 2007/051995 A2 | 5/2007 |
| WO | WO 2007/093364 A1 | 8/2007 |
| WO | WO 2008/116141 A | 9/2008 |
| WO | WO 2008/151211 A1 | 12/2008 |
| WO | WO 2009/055933 A1 | 5/2009 |
| WO | WO 2009/076761 A1 | 6/2009 |
| WO | WO 2010/127440 A1 | 11/2010 |
| WO | WO 2011/048082 A1 | 4/2011 |
| WO | WO 2011/064350 A1 | 6/2011 |
| WO | WO 2013/126990 A1 | 9/2013 |
| WO | WO 2013/173441 A2 | 11/2013 |
| WO | WO 2014/138906 A1 | 9/2014 |
| WO | WO 2014/138907 A1 | 9/2014 |
| WO | WO 2016/054726 A1 | 4/2016 |
| WO | WO 2017/042557 A1 | 3/2017 |
| WO | WO 2019/216266 A1 | 11/2019 |

OTHER PUBLICATIONS

STN Database Registry 1551884-56-0. Entered STN: Feb. 21, 2014. Supplier: Aurora Fine Chemicals.

STN Database Registry 1557804-71-3. Entered STN: Feb. 27, 2014. Supplier: Aurora Fine Chemicals.

STN Database Registry 1557804-99-5. Entered STN: Feb. 27, 2014. Supplier: Aurora Fine Chemicals.

STN Database Registry 1986345-89-4. Entered STN: Sep. 4, 2016. Supplier: Aurora Fine Chemicals.

Chang, L.L. et al., "Substituted Imidazoles as Glucagon receptor Antagonists," vol. 11, No. 18, pp. 2549-2553 (2001).

Chen, Q. et al., "Cobalt-Catalyzed ortho-Alkylation of Secondary Benzamide with Alkyl Chloride through Directed C—H Bond Acitavation," Journal of the American Chemical Society, vol. 133, No. 3, pp. 428-429 (2011).

Chuc, L. et al., "Long-range Olefin Isomerization Catalyzed by Palladium(0) Nanoparticles," ACS Omega, vol. 2, No. 2, pp. 698-711 (2017).

Database Registry [Online], Chemical Abstracts Service, (2014), Database accession No. 1555822-28-0, abstract.

Degraw, J.I. et al., "Potential Antileprotic Agents. 3. Inhibition of Myobacterial Dihydrofolic Reductase b 2,4-Diamino-5-methyl-6-alkylquinazolines," Journal of Medicinal Chemistry, p. 763 (1974).

Fuchs, P. et al., "A Thermotropic Mesophase Comprised of Closed Micellar Aggregates of the Normal Type," Angewandte Chemie, International Edition, vol. 41, No. 4, pp. 628-631 (2002).

Halland, N. et al., "Small Macrocycles as Highly Active Integrin [alpha]2[beta]1 Antagonists," ACS Medicinal Chemistry Letters, vol. 5, No. 2, pp. 193-198 (2014).

Honkanen, E. et al., "Synthesis of Dialkylaminoalkyl Esters of Sterically Hindered 4-Alkoxybenzoic Acids," ACTA Chemica Scandinavica, vol. 13, p. 1189-1192 (1959).

Hu, X. et al., "Carboxylate-directed C—H allylation with allyl alcohols or ethers," Chemical Science, vol. 9, No. 23, pp. 5289-5294 (2018).

Hu, Y. et al., "Synthesis of the aromatic unit of calicheamicin [gamma]11*," Journal of the Chemical Society, Perkin Transactions 1, vol. 1, No. 9, pp. 1421-1424 (1997).

Kung, P. et al., "Design and Synthesis of Pyridone-Containing 3,4-Dihydroisoquinoline-1(2H)-ones as a Novel Class of Enhancer of Zeste Homolog 2 (EZH2) Inhibitors," J. Med. Chem., vol. 59, No. 18, pp. 8306-8325 (2016).

Novak, P. et al., "Synergistic Palladium-Catalyzed C(sp3)—H Activation/C(sp3)-0 Bond Formation: A Direct, Step-Economical Route to Benzolactones," Angewandte Chemie International Edition, vol. 50, No. 51, pp. 11136-12239 (2011).

Okamoto, H. et al., "Synthesis and Thermal Properties for 4-(4-Alkoxyphenoxycarbonyl)phenyl 3-Alkoxy-2-X-benzoates," Molecular Crystals and Liquid Crystals, vol. 439 No. 1, pp. 221-227 (2006).

Raiber, E. et al., "Novel heparin/heparan sulfate mimics as inhibitors of HGF/SF-induced MET activation," Bioorganic & Medicinal Chemistry Letters, vol. 17, No. 22, pp. 6321-6325 (2007).

Roth, J. et al., "Synthesis of small molecule inhibitors of the orphan nuclear receptor steroidogenic factor-1 (NR5A1) based on isoquinolinone scaffolds," Bioorganic & Medicinal Chemistry Letters, vol. 18, No. 8, pp. 2628-2632 (2008).

Santra, S. et al., "Role of polar solvents for the synthesis of pillar[6]arenes," RSC Advances, vol. 5, No. 126, p. 104285 (2015).

Tanaka, K. et al., "Synthesis of Perfluoroalkylated Benzenes and Pyridines through Cationic Rh(1)/Modified BINAP-Catalyzed Chemo- and Regioselective [2 + 2 + 2] Cycloaddition," Organic Letters, vol. 9, No. 10, pp. 1907-1910 (2007).

Thuy-Boun, P.S. et al., "Ligand-Accelerated ortho -C-H Alkylation of Arylcarboxylic Acid Using Alkyl Boron Reagents," Journal of the American Chemical Society, vol. 135, No. 46, pp. 17508-17513 (2013).

International Search Report for International Application No. PCT/IB2019/001139, Feb. 12, 2020 (13 pages).

Written Opinion of the International Searching Authority for International Application No. PCT/IB2019/001139 (11 pages).

Javid, P.J. et al., "The route of lipid administration affects parenteral nutrition-induced hepatic steatosis in a mouse model," Journal of Pediatric Surgery (2005) 40, 1446-1453.

Koelfat, KVK. et al., "Parenteral nutrition dysregulates bile salt homeostasis in a rat model of parenteral nutrition-associated liver disease," Clinical Nutrition 36 (2017) 1403-1410.

Meisel, JA. et al., "Comparison of 5 intravenous lipid emulsions and their effects on hepatic steatosis in a murine model," Journal of Pediatric Surgery (2011) 46, 666-673.

Prince, E. et al., "ω-3 Fatty Acids Prevent Hepatic Steatosis, Independent of PPAR-α Activity, in a Murine Model of Parenteral Nutrition-Associated Liver Disease," JPEN J Parenter Enteral Nutr. Jul. 2014; 38(5): 608-616.

Zhan, L. et al., "Dysregulation of bile acid homeostasis in parenteral nutrition mouse model," Am J Physiol Gastriontest Liver Physiol 310: G93-G102, 2016.

Elliott, M. et al., "The Pyrethrins and Related Compounds. Part XXVIII: Alkenyl- and Alkynyl-substituted Benzyl Esters" Pesticide Science, 17:6, 1986, pp. 691-700.

Kühler, T.C. et al., "Novel Structures Derived from 2-[[(2-Pyridyl)methyl]thio]-1H-benzimidazole as Anti-Helicobacter pylori Agents, Part 1" J. Med. Chem., 45:19, 2002, pp. 4282-4299.

Saha A. and Nasipuri, D., "Stereoselective Synthesis of (±)-Veadeiroic Acid and (±)-Veadeirol by Cyclisation of a 2-(2-Arylethyl)-1 ,3,3-trimethylcyclohexyl Cation: Mechanism and Stereochemistry of Related Cycloalkylation Reactions" J. Chem. Soc. Perkin Trans., 18, 1993, pp. 2223-2228.

Wender, P.A. and Dore, T. M., "A Formal Synthesis of Crinipellin B Based on the Arene-Alkene meta-Photocycloaddition Reaction" Tet. Lett., 39:47, 1998, pp. 8589-8592.

Wu, J. et al., "Conformational Effect of a Lateral Alkoxy Group on Mesomorphic Properties" Chem. Lett., 30:2, 2001, pp. 116-117.

STN Database Registry 2159369-73-8. Entered STN: Dec. 17, 2017. Supplier: UkrOrgSyntez Ltd.

STN Database Registry 2159228-81-4. Entered STN: Dec. 17, 2017. Supplier: UkrOrgSyntez Ltd.

STN Database Registry 2149334-28-9. Entered STN: Dec. 1, 2017. Supplier: UkrOrgSyntez Ltd.

STN Database Registry 2172065-09-5. Entered STN: Jan. 31, 2018. Supplier: Enamine LLC.

(56) References Cited

OTHER PUBLICATIONS

STN Database Registry 2164401-87-8. Entered STN: Dec. 24, 2017. Supplier: UkrOrgSyntez Ltd.
STN Database Registry 2152384-84-2. Entered STN: Dec. 6, 2017. Supplier: UkrOrgSyntez Ltd.
STN Database Registry 2091366-89-9. Entered STN: Apr. 18, 2017. Supplier: FCH Group.
STN Database Registry 2024714-26-7. Entered STN: Nov. 4, 2016. Supplier: UkrOrgSyntez Ltd.
STN Database Registry 1555154-56-7. Entered STN: Feb. 25, 2014. Supplier: Aurora Fine Chemicals.
STN Database Registry 1548191-86-1. Entered STN: Feb. 18, 2014. Supplier: Aurora Fine Chemicals.
STN Database Registry 1546111-99-2. Entered STN: Feb. 17, 2024. Supplier: Aurora Fine Chemicals.
STN Database Registry 1511639-69-2. Entered STN: Jan. 5, 2014. Supplier: Aurora Fine Chemicals.
Hird, N.W., and Milner, P.H. "Synthesis of B-Lactamase Inhibition of Anacardic Acids and Their Analogues." Inorganic & Medicinal Chemistry Letters, vol. 4, No. 12, p. 1423-1428, 1994.
STN Database Registry 2164064-45-1. Entered STN Dec. 24, 2017. Supplier: UkrOrgSyntez Ltd.
STN Database Registry 2154491-13-9. Entered STN Dec. 10, 2017. Supplier: UkrOrgSyntez Ltd.
STN Database Registry 2140641-42-3. Entered STN Nov. 10, 2017. Supplier: UkrOrgSyntez Ltd.
STN Database Registry 1369914-68-0. Entered STN Apr. 18, 2012. Supplier: Milestone Pharmtech USA, Inc.
STN Database Registry 1564208-24-7. Entered STN Mar. 7, 2014. Supplier: Aurora Fine Chemicals.
STN Database Registry 1558500-36-9. Entered STN Feb. 28, 2014. Supplier: Aurora Fine Chemicals.
STN Database Registry 1548284-67-8. Entered STN Feb. 18, 2014. Supplier: Aurora Fine Chemicals.
STN Database Registry 1548284-59-8. Entered STN Feb. 18, 2014. Supplier: Aurora Fine Chemicals.

\* cited by examiner

A.

chow

B.

PN + OG Saline

A.

PN + OG MCT

B.

PN + OG Omegaven

A.

PN + OG 0.3 mmol Compound A

B.

PN + OG 0.6 mmol Compound A

A.

PN + OG 0.3 mmol Compound B

B.

PN + OG 0.6 mmol Compound B

A.

B.

A.

chow

B.

PN + IV Saline + OG MCT

A.

PN + IV Intralipid + OG MCT

B.

PN + IV Omegaven + OG MCT

A.

PN + IV Saline + OG Compound A

B.

PN + IV Intralipid + OG Compound A

PN + IV Omegaven + OG Compound A

A.

Chow

B.

PN + IV saline + OG MCT

A.

PN + IV Intralipid + OG MCT

B.

PN + IV Omegaven + OG MCT

A.

PN + IV saline + Compound A

B.

PN + IV Intralipid + OG Compound A

PN + IV Omegaven + OG Compound A

AROMATIC COMPOUNDS AND PHARMACEUTICAL USES THEREOF

CROSS REFERENCE TO RELATED APPLICATIONS

This application is a national stage filing under 35 U.S.C. § 371 of International Application No. PCT/IB2019/001139, filed Oct. 10, 2019, which claims priority to U.S. Provisional Application No. 62/744,461, filed Oct. 11, 2018. The contents of these applications are incorporated herein by reference.

FIELD OF THE INVENTION

The present invention relates to substituted aromatic compounds, processes for their preparation, pharmaceutical compositions comprising the same, and their use for the treatment of various diseases and conditions in subjects in need thereof.

BACKGROUND

The rising global epidemic of obesity and its comorbidities, e.g., type 2 diabetes mellitus and hyperlipidemia, is placing an enormous burden both on public health (mortality and morbidity) and on the available public health resources required to treat these conditions.

Current drugs that treat hyperlipidemia (e.g., statins, omega-3 fatty acids, fibrates) have mostly neutral effects on glycemic control, whilst drugs targeting glycemic control e.g., insulin, thiazolidinediones (TZDs), have adverse effects upon bodyweight and (for TZDs) other unwanted side-effects restricting their use.

In addition to hyperlipidemia and type 2 diabetes, a marked increase in the prevalence of non-alcoholic fatty liver disease (NAFLD) has occurred. NAFLD has become the most common chronic liver condition in Western populations in relation to the obesity and type 2 diabetes epidemics. The prevalence of non-alcoholic steatohepatitis (NASH), a form of NAFLD that is associated with hepatic inflammation and ballooning of hepatocytes, is expected to increase by 63% between 2015 and 2030 in the United States (Estes, Hepatology, 2018; 67(1): 123-133), where NASH is expected to become the leading cause of liver transplantation by 2020. As liver fibrosis, but not inflammation, is associated with mortality and morbidity in NASH patients, drugs which prevent progression/induce regression of fibrosis are also a focus of biomedical research.

The development of novel compounds that simultaneously target both hyperlipidemia and glycemic control, without the adverse side-effects (e.g., weight gain) typically associated with insulin sensitising drugs is thus a desirable goal. Such compounds would be even more attractive if they could additionally prevent the progression/reverse hepatic fibrosis and reduce hepatic steatosis. The present invention addresses these needs for new treatment methods, compounds, and pharmaceutical compositions.

SUMMARY OF THE INVENTION

The present invention relates to compounds of formula (I) or pharmaceutically acceptable salts, solvates, solvates of such salts, or prodrugs thereof, pharmaceutical compositions of those compounds, processes for their preparation, and the use of those compounds or pharmaceutical compositions in the treatment of various diseases and conditions.

Preferred aspects of the invention relate to compounds of formula (I) described by group (2). Other aspects of the invention relate to compounds of formula (I) described by group (1). Other aspects of the invention relate to compounds of formula (I) described by group (3). Other aspects of the invention relate to compounds of formula (I) described by group (4). Still other aspects of the invention relate to compounds of formula (I) described by group (5).

Aspects of the invention relate to pharmaceutically acceptable salts of compounds of formula (I) described by any of groups (1), (2), (3), (4), or (5). Salts may be selected from sodium, potassium, calcium, and magnesium.

Aspects of the invention relate to pharmaceutical compositions of compounds of formula (I) described by any of groups (1), (2), (3), (4), or (5). Preferred aspects of the invention relate to pharmaceutically acceptable compositions of compounds of formula (I) described by group (2).

Aspects of the invention relate to the use of compounds of formula (I) or pharmaceutically acceptable salts, solvates, solvates of such salts, or prodrugs thereof, or pharmaceutical compositions of those compounds for use in the treatment of diseases related to metabolic diseases and liver diseases.

Additionally, the present invention relates to the pharmaceutical compositions of compounds of formula (I) or salts thereof for use in:

treating hepatic inflammation;
increasing glucose tolerance and/or reducing post-prandial glucose levels;
reducing fasting blood glucose levels;
reducing plasma insulin levels, including reducing fasting plasma insulin levels;
treating a diabetic condition such as type 2 diabetes;
reducing plasma triglycerides and/or total cholesterol;
treating body weight gain;
treating a metabolic syndrome;
treating a dyslipidemic condition, such as hypertriglyceridemia and/or hypercholesterolemia;
treating non-alcoholic fatty liver disease, including non-alcoholic steatohepatitis;
prophylactically treating or reducing development of hepatic fibrosis or reducing existing hepatic fibrosis in non-alcoholic steatohepatitis;
prophylactically treating or reducing development of steatosis or reducing hepatic steatosis;
treating parenteral nutrition associated liver disease (PNALD);
treating sclerosing cholangitis; and
treating hepatic biliary disorders.

The present invention also relates to methods for the treatment of the conditions listed above, comprising administering to a mammal in need thereof a pharmaceutically effective amount of a compound of formula (I) or pharmaceutically acceptable salts, solvates, solvates of such salts, or prodrugs thereof, or pharmaceutical compositions of those compounds.

DETAILED DESCRIPTION OF THE INVENTION

Compounds of the Invention

Figure 1:
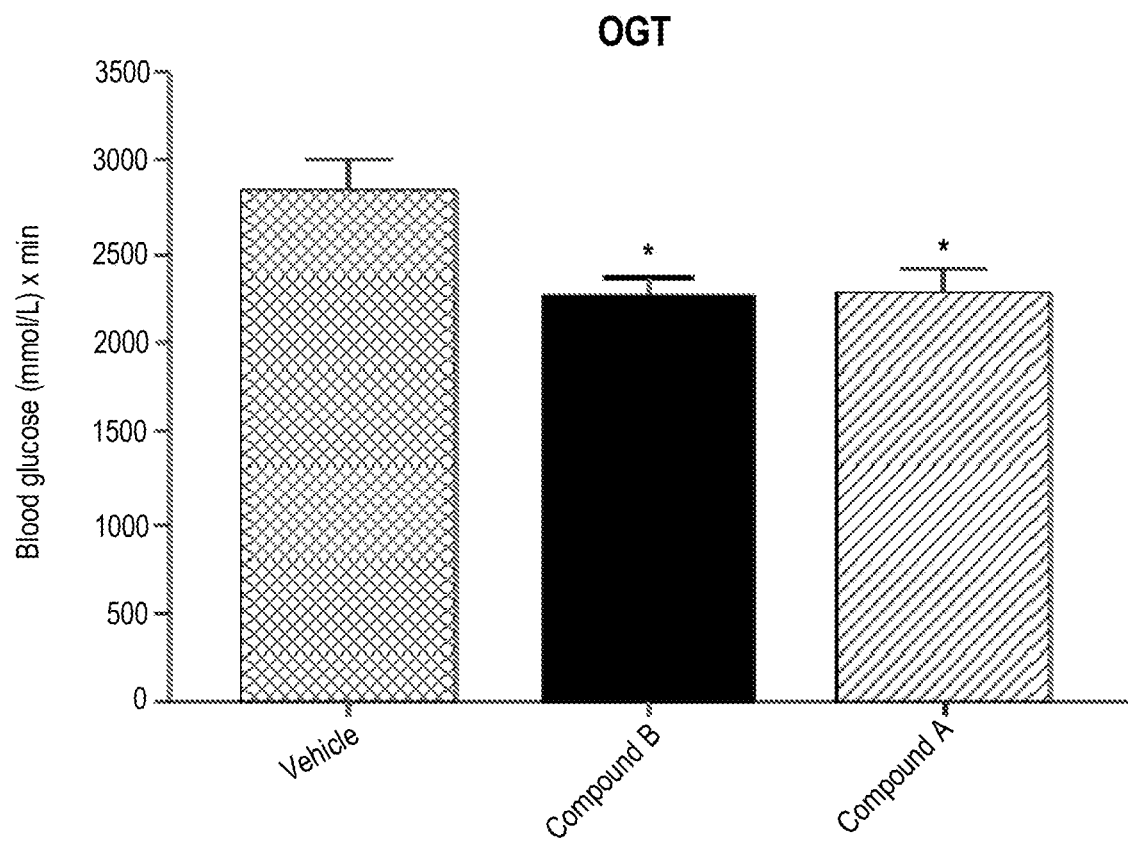
FIG. 1. Effects of Compound B and Compound A on post-prandial blood glucose in ob/ob AMLN mice FIG. 2. Effects of 4-weeks treatment with Compound B and Compound A on post-prandial blood glucose in ob/ob AMLN mice FIG. 3. Effects of 4-weeks treatment with Compound B and Compound A on fasting insulin in ob/ob AMLN mice FIG. 4. Effects of 4-weeks treatment with Compound B and Compound A on fasting blood glucose in ob/ob AMLN mice FIG. 5. Effects of 4-weeks treatment with Compound B and Compound A on hepatic collagenlal gene expression in ob/ob AMLN mice FIG. 6. Effects of 4-weeks treatment with Compound B and Compound on hepatic Slc10a2 gene expression in ob/ob AMLN mice FIG. 7. Effects of 4-weeks treatment with Compound B and Compound A on hepatic Slc51b gene expression in ob/ob AMLN mice FIG. 8. Effects of 4-weeks treatment with Compound B and Compound A on hepatic ABCC2 gene expression in ob/ob AMLN mice FIG. 9. Effects of 4-weeks treatment with Compound B and Compound A on hepatic CYP7A1 gene expression in ob/ob AMLN mice FIG. 10. Effects of 4-weeks treatment with Compound B and Compound A on hepatic CD68 gene expression in ob/ob AMLN mice FIG. 11. Effects of 4-weeks treatment with Compound B and Compound A and pioglitazone on relative bodyweight in ob/ob AMLN mice FIG. 12. Effects of 4-weeks treatment with Compound B and Compound A on hepatic low-density lipoprotein receptor (LDLr) gene expression in ob/ob AMLN mice FIG. 13. Effects of 19-days of an oral parenteral nutrition (PN) diet combined with either medium-chain triglycerides (MCT) or Compound A, compared with chow diet control, on hepatic steatosis in C57BL/6 mice FIG. 14. Effects of 19-days of an oral PN diet combined with MCT, Omegaven®, Compound A, or Compound B, compared with chow diet control, on hepatic steatosis in C57BL/6 mice. Haemotoxylin and Eosin (H&E) stained mouse liver cells magnified by 400× for: (A) chow diet control; and (B) PN-fed mice administered saline via orogastric gavage. Arrows indicate lipid accumulation.

The present disclosure relates to aromatic compounds of the general formula (I):

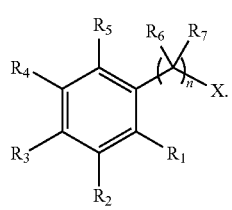

(I)

Group I

For example, the present disclosure relates to compounds of formula (I) described by group (1), wherein:

R1 is a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group or a NR8R9 group, a phenyl group, or a benzyl group;

R2, R3 and R4 are the same or different and are independently chosen from a hydrogen atom or a halogen atom; and R5 is a C4-C12 alkyl group, a C4-C12 hydroxyalkyl group, a C4-C12 haloalkyl group, a heteroalkyl group having 4-12 atoms of which 1-4 atoms are heteroatoms, a C4-C12 alkenyl group having 1-3 double bonds, a heteroalkenyl group having 1-3 double bonds and 5-12 atoms of which 1-3 atoms are heteroatoms, a C4-C12 haloalkenyl group having 1-3 double bonds, a C4-C12 alkynyl group having 1-3 triple bonds, a C(O)R10 group, a OR10 group, a S(O)mR10 group, or a NR9R10 group;

R6 and R7 are the same or different and are independently chosen from a hydrogen atom and an $C_1$-$C_6$ alkyl group, wherein R6 and R7 together can form a cycloalkyl group, such as cyclopropane, cyclobutane, cyclopentane, or cyclohexane;

R8 is a C1-C11 alkyl group, a C2-C11 hydroxyalkyl group, a C2-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a haloalkenyl group having 1-3 double bonds, or a C3-C11 alkynyl group having 1-3 triple bonds;

R9 is a hydrogen atom or a C1-C11 alkyl group;

R10 is C3-C11 alkyl group, a C3-C11 hydroxyalkyl group, a C3-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a C3-C11 haloalkenyl group having 1-3 double bonds, or a C3-C11 alkynyl group having 1-3 triple bonds;

R11 is a $C_1$-$C_4$ alkyl group;

R12 and R13 are independently chosen from a hydrogen atom and a $C_1$-$C_4$ alkyl group;

X is a hydroxymethyl or a carboxylic acid or a derivative thereof, wherein the derivative is a carboxylate, such as a carboxylic ester, a glyceride, an anhydride, a carboxamide, or a phospholipid, or a prodrug thereof;

Y is an oxygen atom, a sulphur atom, or a NR12R13 group;

m is 0, 1, or 2; and n is 0, 1 or 2;

or a pharmaceutically acceptable salt, solvate, solvate of such salt, or prodrug thereof.

Group 2

The present disclosure also relates to compounds of formula (I) described by group (2), wherein:

R1 is a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group or a NR8R9 group, a phenyl group, or a benzyl group;

R2 is a C4-C12 alkyl group, a C4-C12 hydroxyalkyl group, a C4-C12 haloalkyl group, a heteroalkyl group having 4-12 atoms of which 1-4 atoms are heteroatoms, a C4-C12 alkenyl group having 1-3 double bonds, a heteroalkenyl group having 1-3 double bonds and 5-12 atoms of which 1-3 atoms are heteroatoms, a C4-C12 haloalkenyl group having 1-3 double bonds, a C4-C12 alkynyl group having 1-3 triple bonds, a C(O)R10 group, a OR10 group, a S(O)mR10 group, or a NR9R10 group;

R3, R4 are the same or different and may be chosen from a hydrogen atom or a halogen atom, R5 is a hydrogen atom, a halogen atom, a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bond and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group or a NR8R9 group, a phenyl group, or a benzyl group, with the proviso that if R1 is a OR11 group and R5 is a hydrogen atom, a haloalkyl group, a C1-C4 alkyl group, a OR11 group, a SR11 group, or a NR12R13 group, then R2 is not a C4-C6 alkyl group, a C4-C6 alkenyl group, C4-C6 alkynyl group, or a C4-C6 alkyl-Y— group;

R6 and R7 are the same or different and are independently chosen from a hydrogen atom and an C1-C6 alkyl group, wherein R6 and R7 together can form a cycloalkyl group, such as cyclopropane, cyclobutane, cyclopentane, or cyclohexane;

R8 is a C1-C11 alkyl group, a C2-C11 hydroxyalkyl group, a C2-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a haloalkenyl group having 1-3 double bonds, or a C3-C11 alkynyl group having 1-3 triple bonds;

R9 is a hydrogen atom or a C1-C11 alkyl group;

R10 is C3-C11 alkyl group, a C3-C11 hydroxyalkyl group, a C3-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a C3-C11 haloalkenyl group having 1-3 double bonds, or a C3-C11 alkynyl group having 1-3 triple bonds;

R11 is a C1-C4 alkyl group;

R12 and R13 are independently chosen from a hydrogen atom and a C1-C4 alkyl group;

X is a hydroxymethyl or a carboxylic acid or a derivative thereof, wherein the derivative is a carboxylate, such as a carboxylic ester, a glyceride, an anhydride, a carboxamide, or a phospholipid, or a prodrug thereof;

Y is an oxygen atom, a sulphur atom, or a NR12R13 group;

m is 0, 1, or 2; and n is 0, 1 or 2;

or a pharmaceutically acceptable salt, solvate, solvate of such salt, or prodrug thereof.

Group 3

The present disclosure also relates to compounds of formula (I) described by group (3), wherein:

R1 is a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group or a NR8R9 group, a phenyl group, or a benzyl group;

R2 and R4 are the same or different and are independently chosen from a hydrogen atom and a halogen atom, R3 is a C4-C12 alkyl group, a C4-C12 hydroxyalkyl group, a C4-C12 haloalkyl group, a heteroalkyl group having 4-12 atoms of which 1-4 atoms are heteroatoms, a C4-C12 alkenyl group having 1-3 double bonds, a heteroalkenyl group having 1-3 double bonds and 5-12 atoms of which 1-3 atoms are heteroatoms, a C4-C12 haloalkenyl group having 1-3 double bonds, a C4-C12 alkynyl group having 1-3 triple bonds, a C(O)R10 group, a OR10 group, a S(O)mR10 group, or a NR9R10 group;

R5 is a hydrogen atom, a halogen atom, a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group or a NR8R9 group, a phenyl group, or a benzyl group;

with the proviso that if R1 is a haloalkyl group, a C1-C4 alkyl group, a SR11 group or a NR12R13 group and R5 is a hydrogen atom or a OR11 group, then R3 is not a C4-C6 alkyl group, a C4-C6 alkenyl group, C4-C6 alkynyl group, or a C4-C6 alkyl-Y— group;

with the proviso that if R1 is a OR11 group and R5 is a hydrogen atom, a haloalkyl group, a C1-C4 alkyl group, a OR11 group, a SR11 group or a NR12R13 group, then R3 is not a C4-C6 alkyl group, a C4-C6 alkenyl group, C4-C6 alkynyl group, or a C4-C6 alkyl-Y— group;

R6 and R7 are the same or different and are independently chosen from a hydrogen atom and an C1-C6 alkyl group, wherein R6 and R7 together can form a cycloalkyl group, such as cyclopropane, cyclobutane, cyclopentane, or cyclohexane;

R8 is a C1-C11 alkyl group, a C2-C11 hydroxyalkyl group, a C2-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a haloalkenyl group having 1-3 double bonds, or a C3-C11 alkynyl group having 1-3 triple bonds;

R9 is a hydrogen atom or a C1-C11 alkyl group;

R10 is C3-C11 alkyl group, a C3-C11 hydroxyalkyl group, a C3-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a C3-C11 haloalkenyl group having 1-3 double bonds, or a C3-C11 alkynyl group having 1-3 triple bonds;

R11 is a C1-C4 alkyl group;

R12 and R13 are independently chosen from a hydrogen atom and a C1-C4 alkyl group;

X is a hydroxymethyl or carboxylic acid or a derivative thereof, wherein the derivative is a carboxylate, such as a carboxylic ester, a glyceride, an anhydride, a carboxamide, or a phospholipid, or a prodrug thereof;

Y is an oxygen atom, a sulphur atom, or a NR12R13 group;

m is 0, 1, or 2; and n is 0, 1 or 2;

or a pharmaceutically acceptable salt, solvate, solvate of such salt, or prodrug thereof.

Group 4

The present disclosure also relates to compounds of formula (I) described by group (4), wherein:

R1 is a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group or a NR8R9 group, a phenyl group, or a benzyl group;

R2 and R3 are the same or different and are independently chosen from a hydrogen atom and a halogen atom;

R4 is a C4-C12 alkyl group, a C4-C12 hydroxyalkyl group, a C4-C12 haloalkyl group, a heteroalkyl group having 4-12 atoms of which 1-4 atoms are heteroatoms, a C4-C12 alkenyl group having 1-3 double bonds, a heteroalkenyl group having 1-3 double bonds and 5-12 atoms of which 1-3 atoms are heteroatoms, a C4-C12 haloalkenyl group having 1-3 double bonds, a C4-C12 alkynyl group having 1-3 triple bonds, a C(O)R10 group, a OR10 group, a S(O)mR10 group, or a NR9R10 group;

R5 is a hydrogen atom, a halogen atom, a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group or a NR8R9 group, a phenyl group, or a benzyl group;

with the proviso that if R1 in a haloalkyl group, a $C_1$-$C_4$ alkyl group, a OR11 group, a SR11 group, or a NR12R13 group and R5 is a hydrogen atom or a OR11 group, then R4 is not a C4-C6 alkyl group, a C4-C6 alkenyl group, C4-C6 alkynyl group, or a C4-C6 alkyl-Y— group;

R6 and R7 are the same or different and are independently chosen from a hydrogen atom and an C1-C6 alkyl group, wherein R6 and R7 together can form a cycloalkyl group, such as cyclopropane, cyclobutane, cyclopentane, or cyclohexane;

R8 is a C1-C11 alkyl group, a C2-C11 hydroxyalkyl group, a C2-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a haloalkenyl group having 1-3 double bonds, or a C3-C11 alkynyl group having 1-3 triple bonds;

R9 is a hydrogen atom or a C1-C11 alkyl group;

R10 is C3-C11 alkyl group, a C3-C11 hydroxyalkyl group, a C3-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a C3-C11 haloalkenyl group having 1-3 double bonds, or a C3-C11 alkynyl group having 1-3 triple bonds;

R11 is a C1-C4 alkyl group;

R12 and R13 are independently chosen from a hydrogen atom and a C1-C4 alkyl group;

X is a hydroxymethyl or a carboxylic acid or a derivative thereof, wherein the derivative is a carboxylate, such as a carboxylic ester, a glyceride, an anhydride, a carboxamide, or a phospholipid, or a prodrug thereof;

Y is an oxygen atom, a sulphur atom, or a NR12R13 group;

m is 0, 1, or 2; and n is 0, 1 or 2;

or a pharmaceutically acceptable salt, solvate, solvate of such salt, or prodrug thereof.

Group 5

The present disclosure also relates to compounds of formula (I) described by group (5), wherein:

R1 is a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group, a NR8R9 group, or a phenyl group, R2 is a C4-C12 alkyl group, a C4-C12 hydroxyalkyl group, a C4-C12 haloalkyl group, a heteroalkyl group having 4-12 atoms of which 1-4 atoms are heteroatoms, a C4-C12 alkenyl group having 1-3 double bonds, a heteroalkenyl group having 1-3 double bonds and 5-12 atoms of which 1-3 atoms are heteroatoms, a C4-C12 haloalkenyl group having 1-3 double bonds, a C4-C12 alkynyl group having 1-3 triple bonds, a C(O)R10 group, a OR10 group, a S(O)mR10 group, or a NR9R10 group;

R3 is a hydrogen atom or a halogen atom;

R4 is a C4-C12 alkyl group, a C4-C12 hydroxyalkyl group, a C4-C12 haloalkyl group, a heteroalkyl group having 4-12 atoms of which 1-4 atoms are heteroatoms, a C4-C12 alkenyl group having 1-3 double bonds, a heteroalkenyl group having 1-3 double bonds and 5-12 atoms of which 1-3 atoms are heteroatoms, a C4-C12 haloalkenyl group having 1-3 double bonds, a C4-C12 alkynyl group having 1-3 triple bonds, a C(O)R10 group, a OR10 group, a S(O)mR10 group, or a NR9R10 group;

R5 is a hydrogen atom, a halogen atom, a C1-C12 alkyl group, a C1-C12 hydroxyalkyl group, a C1-C12 haloalkyl group, a heteroalkyl group having 3-12 atoms of which 1-4 atoms are heteroatoms, a C3-C12 alkenyl group having 1-3 double bonds, a heteroalkenyl group having 1-3 double bonds and 5-12 atoms of which 1-3 atoms are heteroatoms, a C3-C12 haloalkenyl group having 1-3 double bonds, a C3-C12 alkynyl group having 1-3 triple bonds, a C(O)R8 group, a OR8 group, a S(O)mR8 group, a NR8R9 group, or a phenyl group;

R6 and R7 are the same or different and are independently chosen from a hydrogen atom and an C1-C6 alkyl group, wherein R6 and R7 together can form a cycloalkyl group, such as cyclopropane, cyclobutane, cyclopentane, or cyclohexane;

R8 is a C1-C11 alkyl group, a C2-C11 hydroxyalkyl group, a C2-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a haloalkenyl group having 1-3 double bonds, or a C3-C11 alkynyl group having 1-3 triple bonds;

R9 is a hydrogen atom or a C1-C11 alkyl group;

R10 is C3-C11 alkyl group, a C3-C11 hydroxyalkyl group, a C3-C11 haloalkyl group, a heteroalkyl group having 4-11 atoms of which 1-3 atoms are heteroatoms, a C3-C11 alkenyl group having 1-3 double bonds, a heteroalkenyl group having 1-3 double bonds and 5-11 atoms of which 1-3 atoms are heteroatoms, a C3-C11 haloalkenyl group having 1-3 double bonds, or a C3-C11 alkynyl group having 1-3 triple bonds;

R11 is a C1-C4 alkyl group;

R12 and R13 are independently chosen from a hydrogen atom and a C1-C4 alkyl group;

X is a hydroxymethyl or a carboxylic acid or a derivative thereof, wherein the derivative is a carboxylate, such as a carboxylic ester, a glyceride; an anhydride, a carboxamide, or a phospholipid, or a prodrug thereof;

Y is an oxygen atom, a sulphur atom, or a NR12R13 group;

m is 0, 1, or 2; and n is 0.1 or 2;

or a pharmaceutically acceptable salt, solvate, solvate of such salt, or prodrug thereof.

In some embodiments, the aromatic compounds of the general formula (I) are described by the following embodiments of compounds of groups (I), (II), (III), (IV), or (V).

Group 1

In some embodiments, for compounds of formula (I) described by group (1):
R1 is a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, a phenyl group, or a benzyl group; and
R5 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group, wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and 5-8 atoms of which 1 atom is a heteroatom, a C3-C8 haloalkenyl group having 1-2 double bonds, or a C3-C8 alkynyl group having 1-2 triple bonds.

Group 2

In some embodiments, for compounds of formula (I) described by group (2):
R1 is a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group or a NR9R11 group, a phenyl group, or a benzyl group;
R2 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
R5 is a hydrogen atom, a halogen atom, a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, a phenyl group, or a benzyl group;
with the proviso that if R1 is a OR11 group and R5 is a hydrogen atom, a haloalkyl group, a C1-C4 alkyl group, a OR11 group, a SR11 group, or a NR12R13 group, then R2 is not a C4-C6 alkyl group, a C4-C6 alkenyl group, C4-C6 alkynyl group, or a C4-C6 alkyl-Y— group;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and 5-8 atoms of which 1 atom is a heteroatom, a C3-C8 haloalkenyl group having 1-2 double bonds, or a C3-C8 alkynyl group having 1-2 triple bonds.

Group 3

In some embodiments, for compounds of formula (I) described by group (3):
R1 is a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, a phenyl group, or a benzyl group;
R3 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
and
R5 is a hydrogen atom, a halogen atom, a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, a phenyl group, or a benzyl group;
with the proviso that if R1 is a haloalkyl group, a C1-C4 alkyl group, a SR11 group or a NR12R13 group and R5 is a hydrogen atom or a OR11 group, then R3 is not a C4-C6 alkyl group, a C4-C6 alkenyl group, C4-C6 alkynyl group, or a C4-C6 alkyl group; and
with the proviso that if R1 is a OR11 group and R5 is a hydrogen atom, a haloalkyl group, a C1-C4 alkyl group, a OR11 group, a SR11 group or a NR12R13 group, then R3 is not a C4-C6 alkyl group, a C4-C6 alkenyl group, C4-C6 alkynyl group, or a C4-C6 alkyl-Y— group;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and 5-8 atoms of which 1 atom is a heteroatom, a C3-C8 haloalkenyl group having 1-2 double bonds, or a C3-C8 alkynyl group having 1-2 triple bonds.

Group 4

In some embodiments, for compounds of formula (I) described by group (4):
R1 is a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, a phenyl group, or a benzyl group;
R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
R5 is a hydrogen atom, a halogen atom, a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, a phenyl group, or a benzyl group;
with the proviso that if R1 is a C1-C4 haloalkyl group, a C1-C4 alkyl group, a OR11 group, a SR11 group, or a NR12R13 group and R5 is a hydrogen atom or a OR11 group, then R4 is not a C4-C6 alkyl group, a C4-C6 alkenyl group, C4-C6 alkynyl group, or a C4-C6 alkyl-Y— group;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and 5-8 atoms of which 1 atoms is a heteroatom, a C3-C8 haloalkenyl group having 1-2 double bonds, or a C3-C8 alkynyl group having 1-2 triple bonds Group 5

In some embodiments, for compounds of formula (I) described by group (5):
R1 is a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, or a phenyl group;
R2 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group;
R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
R5 is a hydrogen atom, a halogen atom, a C1-C4 alkyl group, a C1-C4 hydroxyalkyl group, a C1-C4 haloalkyl group, a heteroalkyl group having 3-4 atoms of which 1 atom is a heteroatom, a C(O)R11 group, a OR11 group, a S(O)mR11 group, a NR9R11 group, a phenyl group, or a benzyl group;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and 5-8 atoms of which 1 atom is a heteroatom, a C3-C8 haloalkenyl group having 1-2 double bonds, a C3-C8 alkynyl group having 1-2 triple bonds.

In some embodiments, the aromatic compounds of the general formula (I) are described by the following embodiments of compounds of groups (I), (II), (III), (IV), or (V).

Group 1

In some embodiments, for compounds of formula (I) described by group (1):
R1 is a C1-C4 alkyl group, a C1-C4 hydroxyalkyl group, a C1-C4 haloalkyl group, a heteroalkyl group having 3-4 atoms of which 1 atom is a heteroatom, or a OR11 group; and
R5 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and and 5-8 atoms of which 1 atom is a heteroatom, a C3-C8 haloalkenyl group having 1-2 double bonds, or a C3-C8 alkynyl group having 1-2 triple bonds.

Group 2

In some embodiments, for compounds of formula (I) described by group (2):
R1 is a C1-C4 alkyl group, a C1-C4 hydroxyalkyl group, a C1-C4 haloalkyl group, or a heteroalkyl group having 3-4 atoms of which 1 atom is a heteroatom;
R2 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
R5 is a hydrogen atom, a halogen atom, a C1-C4 alkyl group, a C1-C4 hydroxyalkyl group, a C1-C4 haloalkyl group, or a heteroalkyl group having 3-4 atoms of which 1 atom is a heteroatom;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and and 5-8 atoms of which 1 atom is a heteroatom, a C3-C8 haloalkenyl group having 1-2 double bonds, or a C3-C8 alkynyl group having 1-2 triple bonds.

Group 3

In some embodiments, for compounds of formula (I) described by group (3):
R1 is a C1-C4 alkyl group, a C1-C4 hydroxyalkyl group, a C1-C4 haloalkyl group, a heteroalkyl group having 3-4 atoms of which 1 atom is a heteroatom, or a OR11 group;
R3 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
R5 is a hydrogen atom, a halogen atom, a C1-C4 alkyl group, a C1-C4 hydroxyalkyl group, a C1-C4 haloalkyl group, a heteroalkyl group having 3-4 atoms of which 1 atom is a heteroatom, or a OR11 group;
with the proviso that if R1 is a haloalkyl group or a C1-C4 alkyl group and R5 is a hydrogen atom or a OR11 group, then R3 is not a C4-C6 alkyl group, a C4-C6 alkenyl group, a C4-C6 alkynyl group or a C4-C6 alkyl-Y— group; and
with the proviso that if R1 is a OR11 group and R5 is a hydrogen atom, a haloalkyl group, a C1-C4 alkyl group, or a OR11 group, then R3 is not a C4-C6 alkyl group, a C4-C6 alkenyl group, C4-C6 alkynyl group, or a C4-C6 alkyl-Y— group;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and 4-8 atoms of which 1 atom is a heteroatom, a C3-C8 haloalkenyl group having 1-2 double bonds, or a C3-C8 alkynyl group having 1-2 triple bonds.

Group 4

In some embodiments, for compounds of formula (I) described by group (4):
R1 is a C1-C4 alkyl group, a C1-C4 hydroxyalkyl group, a C1-C4 haloalkyl group, a heteroalkyl group with 3-4 atoms of which 1 atom is a heteroatom, or a OR11 group;
R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
R5 is a hydrogen atom, a halogen atom, C1-C4 alkyl group, a C1-C4 hydroxyalkyl group, a C1-C4 haloalkyl group, a heteroalkyl group having 3-4 atoms of which 1 atom is a heteroatom, or a OR11 group;
with the proviso that if R1 is a haloalkyl group, a C1-C4 alkyl group, or a OR11 group and R5 is a hydrogen atom or a OR11 group, then R4 is not a C4-C6 alkyl group, a C4-C6 alkenyl group, a C4-C6 alkynyl group, or a C4-C6 alkyl-Y— group;
wherein
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and 5-8 atoms of which 1 atom is a heteroatom, a C3-C8 haloalkenyl group having 1-2 double bonds, or a C3-C8 alkynyl group having 1-2 triple bonds.

Group 5

In some embodiments, for compounds of formula (I) described by group (5):
R1 is a C1-C4 alkyl group, a C1-C4 hydroxyalkyl group, a C1-C4 haloalkyl group, a heteroalkyl group having 3-4 atoms of which 1 atom is a heteroatom, or a OR11 group;
R2 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 5-9 atoms of which 1-2 atoms are heteroatoms and 1-2 double bonds, a C4-C9 haloalkenyl group having 1-2 double bonds, a C4-C9 alkynyl group having 1-2 triple bonds, a C(O)R14 group, a OR14 group, a S(O)mR14 group, or a NR9R14 group;

R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and R5 is a hydrogen atom, a halogen atom, a C1-C4 alkyl group, a C1-C4 hydroxyalkyl group, a C1-C4 haloalkyl group, a heteroalkyl group having 3-4 atoms of which 1 atom is a heteroatom, or a OR11 group;

wherein

R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and and 5-8 atoms of which 1 atom is a heteroatom, a C3-C8 haloalkenyl group having 1-2 double bonds, or a C3-C8 alkynyl group having 1-2 triple bonds.

EMBODIMENTS

The following embodiments relate to compounds of formula (I) described by any of groups (1), (2), (3), (4), or (5).

'Alkyl' refers to a straight chain, a branched chain or a cyclic alkyl group. In at least some embodiments, the alkyl group may be chosen from methyl, ethyl, propyl, n-propyl, isopropyl, butyl, n-butyl, sec-butyl, pentyl, n-pentyl, hexyl, n-hexyl, heptyl, n-heptyl, octyl, n-octyl, nonyl, n-nonyl, decyl, and n-decyl.

'Alkenyl' refers to a straight chain or branched chain alkenyl group. In at least some embodiments, the alkenyl group may be chosen from allyl, 2-butenyl, 3-hexenyl, 4-heptenyl, 5-octenyl, and 6-nonenyl. In some embodiments, the alkenyl group has 1 double bond. In some embodiments, the alkenyl group has 2 double bonds. In some embodiments, the alkenyl group has 3 double bonds. In some embodiment, the alkenyl group has an ω-3 double bond. In some embodiments, the alkenyl group has 1 double bond and it is in the ω-3 position. In some embodiments, the alkenyl group is a C4-C9 straight chain alkenyl group having 1 double bond at the ω-3 position. In some embodiments, the double bond is in Z configuration.

In some embodiments the alkenyl group has 1-3 double bonds and each double bond is in Z configuration. In some embodiments, the alkenyl group is a C5-C9 straight chain alkenyl group having 1 double bond in the ω-3 position and it is in Z configuration.

In some embodiments, the alkenyl group is a C5 straight chain alkenyl group having 1 double bond at the ω-3 position. In some embodiments, the alkenyl group is a C6 straight chain alkenyl group having 1 double bond at the ω-3 position. In some embodiments, the alkenyl group is a C7 straight chain alkenyl group having 1 double bond at the ω-3 position. In some embodiments, the alkenyl group is a C8 straight chain alkenyl group having 1 double bond at the ω-3 position. In some embodiments, the double bond is in Z configuration.

'Alkynyl' refers to a straight chain or branched chain alkynyl group. In some embodiments, the alkynyl group may be chosen from a C4-C12 alkynyl group having 1-3 triple bonds. In some embodiments, the alkynyl group has 1 triple bond. In some embodiments, the alkynyl group may be chosen from a C5-C10 alkynyl group having 1 triple bond. In some embodiments, the triple bond is in the ω-3 position.

'Hydroxyalkyl' refers to a hydroxy derivative of a straight chain or branched chain alkyl group. In some embodiments, the hydroxyalkyl group may be chosen from a C1-C12 hydroxyalkyl group, a C2-C11 hydroxyalkyl group, a C1-C6 hydroxyalkyl group, or a C1-C4 hydroxyalkyl group. In some embodiments, the hydroxyalkyl group may be chosen from a hydroxymethyl group, a hydroxyethyl group, a hydroxypropyl group, or a hydroxybutyl group. 'Heteroalkyl' refers to a straight chain or branched chain alkyl group, containing one or more heteroatoms selected from S, O and N, where the alkyl chain optionally may contain one or more hydroxy groups, one or more halogen atoms and/or a carbonyl group.

A heteroalkyl group cannot contain a heteroatom in the first position of the chain with respect to the aromatic ring. For example, a group with the formula —OC6H13 is not a heteroalkyl group under this definition.

A hydroxyalkyl group is not considered a heteroalkyl group under this definition. For example, a group with the formula —C6H12OH is not a heteroalkyl group under this definition. A group with the formula —C4H8OC2H4OH is considered a heteroalkyl group having 7 atoms, of which 1 is a heteroatom (oxygen), and further containing a hydroxy group.

In some embodiments, the heteroalkyl group has 3-12 atoms. In some embodiments, the heteroalkyl group has 3-9 atoms. In some embodiments, the heteroalkyl group has 4-8 atoms. In some embodiments, the heteroalkyl group has 5 or 6 atoms. In some embodiments, the heteroalkyl group has 1-3 heteroatoms. In some embodiments, the heteroalkyl group has 3-9 atoms of which 1-3 are heteroatoms.

In some embodiments, the heteroalkyl group has 4-8 atoms of which 1 is a heteroatom. In some embodiments, the heteroatom is in the second position of the heteroalkyl group. In some embodiments, the heteroatom is in the third position of the heteroalkyl group. In some embodiments, the heteroatom is in the fourth position of the heteroalkyl group. In some embodiments, the heteroatom is oxygen. In some embodiments, the heteroatom is sulphur. In some embodiments, the formula of the heteroalkyl group may be chosen from —CH2OC4H9, —C2H4OC3H7, —C2H4OC2H3, —C3H6OCH3, —CH2OC5H11, —CH2OC3H7, —C2H4OC3H7, —C3H6OC2H7.

An 'alkyl-Y—' group is a heteroalkyl group having 1 heteroatom in the a position with respect to the aromatic ring. Y may be chosen from an oxygen atom, a sulphur atom, and a NR12NR13 group, wherein R12 and R13 are independently chosen from a hydrogen group and C1-C4 group. For example, in some embodiments, Y may be oxygen. In some embodiments, a C4 alkyl-Y— group has the formula —OC4H9 or —SC4H9. In some embodiments, a C5 alkyl-Y— group has the formula —OC5H11 or —SC5H11. In some embodiments, a C6 alkyl-Y-group has the formula —OC6H13 or —SC6H13.

'Heteroalkenyl' refers to a straight chain or branched chain alkenyl group, containing one or more heteroatoms selected from S, O and N in the main chain, where the alkenyl chain optionally may contain hydroxy groups, halogen atoms and/or a carbonyl group. In some embodiments, the heteroatom is a sulphur. In some embodiments, the heteroatom is an oxygen. In some embodiments, the alkenyl group has 2 double bonds. In some embodiments, the alkenyl group has 3 double bonds. In some embodiment, the alkenyl group has an ω-3 double bond. In some embodiments, the alkenyl group has 1 double bond and it is in the ω-3 position. In some embodiments, the heteroalkenyl group has 3-9 atoms of which 1 atom is a heteroatom and 1 double bond. In some embodiments, the heteroalkenyl group has 6-9 atoms of which 1 atom is a heteroatom and 1 double bond, wherein the heteroatom is an oxygen, and wherein the double bond is in the ω-3 position. In some embodiments, the double bond is in Z configuration.

The heteroatom cannot be in the first or last position of the heteroalkenyl group. For example, a heteroalkenyl group cannot contain a heteroatom in the first position of the chain with respect to the aromatic ring. For example, a group with the formula —OCH2CH═CHCH2CH3 is not a heteroalkyl group under this definition.

'Haloalkyl' refers to a straight chain or branched chain alkyl group, in which one or more hydrogen atoms have been substituted by a halogen atom. For example, the halogen atom may be chosen from fluorine, chlorine, bromine, and iodine. In some embodiments, the halogen atom is F. In some embodiments, the haloalkyl group contains a —CF3 group.

In some embodiments, a haloalkyl group may also be a heteroalkyl group. In some embodiments, the haloalkyl may be a heteroalkyl group having 6-9 atoms of which 1-3 atoms are heteroatoms. In some embodiments, the haloalkyl group is a heteroalkyl group having 1 heteroatom. In some embodiments, the heteroatom is an oxygen atom. In some embodiments, the halogen atom is fluorine.

'Haloalkenyl' refers to a straight chain or branched chain alkenyl group, in which one or more hydrogen atoms have been substituted by a halogen atom. For example, the halogen atom may be chosen from fluorine, chlorine, bromine, and iodine.

In some embodiments, a haloalkenyl group may also be a heteroalkenyl group.

In some embodiments, X is a carboxylic acid. In some embodiments, X is a carboxylic acid derivative. In some embodiments, X may be chosen from a carboxylate, a glyceride, an anhydride, a carboxamide, and a phospholipid. In some embodiments, X is a carboxylate such as a carboxylic ester. In some embodiments, X is a carboxylic ester such as an acetate group. In some embodiments, X is a glyceride and, in some embodiments, the glyceride may be in the form of a triglyceride, a 1,2-diglyceride, a 1,3 diglyceride, a 1-monoglyceride, or a 2-monoglyceride. In some embodiments, X is an anhydride. In some embodiments, X is a carboxamide and, in some embodiments, the carboxamide may be chosen from N-methyl carboxamide, N,N-dimethyl carboxamide, N-ethyl carboxamide and N,N-diethyl carboxamide.

In some embodiments, X is a phospholipid In some embodiments, n is 0. In some embodiments X is a carboxylic acid, a carboxamide, or a hydroxymethyl. In some embodiments, n is 0 and X is a carboxylic acid. In some embodiments, n is 0 and X is a carboxamide having the formula —C(O)NH2. In some embodiments, n is 0 and X is a hydroxymethyl.

In some embodiments, n is 1 or 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane. In some embodiments, n is 1 or 2 and X is chosen from a hydroxymethyl group, a carboxylic acid, a carboxylic ester, or a carboxamide.

In some embodiments, n is 1 and R6 and R7 are the same or different and are independently chosen from a hydrogen atom and a C1-C2 alkyl group. In some embodiments, n is 1 and R6 and R7 are both hydrogen atoms. In some embodiments, n is 1 and R6 and R7 are both methyl groups. In some embodiments, R6 is a methyl group and R7 is a hydrogen. In some embodiments, n is 1, R6 and R7 are both hydrogen atoms, and X is a carboxylic acid. In some embodiments, n is 1, R6 and R7 are both methyl groups, and X is a carboxylic acid. In some embodiments, n is 1, R6 and R7 are both hydrogen atoms, and X is an acetate group.

In some embodiments, X may be chosen from a hydroxymethyl group, a carboxylic acid, a carboxylic ester, and a carboxamide.

Group 1 Embodiments

The following embodiments relate to compounds of formula (I) described by group (1).

In some embodiments, R1 is a C1-C4 alkyl group, a C1-C4 hydroxyalkyl group, a C1-C4 haloalkyl group, a heteroalkyl group having 3-4 atoms of which 1 is a heteroatom, or an —O—(C1-C4) alkyl group.

In some embodiments, R5 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, a —S(O)2-(C3-C8) alkyl group, an amine group having a hydrogen atom and a C3-C8 alkyl group, an amine group having a hydrogen atom and a (C1-C6) ketone group, or an amine group having a C1-C9 alkyl group and a C3-C8 alkyl group.

In some embodiments, R5 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S- heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, or a —S—(C3-C8) alkynyl group having 1-2 triple bonds.

In some embodiments, R1 is a C1-C2 alkyl group, a C1-C2 hydroxyalkyl group, a C1-C2 haloalkyl group, or an —O—(C1-C2) alkyl group. In some embodiments, R5 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, an —O—(C3-C8) hydroxyalkyl group, an —O—(C3-C8) haloalkyl, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S— heteroalkenyl group having 5-8 atoms of which 1 is heteroatom and 1 double bond, a —S—(C3-C8) haloalkenyl group having 1-2 double bonds, or a —S—(C3-C8) alkynyl group having 1-2 triple bonds.

In some embodiments, R1 is a C1-C2 alkyl group, a C1-C2 hydroxyalkyl group, or an —O—(C1-C2) alkyl group. In some embodiments, R5 is a C4-C9 alkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, —O—(C3-C8) hydroxyalkyl group, an —O—(C3-C8) haloalkyl group, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, a —S—(C3-C8) alkyl group, a —S-heteroalkyl group having 4-8 atoms of which 1-2 are heteroatoms, a —S—(C3-C8) alkenyl group having 1-2 double bonds, or a —S— heteroalkenyl group having 5-8 atoms of which 1 is heteroatom and 1 double bond.

In some embodiments, R1 is a C1-C2 alkyl group or an —O—(C1-C2) alkyl group. In some embodiments, R5 is a C5-C8 straight chain alkyl group, a C6-C8 alkenyl group having 1 double bond, an —O—(C4-C6) alkyl group, an —O—(C4-C6) hydroxyalkyl group, an —O—(C4-C6) haloalkyl group, an —O-heteroalkyl group having 4-6 atoms of which 1 are heteroatoms and the heteroatom is an O, an —O—(C5-C8) alkenyl group having 1 double bond. In some embodiments the double bond is in the ω-3 position. In some embodiments the double bond is in Z configuration.

In some embodiments, R1 is a methyl group. In some embodiments, R1 is —OCH3. In some embodiments, R5 is an —O—(C3-C8) alkyl group and may have the formula —OC3H7, —OC4H9, —OC5H11, —OC6H13, —OC7H15, or —OC8H17. In some embodiments, R5 is a —S—(C3-C8) alkyl group and may have the formula —SC3H7, —SC4H9, —SC5H11, —SC6H13, —SC7H15, or —SC8H17. In some embodiments, R5 is an —O—(C3-C8) alkenyl group having 1-2 double bonds and may have the formula —OCH2CH=CHCH2CH3, —O(CH2)2CH=CHCH2CH3, —O(CH2)3CH=CHCH2CH3, or —O(CH2)4CH=CHCH2CH3. In some embodiments, R5 is a —S—(C3-C8) alkenyl group having 1-2 double bonds and may have the formula —SCH2CH=CHCH2CH3, —S(CH2)2CH=CHCH2CH3, —S(CH2)3CH=CHCH2CH3, or —S(CH2)4CH=CHCH2CH3.

In some embodiments, R2, R3, and R4 are each a hydrogen atom. In some embodiments, one or more of R2, R3, and R4 is a halogen atom. In some embodiments, one or more of R2, R3, and R4 is a fluorine atom.

In some embodiments, R1 is a methyl group, or —OCH3; R5 is a C4-C8 alkyl group, an —O—(C4-C8) alkyl group, a C4-C8 alkenyl group having 1 double bond, or an —O—(C4-C8) alkenyl group having 1 double bond; R2, R3, and R4 are each hydrogen atoms; n is 0; and X is a carboxylic acid.

In some embodiments, n is 0. In other embodiments, n is 1. In other embodiments, n is 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane.

In some embodiments, n is 0. In some embodiments X is a carboxylic acid, a carboxamide, a hydroxymethyl, or a carboxylic ester such as an acetate group. In some embodiments, n is 0 and X is a carboxylic acid. In some embodiments, n is 0 and X is a carboxamide having the formula —C(O)NH2. In some embodiments, n is 0 and X is a hydroxymethyl.

In some embodiments, n is 1 or 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane. In some embodiments, n is 1 or 2 and X is chosen from a hydroxymethyl group, a carboxylic acid, a carboxamide, or a carboxylic ester such as an acetate group.

In some embodiments, n is 1 and R6 and R7 are the same or different and are independently chosen from a hydrogen atom and a C1-C2 alkyl group. In some embodiments, n is 1 and R6 and R7 are both hydrogen atoms. In some embodiments, n is 1 and R6 and R7 are both methyl groups. In some embodiments, R6 is a methyl group and R7 is a hydrogen. In some embodiments, n is 1, R6 and R7 are both hydrogen atoms, and X is a carboxylic acid. In some embodiments, n is 1, R6 and R7 are both methyl groups, and X is a carboxylic acid.

In some embodiments, X may be chosen from a hydroxymethyl group, a carboxylic acid, a carboxamide, and a carboxylic ester such as an acetate group.

In some embodiments, compounds of formula (I) described by group (1) are described by formula (IA):

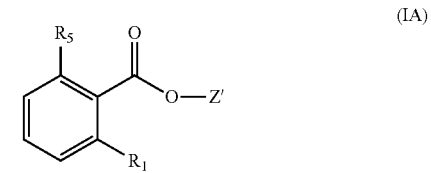

(IA)

wherein R1 and R5 are each defined by any one of the foregoing embodiments for group (1). In some embodiments, Z' is H or a C1-C4 alkyl group.

In some embodiments R1 is a C1-C2 alkyl group or an —O—(C1-C2) alkyl group. In some embodiments, R5 is a C5-C8 straight chain alkyl group, a C6-C8 alkenyl group having 1 double bond, an —O—(C4-C6) alkyl group, an —O—(C4-C6) hydroxyalkyl group, an —O—(C4-C6) haloalkyl group, an —O-heteroalkyl group having 4-6 atoms of which 1 are heteroatoms and the heteroatom is an O, an —O—(C5—C8) alkenyl group having 1 double bond. In some embodiments the double bond is in the ω-3 position. In some embodiments the double bond is in Z configuration. In some embodiments, Z' is H. In some embodiments Z' is a methyl or ethyl group.

Group 2 Embodiments

The following embodiments relate to compounds of formula (I) described by group (2).

In some embodiments, R1 is a C1-C4 alkyl group, a C1-C4 hydroxyalkyl group, a C1-C4 haloalkyl group, a heteroalkyl group having 3-4 atoms of which 1 is a heteroatom, or a phenyl group.

In some embodiments, R2 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) alkynyl group having 1-2 triple bonds, a —S—(C3-C8) haloalkenyl group having 1-2 double bonds, a —S—(C3-C8) alkynyl group having 1-2 triple bonds, a —C(O)—(C3-C8) alkyl group, a —C(O)-heteroalkyl group having 4-8 atoms of which 1-2 are heteroatoms, —C(O)—(C3-C8) alkenyl group having 1-2 double bonds, a —S(O)—(C3-C8) alkyl group, a —S(O)-heteroalkyl group having 4-8 atoms of which 1-2 are heteroatoms, a —S(O)—(C3-C8) alkenyl group having 1-2 double bonds, a —S(O)-heteroalkenyl group having 5-8 atoms of which 1 is heteroatom and 1 double bond, a —S(0)2-(C3-C8) alkyl group, —S(O)2-heteroalkyl group having 4-8 atoms of which 1-2 are heteroatoms, a —S(0)2-(C3-C8) alkenyl group having 1-2 double bonds, a —S(0)2-heteroalkyl group having 4-8 atoms of which 1-2 are heteroatoms; an amine group having a hydrogen atom and a C3-C8 alkyl group; an amine group having a hydrogen atom and a heteroalkyl group having 4-8 atoms of which 1-2 are heteroatoms; an amine group having a hydrogen atom and a ketone group; an amine group having a C1-C9 alkyl group and a C3-C8 alkyl group; an amine group having a C1-C9 alkyl group and a heteroalkyl group having 4-8 atoms of which 1 is a heteroatom, or an amine group having a C1-C9 alkyl group and a C3-C8 alkenyl group having 1-2 double bonds.

In some embodiments, R1 is a C1-C3 alkyl group, a C1-C3 hydroxyalkyl group, a C1-C2 haloalkyl group, or a phenyl group. In some embodiments, R1 is chosen from a methyl group, an ethyl group, an isopropyl group, a —CF3 group, a —(CH2)3OH group, and a phenyl group.

In some embodiments, R2 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —C(O)—(C3-C8) alkyl group, a —S(O)—(C3-C8) alkyl group, a —S(O)2-(C3-C8) alkyl group, an amine group having a hydrogen atom and a C3-C8 alkyl group, an amine group having a hydrogen atom and a (C1-C6) ketone group, or an amine group having a C1-C9 alkyl group and a C3-C8 alkyl group.

In some embodiments, R1 is a C1-C3 alkyl group or a C1-C3 hydroxyalkyl group. In some embodiments, R2 is a C4-C9 alkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, O—(C3-C8) hydroxyalkyl group, an —O—(C3-C8) haloalkyl group, an —O-heteroalkyl group having 4-8 atoms of which 1-2 are heteroatoms, an —O—(C4-C8) alkenyl group having 1-2 double bonds, an —O-heteroalkenyl group having 5-8 atoms of which 1 is heteroatom and 1 double bond, an —O—(C4-C8) haloalkenyl group having 1-2 double bonds, a —S—(C3-C8) alkyl group, a —S-heteroalkyl group having 4-8 atoms of which 1-2 are heteroatoms, a —S—(C4-C8) alkenyl group having 1-2 double bonds, a —S-heteroalkenyl group having 5-8 atoms of which 1 is heteroatom and 1 double bond; a —C(O)—(C3-C8) alkyl group, a —S(O)—(C3-C8) alkyl group, a —S(O)2-(C3-C8) alkyl group, an amine group having a hydrogen atom and a C3-C8 alkyl group, an amine group having a hydrogen atom and a (C1-C6) ketone group; an amine group having a C1-C9 alkyl group and a C3-C8 alkyl group.

In some embodiments, R1 is a C1-C2 alkyl group or a C1-C2 hydroxyalkyl group. In some embodiments, R2 is a C4-C9 alkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, O—(C3-C8) hydroxyalkyl group, an —O—(C3-C8) haloalkyl group, an —O-heteroalkyl group having 4-8 atoms of which 1-2 are heteroatoms, an —O—(C4-C8) alkenyl group having 1-2 double bonds, an —O-heteroalkenyl group having 5-8 atoms of which 1 is heteroatom and 1 double bond, an —O—(C4-C8) haloalkenyl group having 1-2 double bonds, a —S—(C3-C8) alkyl group, a —S-heteroalkyl group having 4-8 atoms of which 1-2 are heteroatoms, a —S—(C4-C8) alkenyl group having 1-2 double bonds, or a —S-heteroalkenyl group having 5-8 atoms of which 1 is heteroatom and 1 double bond.

In some embodiments, R2 is a C5-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond and the double bond is in the ω-3 position.

In some embodiments, R1 is a C1-C2 alkyl group or a C1-C2 hydroxyalkyl group and R2 is a C5-C8 straight chain alkyl group, a C6-C8 alkenyl group having 1 double bond, an —O—(C4-C6) alkyl group, an —O—(C4-C6) hydroxyalkyl group, an —O—(C4-C6) haloalkyl group, an —O-heteroalkyl group having 4-6 atoms of which 1 are heteroatoms and the heteroatom is an O, an —O—(C5-C8) alkenyl group having 1 double bond.

In some embodiments, R1 is a methyl group or an ethyl group and R2 is a C5-C8 straight chain alkyl group, a C6-C8 alkenyl group having 1 double bond, an —O—(C4-C6) straight chain alkyl group, an —O—(C4-C6) hydroxyalkyl group, an —O—(C4-C6) haloalkyl group, an —O-heteroalkyl group having 4-6 atoms of which 1 are heteroatoms and the heteroatom is an O, an —O—(C5-C8) alkenyl group having 1 double bond.

In some embodiments, R1 is a methyl group or an ethyl group and R2 is a C5-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond.

In some embodiments, R1 is a methyl group and R2 is a C5-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond and the double bond is in the ω-3 position. In some embodiments, the double bond is in the Z configuration.

In some embodiments, R1 is a methyl group. In some embodiments, R2 is an —O—(C3-C8) alkyl group and may have the formula —OC3H7, —OC4H9, —OC5H11, —OC6H13, —OC7H15, or —OC8H17. In some embodiments, R2 is a —S—(C3-C8) alkyl group and may have the formula —SC3H7, —SC4H9, —SC5H11, —SC6H13, —SC7H15, or —SC8H17. In some embodiments, R2 is an —O—(C3-C8) alkenyl group having 1-2 double bonds and may have the formula —OCH2CH=CHCH2CH3, —O(CH2)2CH=CHCH2CH3, —O(CH2)3CH=CHCH2CH3, or —O(CH2)4CH=CHCH2CH3. In some embodiments, R2 is a —S—(C3-C8) alkenyl group having 1-2 double bonds and may have the formula —SCH2CH=CHCH2CH3, —S(CH2)2CH=CHCH2CH3, —S(CH2)3CH=CHCH2CH3, or —S(CH2)4CH=CHCH2CH3.

In some embodiments, R3, R4, and R5 are each a hydrogen atom. In some embodiments, R5 is a C1-C4 alkyl group, a C1-C4 hydroxyalkyl group, a C1-C4 haloalkyl group, or a heteroalkyl group having 3-4 atoms of which 1 atom is a heteroatom. In some embodiments, one or more of R3, R4, and R5 is a halogen atom. In some embodiments, one or more of R2, R3, and R4 is a fluorine atom. In some embodiments, R3 and R5 are each a hydrogen atom and R4 is a fluorine atom.

In some embodiments, n is 0. In other embodiments, n is 1. In other embodiments, n is 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane.

In some embodiments, n is 0. In some embodiments X is a carboxylic acid, a carboxamide, a hydroxymethyl, or a carboxylic ester such as an acetate group. In some embodiments, n is 0 and X is a carboxylic acid. In some embodiments, n is 0 and X is a carboxamide having the formula —C(O)NH2. In some embodiments, n is 0 and X is a hydroxymethyl.

In some embodiments, n is 1 or 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane. In some embodiments, n is 1 or 2 and X is chosen from a hydroxymethyl group, a carboxylic acid, a carboxamide, or a carboxylic ester such as an acetate group.

In some embodiments, n is 1 and R6 and R7 are the same or different and are independently chosen from a hydrogen atom and a C1-C2 alkyl group. In some embodiments, n is 1 and R6 and R7 are both hydrogen atoms. In some embodiments, n is 1 and R6 and R7 are both methyl groups. In some embodiments, R6 is a methyl group and R7 is a hydrogen. In some embodiments, n is 1, R6 and R7 are both hydrogen atoms, and X is a carboxylic acid. In some embodiments, n is 1, R6 and R7 are both methyl groups, and X is a carboxylic acid.

In some embodiments, X may be chosen from a hydroxymethyl group, a carboxylic acid, a carboxamide, and a carboxylic ester such as an acetate group.

In some embodiments:
R1 is a methyl group or an ethyl group;
R2 is a C5-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond and the double bond is in the ω-3 position;
R3, R4, and R5 are each a hydrogen atom;
n is 0 or 1;
R6 and R7 are the same or different and independently chosen from a hydrogen atom and a methyl group;
and X is chosen from a hydroxymethyl group, a carboxylic acid, a carboxamide, and a carboxylic ester such as an acetate group.

In some embodiments:
R1 is a methyl group;
R2 is a C5-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond and the double bond is in the ω-3 position;
R3, R4, and R5 are each a hydrogen atom;
n is 0;
and X is a carboxylic acid.

In some embodiments:
R1 is a methyl group;
R2 is a C5-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond and the double bond is in the ω-3 position;

R3, R4, and R5 are each a hydrogen atom;
n is 1;
R6 and R7 are each a hydrogen atom
and X is carboxylic acid.

In some embodiments, compounds of formula (I) described by group (2) are described by formulas (IB-1), (IB-2), (IB-3), or (IB-4):

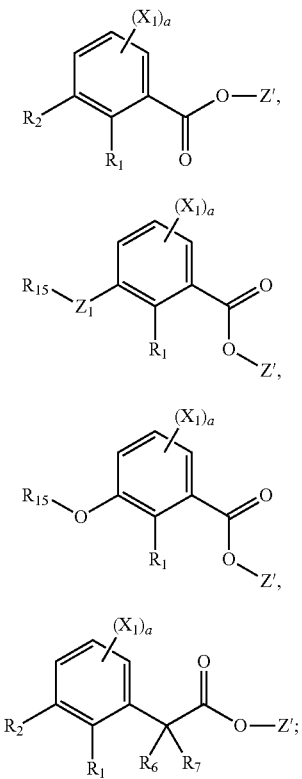

wherein R1, R2, R6, and R7 are each defined by any one of the foregoing embodiments of group (2); and wherein, in some embodiments:
X1 is a halogen atom;
a is 0 or 1;
Z' is H or a C1-C4 alkyl group;
R1 is a C1-C4 alkyl group;
R1 is a methyl group or an ethyl group;
R2 is a C5-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond and the double bond is in the ω-3 position;
R6 and R7 are the same or different and are independently chosen from a hydrogen atom and a C1-C6 alkyl group;
Z1 is —O—, —S(O)m-, or —N(R14)—;
R14 is C3-C8 alkyl group, a C3-C8 hydroxyalkyl group, a C3-C8 haloalkyl group, a heteroalkyl group having 4-8 atoms of which 1-2 atoms are heteroatoms, a C3-C8 alkenyl group having 1-2 double bonds, a heteroalkenyl group having 1 double bond and and 5-8 atoms of which 1 atom is a heteroatom, a C3-C8 haloalkenyl group having 1-2 double bonds, or a C3-C8 alkynyl group having 1-2 triple bonds;
R15 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 haloalkenyl group having 1-2 double bonds, a C4-C9 alkynyl group having 1-2 triple bonds, a C(O)R14 group, a OR14 group, a S(O)mR14 group, or a NR9R14 group; and
R9 is a hydrogen atom or a C1-C11 alkyl group.

In some embodiments R1 is a C1-C2 alkyl group or an —O—(C1-C2) alkyl group. In some embodiments, R5 is a C5-C8 straight chain alkyl group, a C6-C8 alkenyl group having 1 double bond, an —O—(C4-C6) alkyl group, an —O—(C4-C6) hydroxyalkyl group, an —O—(C4-C6) haloalkyl group, an —O-heteroalkyl group having 4-6 atoms of which 1 are heteroatoms and the heteroatom is an O, an —O—(C5-C8) alkenyl group having 1 double bond. In some embodiments the double bond is in the ω-3 position.

In some embodiments the double bond is in Z configuration. In some embodiments, Z' is H. In some embodiments Z' is a methyl or ethyl group. In some embodiments, R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane.

In some embodiments, R2 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —C(O)—(C3-C8) alkyl group, a —S(O)—(C3-C8) alkyl group, a —S(0)2-(C3-C8) alkyl group, an amine group having a hydrogen atom and a C3-C8 alkyl group, an amine group having a hydrogen atom and a (C1-C6) ketone group, or an amine group having a C1-C9 alkyl group and a C3-C8 alkyl group.

Group 3 Embodiments

The following embodiments relate to compounds of formula (I) described by group (3).

In some embodiments, R3 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O-heteroalkyl group having 4-8 atoms of which 1-2 are heteroatoms, an —O- heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, a —S(O)2-(C3-C8) alkyl group, an amine group having a hydrogen atom and a C3-C8 alkyl group, an amine group having a hydrogen atom and a (C1-C6) ketone group, or an amine group having a C1-C9 alkyl group and a C3-C8 alkyl group.

In some embodiments,
R1 is a C1-C4 alkyl group, a C1-C4 hydroxyalkyl group, a C1-C4 haloalkyl group, a heteroalkyl group having 3-4 atoms of which 1 is a heteroatom;
R3 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S— heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, or a —S—(C3-C8) alkynyl group having 1-2 triple bonds; and
R5 is a C1-C4 alkyl group, a C1-C4 hydroxyalkyl group, a C1-C4 haloalkyl group, a heteroalyl group having 3-4 atoms of which 1 atom is a heteroatom.

In some embodiments,
R1 is a heteroalkyl group having 3-4 atoms of which 1 is a heteroatom;
R3 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S— heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, or a —S—(C3-C8) alkynyl group having 1-2 triple bonds; and
R5 is a hydrogen atom or an —O—(C1-C4) alkyl group.

In some embodiments,
R1 is a C1-C4 alkyl group, a C1-C4 hydroxyalkyl group, a C1-C4 haloalkyl group, or a heteroalkyl group having 3-4 atoms of which 1 is a heteroatom;
R3 is a heteroalkyl group having 4-9 atoms of which 1-3 atoms are heteroatoms, a heteroalkenyl group having 1-2 double bonds and 5-9 atoms of which 1-2 atoms are heteroatoms, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, or a —S—(C3-C8) alkynyl group having 1-2 triple bonds; and
R5 is a hydrogen atom, a halogen atom, C1-C4 alkyl group, a C1-C4 hydroxyalkyl group, a C1-C4 haloalkyl group, a heteroalyl group having 3-4 atoms of which 1 atom is a heteroatom.

In some embodiments,
R1 is an —O—(C1-C4) alkyl group;
R3 is a heteroalkyl group having 4-9 atoms of which 1-3 atoms are heteroatoms, a heteroalkenyl group having 1-2 double bonds and 5-9 atoms of which 1-2 atoms are heteroatoms, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, or a —S—(C3-C8) alkynyl group having 1-2 triple bonds; and
R5 is a hydrogen atom, a halogen atom, C1-C4 alkyl group, a C1-C4 hydroxyalkyl group, a C1-C4 haloalkyl group, a heteroalkyl group having 3-4 atoms of which 1 atom is a heteroatom, or an —O—(C1-C4) alkyl group.

In some embodiments,
R1 is a C1-C2 alkyl group or an —O—(C1-C2) alkyl group;
R3 is a heteroalkyl group having 4-9 atoms of which 1-3 atoms are heteroatoms, a heteroalkenyl group having 1-2 double bonds and 5-9 atoms of which 1-2 atoms are heteroatoms, an —O-heteroalkyl group having 4-8 atoms of which 1-2 are heteroatoms, an —O—(C4-C8) alkenyl group having 1 double bond and the double bond is in the ω-3 position, an —O-heteroalkenyl group having 5-8 atoms of which 1 is heteroatom and 1 double bond and the double bond in is in the ω-3 position; and R5 is a hydrogen atom, a C1-C2 alkyl group, or an —O—(C1-C4) alkyl group.

In some embodiments,

R1 is a C1-C2 alkyl group or an —O—(C1-C2) alkyl group;

R3 is an —O—(C4-C8) alkenyl group having 1 double bond and the double bond is in the ω-3 position;

R2 and R4 are both hydrogen atoms;

R5 is a hydrogen atom, a C1-C2 alkyl group, or an —O—(C1-C4) alkyl group n is 0; and X is a carboxylic acid.

In some embodiments, R2 and R4 are each a hydrogen atom. In some embodiments, any one of R2, R4 or both R2 and R4 are a halogen atom. In some embodiments, any one of R2 or R4 or both R2 and R4 are a fluorine atom.

In some embodiments, n is 0. In other embodiments, n is 1. In other embodiments, n is 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane.

In some embodiments, n is 0. In some embodiments X is a carboxylic acid, a carboxamide, a hydroxymethyl, or a carboxylic ester such as an acetate group. In some embodiments, n is 0 and X is a carboxylic acid. In some embodiments, n is 0 and X is a carboxamide having the formula —C(O)NH2. In some embodiments, n is 0 and X is a hydroxymethyl.

In some embodiments, n is 1 or 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane. In some embodiments, n is 1 or 2 and X is chosen from a hydroxymethyl group, a carboxylic acid, a carboxamide, or a carboxylic ester such as an acetate group.

In some embodiments, n is 1 and R6 and R7 are the same or different and are independently chosen from a hydrogen atom and a C1-C2 alkyl group. In some embodiments, n is 1 and R6 and R7 are both hydrogen atoms. In some embodiments, n is 1 and R6 and R7 are both methyl groups. In some embodiments, R6 is a methyl group and R7 is a hydrogen. In some embodiments, n is 1, R6 and R7 are both hydrogen atoms, and X is a carboxylic acid. In some embodiments, n is 1, R6 and R7 are both methyl groups, and X is a carboxylic acid.

In some embodiments, X may be chosen from a hydroxymethyl group, a carboxylic acid, a carboxamide, and a carboxylic ester such as an acetate group.

In some embodiments, compounds of formula (I) described by group (3) are described by formula (IC-1) or (IC-2):

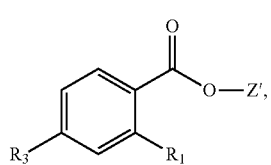

(IC-1)

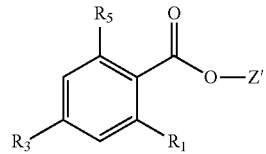

(IC-2)

wherein R1, R3, and R5 are each defined by any one of the foregoing embodiments for group (3).

In some embodiments, Z' is H or a C1-C4 alkyl. In some embodiments, Z' is H. In some embodiments, Z' is methyl or ethyl.

In some embodiments, R1 is a C1-C2 alkyl group or an —O—(C1-C2) alkyl group.

In some embodiments, R3 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, a —S(O)2-(C3-C8) alkyl group, an amine group having a hydrogen atom and a C3-C8 alkyl group, an amine group having a hydrogen atom and a (C1-C6) ketone group, or an amine group having a C1-C9 alkyl group and a C3-C8 alkyl group In some embodiments, R5 is a hydrogen atom, a halogen atom, C1-C4 alkyl group, a C1-C4 hydroxyalkyl group, a C1-C4 haloalkyl group, a heteroalkyl group having 3-4 atoms of which 1 atom is a heteroatom, or an —O—(C1-C4) alkyl group.

Group 4 Embodiments

The following embodiments relate to compounds of formula (I) described by group (4).

In some embodiments, R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, a —S(O)2-(C3-C8) alkyl group, an amine group having a hydrogen atom and a C3-C8 alkyl group, an amine group having a hydrogen atom and a (C1-C6) ketone group, or an amine group having a C1-C9 alkyl group and a C3-C8 alkyl group.

In some embodiments,

R1 is a C1-C4 alkyl group, a C1-C4 hydroxyalkyl group, a C1-C4 haloalkyl group, a heteroalkyl group having 3-4 atoms of which 1 is a heteroatom, a —O—(C1-C4) alkyl group, or a phenyl group;

R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S— heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, or a —S(O)2-(C3-C8) alkyl group; and R5 is a C1-C4 alkyl group, a C1-C4 hydroxyalkyl group, a C1-C4 haloalkyl group, a heteroalyl group having 3-4 atoms of which 1 atom is a heteroatom.

In some embodiments,

R1 is a heteroalkyl group having 3-4 atoms of which 1 atom is a heteroatom or a phenyl group;

R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S— heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, or a —S(O)2-(C3-C8) alkyl group; and R5 is a hydrogen atom, a halogen atom, or a —O—(C1-C4) alkyl group.

In some embodiments,

R1 is a phenyl group;

R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C4-C8) alkenyl group having 1-2 double bonds, an —O-heteroalkenyl group having 5-8 atoms of which 1 is heteroatom and 1 double bond; and R5 is a hydrogen atom, a halogen atom, a C1-C4 alkyl group, a C1-C4 haoalkyl group, a heteroalkyl group having 3-4 atoms of which 1 atom is a heteroatom; or a —O—(C1-C4) alkyl group.

In some embodiments,

R1 is a C1-C4 alkyl group, a C1-C4 haloalkyl group, a —O—(C1-C4) alkyl group, a heteroalkyl group having 3-4 atoms of which 1 atom is a heteroatom, or a phenyl group;

R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S—(C3-C8) haloalkyl, a —S— heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, or a —S(O)2-(C3-C8) alkyl group; and R5 is a C1-C4 alkyl group, a C1-C4 hydroxyalkyl group, a C1-C4 haloalkyl group, or a heteroalkyl group having 3-4 atoms of which 1 atom is a heteroatom.

In some embodiments,
R1 is a C1-C4 alkyl group, a C1-C4 haloalkyl group, or a —O—(C1-C4) alkyl group;
R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C4-C8) alkenyl group having 1-2 double bonds, an —O-heteroalkenyl group having 5-8 atoms of which 1 is heteroatom and 1 double bond; and
R5 is a C1-C4 alkyl group or a C1-C4 haloalkyl group.

In some embodiments,
R1 is a C1-C4 alkyl group or a —O—(C1-C4) alkyl group;
R4 is a C4-C9 alkyl group, an —O—(C3-C8) alkyl group, or a —C(O)—(C3-C8) alkyl group; and
R5 is a C1-C4 alkyl group or a C1-C4 haloalkyl group.

In some embodiments,
R1 is a C1-C4 alkyl group, a C1-C4 hydroxyalkyl group, a C1-C4 haloalkyl group, a heteroalkyl group having 3-4 atoms of which 1 is a heteroatom, a —O—(C1-C4) alkyl group, or a phenyl group;
R4 is a heteroalkyl group having 4-9 atoms of which 1-3 atoms are heteroatoms, a heteroalkenyl group having 1-2 double bonds and 5-9 atoms of which 1-2 atoms are heteroatoms, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, a —S—(C3-C8) alkynyl group having 1-2 triple bonds, a —C(O)—(C3-C8) alkyl group, a —S(O)—(C3-C8) alkyl group, or a —S(0)2-(C3-C8) alkyl group; and
R5 is a hydrogen atom, a halogen atom, C1-C4 alkyl group, a C1-C4 hydroxyalkyl group, a C1-C4 haloalkyl group, a heteroalyl group having 3-4 atoms of which 1 atom is a heteroatom.

In some embodiments,
R1 is a C1-C2 alkyl group, a C1-C2 haloalkyl group, a —O—(C1-C2) alkyl group, or a phenyl group;
R4 is a heteroalkyl group having 4-9 atoms of which 1-3 atoms are heteroatoms, a heteroalkenyl group having 1-2 double bonds and 5-9 atoms of which 1-2 atoms are heteroatoms, an —O—(C4-C8) alkenyl group having 1 double bond and the double bond is in the ω-3 position, an —O-heteroalkenyl group having 5-8 atoms of which 1 is heteroatom and 1 double bond and the double bond in is in the ω-3 position; and
R5 is a hydrogen atom, a halogen atom, a C1-C2 alkyl group, or a —O—(C1-C2) alkyl group.

In some embodiments,
R1 is a C1-C2 alkyl group or a —O—(C1-C2) alkyl group;
R4 is a a heteroalkenyl group having 1-2 double bonds and 5-9 atoms of which 1-2 atoms are heteroatoms, an —O—(C4-C8) alkenyl group having 1 double bond and the double bond is in the ω-3 position, an —O-heteroalkenyl group having 5-8 atoms of which 1 is heteroatom and 1 double bond and the double bond in is in the ω-3 position; and
R5 is a hydrogen atom, a halogen atom, a C1-C2 alkyl group, or a —O—(C1-C2) alkyl group.

In some embodiments,
R1 is a C1-C2 alkyl group or a —O—(C1-C2) alkyl group;
R4 is a an —O—(C4-C8) alkenyl group having 1 double bond and the double bond is in the ω-3 position or a —C(O)—(C3-C8) alkyl group;
R5 is a hydrogen atom, a halogen atom, a C1-C2 alkyl group, or a —O—(C1-C2) alkyl group;
R2 and R3 are each a hydrogen atom;
n is 0; and
X is a carboxylic acid.

In some embodiments, R2 and R3 are each a hydrogen atom. In some embodiments, any one of R2, R4 or both R2 and R4 are a halogen atom. In some embodiments, any one of R2, R4, or both R2 and R4 are a fluorine atom.

In some embodiments, n is 0. In other embodiments, n is 1. In other embodiments, n is 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane.

In some embodiments, n is 0. In some embodiments X is a carboxylic acid, a carboxamide, a hydroxymethyl, or a carboxylic ester such as an acetate group. In some embodiments, n is 0 and X is a carboxylic acid. In some embodiments, n is 0 and X is a carboxamide having the formula —C(O)NH2. In some embodiments, n is 0 and X is a hydroxymethyl.

In some embodiments, n is 1 or 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane. In some embodiments, n is 1 or 2 and X is chosen from a hydroxymethyl group, a carboxylic acid, a carboxamide, or a carboxylic ester such as an acetate group.

In some embodiments, n is 1 and R6 and R7 are the same or different and are independently chosen from a hydrogen atom and a C1-C2 alkyl group. In some embodiments, n is 1 and R6 and R7 are both hydrogen atoms. In some embodiments, n is 1 and R6 and R7 are both methyl groups. In some embodiments, R6 is a methyl group and R7 is a hydrogen. In some embodiments, n is 1, R6 and R7 are both hydrogen atoms, and X is a carboxylic acid. In some embodiments, n is 1, R6 and R7 are both methyl groups, and X is a carboxylic acid.

In some embodiments, X may be chosen from a hydroxymethyl group, a carboxylic acid, a carboxamide, and a carboxylic ester such as an acetate group.

In some embodiments, compounds of formula (I) described by group (4) are described by formula (ID-1) or (ID-2):

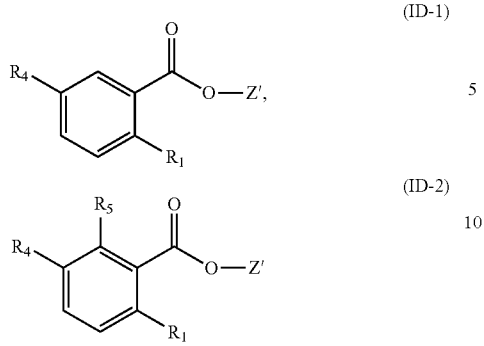

(ID-1)

(ID-2)

wherein R1, R4, and R5 are each defined by any one of the foregoing embodiments for group (4).

In some embodiments, Z' is H or a C1-C4 alkyl. In some embodiments, Z' is H. In some embodiments, Z' is methyl or ethyl.

In some embodiments, R1 is a C1-C2 alkyl group, a C1-C2 haloalkyl group, a —O—(C1-C2) alkyl group, or a phenyl group.

In some embodiments, R4 is a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl, an —O-heteroalkyl group having 4-8 atoms of which 1-2 are heteroatoms, an —O—(C4-C8) alkenyl group having 1-2 double bonds, an —O-heteroalkenyl group having 5-8 atoms of which 1 is heteroatom and 1 double bond.

In some embodiments, R5 is a hydrogen atom, a halogen atom, a C1-C2 alkyl group, or a —O—(C1-C2) alkyl group.

Group 5 Embodiments

The following embodiments relate to compounds of formula (I) described by group (5).

In some embodiments,

R1 is a C1-C4 alkyl group, a C1-C4 hydroxyalkyl group, a C1-C4 haloalkyl group, a heteroalkyl group having 3-4 atoms of which 1 is a heteroatom, or an —O—(C1-C4) alkyl group;

In some embodiments, R2 and R4 are the same or different and are independently chosen from a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, a C4-C9 alkynyl group having 1-2 triple bonds, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxy- alkyl group, a —S—(C3-C8) haloalkyl, a —S-heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) alkynyl group having 1-2 triple bonds, a —C(O)—(C3—C8) alkyl group, a —S(O)—(C3-C8) alkyl group, a —S(O)2-(C3-C8) alkyl group, an amine group having a hydrogen atom and a C3-C8 alkyl group, an amine group having a hydrogen atom and a (C1-C6) ketone group, and an amine group having a C1-C9 alkyl group and a C3-C8 alkyl group; and R5 is a hydrogen atom, a halogen atom, a C1-C4 alkyl group, a C1-C4 hydroxyalkyl group, a C1-C4 haloalkyl group, a heteroalkyl group having 3-4 atoms of which 1 is a heteroatom, or an —O—(C1-C4) alkyl group.

In some embodiments, R2 and R4 are the same or different and are independently chosen from a C4-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, an —O—(C3-C8) hydroxyalkyl group, an —O—(C3-C8) haloalkyl, an —O—(C3-C8) alkenyl group having 1-2 double bonds, an —O-heteroalkyl group having 4-8 atoms of which 1-2 are heteroatoms, an —O-heteroalkenyl group having 5-8 atoms of which 1 is heteroatom and 1 double bond, an —O—(C3-C8) haloalkenyl group having 1-2 double bonds, an —O—(C3-C8) alkynyl group having 1-2 triple bonds, a —S—(C3-C8) alkyl group, a —S—(C3-C8) hydroxyalkyl group, a —S— (C3-C8) haloalkyl, a —S— heteroalkyl group having 4-8 atoms of which 1-2 are heteroatoms, a —S—(C3-C8) alkenyl group having 1-2 double bonds, a —S-heteroalkenyl group having 5-8 atoms of which 1 is heteroatom and 1 double bond, a —S—(C3-C8) haloalkenyl group having 1-2 double bonds, or a —S—(C3-C8) alkynyl group having 1-2 triple bonds.

In some embodiments, R2 and R4 are the same or different and are independently chosen from a C4-C9 alkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, O—(C3-C8) hydroxyalkyl group, an —O—(C3-C8) haloalkyl group, an —O-heteroalkyl group having 4-8 atoms of which 1-2 are heteroatoms, an —O—(C3-C8) alkenyl group having 1-2 double bonds, an —O-heteroalkenyl group having 5-8 atoms of which 1 is heteroatom and 1 double bond, an —O—(C3-C8) haloalkenyl group having 1-2 double bonds, a —S—(C3-C8) alkyl group, a —S-heteroalkyl group having 4-8 atoms of which 1-2 are heteroatoms, a —S—(C3-C8) alkenyl group having 1-2 double bonds, or a —S-heteroalkenyl group having 5-8 atoms of which 1 is heteroatom and 1 double bond.

In some embodiments, R2 and R4 are the same or different and are independently chosen from a C4-C8 straight chain alkyl group, a C6-C8 alkenyl group having 1 double bond, an —O—(C4-C6) alkyl group, an —O—(C4-C6) hydroxyalkyl group, an —O—(C4-C6) haloalkyl group, an —O-heteroalkyl group having 4-6 atoms of which 1 are heteroatoms and the heteroatom is an O, or an —O—(C5-C8) alkenyl group having 1 double bond. In some embodiments, the double bond is in the 0>-3 position. In some embodiments, the double bond is in Z configuration.

In some embodiments, R2 and R4 are the same or different and are independently chosen from a C4-C8 alkyl group or an —O—(C3-C8) alkyl group and may have the formula —C4H9, —C5H11, —C6H13, —C7H15, —C8H17, —OC3H7, —OC4H9, —OC5H11, —OC6H13, —OC7H15, or —OC8H17. In some embodiments, R2 and R4 are the same or different and are independently chosen from a —S—(C3-C8) alkyl group and may have the formula —SC3H7, —SC4H9, —SC5H11, —SC6H13, —SC7H15, or —SC8H17. In some embodiments, R2 and R4 are the same or different and are independently chosen from an —O—(C3-C8) alkenyl group having 1-2 double bonds and may have the formula —OCH2CH=CHCH2CH3, —O(CH2)2CH=CHCH2CH3, —O(CH2)3CH=CHCH2CH3, or —O(CH2)4CH=CHCH2CH3. In some embodiments, R2 and R4 are the same or different and are independently chosen from is a —S—(C3-C8) alkenyl group having 1-2 double bonds and may have the formula —SCH2CH=CHCH2CH3, —S(CH2)2CH=CHCH2CH3, —S(CH2)3CH=CHCH2CH3, or —S(CH2)4CH=CHCH2CH3.

In some embodiments, R2 and R4 are the same or different and are independently chosen from a C4-C8 straight chain alkyl group, an —O—(C4-C6) alkyl group, and an —O-heteroalkyl group having 4-6 atoms of which 1 are heteroatoms and the heteroatom is an O; In some embodiments, R1 and R5 are the same or different and are independently chosen from a C1-C4 alkyl group. In some embodiments, R1 and R5 are the same or different and are independently chosen from a methyl group or an ethyl group. In some embodiments, R1 and R5 are the same and are both methyl groups.

In some embodiments, R1 and R5 are the same or different and are independently chosen from an —O—(C1-C4) alkyl group. In some embodiments, R1 and R5 are both —OCH3.

In some embodiments, R5 is a hydrogen atom. In some embodiments R1 is a C1-C4 alkyl group or an —O—(C1-C4) alkyl group and R5 is a hydrogen atom. In some embodiments, R1 is a methyl group or an ethyl group and R5 is a hydrogen atom. In some embodiments, R1 is —OCH3 or —OCH2CH3 and R5 is a hydrogen atom. In some embodiments, R5 is a halogen atom. In some embodiments, R5 is a fluorine atom.

In some embodiments, R3 is a hydrogen atom. In other embodiments, R3 is a halogen atom. In some embodiments, R3 is a fluorine atom.

In some embodiments,
R1 is a methyl group or —OCH3;
R2 and R4 are the same or different and are independently chosen from a C4-C8 straight chain alkyl group, an —O—(C4-C6) alkyl group, and an —O-heteroalkyl group having 4-6 atoms of which 1 are heteroatoms and the heteroatom is an 0;
R3 is a hydrogen atom;
R5 is a hydrogen atom, a methyl group, or —OCH3;
n is 0; and
X is a carboxylic acid.

In some embodiments,
R1 is a methyl group or —OCH3;
R2 and R4 are the same and are chosen from a C4-C8 straight chain alkyl group and an —O—(C4-C6) alkyl group;
R3 is a hydrogen atom;
R5 is a hydrogen atom, a methyl group, or —OCH3;
n is 0; and
X is a carboxylic acid.

In some embodiments, n is 0. In other embodiments, n is 1. In other embodiments, n is 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane.

In some embodiments, n is 0. In some embodiments X is a carboxylic acid, a carboxamide, a hydroxymethyl, or a carboxylic ester such as an acetate group. In some embodiments, n is 0 and X is a carboxylic acid. In some embodiments, n is 0 and X is a carboxamide having the formula —C(O)NH2. In some embodiments, n is 0 and X is a hydroxymethyl.

In some embodiments, n is 1 or 2. In some embodiments n is 1 or 2 and R6 and R7 are the same or different and are independently chosen from a hydrogen atom and a C1-C6 alkyl group. In some embodiments, R6 and R7 together can form a cycloalkyl group, such as cyclopropane, cyclobutane, cyclopentane, or cyclohexane. In some embodiments, n is 1 or 2 and X is chosen from a hydroxymethyl group, a carboxylic acid, a carboxamide, or a carboxylic ester such as an acetate group.

In some embodiments, n is 1 and R6 and R7 are the same or different and are independently chosen from a hydrogen atom and a C1-C2 alkyl group. In some embodiments, n is 1 and R6 and R7 are both hydrogen atoms. In some embodiments, n is 1 and R6 and R7 are both methyl groups. In some embodiments, R6 is a methyl group and R7 is a hydrogen. In some embodiments, n is 1, R6 and R7 are both hydrogen atoms, and X is a carboxylic acid. In some embodiments, n is 1, R6 and R7 are both methyl groups, and X is a carboxylic acid.

In some embodiments, X may be chosen from a hydroxymethyl group, a carboxylic acid, a carboxamide, and a carboxylic ester such as an acetate group.

In some embodiments, compounds of formula (I) described by group (5) are described by formula (IE-1) or (IE-2):

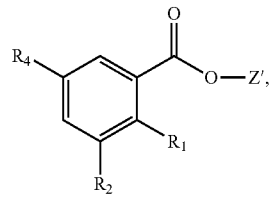

(ID-1)

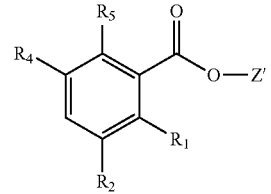

(ID-2)

wherein R1, R2, R4, and R5 are each defined by any one of the foregoing embodiments for group (5).

In some embodiments, Z' is H or a C1-C4 alkyl. In some embodiments, Z' is H. In some embodiments, Z' is methyl or ethyl.

In some embodiments, R1 is a C1-C4 alkyl group, a C1-C4 hydroxyalkyl group, a C1-C4 haloalkyl group, a heteroalkyl group having 3-4 atoms of which 1 is a heteroatom, or an —O—(C1-C4) alkyl group.

In some embodiments, R2 and R4 are the same or different and are independently chosen from a C4-C8 alkyl group or an —O—(C3-C8) alkyl group and may have the formula —C4H9, —C5H11, —C6H13, —C7H15, —C8H17, —OC3H7, —OC4H9, —OC5H11, —OC6H13, —OC7H15, or —OC8H17. In some embodiments, R2 and R4 are the same or different and are independently chosen from a —S—(C3-C8) alkyl group and may have the formula —SC3H7, —SC4H9, —SC5H11, —SC6H13, —SC7H15, or —SC8H17. In some embodiments, R2 and R4 are the same or different and are independently chosen from an —O—(C3-C8) alkenyl group having 1-2 double bonds and may have the formula —OCH2CH=CHCH2CH3, —O(CH2)2CH=CHCH2CH3, —O(CH2)3CH=CHCH2CH3, or —O(CH2)4CH=CHCH2CH3. In some embodiments, R2 and R4 are the same or different and are independently chosen from is a —S—(C3-C8) alkenyl group having 1-2 double bonds and may have the formula —SCH2CH=CHCH2CH3, —S(CH2)2CH=CHCH2CH3, —S(CH2)3CH=CHCH2CH3, or —S(CH2)4CH=CHCH2CH3.

In some embodiments, R5 is a hydrogen atom, a methyl group, or —OCH3. In some embodiments R5 is a fluorine atom.

Salts

The present disclosure also relates to salts of the compound of formula (I). Such salts may be represented by

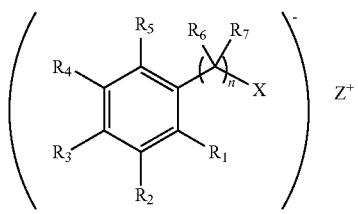

wherein X is COO—, and Z+ may be NH4+; metal ions such as Li+, Na+, K+, Mg2+, or Ca2+; a protonated primary amine such as tert-butyl ammonium, (3S,5S,7S)-adamantan-1-ammonium, 1,3-dihydroxy-2-(hydroxymethyl)propan-2-ammonium, a protonated aminopyridine (e.g., pyridine-2-ammonium); a protonated secondary amine such as diethylammonium, 2,3,4,5,6-pentahydroxy-N-methylhexan-1-ammonium, N-ethylnaphthalen-1-ammonium, a protonated tertiary amine such as 4-methylmorpholin-4-ium, a quaternary amine such as 2-hydroxy-N,N,N-trimethylethan-1-aminium and a protonated guanidine such as amino((4-amino-4-carboxybutyl)amino)methaniminium or a protonated heterocycle such as 1H-imidazol-3-ium. Additional examples of suitable salts include salts of a diprotonated diamine such as ethane-1,2-diammonium or piperazine-1,4-diium. or by

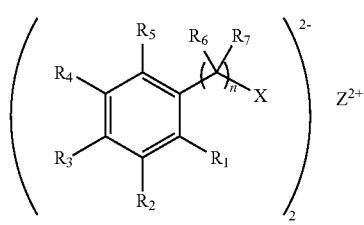

wherein X=COO—, and Z2+ may be Mg2+ or Ca2+, or a diprotonated diamine such as ethane-1,2-diammonium or piperazine-1,4-diium.

Examples of pharmaceutically acceptable salts are also described, for example, in Pharmaceutical Salts: Properties, Selection, and Use, 2nd Revised Edition, P. Heinrich Stahl (Editor), Camille G. Wermuth (Editor).

Certain compounds of the present invention may exist in Zwitterionic form and the present invention includes Zwitterionic forms of these compounds and mixtures thereof.

The present disclosure also relates to prodrugs of the compound of Formula (I). Examples of such produgs includes the pharmaceutically acceptable esters or amides obtained upon reaction of alcohols or amines, including amino acids, with the free acids defined by Formula I.

The compounds of formula (I) are capable of existing in stereoisomeric forms. It will be understood that the invention encompasses all optical isomers of the compounds of formula (I) and mixtures thereof. Hence, compounds of formula (I) that exist as diastereomers, racemates, and enantiomers are included within the scope of the present disclosure. The present disclosure also relates to at least one lipid compound according of formula (I) for use as a medicament.

It is also to be understood that certain compounds of the formula (I) can exist in solvated as well as unsolvated forms such as, for example, hydrated forms. It is to be understood that the invention encompasses all such solvated forms which possess biological activity.

Formulations

A "pharmaceutical composition" is a compound according to the invention in any form suitable to be used for a medical purpose. The term "pharmaceutically acceptable" refers to drugs, medicaments, inert ingredients etc., which are suitable for use in contact with the tissues of humans and lower animals without undue toxicity, incompatibility, instability, irritation, allergic response, and the like, commensurate with a reasonable benefit/risk ratio.

A "pharmaceutically acceptable vehicle" refers to a diluent, adjuvant, excipient, or carrier with which a compound is administered. The pharmaceutically acceptable vehicle can be a solvent or dispersion medium containing, for example, water, ethanol, polyol (e.g. glycerol, propylene glycol, and liquid polyethylene glycol), suitable mixtures thereof, and vegetable oils. Additional examples of pharmaceutically acceptable vehicles include, but are not limited to: Water for Injection USP; aqueous vehicles such as, but not limited to, Sodium Chloride Injection, Ringer's Injection, Dextrose Injection, Dextrose and Sodium Chloride Injection, and Lactated Ringer's Injection; water-miscible vehicles such as, but not limited to, ethyl alcohol, polyethylene glycol, and polypropylene glycol; and non-aqueous vehicles such as, but not limited to, corn oil, cottonseed oil, peanut oil, sesame oil, ethyl oleate, isopropyl myristate, and benzyl benzoate.

Prevention of the action of microorganisms can be achieved by addition of antibacterial and antifungal agents. Examples of such agents are parabens, chlorobutanol, phenol, ascorbic acid, thimerosal, and the like. Isotonic agents may be included in a formulation. Examples of isotonic agents include sugars, sodium chloride, or polyalcohols such as mannitol and sorbitol, in the composition.

The compounds of the invention may be formulated prior to administration into pharmaceutical compositions using available techniques and procedures. For instance, the pharmaceutical compositions may be formulated in a manner suitable for administration by topical, oral, intravenous (iv), intramuscular (im), depo-im, subcutaneous (sc), depo-sc, sublingually, intranasal, intrathecal topical or rectal routes.

Preferably, the compound(s) of the invention can be orally administered or intravenously administered. The formulations may conveniently be presented in unit dosage form and may be prepared by any methods well known in the art of pharmacy. The amount of the therapeutic agent in such therapeutically useful compositions is such that a suitable dosage will be obtained.

The compounds and compositions of the invention may be formulated in conventional oral administration forms, e.g. tablets, coated tablets, capsules, powders, granulates, solutions, dispersions, suspensions, syrups, emulsions, sprays, etc., using conventional excipients, e.g. solvents, diluents, binders, sweeteners, aromas, pH modifiers, viscosity modifiers, antioxidants (e.g. tocopherol), corn starch, lactose, glucose, microcrystalline cellulose, magnesium stearate, polyvinylpyrrolidone, citric acid, tartaric acid, water, ethanol, glycerol, sorbitol, polyethylene glycol, propylene glycol, cetylstearyl alcohol, carboxymethylcellulose or fatty substances such as hard fat or suitable mixtures thereof etc. Conventional formulation techniques, well known in the art, may be used.

Formulations of the invention suitable for oral administration may be in the form of capsules (e.g., hard or soft shell gelatin capsule), cachets, pills, tablets, lozenges, powders, granules, pellets, dragees, e.g., coated (e.g., enteric coated) or uncoated, or as a solution or a suspension in an aqueous or non-aqueous liquid, or as an oil-in-water or water-in-oil liquid emulsion, or as an elixir or syrup, or as pastilles or as mouth washes and the like, each containing a predetermined amount of a compound of the present invention as an active ingredient. A compound of the present invention may also be administered as a bolus, electuary or paste, or incorporated directly into the subject's diet. Moreover, in certain embodiments these pellets can be formulated to (a) provide for instant or rapid drug release (i.e., have no coating on them); (b) be coated, e.g., to provide for sustained drug release over time; or (c) be coated with an enteric coating for better gastrointestinal tolerability. Coating may be achieved by conventional methods, typically with pH or time-dependent coatings, such that the compound(s) of the invention is released in the vicinity of the desired location, or at various times to extend the desired action. Such dosage forms typically include, but are not limited to, one or more of cellulose acetate phthalate, polyvinylacetate phthalate, hydroxypropyl methyl cellulose phthalate, ethyl cellulose, waxes, and shellac.

In solid dosage forms for oral administration a compound of the present invention may be mixed with one or more pharmaceutically acceptable carriers, such as sodium citrate or dicalcium phosphate, or any of the following: fillers or extenders, such as starches, lactose, sucrose, glucose, mannitol, or silicic acid; binders, such as, for example, carboxymethylcellulose, alginates, gelatin, polyvinyl pyrrolidone, sucrose or acacia; humectants, such as glycerol; disintegrating agents, such as agar-agar, calcium carbonate, potato or tapioca starch, alginic acid, certain silicates, and sodium carbonate; solution retarding agents, such as paraffin; absorption accelerators, such as quaternary ammonium compounds; wetting agents, such as, for example, cetyl alcohol and glycerol monostearate; absorbents, such as kaolin and bentonite clay; lubricants, such as talc, calcium stearate, magnesium stearate, solid polyethylene glycols, sodium lauryl sulfate, and mixtures thereof; and coloring agents. In the case of capsules, tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

Peroral compositions include liquid solutions, emulsions, suspensions, and the like. The pharmaceutically acceptable vehicles suitable for preparation of such compositions are well known in the art. Typical components of carriers for syrups, elixirs, emulsions and suspensions include ethanol, glycerol, propylene glycol, polyethylene glycol, liquid sucrose, sorbitol and water. For a suspension, typical suspending agents include methyl cellulose, sodium carboxymethyl cellulose, tragacanth, and sodium alginate; typical wetting agents include lecithin and polysorbate 80; and typical preservatives include methyl paraben and sodium benzoate. Peroral liquid compositions may also contain one or more components such as sweeteners, flavoring agents and colorants.

Pharmaceutical preparation suitable for injectable use (e.g., via i.v.) may include sterile aqueous solutions (where water soluble) or dispersions and sterile powders for the extemporaneous preparation of sterile injectable solutions or dispersions. Dispersions may be prepared by incorporating the therapeutic agent into a sterile vehicle which contains a basic dispersion medium and the required other ingredients from those enumerated above. In the case of sterile powders for the preparation of sterile injectable solutions, the methods of preparation are vacuum drying and freeze-drying which yields a powder of the active ingredient (i.e., the therapeutic agent) plus any additional desired ingredient from a previously sterile-filtered solution thereof. Prolonged absorption of injectable compositions may be obtained by including in the composition an agent which delays absorption, for example, aluminum monostearate or gelatin.

Compositions for injection must be sterile and must be fluid to the extent that easy syringability exists. It must be stable under the conditions of manufacture and storage and must be preserved against the contaminating action of microorganisms such as bacteria and fungi. Sterile injectable solutions can be prepared by incorporating the therapeutic agent in the required amount in an appropriate solvent with one or a combination of ingredients enumerated above, as required, followed by filtered sterilization.

Compounds according to the present invention may be administered parenterally, intraperitoneally, intraspinally, or intracerebrally. For such compositions, the compound of the invention can be prepared in glycerol, liquid polyethylene glycols, and mixtures thereof and in oils. Under ordinary conditions of storage and use, this preparation may contain a preservative to prevent the growth of microorganisms.

Pharmaceutical formulations are also provided which are suitable for administration as an aerosol, by inhalation. These formulations comprise a solution or suspension of the desired compound of any Formula herein or a plurality of solid particles of such compound(s). For instance, metal salts of the compounds of this invention are expected to have physical chemical properties amenable with the preparation of fine particles of active pharmaceutical ingredient (API) for administration by inhalation but not the free acid form of these compounds. The desired formulation may be placed in a small chamber and nebulized. Nebulization may be accomplished by compressed air or by ultrasonic energy to form a plurality of liquid droplets or solid particles comprising the agents or salts. The liquid droplets or solid particles should have a particle size in the range of about 0.5 to about 5 microns. The solid particles can be obtained by processing the solid agent of any Formula described herein, or a salt thereof, in any appropriate manner known in the art, such as by micronization. The size of the solid particles or droplets will be, for example, from about 1 to about 2 microns. In this respect, commercial nebulizers are available to achieve this purpose. A pharmaceutical formulation suitable for administration as an aerosol may be in the form of a liquid, the formulation will comprise a water-soluble agent of any Formula described herein, or a salt thereof, in a carrier which comprises water. A surfactant may be present which lowers the surface tension of the formulation sufficiently to result in the formation of droplets within the desired size range when subjected to nebulization.

The compositions of this invention may also be administered topically to a subject, e.g., by the direct laying on or spreading of the composition on the epidermal or epithelial tissue of the subject, or transdermally via a "patch". Such compositions include, for example, lotions, creams, solutions, gels, emulsions and solids. These topical compositions may comprise an effective amount, usually about 0.01% to about 10% (w/w), or from about 0.1% to about 5% (w/w), or from about 1% to about 5% (w/w), of a compound of the invention. Suitable carriers for topical administration typically remain in place on the skin as a continuous film, and resist being removed by perspiration or immersion in water. Generally, the carrier is organic in nature and capable of with dispersed or dissolved therein the therapeutic agent. The carrier may include pharmaceutically acceptable emollients, emulsifiers, thickening agents, solvents and the like. The carrier may include vernix. Topical formulation includes one or more excipients such as, but not limited to, protectives, adsorbents, demulcents, emollients, preservatives, antioxidants, moisturizers, buffering agents, solubilizing agents, skin-penetration agents, and surfactants.

Suitable protectives and adsorbents include, but are not limited to, dusting powders, zinc sterate, collodion, dimethicone, silicones, zinc carbonate, aloe vera gel and other aloe products, vitamin E oil, allatoin, glycerin, petrolatum, and zinc oxide. Suitable demulcents include, but are not limited to, benzoin, hydroxypropyl cellulose, hydroxypropyl methylcellulose, and polyvinyl alcohol.

Suitable emollients include, but are not limited to, animal and vegetable fats and oils, myristyl alcohol, alum, and aluminum acetate. Suitable preservatives include, but are not limited to, quaternary ammonium compounds, such as benzalkonium chloride, benzethonium chloride, cetrimide, dequalinium chloride, and cetylpyridinium chloride; mercurial agents, such as phenylmercuric nitrate, phenylmercuric acetate, and thimerosal; alcoholic agents, for example, chlorobutanol, phenylethyl alcohol, and benzyl alcohol; antibacterial esters, for example, esters of parahydroxybenzoic acid; and other anti-microbial agents such as chlorhexidine, chlorocresol, benzoic acid and polymyxin.

Suitable antioxidants include, but are not limited to, ascorbic acid and its esters, sodium bisulfite, butylated hydroxytoluene, butylated hydroxyanisole, tocopherols, and chelating agents like EDTA and citric acid.

Suitable moisturizers include, but are not limited to, glycerin, sorbitol, polyethylene glycols, urea, and propylene glycol. Suitable buffering agents for use with the invention include, but are not limited to, acetate buffers, citrate buffers, phosphate buffers, lactic acid buffers, and borate buffers.

Suitable solubilizing agents include, but are not limited to, quaternary ammonium chlorides, cyclodextrins, benzyl benzoate, lecithin, and polysorbates.

Suitable skin-penetration agents include, but are not limited to, ethyl alcohol, isopropyl alcohol, octylphenylpolyethylene glycol, oleic acid, polyethylene glycol 400, propylene glycol, N-decylmethylsulfoxide, fatty acid esters (e.g., isopropyl myristate, methyl laurate, glycerol monooleate, and propylene glycol monooleate); and N-methylpyrrolidone.

Other compositions useful for attaining systemic delivery of the subject agents may include sublingual, buccal and nasal dosage forms. Such compositions typically comprise one or more of soluble filler substances such as sucrose, sorbitol and mannitol; and binders such as acacia, microcrystalline cellulose, carboxymethyl cellulose and hydroxypropyl methyl cellulose. Glidants, lubricants, sweeteners, colorants, antioxidants and flavoring agents may also be included.

Uses

The compounds of formula (I) and the pharmaceutical formulations thereof may be used in the treatment of various diseases and disorders. In particular, the compounds of formula (I) are useful in the treatment of diseases and disorders related to dyslipidemia, metabolic syndromes, non-alcoholic fatty liver disease, and cholestasis.

"Treatment" includes any therapeutic application that can benefit a human or non-human mammal. Both human and veterinary treatments are within the scope of the present invention. Treatment may be in respect of an existing condition or it may be prophylactic, i.e., preventative.

Dyslipidemia and Metabolic Syndrome

Factors such as, high LDL/non-HDL cholesterol, hypertriglyceridemia (HTG), and low HDL cholesterol are features of metabolic syndrome, which represents a collection of lipid and non-lipid (e.g., hypertension) risk factors of metabolic origin. Metabolic syndrome is closely linked to a generalized metabolic disorder called insulin resistance in which the normal actions of insulin are impaired. Conditions are characterized by abnormally high blood cholesterol and/or lipid values include hypercholesterolemia, hyperlipidemia (hyperlipoproteinemia), HTG, and mixed dyslipidemia. Current drugs that treat hyperlipidemia (e.g., statins, omega-3 fatty acids, fibrates) have mostly neutral effects on glycemic control, whilst drugs targeting glycemic control e.g., insulin, thiazolidinediones (TZDs), have adverse effects upon bodyweight and (for TZDs) other unwanted side-effects restricting their use.

Compounds of formula (I) have surprisingly been found to reduce plasma triglyceride and total cholesterol levels in APOE*3Leiden mice fed a high-fat, high cholesterol diet. Further, it has surprisingly been discovered that compounds of formula (I) also improve glycemic control by reducing post-prandial total plasma glucose levels, reducing fasting glucose levels, and reducing fasting plasma insulin levels in an ob/ob mouse model. Surprisingly, and unlike current drugs used to target glycemic control (e.g., insulin, thiazolidinediones), compounds of formula (I) have also been found to reduce bodyweight in this model.

In some embodiments, the compounds of formula (I) may be used to reduce plasma triglycerides and/or total cholesterol. In some embodiments, the compounds of formula (I) may be used to treat a dyslipidemic condition, such as hypertriglyceridemia and/or hypercholesterolemia. In some embodiments, the treatment of a dyslipidemic condition, such as hypertriglyceridemia and/or hypercholesterolemia, may be prophylactic.

Some embodiments may include use of the compounds of formula (I) for reducing plasma triglycerides and/or total cholesterol. Some embodiments may include use of the compounds of formula (I) for treating a dyslipidemic condition, such as hypertriglyceridemia and/or hypercholesterolemia. The use may be prophylactic.

In some embodiments, the compounds of formula (I) may be used in the manufacture of a medicament for reducing plasma triglycerides and/or total cholesterol. In some embodiments, the compounds of formula (I) may be used be used in the manufacture of a medicament for treating a dyslipidemic condition, such as hypertriglyceridemia and/or hypercholesterolemia. In some embodiments, the use or treatment may be prophylactic.

In some embodiments, the compounds of formula (I) may be used to reduce plasma insulin levels. In some embodiments, the compounds of formula (I) may be used to reduce fasting plasma insulin levels. In some embodiments, the compounds of formula (I) may be used to increase glucose tolerance and/or reduce post-prandial glucose levels. In some embodiments, the compounds of formula (I) may be used to reduce fasting blood glucose levels. In some embodiments, the compounds of formula (I) may be used to treat a diabetic condition such as type 2 diabetes. In some embodiments, the treatment of a diabetic condition, such as type 2 diabetes, may be prophylactic.

Some embodiments may include use of the compounds of formula (I) for reducing plasma insulin levels. Some embodiments may include use of the compounds of formula (I) for reducing fasting plasma insulin levels. Some embodiments may include use of the compounds of formula (I) for increasing tolerance and/or reducing post-prandial glucose levels. Some embodiments may include use of the compounds of formula (I) for reducing fasting blood glucose levels. Some embodiments may include use of the compounds of formula (I) for treating a diabetic condition such as type 2 diabetes. In some embodiments, the use may be prophylactic.

In some embodiments, the compounds of formula (I) may be used in the manufacture of a medicament for reducing plasma insulin levels. In some embodiments, the compounds of formula (I) may be used in the manufacture of a medicament for reducing fasting plasma insulin levels. In some embodiments, the compounds of formula (I) may be used in the manufacture of a medicament for increasing glucose tolerance and/or reduce post-prandial glucose levels. In some embodiments, the compounds of formula (I) may be used in the manufacture of a medicament for reducing fasting blood glucose levels. In some embodiments, the compounds of formula (I) may be used in the manufacture of a medicament for treating a diabetic condition such as type 2 diabetes. In some embodiments, the use or treatment may be prophylactic.

In some embodiments, the compounds of formula (I) may be used to reduce bodyweight. In some embodiments, the compounds of formula (I) may be used to reduce bodyweight in an overweight individual. In some embodiments, the compounds of formula (I) may be used to reduce bodyweight in an individual with a metabolic syndrome.

Some embodiments may include use of the compounds of formula (I) for reducing bodyweight. Some embodiments may include use of the compounds of formula (I) for reducing bodyweight of an overweight individual. Some embodiments may include use of the compounds of formula (I) for reducing bodyweight in an individual with a metabolic syndrome.

In some embodiments, the compounds of formula (I) may be used in the manufacture of a medicament for reducing bodyweight. In some embodiments, the compounds of formula (I) may be used in the manufacture of a medicament for reducing bodyweight in an overweight individual. In some embodiments, the compounds of formula (I) may be used in the manufacture of a medicament for reducing bodyweight in an individual with a metabolic syndrome.

Non-Alcoholic Fatty Liver Disease and Steatohepatitis

Non-alcoholic fatty liver disease (NAFLD) encompasses a spectrum of liver diseases characterized by lipid accumulation in the liver, including isolated hepatosteatosis (>5% of hepatocytes histologically), that is not due to alcohol consumption. A subgroup of NAFLD patients have liver cell injury and inflammation in addition to hepatosteatosis, a condition known as non-alcoholic steatohepatitis (NASH). NASH dramatically increases the risks of cirrhosis, liver failure, and hepatocellular carcinoma (HCC).

Key histologic components of NASH are steatosis, hepatocellular ballooning, and lobular inflammation; fibrosis is not part of the histologic definition of NASH. Hepatocellular ballooning is usually defined as cellular enlargement 1.5-2 times the normal hepatocyte diameter, with rarefied cytoplasm and has been shown to correlate with fibrosis and to be associated with liver injury. However, the degree of fibrosis on liver biopsy (stage) is predictive of the prognosis, whereas the degree of inflammation and necrosis on liver biopsy (grade) are not. Despite the importance of fibrosis in clinical outcomes, regulatory approval of novel efficacious drugs for the treatment of NASH is related to clinical NAFLD activity score (NAS score) without worsening of fibrosis. The NAS score addresses steatosis, lobular inflammation and hepatocellular ballooning.

A novel finding in an ob/ob AMLN-diet mouse NASH model is that compounds of formula (I) significantly reduce hepatic expression of alpha-1 type 1 collagen 1, a key gene involved in hepatic fibrosis after 4 weeks of treatment. It was also found that, in this model, compounds of formula (I) decrease hepatic expression of CD68, a marker of hepatic macrophages and thus an indication of inflammation. Compounds of formula (I) were also found to significantly decrease hepatosteatosis in mice fed a high-carbohydrate, no-fat diet.

In some embodiments, the compounds of formula (I) may be used to treat NAFLD. In some embodiments, the treatment of NAFLD may be prophylactic. In some embodiments, the compounds of formula (I) may be used to treat NASH. In some embodiments, the treatment of NASH may be prophylactic. In some embodiments, the compounds of formula (I) may be used to reduce or prophylactically treat the development of hepatic fibrosis or reduce existing hepatic fibrosis in NASH. In some embodiments, the compounds of formula (I) may be used to reduce or prophylactically treat the development of hepatic inflammation or reduce existing hepatic inflammation in NASH. In some embodiments, the compounds of formula (I) may be used to reduce or prophylactically treat the development of hepatic steatosis or reduce existing hepatic steatosis in NAFLD or NASH.

Some embodiments may include use of the compounds of formula (I) for treating NAFLD. Some embodiments may include use of the compounds of formula (I) for treating NASH. Some embodiments may include use of the compounds of formula (I) for treating the development of hepatic fibrosis or reducing existing hepatic fibrosis in NASH. Some embodiments may include use of the compounds of formula (I) for treating the development of hepatic inflammation or reducing existing hepatic inflammation in NASH. Some embodiments may include use of the compounds of formula (I) for reducing or prophylactically treating the development of hepatic steatosis or reducing existing hepatic steatosis in NAFLD or NASH.

In some embodiments, the compounds of formula (I) may be used in the manufacture of a medicament for treating NAFLD. In some embodiments, the treatment of NAFLD may be prophylactic. In some embodiments, the compounds of formula (I) may be used in the manufacture of a medicament for treating NASH. In some embodiments, the treatment of NASH may be prophylactic In some embodiments, the compounds of formula (I) may be used in the manufacture of a medicament for reducing or prophylactically treating the development of hepatic fibrosis or reducing existing hepatic fibrosis in NASH In some embodiments, the compounds of formula (I) may be used in the manufacture of a medicament for reducing or prophylactically treating the development of hepatic inflammation or reducing existing hepatic inflammation in NASH. In some embodiments, the compounds of formula (I) may be used in the manufacture of a medicament for reducing or prophylactically treating the development of hepatic steatosis or reducing existing hepatic steatosis in NAFLD or NASH.

Cholestasis

Cholestasis is the reduction or stoppage of bile flow resulting in impaired bile salt homeostasis. Several liver diseases are associated with cholestasis, including hepatic biliary disorders, such as primary biliary cholangitis and sclerosing cholangitis, and parenteral nutrition associated liver disease (PNALD). NAFLD and NASH are also associated with impaired bile salt homeostasis.

Primary biliary cholangitis is characterized by progressive deterioration of bile ducts resulting in hepatic retention of bile acids. Sclerosing cholangitis is characterized by inflammation and fibrosis of the intrahepatic and extrahepatic bile ducts, resulting in stricturing of the bile ducts, which normally allow bile to drain from the gallbladder. These disorders can lead to hepatic inflammation, fibrosis, and cirrhosis.

Parenteral Nutrition (PN) is a life-saving therapy for patients with intestinal failure who are unable to absorb nutrients via the enteral route. However, long-term PN dependence places patients at risk of developing PN-associated liver disease (PNALD), characterized by hepatic steatosis, inflammation, and cholestasis that can progress to fibrosis and cirrhosis, end-stage liver disease requiring liver transplantation, and death if not treated.

Impaired bile salt homeostasis, a contributor to cholestasis, has been shown to be associated with increased expression of CYP7A1, which mediates the rate-limiting step in bile acid synthesis, and decreased hepatic expression of ABBC2, which regulates canalicular excretion of bilirubin via Mrp2. Dysregulation of CYP7A1 and ABBC2 has been shown to occur in PNALD models. Zhan et al., *Am J Physiol Gastrointest Liver Physiol.*, 2016; 310(2): G93-G102; Koelfat et al., *Clin Nutr.*, 2017; 36(5): 1403-1410.

A novel finding is that compounds of formula (I) affected the hepatic expression of genes involved in bile salt homeostasis in an ob/ob AMLN-diet mouse model. Specifically, compounds of formula (I) simultaneously decreased CYP7A1 expression and increased ABBC2 expression, which could be advantageous in the treatment or prophylaxis of PNALD and other hepatobiliary disorders in which cholestasis is involved.

Another novel finding is that compounds of formula (I) reduce hepatic steatosis in an oral PN diet mouse model. It was also found that compounds of formula (I) reduce alpha-1 type 1 collagen expression in an ob/ob AMLN-diet mouse model, which could be advantageous in the reduction or prophylactic treatment of fibrosis and/or reduction of existing fibrosis in PNALD and disorders characterized by hepatic fibrosis.

In some embodiments, the compounds of formula (I) may be used to treat a hepatic biliary disorder. In some embodiments, the treatment of a hepatic biliary disorder is prophylactic. In some embodiments, the compounds of formula (I) may be used to treat sclerosing cholangitis. In some embodiments, the treatment of sclerosing cholangitis may be prophylactic. In some embodiments, the compounds of formula (I) may be used to treat primary biliary cholangitis. In some embodiments, the treatment of primary biliary cholangitis may be prophylactic. In some embodiments, the compounds of formula (I) may be used to improve bile salt homeostasis. In some embodiments, the compounds of formula (I) may be used to improve bile salt homeostasis in a hepatic biliary disorder, such as sclerosing cholangitis or primary biliary cholangitis.

Some embodiments may include use of the compounds of formula (I) for treating hepatic biliary disorder. Some embodiments may include use of the compounds of formula (I) for treating sclerosing cholangitis. Some embodiments may include use of the compounds of formula (I) for treating biliary cholangitis. Some embodiments may include use of the compounds of formula (I) for improving bile salt homeostasis. Some embodiments may include use of the compounds of formula (I) for improving bile salt homeostasis in a hepatic biliary disorder such as sclerosing cholangitis or primary biliary cholangitis.

In some embodiments, the compounds of formula (I) may be used in the manufacture of a medicament for treating a hepatic biliary disorder. In some embodiments, the treatment of a hepatic biliary disorder is prophylactic. In some embodiments, the compounds of formula (I) may be used in the manufacture of a medicament for treating sclerosing cholangitis. In some embodiments, the treatment of sclerosing cholangitis may be prophylactic In some embodiments, the compounds of formula (I) may be used in the manufacture of a medicament for treating primary biliary cholangitis. In some embodiments, the treatment of primary biliary cholangitis may be prophylactic. In some embodiments, the compounds of formula (I) may be used in the manufacture of a medicament for improving bile salt homeostasis. In some embodiments, the compounds of formula (I) may be used in the manufacture of a medicament for improving bile salt homeostasis in a hepatic biliary disorder, such as sclerosing cholangitis or primary biliary cholangitis.

In some embodiments, the compounds of formula (I) may be used to reduce or prophylactically treat the development of hepatic inflammation or reduce existing hepatic inflammation in a hepatic biliary disorder, such as sclerosing cholangitis or primary biliary cholangitis. In some embodiments, the compounds of formula (I) may be used to reduce or prophylactically treat the development of hepatic fibrosis or reduce existing hepatic fibrosis in a hepatic biliary disorder, such as sclerosing cholangitis or primary biliary cholangitis.

Some embodiments may include use of the compounds of formula (I) for reducing or prophylactically treating the development of hepatic inflammation or reduce existing hepatic inflammation in a hepatic biliary disorder, such as sclerosing cholangitis or primary biliary cholangitis. Some embodiments may include use of the compounds of formula (I) for reducing or prophylactically treating the development of hepatic fibrosis or reducing existing hepatic fibrosis in a hepatic biliary disorder, such as sclerosing cholangitis or primary biliary cholangitis.

In some embodiments, the compounds of formula (I) may be used in the manufacture of a medicament for reducing or prophylactically treating the development of hepatic inflammation or reducing existing hepatic inflammation in a hepatic biliary disorder, such as sclerosing cholangitis or primary biliary cholangitis. In some embodiments, the compounds of formula (I) may be used in the manufacture of a medicament for reducing or prophylactically treating the development of hepatic fibrosis or reducing existing hepatic fibrosis in a hepatic biliary disorder, such as sclerosing cholangitis or primary biliary cholangitis.

In some embodiments, the compounds of formula (I) may be used to treat PNALD. In some embodiments, the treatment of PNALD may be prophylactic. In some embodiments, the compounds of formula (I) may be used to improve bile salt homeostasis in PNALD. In some embodiments, the compounds of formula (I) may be used to reduce or prophylactically treat the development of hepatic steatosis or reduce existing hepatic steatosis in PNALD. In some embodiments, the compounds of formula (I) may be used to reduce or prophylactically treat the development of hepatic inflammation or reduce existing hepatic inflammation in PNALD. In some embodiments, the compounds of formula (I) may be used to reduce or prophylactically treat the development of hepatic fibrosis or reduce existing hepatic fibrosis in PNALD.

Some embodiments may include use of the compounds of formula (I) for treating PNALD. Some embodiments may include use of the compounds of formula (I) for improving bile salt homeostasis in PNALD. Some embodiments may include use of the compounds of formula (I) for reducing or prophylactically treating the development of hepatic inflammation or reducing existing hepatic inflammation in PNALD. Some embodiments may include use of the compounds of formula (I) for reducing or prophylactically treating the development of hepatic fibrosis or reducing existing hepatic fibrosis in PNALD.

In some embodiments, the compounds of formula (I) may be used in the manufacture of a medicament for treating PNALD. In some embodiments, the treatment of PNALD may be prophylactic. In some embodiments, the compounds of formula (I) may be used in the manufacture of a medicament for improving bile salt homeostasis in PNALD. In some embodiments, the compounds of formula (I) may be used in the manufacture of a medicament for reducing or prophylactically treating the development of hepatic steatosis or reducing existing hepatic steatosis in PNALD. In some embodiments, the compounds of formula (I) may be used in the manufacture of a medicament for reducing or prophylactically treating the development of hepatic inflammation or reducing existing hepatic inflammation in PNALD In some embodiments, the compounds of formula (I) may be used in the manufacture of a medicament for reducing or prophylactically treating the development of hepatic fibrosis or reducing existing hepatic fibrosis in PNALD.

Dosing and Administration

A suitable daily dosage of a compound as disclosed, such as a compound of formula (I), may range from about 5 mg to about 2 g, such as from about 25 mg to about 1 g. For example, in some embodiments, the daily dose ranges from about 10 mg to about 1 g, from about 25 mg to about 750 mg, from about 30 mg to about 600 mg, from about 35 mg to about 500 mg, from about 40 mg to about 300 mg, from about 45 mg to about 250 mg, from about 50 mg to about 200 mg, from about 20 to about 100 mg, or from about 25 to about 75 mg. In at least one embodiment, the daily dose ranges from about 30 mg to about 70 mg. In at least one embodiment, the daily dose is about 10 mg, about 15 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, about 100 mg, about 110 mg, about 120 mg, about 125 mg, about 130 mg, about 140 mg, about 150 mg, about 160 mg, about 170 mg, about 175 mg, about 180 mg, about 190 mg, about 200 mg, about 225 mg, about 250 mg, about 275 mg, about 300 mg, about 325 mg, about 350 mg, about 375 mg, about 400 mg, about 450 mg, about 500 mg, about 550 mg, about 600 mg, about 650 mg, about 700 mg, about 750 mg, about 800 mg, about 850 mg, or about 900 mg. The compound(s) may be administered, for example, once, twice, or three times per day. In at least one embodiment, the compound of formula (I) is administered in an amount ranging from about 20 mg to about 300 mg per dose. In some embodiments, the compound of formula (I) is administered in an amount ranging from about 25 mg to about 100 mg. In at least one embodiment, the compound of formula (I) is administered once per day.

In some embodiments, the dose may be provided in one dose per day or in multiple doses per day. For example, a daily dosage may be provided in two doses per day, three doses per day, or four doses per day. In some embodiments, a daily dosage is provided in a single dose per day.

In some embodiments, the dose may not be administered every day. In some embodiments, the dose may be administered every other day, every three days, every four days, twice per week, or once per week.

In some embodiments, the compound of formula (I) is administered once per day at a dose of 30 mg. In some embodiments, the compound of formula (I) is administered once per day at a dose of 40 mg. In some embodiments, the compound of formula (I) is administered once per day at a dose of 50 mg. In some embodiments, the compound of formula (I) is administered once per day at a dose of 75 mg. In some embodiments, the compound of formula (I) is administered once per day at a dose of 100 mg. In some embodiments, the compound of formula (I) is administered once per day at a dose of 150 mg. In some embodiments, the compound of formula (I) is administered once per day at a dose of 200 mg. In some embodiments, the compound of formula (I) is administered once per day at a dose of 250 mg. In some embodiments, the compound of formula (I) is administered once per day at a dose of 300 mg.

A "pharmaceutically active amount" relates to an amount that will lead to the desired pharmacological and/or therapeutic effects, i.e. an amount of the combination product which is effective to achieve its intended purpose. While individual patient needs may vary, determination of optimal ranges for effective amounts of the combination product is within the skill of the art. Generally, the dosage regimen for treating a condition with the combination product of this invention is selected in accordance with a variety of factors, including the type, age, weight, sex, diet and medical condition of the patient.

Unless otherwise indicated, all numbers expressing quantities of ingredients, reaction conditions, concentrations, properties, and so forth used in the specification and claims are to be understood as being modified in all instances by the term "about." At the very least, each numerical parameter should at least be construed in light of the number of reported significant digits and by applying ordinary rounding techniques. Accordingly, unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contain certain errors resulting from variations in experiments, testing measurements, statistical analyses and such.

The present invention is not intended to be limited to the embodiments shown herein but is to be accorded the widest scope consistent with the principles and novel features disclosed herein. Those skilled in the art will recognize, or be able to ascertain, using no more than routine experimentation, numerous equivalents to the specific procedures, embodiments, claims, and examples described herein. Such equivalents are considered to be within the scope of the inventions. The disclosed inventions are further illustrated by the following examples, which should not be construed as limiting the inventions.

EXAMPLES OF COMPOUNDS OF FORMULA (I)
The present disclosure relates to the following non-limiting examples of compounds of formula (I).
Group 1
Example 1
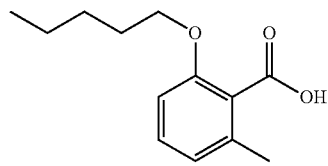 [SMILES: CCCCCOc1cccc(C)c1C(=O)O]
2-methyl-6-(pentyloxy)benzoic acid
Example 2
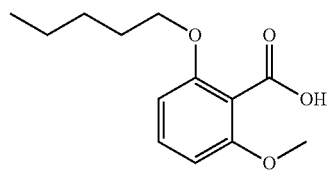 [SMILES: CCCCCOc1cccc(OC)c1C(=O)O]
2-methoxy-6-(pentyloxy)benzoic acid
Example 3
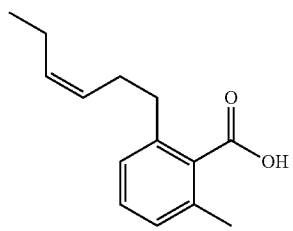 [SMILES: CC/C=C\CCc1cccc(C)c1C(=O)O]
(Z)-2-(hex-3-en-1-yl)-6-methylbenzoic acid
Group 2
Example 1
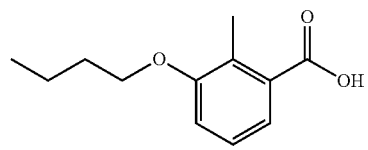
3-butoxy-2-methylbenzoic acid
Example 2
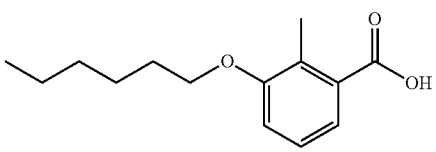 [SMILES: CCCCCCOc1cccc(C(=O)O)c1C]
3-(hexyloxy)-2-methylbenzoic acid
Example 3
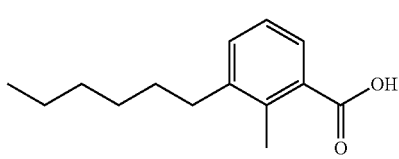 [SMILES: CCCCCCc1cccc(C(=O)O)c1C]

3-hexyl-2-methylbenzoic acid

Example 4

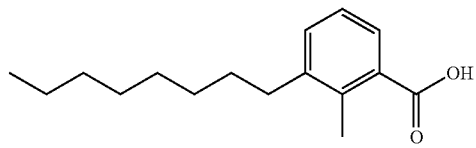 [SMILES: CCCCCCCCc1cccc(C(=O)O)c1C]

2-methyl-3-octylbenzoic acid

Example 5

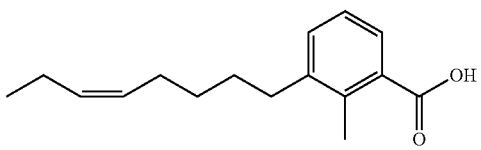 [SMILES: CC/C=C\CCCCc1cccc(C(=O)O)c1C]

(Z)-2-methyl-3-(oct-5-en-1-yl)benzoic acid

Example 6

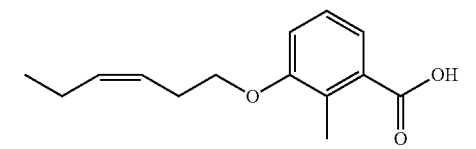 [SMILES: CC/C=C\CCOc1cccc(C(=O)O)c1C]

(Z)-3-(hex-3-en-1-yloxy)-2-methylbenzoic acid

Example 7

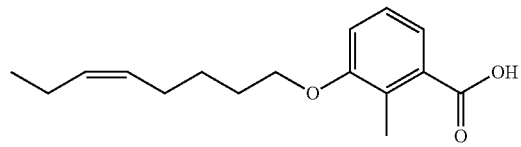 [SMILES: CC/C=C\CCCCOc1cccc(C(=O)O)c1C]

(Z)-2-methyl-3-(oct-5-en-1-yloxy)benzoic acid

Example 8

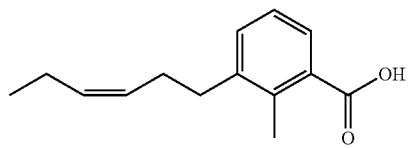 [SMILES: CC/C=C\CCc1cccc(C(=O)O)c1C]

(Z)-3-(hex-3-en-1-yl)-2-methylbenzoic acid

Example 9

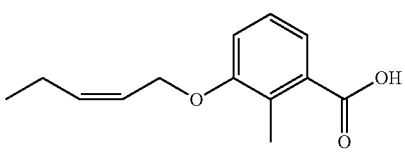 [SMILES: CC/C=C\COc1cccc(C(=O)O)c1C]

(Z)-2-methyl-3-(pent-2-en-1-yloxy)benzoic acid ("Compound B")

Example 10

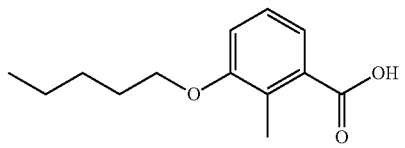 [SMILES: CCCCCOc1cccc(C(=O)O)c1C]

2-methyl-3-(pentyloxy)benzoic acid ("Compound A")

Example 11

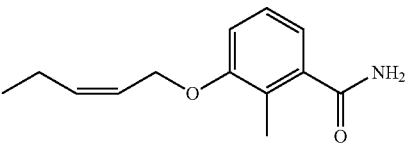 [SMILES: CC/C=C\COc1cccc(C(N)=O)c1C]

(Z)-2-methyl-3-(pent-2-en-1-yloxy)benzamide ("Compound C")

Example 12

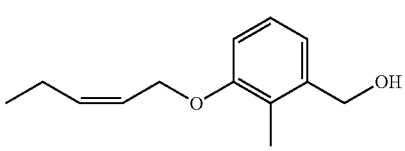

57

(Z)-(2-methyl-3-(pent-2-en-1-yloxy)phenyl)methanol

Example 13

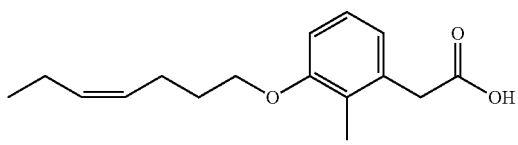 [SMILES: CC/C=C\CCCOc1cccc(CC(=O)O)c1C]

(Z)-2-(3-(hept-4-en-1-yloxy)-2-methylphenyl)acetic acid

Example 14

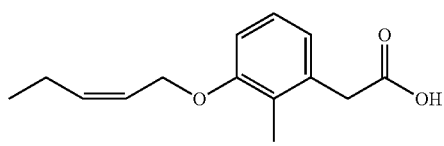 [SMILES: CC/C=C\COc1cccc(CC(=O)O)c1C]

(Z)-2-(2-methyl-3-(pent-2-en-1-yloxy)phenyl)acetic acid

Example 15

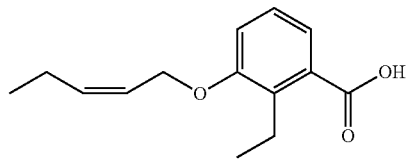 [SMILES: CC/C=C\COc1cccc(C(=O)O)c1CC]

(Z)-2-ethyl-3-(pent-2-en-1-yloxy)benzoic acid

Example 16

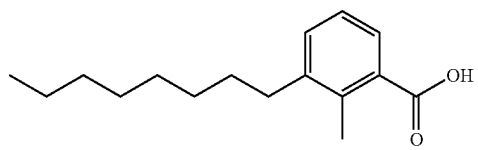 [SMILES: CCCCCCCCc1cccc(C(=O)O)c1C]

58

2-methyl-3-octylbenzoic acid

Example 17

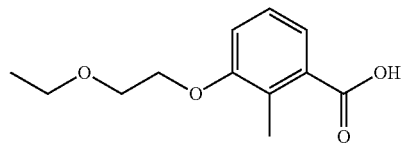 [SMILES: CCOCCOc1cccc(C(=O)O)c1C]

3-(2-ethoxyethoxy)-2-methylbenzoic acid

Example 18

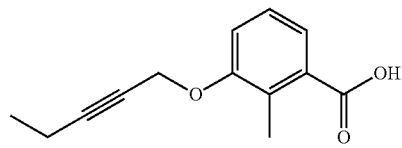 [SMILES: CCC#CCOc1cccc(C(=O)O)c1C]

2-methyl-3-(pent-2-yn-1-yloxy)benzoic acid

Example 19

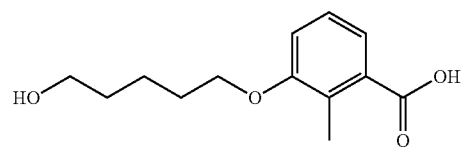 [SMILES: Cc1c(OCCCCCO)cccc1C(=O)O]

3-((5-hydroxypentyl)oxy)-2-methylbenzoic acid

Example 20

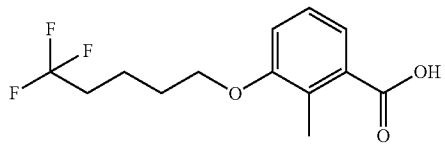 [SMILES: Cc1c(OCCCCC(F)(F)F)cccc1C(=O)O]

2-methyl-3-((5,5,5-trifluoropentyl)oxy)benzoic acid

Example 21

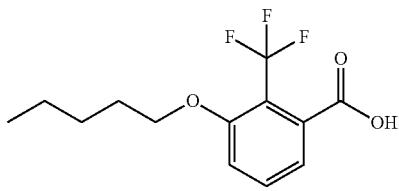 [SMILES: CCCCCOc1cccc(C(=O)O)c1C(F)(F)F]

3-(pentyloxy)-2-(trifluoromethyl)benzoic acid

Example 22

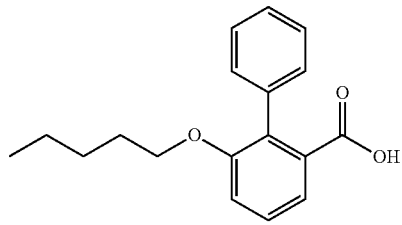 [SMILES: CCCCCOc1cccc(C(=O)O)c1-c1ccccc1]

6-(pentyloxy)-[1,1'-biphenyl]-2-carboxylic acid

Example 23

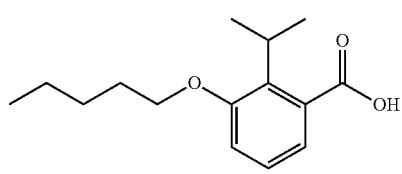 [SMILES: CCCCCOc1cccc(C(=O)O)c1C(C)C]

2-isopropyl-3-(pentyloxy)benzoic acid

Example 24

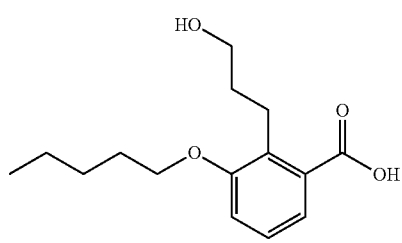 [SMILES: CCCCCOc1cccc(C(=O)O)c1CCCO]

2-(3-hydroxypropyl)-3-(pentyloxy)benzoic acid

Example 25

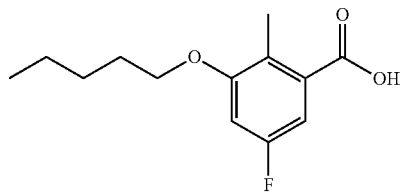 [SMILES: CCCCCOc1cc(F)cc(C(=O)O)c1C]

5-fluoro-2-methyl-3-(pentyloxy)benzoic acid

Example 26

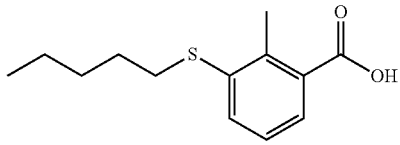 [SMILES: CCCCCSc1cccc(C(=O)O)c1C]

2-methyl-3-(pentylthio)benzoic acid

Example 27

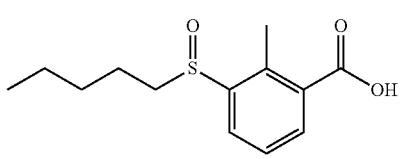 [SMILES: CCCCCS(=O)c1cccc(C(=O)O)c1C]

2-methyl-3-(pentylsulfinyl)benzoic acid

Example 28

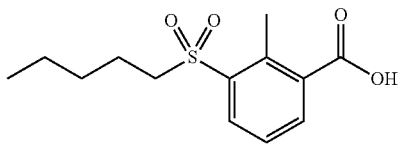 [SMILES: CCCCCS(=O)(=O)c1cccc(C(=O)O)c1C]

2-methyl-3-(pentylsulfonyl)benzoic acid

Example 29

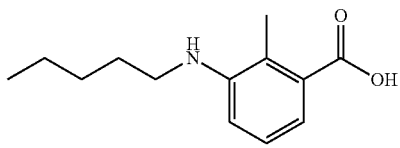 [SMILES: CCCCCNc1cccc(C(=O)O)c1C]

2-methyl-3-(pentylamino)benzoic acid

Example 30

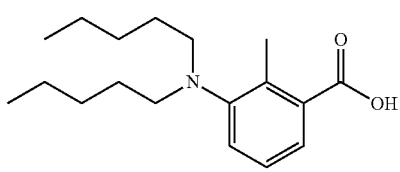 [SMILES: CCCCCN(CCCCC)c1cccc(C(=O)O)c1C]

3-(dipentylamino)-2-methylbenzoic acid

Example 31

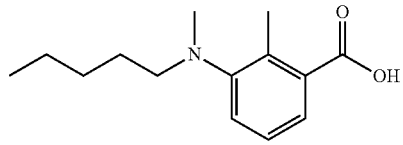 [SMILES: CCCCCN(C)c1cccc(C(=O)O)c1C]

2-methyl-3-(methyl(pentyl)amino)benzoic acid

Example 32

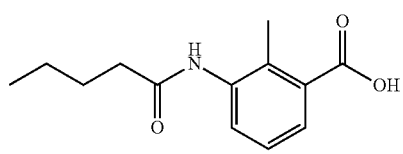 [SMILES: CCCCC(=O)Nc1cccc(C(=O)O)c1C]

2-methyl-3-pentanamidobenzoic acid

Example 33

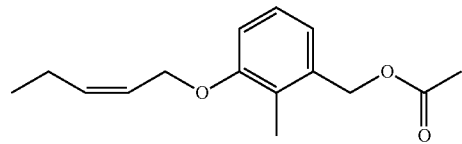 [SMILES: CC/C=C\COc1cccc(COC(C)=O)c1C]

(Z)-2-methyl-3-(pent-2-en-1-yloxy)benzyl acetate

Example 34

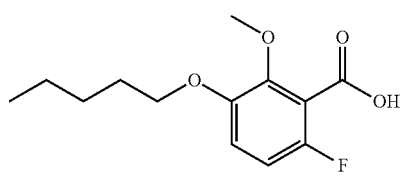 [SMILES: CCCCCOc1ccc(F)c(C(=O)O)c1OC]

6-fluoro-2-methoxy-3-(pentyloxy)benzoic acid

Example 35

2-methyl-2-(2-methyl-3-(pentyloxy)phenyl)propanoic acid

Example 36

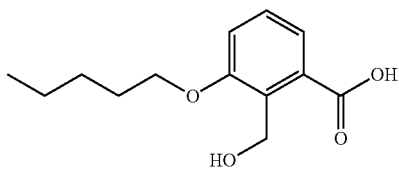 [SMILES: CCCCCOc1cccc(C(=O)O)c1CO]

2-(hydroxymethyl)-3-(pentyloxy)benzoic acid

Example 37

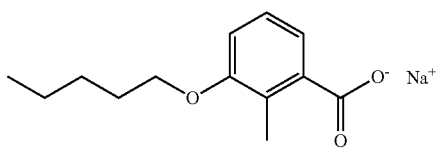 [SMILES: CCCCCOc1cccc(C(=O)[O-])c1C ; [Na+]]

sodium 2-methyl-3-(pentyloxy)benzoate

Example 38

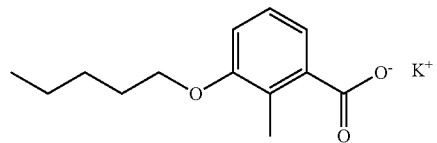 [SMILES: CCCCCOc1cccc(C(=O)[O-])c1C ; [K+]]

potassium 2-methyl-3-(pentyloxy)benzoate

Example 39

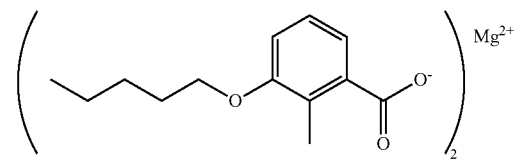

magnesium 2-methyl-3-(pentyloxy)benzoate

Example 40

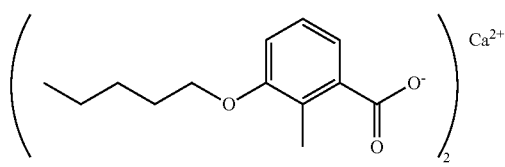

calcium 2-methyl-3-(pentyloxy)benzoate

Group 3

Example 1

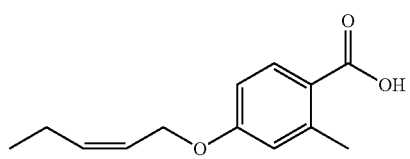 [SMILES: CC/C=C\COc1ccc(C(=O)O)c(C)c1]

(Z)-2-methyl-4-(pent-2-en-1-yloxy)benzoic acid

Example 2

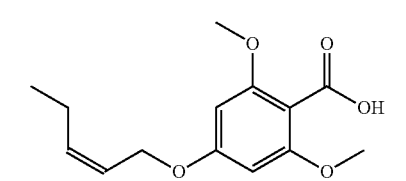 [SMILES: CC/C=C\COc1cc(OC)c(C(=O)O)c(OC)c1]

(Z)-2,6-dimethoxy-4-(pent-2-en-1-yloxy)benzoic acid

Example 3

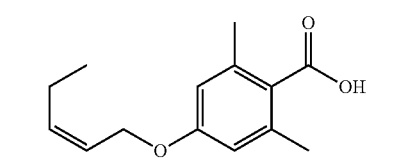 [SMILES: CC/C=C\COc1cc(C)c(C(=O)O)c(C)c1]

(Z)-2,6-dimethyl-4-(pent-2-en-1-yloxy)benzoic acid

Group 4

Example 1

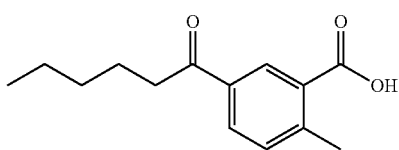 [SMILES: CCCCCC(=O)c1ccc(C)c(C(=O)O)c1]

5-hexanoyl-2-methylbenzoic acid

Example 2

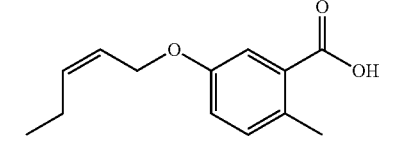 [SMILES: CC/C=C\COc1ccc(C)c(C(=O)O)c1]

(Z)-2-methyl-5-(pent-2-en-1-yloxy)benzoic acid

Example 3

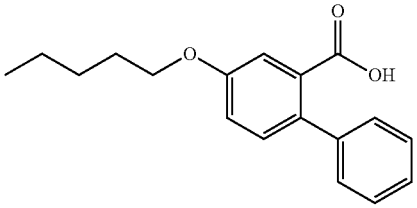 [SMILES: CCCCCOc1ccc(-c2ccccc2)c(C(=O)O)c1]

4-(pentyloxy)-[1,1'-biphenyl]-2-carboxylic acid

Example 4

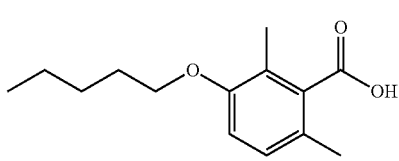 [SMILES: CCCCCOc1ccc(C)c(C(=O)O)c1C]

2,6-dimethyl-3-(pentyloxy)benzoic acid

Example 5

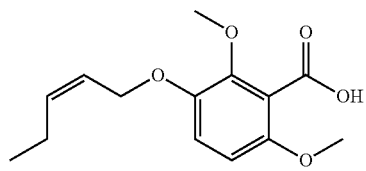 [SMILES: CC/C=C\COc1ccc(OC)c(C(=O)O)c1OC]

(Z)-2,6-dimethoxy-3-(pent-2-en-1-yloxy)benzoic acid

Group 5

Example 1

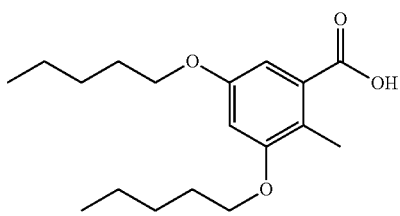 [SMILES: CCCCCOc1cc(OCCCCC)c(C)c(C(=O)O)c1]

2-methyl-3,5-bis(pentyloxy)benzoic acid

Example 2

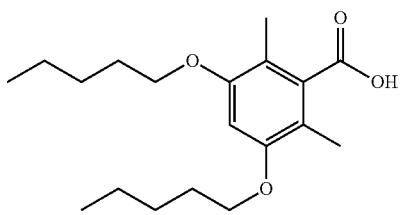 [SMILES: CCCCCOc1cc(OCCCCC)c(C)c(C(=O)O)c1C]

2,6-dimethyl-3,5-bis(pentyloxy)benzoic acid

Example 3

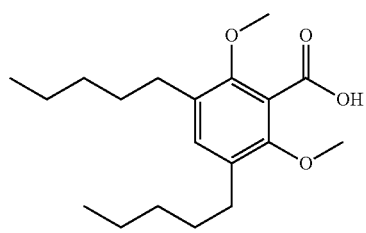 [SMILES: CCCCCc1cc(CCCCC)c(OC)c(C(=O)O)c1OC]

2,6-dimethoxy-3,5-dipentylbenzoic acid

General synthetic methods for the compounds described herein

In general, all compounds of the present invention may be prepared by conventional methods, using readily available and/or conventionally preparable starting materials, reagents and conventional synthesis procedures. Key synthetic steps may include cross-coupling reactions, ether formation reactions like Mitsunobu type reactions, Friedel-Craft reactions, aromatic nucleophilic substitution reactions, and functional group interconversion (FGI) reactions. It will also be appreciated that in some of the reactions it may be necessary/desirable to protect any sensitive groups in the compounds. Suitable protecting groups and the methods for protecting and de-protecting different substituents are well known to those skilled in the art. Conventional protecting groups may be used in accordance with standard practice. Pharmaceutically acceptable salts may be synthesized from the parent compound that contains an acid moiety by conventional chemical methods. Salts may be prepared in situ or in a separate step.

The compounds of general formula (I) can be prepared by the following general procedures:

Method I

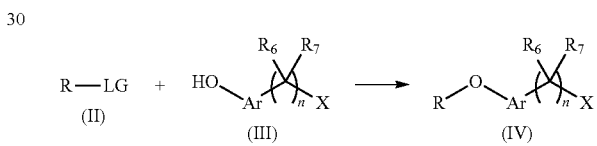

Compounds of formula (II) and (III) are commercially available, or they are known in the literature, or they are prepared by standard processes known in the art. The leaving group (LG) present in compounds of formula (II) may, for example, be a mesylate, a tosylate or a suitable halogen, such as bromine or chlorine. R is an optionally substituted group selected from alkyl, alkenyl and alkynyl groups. Ar is a phenyl ring comprising four substituents selected from: R1, R2, R3, R4, and R5. Substituents R1, R2, R3, R4, R5, R6, R7, and X each comprise any one of the foregoing embodiments for formula (I), which each optionally comprise a protecting group. The skilled person will be able to select suitable protecting groups based on the desired outcome.

Using Method I, the alcohols of formula (III) can react in a substitution reaction with a compound of formula (II) in the presence of base such as a metal hydride, for example NaH, a metal hydroxide, for example NaOH, a metal alkoxide, for example NaOEt, a metal carbanion, for example n-butyllithium, or a metal carbonate, for example K2CO3 in an appropriate solvent or solvent system. Suitable solvent systems may include a two phase mixture and the use of a phase transfer catalyst, optionally in the presence of additional heat. Method I may also include optional steps to add and remove protecting groups. For example, removal of protecting groups may include converting an ester group to a carboxylic acid. Some embodiments of Method I may comprise using a catalyst and/or heat to provide a compound of formula (IV).

In some embodiments, compounds of formula (III) may be described by any one of formulas (IIIA)-(IIIE):

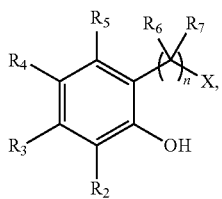
(III-A)

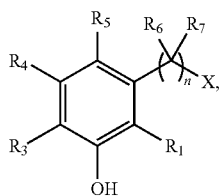
(III-B)

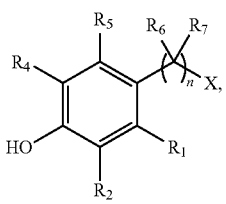
(III-C)

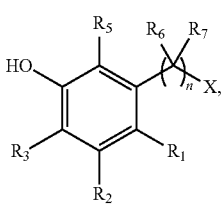
(III-D)

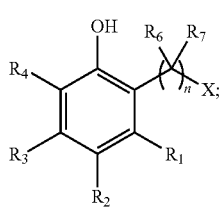
(III-E)

wherein substituents R1, R2, R3, R4, R5, R6, R7 and X each comprise any one of the foregoing embodiments for formula (I).

In some embodiments, compounds of formula (IV) may comprise any one of formulas (IV-A)-(IV-E):

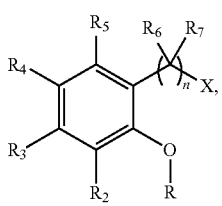
(IV-A)

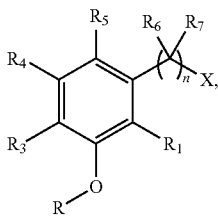
(IV-B)

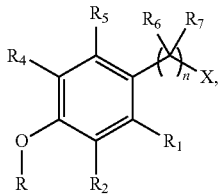
(IV-C)

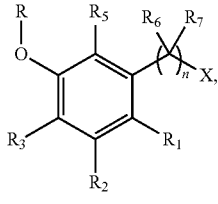
(IV-D)

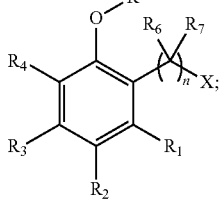
(IV-E)

wherein substituents R1, R2, R3, R4, R5, R6, R7 and X each comprise any one of the foregoing embodiments for formula (I); and wherein R is an optionally substituted group selected from alkyl, alkenyl and alkynyl groups.

Method II

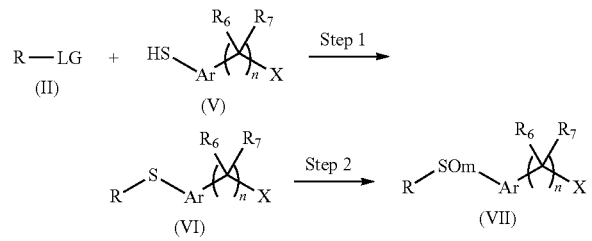

Compounds of formula (II) and (V) are commercially available, or they are known in the literature, or they are prepared by standard processes known in the art. The leaving group (LG) present in compounds of formula (II) may, for example, be a mesylate, a tosylate or a suitable halogen, such as bromine or chlorine. R is an optionally substituted group selected from an alkyl, alkenyl and alkynyl group. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Using Method II, the thiols of formula (V) can react in a substitution reaction with a compound of formula (II) in the presence of base such as a metal hydride, for example NaH, a metal hydroxide, for example NaOH, a metal carbonate, for example K2CO3, or an organic base, for example Et3N in an appropriate solvent or solvent system to form compounds of formula (VI) (Step 1). Suitable solvent systems may include a two phase mixture and the use of a phase transfer catalyst optionally in the presence of additional heat. Method II may also include optional steps to add and remove protecting groups. For example, removal of protecting groups may include converting an ester group to a carboxylic acid. Some embodiments of Method II may comprise using a catalyst and/or heat to provide a compound of formula (VII).

The corresponding sulfoxides and sulfones of compound (VI) can be prepared by oxidation of the thioethers with a suitable oxidising agent (Step 2). Examples of oxidising agents are m-chloro-perbenzoic acid (MCPBA), hydrogen peroxide (H2O2) and oxone (potassium peroxymonosulfate). By using 1 equivalent or less of the oxidising agent, the main product is typically the sulfoxide (m=1). By using an excess oxidising agent, the main product is typically the sulfone (m=2).

In some embodiments, compounds of formula (V) may be described any one of formulas (V-A)-(V-E):

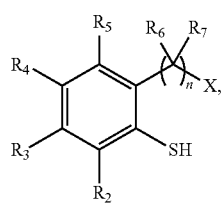
(V-A)

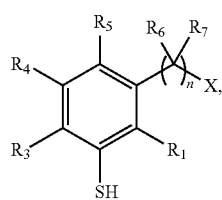
(V-B)

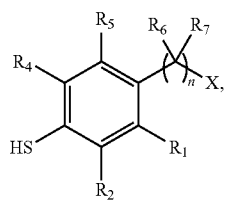
(V-C)

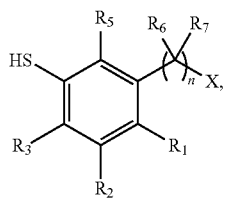
(V-D)

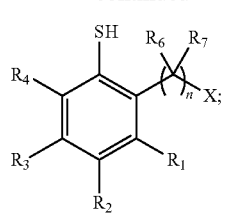
(V-E)

wherein substituents R1, R2, R3, R4, R5, R6, R7 and X each comprise groups according to any one of the foregoing embodiments for formula (I).

In some embodiments, compounds of formula (VI) may comprise any one of formulas (VI-A)-(VI-E):

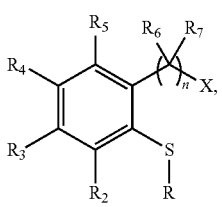
(VI-A)

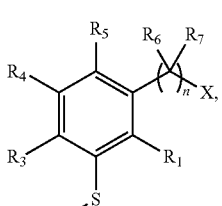
(VI-B)

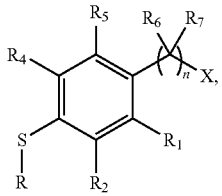
(VI-C)

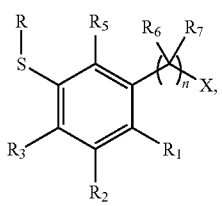
(VI-D)

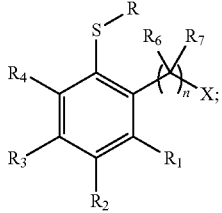
(VI-E)

wherein substituents R1, R2, R3, R4, R5, R6, R7 and X each comprise any one of the foregoing embodiments for formula (I); and wherein R is an optionally substituted group selected from alkyl, alkenyl and alkynyl groups.

In some embodiments, compounds of formula (VII) may be described by any one of formulas (VII-A)-(VII-E):

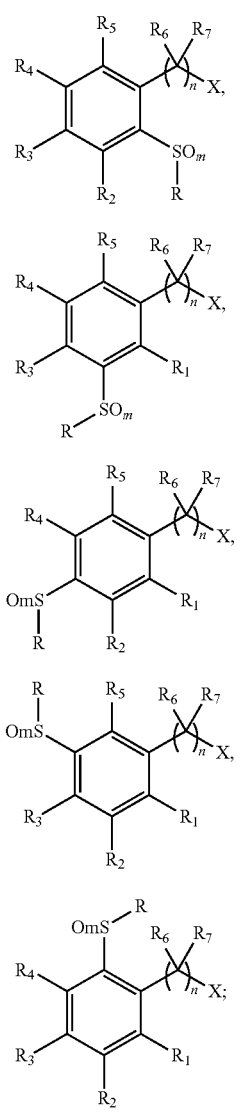

wherein substituents R1, R2, R3, R4, R5, R6, R7 and X each comprise any one of the foregoing embodiments for formula (I); and wherein R is an optionally substituted group selected form alkyl alkenyl and alkynyl groups, and m is 1 or 2.

Method III

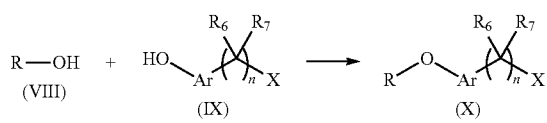

Compounds of formula (VIII) and (IX) are commercially available, or they are known in the literature, or they are prepared by standard processes known in the art. R is an optionally substituted group selected from an alkyl, alkenyl or alkynyl group, and an aromatic group, like aryl. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Using Method III, the alcohol of formula (IX) can react with compounds of formula (VIII), under classic or non-classic Mitsunobu conditions, using methods familiar to persons skilled in the art. Method III may also include optional steps to add and remove protecting groups. For example, removal of protecting groups may include converting an ester group to a carboxylic acid. Some embodiments of Method III may comprise using a catalyst and/or heat to provide a compound of formula (X).

In some embodiments, compounds of formula (IX) may be described by compounds of formula (III), (III-A), (III-B), (III-C), (III-D), or (III-E), as described above.

In some embodiments, compounds of formula (X) may be described by compounds of formula (IV), (IV-A), (IV-B), (IV-C), (IV-D), or (IV-E), as described above.

Method IV

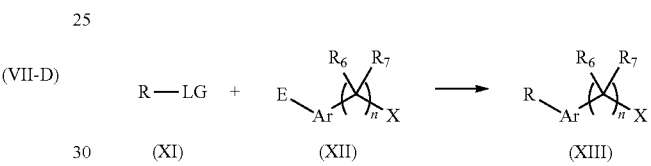

Compounds of formula (XI) and (XII) are commercially available, or they are known in the literature, or they are prepared by standard processes known in the art. The leaving group (LG) present in compounds of formula (XI) may, for example, be a hydrid, a triflate, a tosylate, or a suitable halogen, such as bromine or iodide. The leaving group (E) present in compounds of formula (XII) are elements based on boron, copper, magnesium, silicon, tin or zinc. R is an optionally substituted group selected from an alkyl, alkenyl, alkynyl group, and an aromatic group, like aryl. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Method IV represents various cross coupling reactions where the fragments (XI) and (XII) are joined together with the aid of a metal catalyst, for example complexes based on palladium, copper, iron, cobalt or nickel, to form a carbon-carbon bound between the fragments. These cross-coupling reactions may be performed under classic or non-classical Heck, Kumada, Negishi, Sonogashira, Stille or Suzuki conditions, using methods familiar to persons skilled in the art. The skilled person will be able to select suitable leaving groups (LG' and E), catalysts and reaction conditions based on the desired outcome. Method IV may also include optional steps to add and remove protecting groups. For example, removal of protecting groups may include converting an ester group to a carboxylic acid. Some embodiments of Method IV may comprise using a catalyst and/or heat to provide a compound of formula (XIII).

In some embodiments, compounds of formula (XII) may be described by any one of formulas (XII-A)-(XII-E):

(XII-A)
(XII-B)
(XII-C)
(XII-D)
(XII-E)

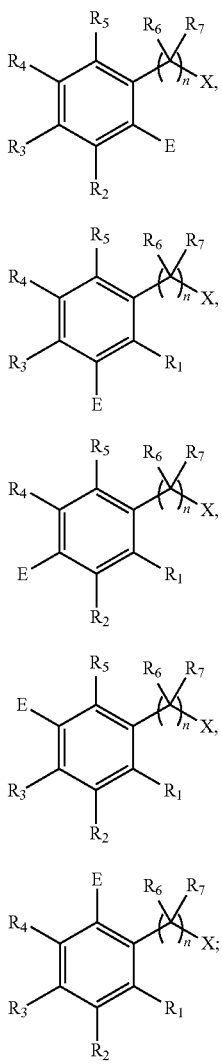

wherein substituents R1, R2, R3, R4, R5, R6, R7 and X each comprise groups according to any one of the foregoing embodiments for formula (I).

In some embodiments, compounds of formula (XIII) may be described by any one of formulas (XIII-A)-(XIII-E):

(XII-A)
(XII-B)

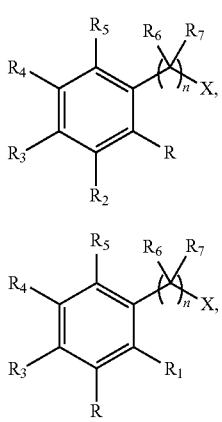

(XII-C)
(XII-D)
(XII-E)

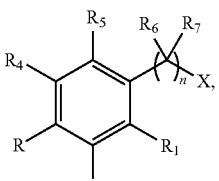

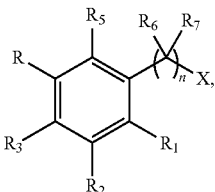

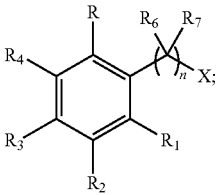

wherein substituents R1, R2, R3, R4, R5, R6, R7 and X each comprise any one of the foregoing embodiments for formula (I); and wherein R is an optionally substituted group selected from alkyl, alkenyl, alkynyl group, and an aromatic group.

Method V

Compounds of formula (XIV) and (XV) are commercially available, or they are known in the literature, or they are prepared by standard processes known in the art. The LG-group present in compounds of formula (XIV) may, for example, be a halogen, such as chlorine, or a thioalkyl group (SR'). The group (E) present in compounds of formula (XV) may be Sn(Alkyl)3 group, or a BR2 group (i.e., a boronic acid or a cyclic or acyclic boronic ester group). R is an allyl, alkenyl, or aryl group. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Method V represents cross coupling reactions where the fragments (XIV) and (XV) are joined together with the aid of a metal catalyst, for example complexes based on palladium or copper. These cross-coupling reactions may be performed under classic or non-classical Stille or Liebeskind-Srogl coupling conditions, using methods familiar to persons skilled in the art. The skilled person will be able to select suitable leaving groups (LG and E), catalysts and reaction conditions based on the desired outcome. Method V may also include optional steps to add and remove protecting groups. For example, removal of protecting groups may include converting an ester group to a carboxylic acid. Some embodiments of Method V may comprise using a catalyst and/or heat to provide a compound of formula (XVI).

Compounds of formula (XVI) can also be formed when compounds of formula (XV) reacts with compounds of formula R-LG, where the LG- group may, for example, be a triflate, or a halogen, such as bromine, chlorine or iodine in the presence of CO under classic or non-classic Stille-Carbonylative cross-coupling conditions.

In some embodiments, compounds of formula (XV) may be described by compounds of formula (XII), (XII-A), (XII—B), (XII—C), (XII-D), or (XII-E), as described above.

In some embodiments, compounds of formula (XVI) may be described by any one of formulas (XVI-A)-(XVI-E):

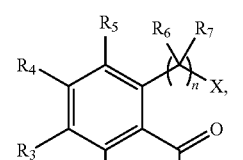
(XVI-A)

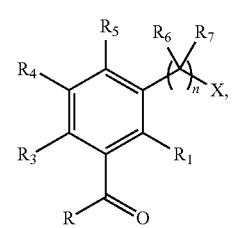
(XVI-B)

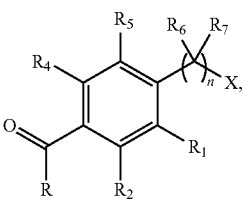
(XVI-C)

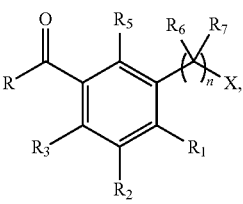
(XVI-D)

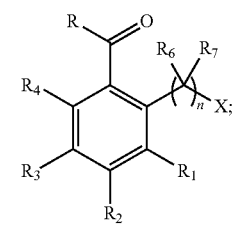
(XII-E)

wherein substituents R1, R2, R3, R4, R5, R6, R7 and X each comprise any one of the foregoing embodiments for formula (I); and wherein R is an optionally substituted group selected from alkyl, alkenyl, alkynyl group, and an aromatic group.

Method VI

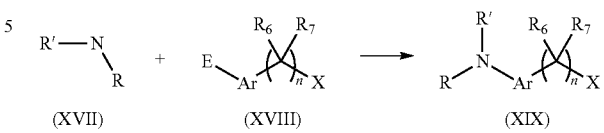

(XVII)     (XVIII)     (XIX)

Compounds of formula (XVII) and (XVIII) are commercially available, or they are known in the literature, or they are prepared by standard processes known in the art. The R and R'-groups present in compounds of formula (XVII) may be the same or different and may, for example, be an optionally substituted group selected from an alkyl group, an alkenyl group, an alkynyl group, an aryl group, a —COR" group, or a H atom, provided that both R and R' cannot both be a H atom. The R" group can be the same as R and R' except for a H atom or a —COR group. The leaving group (E) present in compounds of formula (XVIII) may, for example, be a O-triflate (OTf), a suitable halogen, such as chlorine, bromine or iodide, or a boronic acid. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Method VI represents cross coupling reactions where two fragments (XVII) and (XVIII) are joined together with the aid of a metal catalyst, for example complexes based on palladium or copper. These cross-coupling reactions may be performed under classic or non-classical Buchwald-Hartwig amination or Chan-Lam coupling conditions, using methods familiar to persons skilled in the art. The skilled person will be able to select a suitable leaving groups (LG), catalysts and reaction conditions based on the desired outcome. Method VI may also include optional steps to add and remove protecting groups. For example, removal of protecting groups may include converting an ester group to a carboxylic acid. Some embodiments of Method VI may comprise using a catalyst and/or heat to provide a compound of formula (XIX).

In some embodiments, compounds of formula (XVIII) may be described by compounds of formula (XV), (XV-A), (XV—B), (XV—C), (XV-D), or (XV-E), as described above.

In some embodiments, compounds of formula (XIX) may be described by any one of formulas (XIX-A)-(XIX-E):

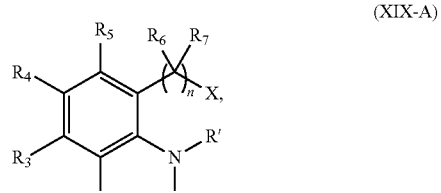
(XIX-A)

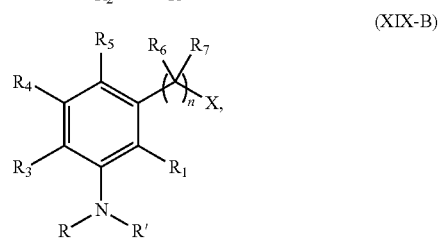
(XIX-B)

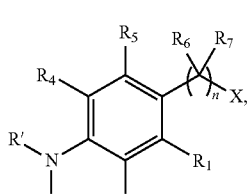
(XIX-C)

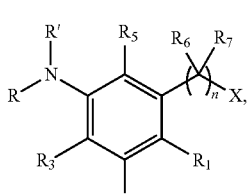
(XIX-D)

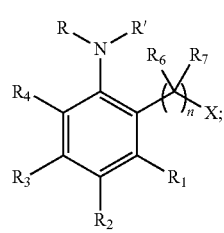
(XIX-E)

wherein substituents R1, R2, R3, R4, R5, R6, R7 and X each comprise any one of the foregoing embodiments for formula (I); and wherein the R and R'-groups present in compounds of formula (XVII) may be the same or different and may, for example, be an optionally substituted group selected from an alkyl group, an alkenyl group, an alkynyl group, an aryl group, a —COR" group, or a H atom, provided that both R and R' cannot both be a H atom. The R" group can be the same as R and R' except for a H atom or a —COR group.

Method VII

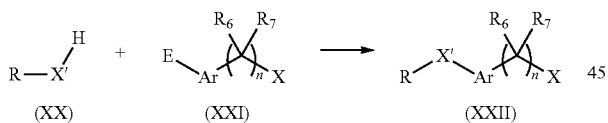

Compounds of formula (XX) and (XXI) are commercially available, or they are known in the literature, or they are prepared by standard processes known in the art. The R-groups present in compounds of formula (XX) may, for example, be an optionally substituted group selected from an alkyl group, an alkenyl group, an alkynyl group, and an aryl group. X' is O or S. The leaving group (E) present in compounds of formula (XXI) may, for example, be a O-triflate (OTf), or a suitable halogen, such as chlorine, bromine or iodide or a boronic acid. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Method VII represents cross coupling reactions where two fragments (XX) and (XXI) are joined together with the aid of a metal catalyst, for example complexes based on palladium or copper. These cross-coupling reactions may be performed under classic or non-classical Buchwald-Hartwig reaction, Ullman condensation or Chan-Lam coupling type conditions, using methods familiar to persons skilled in the art. The skilled person will be able to select a suitable leaving groups (E), catalysts and reaction conditions based on the desired outcome. Method VII may also include optional steps to add and remove protecting groups, for example, removal of protecting groups may include converting an ester group to a carboxylic acid. Some embodiments of Method VII may comprise using a catalyst and/or heat to provide a compound of formula (XXII).

In some embodiments, compounds of formula (XXI) may be described by compounds of formula (XV), (XV-A), (XV—B), (XV—C), (XV-D), or (XV-E), as described above.

In some embodiments, compounds of formula (XXII) may be described by any one of formulas (XXII-A)-(XXII-E):

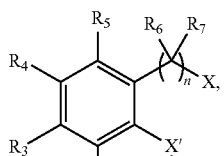
(XXII-A)

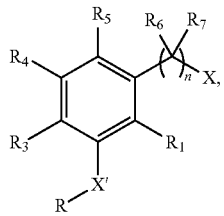
(XXII-B)

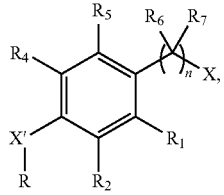
(XXII-C)

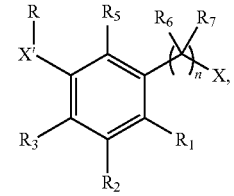
(XXII)

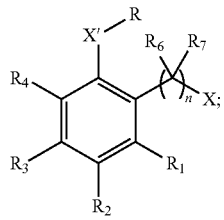
(XXII-E)

wherein substituents R1, R2, R3, R4, R5, R6, R7 and X each comprise any one of the foregoing embodiments for formula (I); n is 0, 1, or 2; and R is an optionally substituted group selected from alkyl, alkenyl and alkynyl groups.

Method VIII

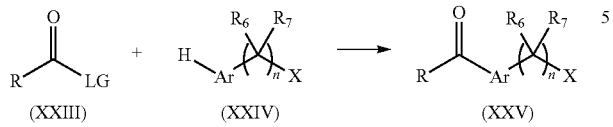

Compounds of formula (XXIII) and (XXIV) are commercially available, or they are known in the literature, or they are prepared by standard processes known in the art. The LG- group present in compounds of formula (XXIII) may, for example, be a halogen, such as chlorine, or a RCOO- group. R is an allyl, alkenyl, or aryl group. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Method VIII represents electrophilic aromatic substitution reactions where the fragments (XXIII) and (XXIV) are joined together with the aid of a Lewis acid, for example complexes based on aluminium, iron, zinc, boron, or titanium. These reactions may be performed under classic or non-classical Friedel Crafts acylation coupling conditions, using methods familiar to persons skilled in the art. The skilled person will be able to select suitable leaving groups (LG), catalysts and reaction conditions based on the desired outcome. Method VIII may also include optional steps to add and remove protecting groups. For example, removal of protecting groups may include converting an ester group to a carboxylic acid. Some embodiments of Method VIII may comprise using a catalyst and/or heat to provide a compound of formula (XXV).

In some embodiments, compounds of formula (XXIV) may be described by any one of formulas (XXIV-A)-(XXIV-E):

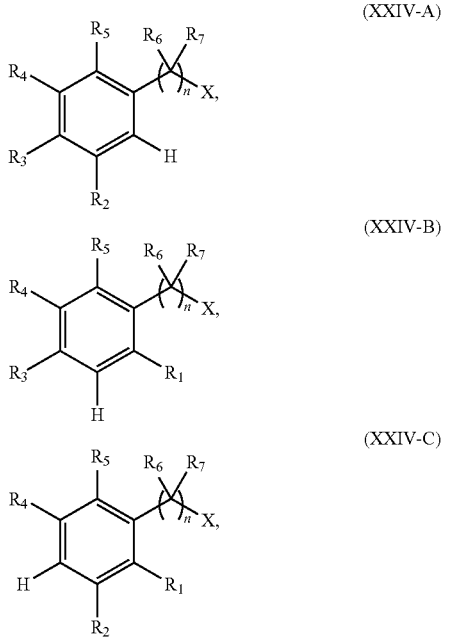

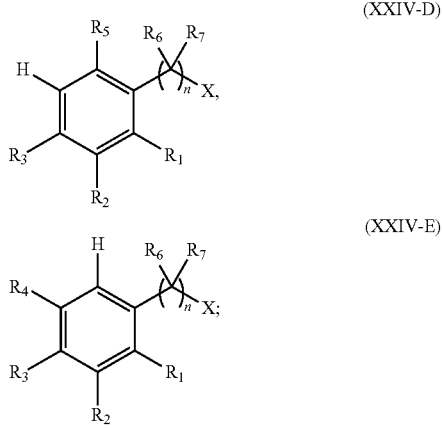

In some embodiments, compounds of formula (XXV) may be described by compounds of formula (XVI), (XVI-A), (XVI—B), (XVI—C), (XVI-D), or (XVI-E), as described above.

Method IX

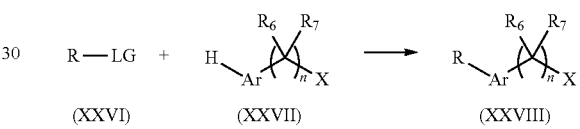

Compounds of formula (XXVI) and (XXVII) are commercially available, or they are known in the literature, or they are prepared by standard processes known in the art. The LG- group present in compounds of formula (XXIII) may, for example, be a halogen, such as chlorine. R is an allyl, alkenyl, or aryl group. Ar is a phenyl ring comprising four substituents selected from: R1, R2, R3, R4, and R5. Substituents R1, R2, R3, R4, R5, R6, R7, and X comprise any one of the foregoing embodiments for formula (I), which each optionally comprise a protecting group.

Method IX represents electrophilic aromatic substitution reactions where the fragments (XXIII) and (XXIV) are joined together with the aid of a Lewis acid, for example complexes based on aluminium, iron, zinc, boron, or titanium. These reactions may be performed under classic or non-classical Friedel Crafts alkylation coupling conditions, using methods familiar to persons skilled in the art. The skilled person will be able to select suitable leaving groups (LG), catalysts and reaction conditions based on the desired outcome. Method IX may also include optional steps to add and remove protecting groups. For example, removal of protecting groups may include converting an ester group to a carboxylic acid. Some embodiments of Method IX may comprise using a catalyst and/or heat to provide a compound of formula (XXVIII).

In some embodiments, compounds of formula (XXVII) may be described by compounds of formula (XXIV), (XXIV-A), (XXIV—B), (XXIV—C), (XXIV-D), or (XXIV-E), as described above.

In some embodiments, compounds of formula (XXVIII) may be described by compounds of formula (XVI), (XVI-A), (XVI—B), (XVI—C), (XVI-D), or (XVI-E), as described above.

The exemplification section hereinafter provides general schemes and specific, but non-limitative, examples for the synthesis of compounds of formula I.

SYNTHESIS EXAMPLES

The present disclosure may be further described by the following non-limiting examples, in which standard techniques known to the skilled chemist and techniques analogous to those described in these examples may be used where appropriate. It is understood that the skilled artisan will envision additional embodiments consistent with the disclosure provided herein.

Unless otherwise stated, reactions were carried out at room temperature, typically in the range between 18-25° C. with solvents of HPLC grade under anhydrous conditions. Evaporations were carried out by rotary evaporation in vacuo. Column chromatography was performed by the flash procedure on silica gel. Nuclear magnetic resonance (NMR) shift values were recorded on a Bruker Avance DPX 200 or 300, or on an AVII 400 instrument with peak multiplicities described as follows: s, singlet; d, doublet; dd, double doublet; t, triplet; q, quartet; p, pentet; m, multiplett; br, broad. Mass spectra were recorded with a G1956A mass spectrometer (electrospray, 3000 V) switching positive and negative ionization mode. Reported yields are illustrative and do not necessarily represent the maximum yield attainable.

Example 1: Preparation of 3-butoxy-2-methylbenzoic acid

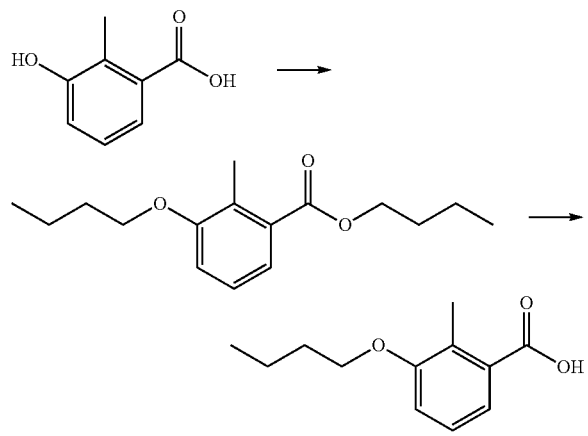

Step 1

To a solution of 3-hydroxy-2-methylbenzoic acid (0.913 g, 6 mmol) in DMF (30 ml) was added potassium carbonate (3.32 g, 24.00 mmol) and 1-iodobutane (2.05 ml, 18.01 mmol) and the mixture was stirred overnight. Water (300 ml) was added and the mixture was extracted with diethyl ether (200 ml). The organic phase was washed with brine (200 ml), dried (Na2SO4), filtered and concentrated in vacuo to afford butyl 3-butoxy-2-methylbenzoate (1.55 g, 5.86 mmol, 98% yield) as a solid. MS (electrospray): 287.0 [M+Na]+.

Step 2

To a solution of butyl 3-butoxy-2-methylbenzoate (1.6 g, 6.0 mmol) in THF (10 ml) was added a solution of LiOH*H2O (1.0 g, 23.8 mmol) in H2O (5 ml) and the mixture was heated at 70° C. overnight. TLC showed no reaction. EtOH (5 ml) was added and the mixture was heated at 70° C. for 3 nights, cooled to room temperature and acidified to pH 1-2 with 1M HCl. The mixture was extracted with EtOAc (100 ml) and the organic phase was washed with brine (100 ml), dried (Na2SO4), filtered and concentrated in vacuo. Flash chromatography (heptane/EtOAc w/5% HCOOH 90/10) afforded 3-butoxy-2-methylbenzoic acid (0.81 g, 3.85 mmol. 63.6% yield) as a solid. 1H NMR (300 MHz, CDCl3) δ 7.61 (dd, 1H), 7.33-7.16 (m, 1H), 7.05 (d, 1H), 4.01 (t, 2H), 2.55 (s, 3H), 1.94-1.74 (m, 2H), 1.67-1.45 (m, 2H), 1.02 (t, 3H). MS (electrospray): 207.0 [M−H]−.

Example 2: Preparation of 3-(hexyloxy)-2-methylbenzoic acid

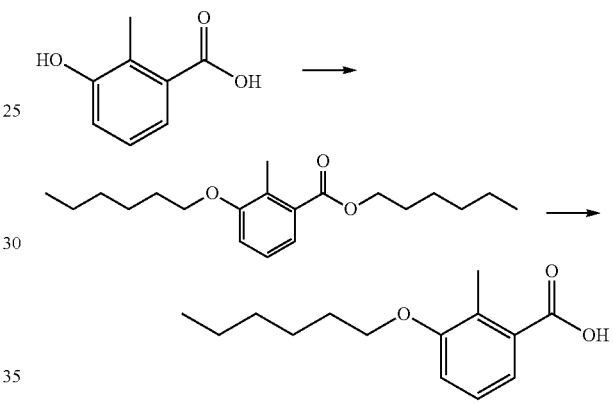

Step 1

To a solution of 3-hydroxy-2-methylbenzoic acid (0.913 g, 6.00 mmol) in DMF (10 ml) was added K2CO3 (2.49 g, 18.02 mmol) and the mixture was stirred for 5 minutes. 1-iodohexane (3.6 ml, 24.39 mmol) was added and the mixture was stirred over night. Et2O (100 ml) was added and the resulting mixture was washed with brine (2×25 ml). The phases were separated and the organic layer was concentrated in vacuo to afford hexyl 3-(hexyloxy)-2-methylbenzoate (1.92 g. 5.99 mmol, 100% yield).

Step 2

To a solution of hexyl 3-(hexyloxy)-2-methylbenzoate (1.92 g, 5.99 mmol) in THF (20 ml) was added LiOH*H2O (2.1 g, 50.0 mmol) in water (10 ml) and the mixture was stirred for 2 nights at room temperature and the for 1 night at 50° C. The reaction was incomplete. The mixture was concentrated in vacuo, dissolved in dioxane (20.00 ml) and water (20.00 ml), and refluxed for 3 hours. The mixture was cooled, acidified with 6M HCl (15 ml) and extracted with Et2O (2×50 ml). The combined organic phases were dried (Na2SO4), filtered and concentrated in vacuo. Flash chromatography (silica gel, heptane:EtOAc—0:100, 10:90) afforded 3-(hexyloxy)-2-methylbenzoic acid (0.33 g, 1.41 mmol, 23.6% yield). 1H NMR (300 MHz, CDCl3) δ 7.68-7.56 (m, 1H), 7.31-7.17 (m, 1H), 7.10-7.01 (m, 1H), 4.00 (t, 2H), 2.56 (s, 3H), 1.92-1.78 (m, 2H), 1.60-1.47 (m, 2H), 1.44-1.30 (m, 4H), 1.00-0.86 (m, 3H). MS (electrospray): 235.1 [M–H]–.

Example 3: Preparation of 2-methyl-3-octylbenzoic acid

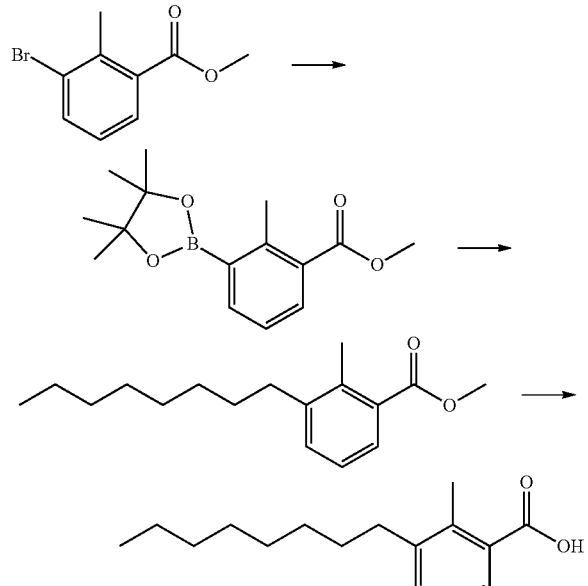

Step 1

To a solution of methyl 3-bromo-2-methylbenzoate (4.8 g, 21 mmol) in DMSO (250 ml) were added 4,4,4',4',5,5,5',5'-octamethyl-2,2'-bi(1,3,2-dioxaborolane) (5.3 g, 21 mmol), AcOK (6.17 g. 62.9 mmol) and Pd(dppf)Cl2 ([1,1'-bis (diphenylphosphino)ferrocene]dichloropalladium(II)) (0.613 g, 0.838 mmol) under N2-atmosphere at room temperature. The mixture was heated at 120° C. over night. The reaction mixture was concentrated in vacuo. The residue was diluted with EtOAc (300 ml), filtered through a pad of celite and washed with water (2×200 ml). The aqueous phase was extracted with EtOAc (150 ml). The combined organic phase was washed with brine (150 ml), dried (Na2SO4), filtered and concentrated in vacuo. Flash chromatography (Heptane/EtOAc 98/2-95/5) afforded methyl 2-methyl-3-(4, 4,5,5-tetramethyl-1,3,2-dioxaborolan-2-yl)benzoate (2.3 g, 8.3 mmol, 40% yield) as an oil. 1H NMR (400 MHz, CDCl3) δ 7.88-7.75 (m, 2H), 7.19 (t, 1H), 3.86 (s, 3H), 2.72 (s, 3H), 1.34 (s, 12H).

Step 2

To a solution of methyl 2-methyl-3-(4,4,5,5-tetramethyl-1,3,2-dioxaborolan-2-yl)benzoate (0.537 g, 1.943 mmol) in DMF (25 ml) was added LiOtBu (0.311 g, 3.89 mmol), CuI (0.056 g, 0.292 mmol) and 1-iodooctane (0.526 ml, 2.92 mmol) under N2-atmosphere. The mixture was stirred at 60° C. over night and cooled to room temperature. The mixture was diluted with Et2O (150 ml), filtered through a pad of silica which was washed with EtOAc (150 ml). The filtrate was concentrated and flashed (heptane/EtOAc 99/1, 98/2) to afford methyl 2-methyl-3-octylbenzoate (320 mg, 1.22 mmol, 62.8% yield) as an oil. 1H NMR (400 MHz, CDCl3) δ 7.58-7.47 (m, 1H), 7.22-7.12 (m, 1H). 7.10-7.01 (m, 1H), 3.80 (s, 3H), 2.62-2.53 (m, 2H), 2.40 (s, 3H), 1.53-1.42 (m, 2H), 1.32-1.14 (m, 1OH), 0.80 (t, 3H).

Step 3

To a solution of methyl 2-methyl-3-octylbenzoate (300 mg, 1.143 mmol) in ethanol (10 ml) under N2-atmosphere was added a solution of LiOHxH20 (384 mg, 9.15 mmol) in water (5 ml) and the mixture was heated at 70° C. for 2 hours. The mixture was cooled to room temperature acidified to pH 1-2 with 1M HCl (aq) and extracted with EtOAc (2×50 ml), washed with brine (100 ml), dried (Na2SO4), filtered and concentrated in vacuo. Flash chromatography (heptane/EtOAc/HCOOH 90/10/0.1-88/12/0.1) afforded 2-methyl-3-octylbenzoic acid (200 mg, 0.767 mmol, 67.1% yield) as a solid. 1H NMR (400 MHz, CDCl3) δ 7.82 (d, 1H), 7.35 (d, 1H), 7.21 (t, 1H), 2.73-2.65 (m, 2H), 2.58 (s, 3H), 1.63-1.53 (m, 2H), 1.43-1.25 (m, 10H), 0.91 (t, 3H). MS (electrospray): 247.1 [M–H]–.

Example 4: Preparation of (Z)-2-methyl-3-(oct-5-en-1-yl)benzoic acid

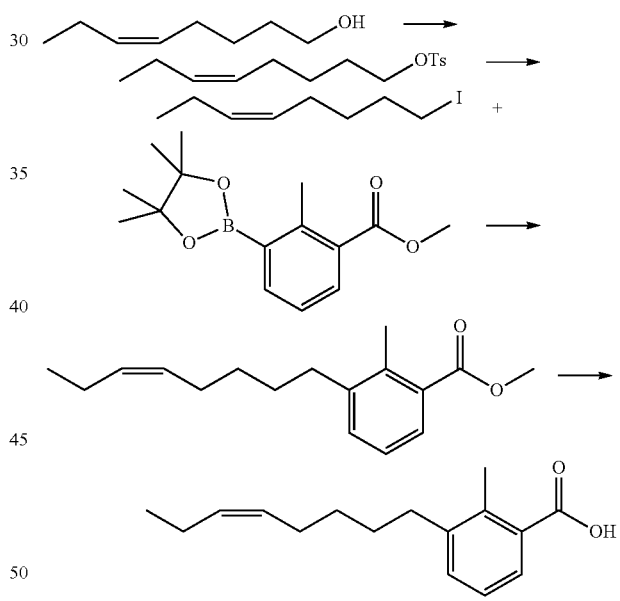

Step 1

To a solution of (Z)-oct-5-en-1-ol (5.88 ml, 39.0 mmol) in CH2Cl2 (50 ml) under N2-atmosphere at 0° C. was added 4-methylbenzene-1-sulfonyl chloride (14.87 g, 78 mmol) followed by TEA (7.89 g 78 mmol). The reaction mixture was stirred at 0° C. for 3 hours, poured over ice-water (100 ml) and extracted with CH2Cl2 (2×100 ml).

The combined organic phase was concentrated in vacuo. The residue was added pyridine (13 ml) and water (10 ml), and the mixture was stirred at room temperature for 30 minutes. Heptane (200 ml) was added and the organic layer was washed with water (100 ml), 1M HCl (aq, 100 ml), brine (100 ml), dried (Na2SO4), filtered and concentrated in vacuo. Flash chromatography (heptane/EtOAc 90/10) afforded (Z)-oct-5-en-1-yl 4-methylbenzenesulfonate (8.6 g, 30.5 mmol, 78% yield) as an oil. 1H NMR (300 MHz, CDCl3) δ 7.74 (d, 2H), 7.30 (d, 2H), 5.40-5.25 (m, 1H), 5.24-5.08 (m, 1H), 3.98 (t, 2H), 2.43 (s, 3H), 2.02-1.76 (m, 4H), 1.70-1.50 (m, 2H), 1.43-1.15 (m, 2H), 0.98-0.75 (m, 3H). MS (electrospray): 305.0 [M+Na]+.

Step 2

To a solution of (Z)-oct-5-en-1-yl 4-methylbenzenesulfonate (2.0 g, 7.1 mmol) in acetone (25 ml) was added sodium iodide (1.7 g, 11.3 mmol) and the mixture was stirred at ambient temperature for 2 nights.

The mixture was concentrated under reduced pressure. Et2O (100 ml) was added and the resulting organic phase was washed with water (2×100 ml) and brine (100 ml), dried (Na2SO4), filtered and concentrated in vacuo to afford (Z)-8-iodooct-3-ene (1.1 g, 4.6 mmol, 65.2% yield) as an oil. 1H NMR (400 MHz, CDCl3) δ 5.50-5.26 (m, 2H), 3.21 (t, 2H), 2.13-1.97 (m, 4H), 1.93-1.79 (m, 2H), 1.56-1.43 (m, 2H), 0.98 (t, 3H).

Step 3

To a solution of methyl 2-methyl-3-(4,4,5,5-tetramethyl-1,3,2-dioxaborolan-2-yl)benzoate (0.8 g, 2.9 mmol) in DMF (40 ml) was added Lithium t-butoxide (0.464 g, 5.79 mmol), Copper(l) iodide (0.083 g, 0.435 mmol) and (Z)-8-iodooct-3-ene (1.035 g, 4.35 mmol) under N2-atmosphere The mixture was stirred at 60° C. over night and cooled to room temperature. The mixture was diluted with Et20 (150 ml), filtered through a pad of silica, which was washed with EtOAc (150 ml). The filtrate was concentrated and purified by flash chromatography (heptane/EtOAc 99/1, 98/2) to afford (Z)-methyl 2-methyl-3-(oct-5-en-1-yl)benzoate (0.3 g, 1.2 mmol, 40% yield) as an oil. MS (electrospray): 283.1 [M+Na]+.

Step 4

To a solution of (Z)-methyl 2-methyl-3-(oct-5-en-1-yl) benzoate (284 mg, 1.09 mmol) in EtOH (10 ml) under N2-atmosphere was added a solution of Lithium hydroxide monohydrate (366 mg, 8.73 mmol) in water (5 ml) and the mixture was heated at 50° C. for 3 hours. The mixture was cooled to room temperature, acidified to pH 1-2 with 1M HCl (aq) and extracted with EtOAc (2×50 ml), washed with brine (100 ml), dried (Na2SO4), filtered and concentrated in vacuo. Flash chromatography (heptane/EtOAc/HCOOH 80/10/0.1), followed by preparative HPLC afforded (Z)-2-methyl-3-(oct-5-en-1-yl)benzoic acid (125 mg, 0.498 mmol, 45.6% yield) as an oil. 1H NMR (400 MHz, CDCl3) δ 11.83 (s, 1H), 7.75 (d, 1H), 7.29-7.22 (m, 1H), 7.15-7.06 (m, 1H), 5.39-5.16 (m, 2H), 2.65-2.56 (m, 2H), 2.50 (s, 3H), 2.05-1.92 (m, 4H), 1.57-1.47 (m, 2H), 1.41-1.33 (m, 2H), 0.89 (t, 3H). MS (electrospray): 245.1 [M−H]−.

Example 5: Preparation of (Z)-3-(hex-3-en-1-yloxy)-2-methylbenzoic acid

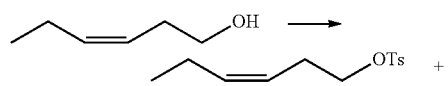

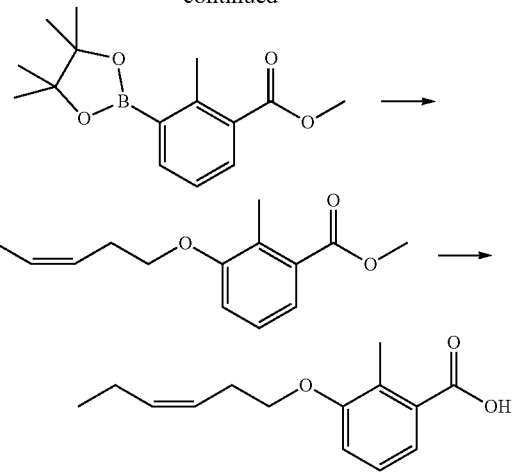

Step 1

To solution of (Z)-hex-3-en-1-ol (5.0 g, 50 mmol) in CH2Cl2 (50 ml) under N2-atmosphere at 0° C. was added 4-methylbenzene-1-sulfonyl chloride (19.0 g, 100 mmol) followed by TEA (10.1 g, 100 mmol). The reaction mixture was stirred at 0° C. for 3 hours. The reaction mixture was poured over ice-water (100 ml) and extracted with CH2Cl2 (2×100 ml). The combined organic phase was concentrated in vacuo. The residue was added pyridine (13 ml) and water (10 ml), and the mixture was stirred at room temperature for 30 minutes. Heptane (200 ml) was added and the organic layer was washed with water (100 ml), 1M HCl (aq, 100 ml) and brine (100 ml), dried (Na2SO4), filtered and concentrated in vacuo. Flash chromatography (heptane/EtOAc 90/10) afforded (Z)-hex-3-enyl 4-methylbenzenesulfonate (10.8 g, 42.5 mmol, 85% yield) as an oil. 1H NMR (400 MHz, CDCl3) δ 7.75 (d, 2H), 7.31 (d, 2H), 5.50-5.38 (m, 1H), 5.21-5.05 (m, 1H), 3.96 (t, 2H), 2.41 (s. 3H), 2.35 (q, 2H), 2.00-1.88 (m, 2H), 0.89 (t, 3H). MS (electrospray): 277.0 [M+Na]+.

Step 2

To a solution of methyl 2-methyl-3-(4,4,5,5-tetramethyl-1,3,2-dioxaborolan-2-yl)benzoate (0.77 g, 2.79 mmol) in DMF (35 ml) was added LiOtBu (0.298 g, 3.72 mmol), CuI (0.035 g, 0.186 mmol) and (Z)-hex-3-enyl 4-methylbenzenesulfonate (0.473 g, 1.859 mmol) under N2-atmosphere. The reaction mixture was stirred at 60° C. over night and cooled to room temperature. The reaction mixture was diluted with Et20 (100 ml), filtered through the pad of silica, which was washed with EtOAc (100 ml). The filtrate was concentrated and purified by flash chromatography (heptane/EtOAc 100/1) to afford (Z)-methyl 3-(hex-3-en-1-yloxy)-2-methylbenzoate (0.35 g, 1.409 mmol, 76% yield) as an oil (impure according to 1 H NMR).

Step 3

To a solution of (Z)-methyl 3-(hex-3-en-1-yloxy)-2-methylbenzoate (0.35 g, 1.41 mmol) (impure) in ethanol (20 ml) under N2-atmosphere was added a solution of LiOH*H20 (0.472 g, 11.28 mmol) in water (10 ml) and the mixture was stirred at 40° C. over night. The mixture was cooled to room temperature, acidified to pH ~1-2 with 2M HCl (aq, 3 ml), extracted with Et2O (2×50 ml). Flash chromatography (heptane/EtOAc w/5% HCOOH 95/5-90/10) afforded 100 mg impure product which was purified by preparative HPLC to afford (Z)-3-(hex-3-en-1-yloxy)-2-methylbenzoic acid (0.10 g, 0.42 mmol, 30% yield) as a solid. 1H NMR (400 MHz, MeOD) δ 7.40 (d, 1H), 7.22 (t, 1H), 7.09 (d, 1H), 5.65-5.44 (m, 2H), 4.04 (t, 2H), 2.66-2.52 (m, 2H), 2.42 (s, 3H), 2.23-2.08 (m, 2H), 1.03 (t, 3H). MS (electrospray): 233.0 [M−H]−.

Example 6: Preparation of (Z)-2-methyl-3-(oct-5-en-1-yloxy)benzoic acid

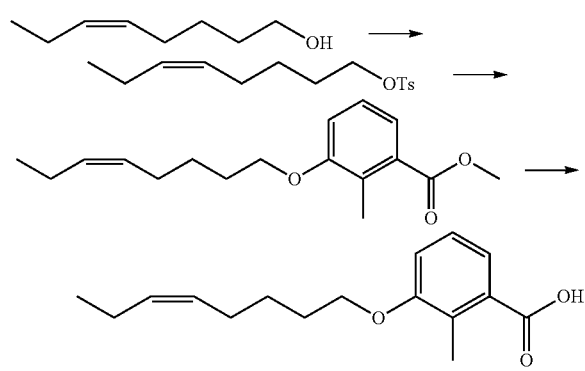

Step 1

To a solution of (Z)-oct-5-en-1-ol (5.88 ml, 39.0 mmol) in CH2Cl2 (50 ml) under N2-atmosphere at 0° C. was added 4-methylbenzene-1-sulfonyl chloride (14.87 g, 78.0 mmol) followed by TEA (7.89 g. 78.0 mmol). The reaction mixture was stirred at 0° C. for 3 hours, poured over ice-water (100 ml) and extracted with CH2Cl2 (2×100 ml).

The combined organic phase was concentrated in vacuo. The residue was added pyridine (13 ml) and water (10 ml), and the mixture was stirred at room temperature for 30 minutes. Heptane (200 ml) was added and the organic layer was washed with water (100 ml), 1M HCl (aq, 100 ml), brine (100 ml), dried (Na2SO4), filtered and concentrated in vacuo. Flash chromatography (heptane/EtOAc 90/10) afforded (Z)-oct-5-en-1-yl 4-methylbenzenesulfonate (8.6 g, 30.5 mmol, 78% yield) as an oil. 1H NMR (300 MHz, CDCl3) δ 7.74 (d, 2H), 7.30 (d, 2H), 5.40-5.25 (m, 1H), 5.24-5.08 (m, 1H), 3.9S (t, 2H), 2.43 (s, 3H), 2.02-1.76 (m, 4H), 1.70-1.50 (m, 2H), 1.43-1.15 (m, 2H), 0.98-0.75 (m, 3H). MS (electrospray): 305.0 [M+Na]+.

Step 2

To a solution of methyl 2-methyl-3-(4,4,5,5-tetramethyl-1,3,2-dioxaborolan-2-yl)benzoate (0.75 g, 2.72 mmol) in DMF (30 ml) was added LiOtBu (0.290 g, 3.62 mmol), CuI (0.069 g, 0.362 mmol) and (Z)-oct-5-en-1-yl 4-methylbenzenesulfonate (0.511 g, 1.811 mmol) under N2-atmosphere. The reaction mixture was stirred at 60° C. over night and cooled to room temperature. The mixture was diluted with Et2O (100 ml), filtered through a pad of silica, which was washed with EtOAc (100 ml). The filtrate was concentrated and purified by flash chromatography (heptane/EtOAc 100/1) to afford (Z)-methyl 2-methyl-3-(oct-5-en-1-yloxy)benzoate (0.22 g, 0.78 mmol, 44% yield) as an oil. 1H NMR (400 MHz, CDCl3) δ 7.36 (d, 1H), 7.19-7.07 (m, 1H), 6.94 (d, 1H), 5.48-5.24 (m, 2H), 3.95 (t, 2H), 3.87 (s, 3H), 2.41 (s, 3H), 2.14-1.95 (m, 4H), 1.85-1.76 (m, 2H), 1.59-1.48 (m, 2H), 0.98-0.90 (m, 3H).

Step 3

To a solution of (Z)-methyl 2-methyl-3-(oct-5-en-1-yloxy)benzoate (220 mg, 0.796 mmol) in EtOH (25 ml) under N2-atmosphere was added a solution of LiOH*H2O (267 mg, 6.37 mmol) in Water (10 ml) and the mixture was stirred at 40° C. over night. The mixture was cooled to room temperature, acidified to pH 1-2 with 3M HCl (aq, 1 ml), extracted with Et2O (2×20 ml), dried (Na2SO4), filtered and concentrated in vacuo. Flash chromatography (heptane/EtOAc w/5% HCOOH 95/5-90/10) afforded 150 mg product. Purification by preparative HPLC afforded (Z)-2-methyl-3-(oct-5-en-1-yloxy)benzoic acid (60 mg, 0.228 mmol, 28.6% yield) as a solid. 1H NMR (400 MHz, MeOD) δ 7.39 (d, 1H), 7.22 (t, 1H), 7.09 (d, 1H), 3.51-5.29 (m, 2H), 4.04 (t, 2H), 2.43 (s, 3H), 2.24-2.00 (m, 4H), 1.95-1.76 (m, 2H), 1.68-1.52 (m, 2H), 1.00 (t, 3H). MS (electrospray): 261.1 [M−H]−.

Example 7: Preparation of (Z)-2-methyl-3-(pent-2-en-1-yloxy)benzoic acid ("Compound B")

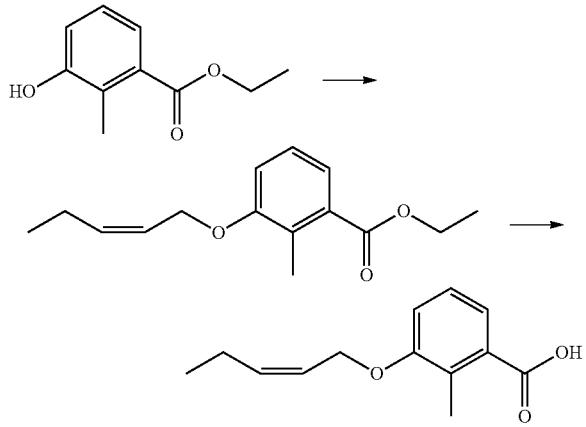

Step 1

To a solution of triphenylphosphine (26.4 g, 101 mmol) in dry THF (600 ml) at 0° C. under N2-atmosphere was added drop wise diisopropyl azodicarboxylate (20.5 ml, 105 mmol). The resulting suspension was stirred for 30 minutes before a solution of (Z)-pent-2-en-1-ol (7.89 g, 92.0 mmol) and ethyl 3-hydroxy-2-methylbenzoate (16.5 g, 92 mmol) in THF (200 ml) was added dropwise. The cooling was removed, and the reaction mixture was stirred at ambient temperature overnight and concentrated in vacuo. Flash chromatography (heptane/EtOAc 97/3) afforded ethyl (Z)-2-methyl-3-(pent-2-en-1-yloxy)benzoate (16.5 g, 66.4 mmol, 72.6% yield) as an oil. 1H NMR (400 MHz, CDCl$_3$) δ 7.37 (d, 1H), 7.15 (t, 1H), 6.96 (d, 1H), 5.71-5.57 (m, 2H), 4.64-4.52 (m, 2H), 4.33 (q, 2H), 2.42 (s, 3H), 2.19-2.02 (m, 2H), 1.37 (t, 3H), 1.00 (t, 3H).

Step 2

To a solution of ethyl (Z)-2-methyl-3-(pent-2-en-1-yloxy) benzoate (16.4 g, 66.0 mmol) in EtOH (200 ml) under $N_2$-atmosphere was added a solution of lithium hydroxide monohydrate (22.2 g, 528 mmol) in water (100 ml) and the mixture was heated at 50° C. for 1 hour. The mixture was cooled to room temperature, acidified to pH-1-2 with 3M HCl (aq) and extracted with EtOAc (2×300 ml), washed with brine (300 ml), dried ($Na_2SO_4$), filtered and concentrated in vacuo to afford 14.5 g of crude product. The crude product was recrystallized from heptane/EtOAc (approximately 90/10) to afford (Z)-2-methyl-3-(pent-2-en-1-yloxy) benzoic acid (12.6 g, 55.9 mmol, 85% yield) as a solid. 1H NMR (400 MHz, CDCl3) δ 12.11 (s, 1H), 7.59 (d, 1H), 7.20 (t, 1H), 7.03 (d, 1H), 5.74-5.55 (m, 2H), 4.64-4.56 (m, 2H), 2.51 (s, 3H), 2.21-2.07 (m, 2H), 1.01 (t, 3H). MS (electrospray): 219.1 [M–H]–.

Example 8: Preparation of 2-methyl-3-(pentyloxy)benzoic acid ("Compound A")

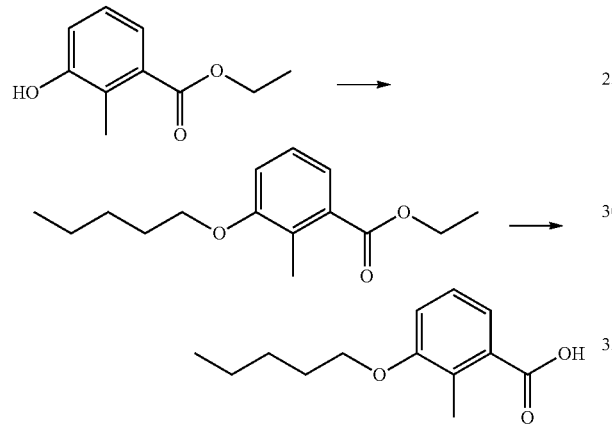

Step 1

To a solution of triphenylphosphine (13.0 g, 49.5 mmol) in THF (200 ml) at 0° C. under N2-atmosphere was added dropwise diisopropyl azodicarboxylate (10.2 ml, 51.8 mmol). The suspension was stirred for 30 minutes before a solution of 1-pentanol (4.9 ml, 45 mmol) and ethyl 3-hydroxy-2-methylbenzoate (8.1 g, 45 mmol) in THF (50 ml) was added dropwise. The cooling was removed, and the reaction mixture was stirred at ambient temperature overnight and concentrated in vacuo. Flash chromatography (heptane/EtOAc—98/2) afforded ethyl 3-hydroxy-2-methylbenzoate (8.9 g, 35.6 mmol, 79% yield) as an oil. 1H NMR (300 MHz, $CDCl_3$) δ 7.35 (dd, 1H), 7.20-7.06 (m, 1H), 6.95-6.91 (m, 1H), 4.33 (q, 2H), 3.94 (t, 2H), 2.41 (s, 3H), 1.84-1.75 (m, 2H), 1.51-1.28 (m, 7H), 0.92 (t, 3H). MS (electrospray): 273.2 [M+Na]+.

Step 2

To a solution of ethyl 3-hydroxy-2-methylbenzoate (8.9 g, 35.6 mmol) in EtOH (100 ml) under $N_2$-atmosphere was added a solution of lithium hydroxide monohydrate (11.9 g, 284 mmol) in water (50 ml) and the mixture was stirred at room temperature overnight. The mixture was acidified to pH-1-2 with 3M HCl (aq) and extracted with EtOAc (2×300 ml), washed with water (300 ml) and brine (300 ml), dried ($Na_2SO_4$), filtered and concentrated in vacuo to afford 2-methyl-3-(pentyloxy)benzoic acid (7.7 g, 34.0 mmol, 96% yield) as a solid. 1H NMR (300 MHz, $CDCl_3$) δ 12.24 (s, 1H), 7.57 (dd, 1H), 7.19 (t, 1H), 7.01 (d, 1H), 3.96 (t, 2H), 2.51 (s, 3H), 1.88-1.75 (m, 2H), 1.55-1.31 (m, 4H), 0.93 (t, 3H). MS (electrospray): 221.1 [M–H]–.

Example 9: Preparation of (Z)-2-methyl-4-(pent-2-en-1-yloxy)benzoic acid

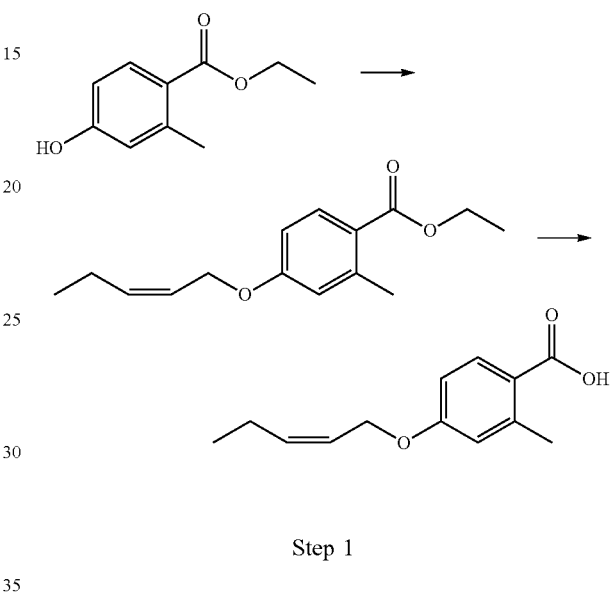

Step 1

To a solution of triphenylphosphine (13.4 g, 51.1 mmol) in THF (200 ml) at 0° C. under $N_2$-atmosphere was added drop wise diisopropyl azodicarboxylate (10.4 ml, 53.4 mmol). The resulting suspension was stirred for 30 minutes before a solution of cis-2-penten-1-ol (4 g, 46 mmol) and ethyl 4-hydroxy-2-methylbenzoate (8.37 g, 46.4 mmol) in THF (50 ml) was added dropwise. The cooling was removed, and the yellow reaction mixture was stirred at ambient temperature overnight and concentrated in vacuo. Flash chromatography (heptane/EtOAc 98/2-95/5) afforded ethyl (Z)-2-methyl-4-(pent-2-en-1-yloxy)benzoate (9.5 g, 38.3 mmol, 82% yield) as an oil.

Step 2

To a solution of ethyl (Z)-2-methyl-4-(pent-2-en-1-yloxy) benzoate (9.5 g, 38.3 mmol) in ethanol (100 ml) under $N_2$-atmosphere was added a solution of lithium hydroxide monohydrate (12.8 g, 306 mmol) in water (50 ml) and the mixture was stirred at room temperature for 2 hours. The mixture was acidified to pH-1-2 with 3M HCl (aq) and extracted with EtOAc (2×150 ml), washed with water (100 mL) and brine (100 mL), dried (Na2SO4), filtered and concentrated in vacuo. Flash chromatography (heptane/ EtOAc/HCOOH 90/10/0.5-85/15/0.5) afforded (Z)-2-methyl-4-(pent-2-en-1-yloxy)benzoic acid (4.9 g, 22 mmol, 57% yield) as a solid. 1H NMR (300 MHz, $CDCl_3$) δ 8.09-7.99 (m, 1H), 6.80-6.70 (m, 2H), 5.79-5.49 (m, 2H), 4.61 (d, 2H), 2.63 (s, 3H), 2.15 (p, 2H), 1.02 (t, 3H). MS (electrospray): 219.1 [M–H]–.

Example 10: Preparation of (Z)-2-methyl-3-(pent-2-en-1-yloxy)benzamide ("Compound C")

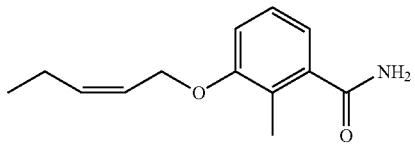 [SMILES: CC/C=C\COc1cccc(C(N)=O)c1C]

To a solution of (Z)-2-methyl-3-(pent-2-en-1-yloxy)benzoic acid (2.0 g, 9.1 mmol) in DCM (50 ml) was added HBTU (4.13 g, 10.90 mmol) followed by TEA (1.58 ml, 11.35 mmol). The mixture was stirred for 20 minutes at room temperature and ammonia (28% in water) (3.14 ml, 45.4 mmol) was added. After stirring for 30 minutes, 1M HCl (100 ml) and tert-butyl methyl ether (200 ml) were added. The phases were separated, and the organic phase was washed with saturated NaHCO$_3$ (100 ml) and brine (100 ml), dried (Na$_2$SO$_4$), filtered and concentrated in vacuo. Flash chromatography (heptane/EtOAc/HCOOH—65/35/0.5) afforded (Z)-2-methyl-3-(pent-2-en-1-yloxy)benzamide (1.4 g, 6.3 mmol, 69.3% yield) as a solid. 1H NMR (400 MHz, CDCl3) δ 7.16-7.12 (m, 1H), 7.02-6.98 (m, 1H), 6.90-6.86 (m, 1H), 6.04 (s, 1H), 5.74 (s, 1H), 5.68-5.54 (m, 2H), 4.63-4.51 (m, 2H), 2.32 (s, 3H), 2.20-2.02 (m, 2H), 1.00 (t, 3H). MS (electrospray): 220.1 [M+H]$^+$.

Example 11: Preparation of (Z)-(2-methyl-3-(pent-2-en-1-yloxy)phenyl)methanol

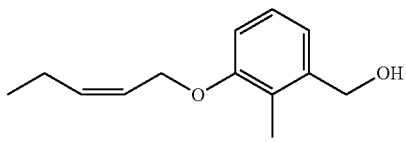

A suspension of lithium aluminum hydride (0.564 ml, 13.66 mmol) in dry THF (25 ml) was cooled to 0° C. under N$_2$-atmosphere before a solution of ethyl (Z)-2-methyl-3-(pent-2-en-1-yloxy)benzoate (3.08 g, 12.40 mmol) was added dropwise. The reaction mixture was stirred at 0° C. for 2 hrs. Water 40 ml was added dropwise and then 1 M HCl (80 ml) was added. The cooling bath was removed, and the reaction mixture was stirred for 5 minutes. The reaction mixture was extracted with t-butyl methyl ether (2×200 ml), the organic phase was washed with 1 M HCl (100 ml), dried (Na$_2$SO$_4$), filtered and concentrated under reduced pressure. Flash chromatography on silica gel (80 g) eluting with heptane—heptane:EtOAc (90:10) afforded (Z)-(2-methyl-3-(pent-2-en-1-yloxy)phenyl)methanol (2.39 g, 11.48 mmol, 92% yield) as a solid. 1H NMR (300 MHz, CDCl$_3$) δ 7.14 (t, 1H), 6.96 (d, 1H), 6.81 (d, 1H), 5.76-5.49 (m, 2H), 4.68 (d, 2H), 4.65-4.50 (m, 2H), 2.22 (s, 3H), 2.19-1.92 (m, 2H), 1.50 (t, 1H), 1.01 (dd, 3H). MS (electrospray): 229.1 [M+Na]+.

Example 12: Preparation of (Z)-2-(3-(hept-4-en-1-yloxy)-2-methylphenyl)acetic acid

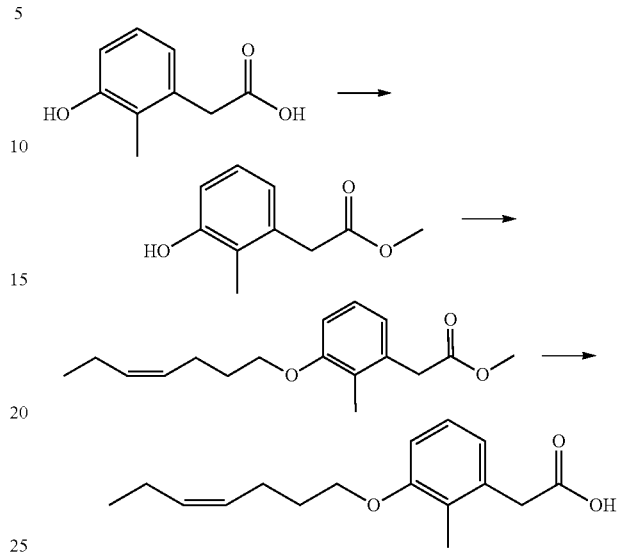

Step 1

A mixture of 2-(3-hydroxy-2-methylphenyl)acetic acid (27.7 g, 167 mmol) in methanol (100 ml) was added sulfuric acid (1 ml, 167 mmol). The reaction mixture was stirred at reflux for 60 hrs. Methanol was partially evaporated under reduced pressure. EtOAc (1000 ml) was added to the residue. The mixture was washed with NaHCO$_3$ (300 ml) and brine (300 ml), dried (Na$_2$SO$_4$), filtered and concentrated under reduced pressure. Dry-flash chromatography on silica gel (500 g) eluting with heptane—heptane:EtOAc (80:20) afforded methyl 2-(3-hydroxy-2-methylphenyl)acetate (13.15 g, 73.0 mmol, 43.8% yield) as a solid. 1H NMR (300 MHz, CDCl3) δ 6.98 (t, 1H), 6.76 (d, 1H), 6.65 (d, 1H), 5.10 (s, 1H), 3.68 (s, 3H), 3.64 (s, 2H), 2.16 (s, 3H).

Step 2

To a solution of triphenylphosphine (6.41 g, 24.44 mmol) in dry THF (125 ml) at 0° C. under N$_2$-atmosphere was added diisopropyl azodicarboxylate (5 ml, 25.4 mmol) dropwise. The reaction mixture was stirred at 0° C. for 35 minutes before a solution of methyl 2-(3-hydroxy-2-methylphenyl)acetate (4 g, 22.2 mmol) and cis-4-hepten-1-ol (3 ml, 22.3 mmol) in dry THF (45 ml) was added dropwise. The cooling bath was removed, and the reaction mixture was stirred at room temperature for 17.5 hrs and concentrated under reduced pressure. Flash-chromatography on silica gel (200 g) eluting with heptane—heptane:EtOAc (98:2) afforded methyl (Z)-2-(3-(hept-4-en-1-yloxy)-2-methylphenyl)acetate (4.18 g, 15.12 mmol, 68.1% yield) as an oil. 1H NMR (300 MHz, CDCl3) δ 7.08 (t, 1H), 6.76 (dd, 2H), 5.52-5.19 (m, 2H), 3.93 (t, 2H), 3.66 (s, 3H), 3.64 (s, 2H), 2.23 (dd, 2H), 2.17 (s, 3H), 2.10-1.93 (m, 2H), 1.91-1.75 (m, 2H), 0.92 (t, 3H). MS (electrospray): 299.2 [M+Na]$^+$.

Step 3

A solution of methyl (Z)-2-(3-(hept-4-en-1-yloxy)-2-methylphenyl)acetate (4.15 g, 15.02 mmol) in ethanol (55 ml) was added a solution of lithium hydroxide monohydrate (5.04 g, 120 mmol) in water (55 ml). The reaction mixture was flushed with argon and stirred for 20 hrs at room temperature. 6 M HCl was added to pH 1. The mixture was extracted with EtOAc (200 ml×2), dried (MgSO4), filtered and concentrated under reduced pressure. Flash chromatography on silica gel (80 g) eluting with heptane—heptane:EtOAc (80:20) afforded (Z)-2-(3-(hept-4-en-1-yloxy)-2-methylphenyl)acetic acid (3.69 g, 13.22 mmol, 88% yield) as an oil which solidified upon standing. 1H NMR (300 MHz, CDCl3) δ 7.08 (t, 1H), 6.77 (t, 2H), 5.37 (dt, 2H), 3.93 (t, 2H), 3.66 (s, 2H), 2.33-2.10 (m, 2H), 2.17 (s, 3H), 2.10-1.94 (m, 2H), 1.94-1.78 (m, 2H), 0.92 (t, 3H).

Example 13: Preparation of (Z)-2-(2-methyl-3-(pent-2-en-1-yloxy)phenyl)acetic acid

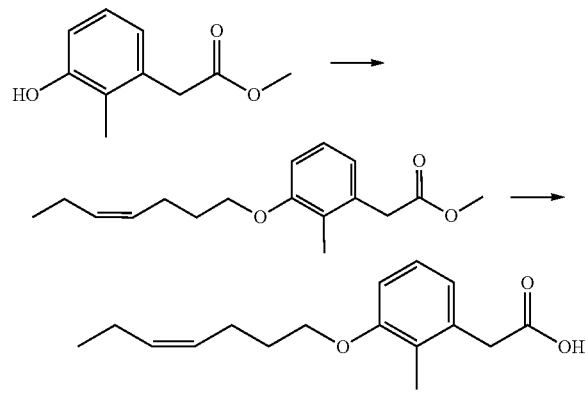

Step 1

To a solution of triphenylphosphine (6.40 g, 24.42 mmol) in dry THF (125 ml) at 0° C. under N2-atmosphere was added (E)-diisopropyl diazene-1,2-dicarboxylate (5 ml, 25.4 mmol) dropwise. The reaction mixture was stirred at 0° C. for 30 minutes before a solution of methyl 2-(3-hydroxy-2-methylphenyl)acetate (4 g, 22.2 mmol) and (Z)-pent-2-en-1-ol (2.24 ml, 22.20 mmol) in dry THF (45 ml) was added dropwise. The cooling bath was removed, and the reaction mixture was stirred at room temperature for 67.5 hrs. The reaction mixture was concentrated under reduced pressure. Flash-chromatography on silica gel (80 g) eluting with heptane—heptane:EtOAc (98:2) afforded methyl (Z)-2-(2-methyl-3-(pent-2-en-1-yloxy)phenyl)acetate (3.67 g, 14.78 mmol, 66.6% yield) as an oil. 1H NMR (300 MHz, CDCl3) δ 7.08 (t, 1H), 6.79 (t, 2H), 5.72-5.41 (m, 2H), 4.56 (d, 2H), 3.66 (s, 3H), 3.63 (s, 2H), 2.23-2.03 (m, 5H), 1.00 (t, 3H). MS (electrospray): 271.2 [M+Na]+.

Step 2

A solution of methyl (Z)-2-(2-methyl-3-(pent-2-en-1-yloxy)phenyl)acetate (3.67 g, 14.78 mmol) in ethanol (55 ml) was added a solution of lithium hydroxide monohydrate (4.96 g, 118 mmol) in water (55 ml). The reaction mixture was flushed with argon and stirred for 20 hrs at room temperature. 6 M HCl was added to pH 1. The mixture was extracted with MTBE (200 ml×2), dried (MgSO4), filtered and concentrated under reduced pressure. Flash chromatography on silica gel (80 g) eluting with heptane—heptane:EtOAc (80:20) afforded (Z)-2-(2-methyl-3-(pent-2-en-1-yloxy)phenyl)acetic acid (2.96 g, 12.33 mmol, 83% yield) as a solid. 1H NMR (300 MHz, CDCl3) δ 7.10 (t, 1H), 6.80 (dd, 2H), 5.77-5.45 (m, 2H), 4.56 (d, 2H), 3.66 (s, 2H), 2.25-2.05 (m, 5H), 1.01 (t, 3H).

Example 14: Preparation of 2-methyl-3-(pent-2-yn-1-yloxy)benzoic acid

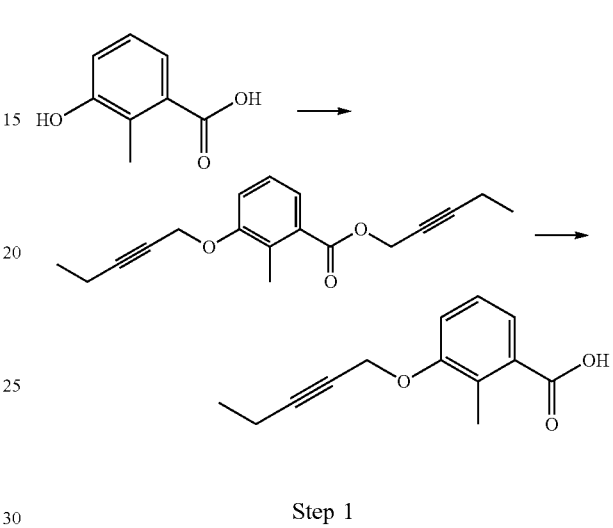

Step 1

A mixture comprising 3-hydroxy-o-toluic acid (0.20 g, 1.32 mmol), 1-bromo-2-pentyne (0.49 g, 3.3 mmol) and potassium carbonate (0.64 g, 4.6 mmol) in 5 mL dimethylformamide was stirred overnight under nitrogen at room temperature. After transfer to a separating funnel water was added (50 mL) and the mixture extracted two times with 50 mL diethyl ether. The combined organic phases were washed twice with 25 mL water, followed by 25 mL sat. NaCl (aq.), and subsequently dried over MgSO4. After filtration and removal of solvent under reduced pressure, the crude product was purified on a silica column, eluted with 4% ethyl acetate in n-heptane. After evaporation of solvent from the pure fractions, 0.33 g of pent-2-yn-1-yl 2-methyl-3-(pent-2-yn-1-yloxy)benzoate was obtained as an oil (88% yield). 1H NMR (400 MHz, chloroform-d) δ 7.46 (dd, 1H), 7.17 (t, 1H), 7.10 (d, 1H), 4.86 (t, 2H), 4.67 (t, 2H), 2.44 (s, 3H), 2.21 (m, 4H), 1.13 (t, 3H), 1.11 (t, 3H). 13C NMR (100 MHz, chloroform-d) δ 167.50, 156.59, 131.49, 129.63, 126.07, 123.07, 116.01, 89.80, 89.13, 74.44, 73.64, 57.46, 53.36, 13.80, 13.79, 13.13, 12.70, 12.69. MS (ESI, positive mode) m/z 307.1 [M+Na]+.

Step 2

To a solution of pent-2-yn-1-yl 2-methyl-3-(pent-2-yn-1-yloxy)benzoate (0.32 g, 1.13 mmol) in 40 mL 1:1 tetrahydrofuran/water was added lithium hydroxide monohydrate (2.02 g, 48 mmol) and the mixture was stirred at 60° C. for three days. After full conversion was observed on TLC, the mixture was neutralized to weakly acidic pH with 100 mL 0.5 M HCl (aq.). The product was extracted with 2×100 mL ethyl acetate and subsequently washed with sat. NaCl (aq.) and dried over MgSO4. Filtration and removal of solvent gave a solid which was purified by way of recrystallisation from 50 mL 1:1 methanol/water. The product was filtered off and dried under vacuum to give 0.19 g (77% yield) of the title compound. 1H NMR (400 MHz, chloroform-d) δ 7.62 (dd, 1H), 7.24-7.15 (m, 2H), 4.70 (t, 2H), 2.52 (s, 3H), 2.21 (qt, 2H), 1.12 (t, 3H). 13C NMR (100 MHz, chloroform-d) δ 173.76, 156.70, 130.70, 130.50, 126.12, 123.94, 116.84, 89.90, 74.39, 57.54, 13.80, 13.28, 12.70. MS (ESI, negative mode) m/z 217.1 [M–H]–.

Example 15: Preparation of 2-Methyl-3-(pentylamino)benzoic acid

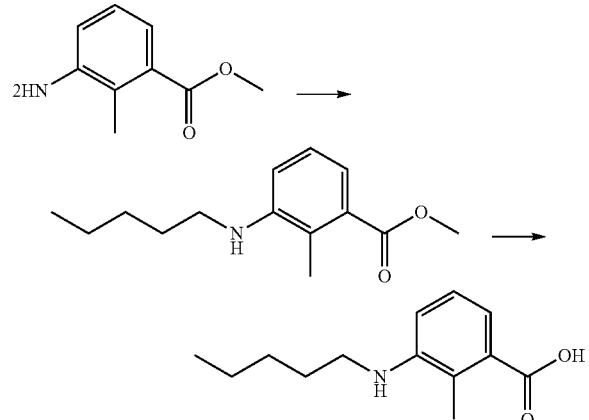

Step 1

A mixture of methyl 3-amino-2-methylbenzoate (0.41 g, 2.46 mmol), 1-iodopentane (0.4 mL, 3.1 mmol) and potassium carbonate (0.83 g, 6.01 mmol) in 10 mL dimethylformamide was stirred at 100° C. for 2 h, diluted with 100 mL water and extracted with 2×100 mL diethyl ether. The combined organic phases were washed twice with 50 mL water and with 50 mL sat. NaCl(aq.). After drying over MgSO4, and subsequent filtration and removal of solvent under reduced pressure, the crude product was purified on a silica column, eluted with 5% ethyl acetate in n-heptane. Pure fractions were combined, and solvent evaporated under reduced pressure to give 0.31 g of methyl 2-methyl-3-(pentylamino)benzoate as an oil (60% yield). 1H NMR (400 MHz, chloroform-d) δ 7.14-7.08 (m, 2H), 6.72 (dd, 1H), 3.86 (s, 3H), 3.61 (br s, 1H), 3.13 (t, 2H), 2.28 (s, 3H), 1.66 (m, 2H), 1.43-1-31 (m, 4H), 0.91 (t, 3H). 13C NMR (100 MHz, chloroform-d) δ 169.70, 147.22, 131.51, 126.49, 122.34, 118.15, 112.78, 52.11, 44.36, 29.60, 29.39, 22.73, 14.25, 13.77. MS (ESI, positive mode) m/z 258.1 [M+Na]+.

Step 2

To a solution of methyl 2-methyl-3-(pentylamino)benzoate (0.30 g, 1.27 mmol) in 40 mL 1:1 tetrahydrofuran/water was added lithium hydroxide monohydrate (1.92 g, 46 mmol) and the mixture was stirred at 60° C. for two days. Due to slow reaction progress, temperature was increased to reflux and more lithium hydroxide monohydrate (1.01 g, 24 mmol) was added. After a couple of hours, the mixture was neutralized to weakly acidic pH with 140 mL 0.5 M HCl (aq.). The product was extracted with 2×100 mL ethyl acetate and subsequently washed with sat. NaCl (aq.) and dried over MgSO4. Filtration and removal of solvent gave a crude product which was purified on a silica column, eluted with 25% ethyl acetate in n-heptane. After combining pure fractions, solvent was removed under reduced pressure in order to afford 0.15 g of the title compound as a solid (53% yield). 1H NMR (400 MHz, chloroform-d) δ 7.30 (dd, 1H), 7.16 (dd, 1H), 6.78 (d, 1H), 3.14 (t, 2H), 2.38 (s, 3H), 1.71-1.64 (m, 2H), 1.45-1.32 (m, 4H), 0.92 (t, 3H). 13C NMR (100 MHz, chloroform-d) δ 174.63, 147.34, 130.04, 126.55, 123.50, 119.25, 113.80, 44.43, 29.61, 29.39, 22.73, 14.26, 13.84. MS (ESI, negative mode) m/z 220.1 [M–H]–.

Example 16: Preparation of 3-(dipentylamino)-2-methylbenzoic acid

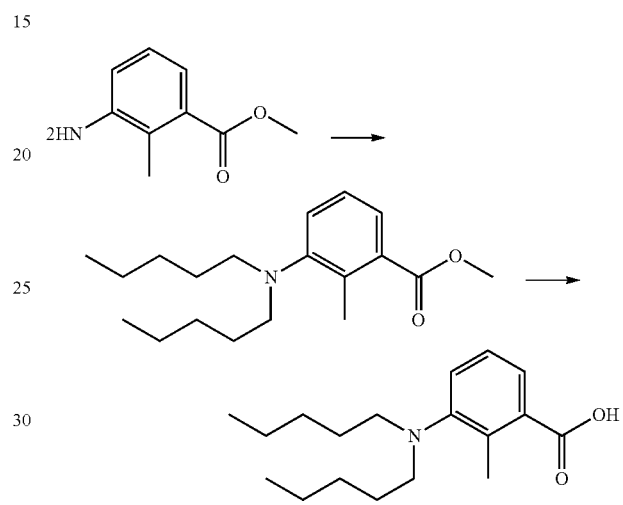

Step 1

A mixture of methyl 3-amino-2-methylbenzoate (0.37 g, 2.23 mmol), 1-iodopentane (0.9 mL, 6.9 mmol) and potassium carbonate (0.70 g, 5.1 mmol) in 5 mL dimethylformamide was stirred at 100° C. Due to incomplete conversion after 1 day reaction time, more 1-iodopentane (0.9 mL, 6.9 mmol) was added, and the mixture was stirred for additional 3 h at 100° C. The mixture was transferred to a separating funnel with 100 mL water and extracted with 2×100 mL diethyl ether. The combined organic phases were washed twice with 50 mL water, followed by 50 mL sat. NaCl (aq.). After drying over MgSO4, and subsequent filtration and removal of solvent under reduced pressure, the crude product was purified on a silica column, eluted with 3% ethyl acetate in n-heptane. Pure fractions were combined, and solvent evaporated under reduced pressure to give 0.49 g of methyl 3-(dipentylamino)-2-methylbenzoate as an oil (72% yield). 1H NMR (400 MHz, chloroform-d) δ 7.48 (dd, 1H), 7.21 (dd, 1H), 7.14 (t, 1H), 3.87 (s, 3H), 2.87 (m, 4H), 2.47 (s, 3H), 1.36 (m, 4H), 1.29-1.14 (m, 8H), 0.83 (t, 3H). 13C NMR (100 MHz, chloroform-d) δ 169.31, 151.73, 136.64, 132.17, 126.10, 125.53, 124.97, 54.17, 52.08, 29.71, 26.92, 22.75, 15.71, 14.30. MS (ESI, positive mode) m/z 306.2 [M+H]+, 328.2 [M+Na]+.

Step 2

To a solution of methyl 3-(dipentylamino)-2-methylbenzoate (0.48 g, 1.57 mmol) in 40 mL 1:1 tetrahydrofuran/water was added lithium hydroxide monohydrate (2.23 g, 53 mmol) and the mixture was stirred at 60° C. for four days.

The reaction mixture was then neutralized to weakly acidic pH with 110 mL 0.5 M HCl (aq.). The product was extracted with 2×100 mL ethyl acetate and subsequently washed with sat. NaCl (aq.) and dried over MgSO4. Filtration and removal of solvent gave a crude product which was purified on a silica column, eluted with a gradient of 5% to 10% ethyl acetate in n-heptane. Solvent was removed under reduced pressure from the combined pure fractions, giving 0.33 g of the title compound as an oil which solidified upon standing (72% yield). 1H NMR (400 MHz, chloroform-d) δ 7.72 (d, 1H), 7.31 (d, 1H), 7.22 (t, 1H), 2.93 (m, 4H), 2.60 (s, 3H), 1.46-1.38 (m, 4H), 1.34-1.19 (m, 8H), 0.88 (t, 6H). 13C NMR (100 MHz, chloroform-d) δ 174.25, 151.87, 137.86, 130.98, 127.04, 126.08, 125.58, 54.20, 29.71, 26.92, 22.76, 15.93, 14.31. MS (ESI, negative mode) m/z 290.2 [M–H]–.

Example 17: Preparation of (Z)-2-methyl-3-(pent-2-en-1-yloxy)benzoic acid

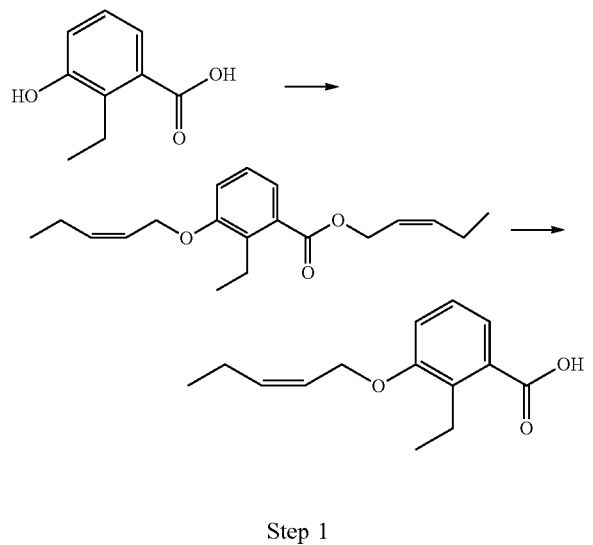

Step 1

To a solution of 2-ethyl-3-hydroxybenzoic acid (166 mg, 1.0 mmol) in DMF (10 ml) was added potassium carbonate (0.55 g, 4.0 mmol) followed by (Z)-1-bromopent-2-ene (0.59 g, 4.0 mmol). The reaction mixture was heated at 90° C. for one hour. After cooling to room temperature, the mixture was poured into water and extracted with EtOAc (×3). The combined organic extract was washed with brine, dried (Na2SO4), filtered and concentrated to afford 300 mg (99% yield) of (Z)-pent-2-en-1-yl 2-ethyl-3-(((Z)-pent-2-en-1-yl)oxy)benzoate as an oil. 1H NMR (400 MHz, CDCl3) δ 7.39-7.27 (m, 1H), 7.14 (dd, 1H), 6.95 (d, 1H), 5.74-5.52 (m, 4H), 4.82 (d, 2H), 4.58 (d, 2H), 2.89 (dd, 3H), 2.23-2.04 (m, 4H), 1.18-1.10 (m, 3H), 1.05-0.94 (m, 6H). MS (ESI, positive mode) m/z 325.1 [M+Na]+.

Step 2

To a solution of (Z)-pent-2-en-1-yl 2-ethyl-3-(((Z)-pent-2-en-1-yl)oxy)benzoate (300 mg, 0.92 mmol) in ethanol (10 ml) was added 10 M NaOH (10 ml) and the reaction mixture stirred at 90° C. for three days. After cooling to room temperature, ethanol was removed and 1 M HCl added. The aqueous phase was extracted with EtOAc (×2), the combined organic phase washed with brine, dried (Na2SO4), filtered and concentrated. Dry column vacuum chromatography (heptane:EtOAc—80:20) afforded 122 mg (57% yield) of the title compound as a solid. 1H NMR (400 MHz, CDCl3) δ 7.52 (d, 1H), 7.19 (td, 1H), 7.02 (d, 1H), 5.65 (dd, 2H), 4.60 (d, 2H), 3.08-2.95 (m, 2H), 2.21-2.05 (m, 2H), 1.22-1.12 (m, 3H), 1.01 (t, 3H). MS (ESI, negative mode) m/z 233.1 [M–H]–.

Example 18: Preparation of (Z)-2,6-dimethyl-4-(pent-2-en-1-yloxy)benzoic acid

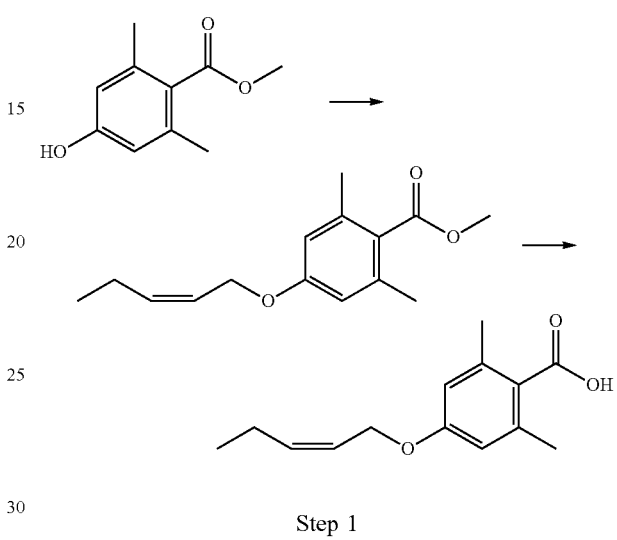

Step 1

To a solution of methyl 4-hydroxy-2,6-dimethyl benzoate (100 mg, 0.55 mmol) in DMF (5 ml) was added potassium carbonate (167 mg, 1.22 mmol) followed by (Z)-1-bromopent-2-ene (182 mg, 1.22 mmol). The reaction mixture was heated at 90° C. for one hour. After cooling to room temperature, the mixture was poured into water and extracted with EtOAc (×3). The combined organic extract was washed with brine, dried (Na2SO4), filtered and concentrated to afford 130 mg (95% yield) of methyl (Z)-2,6-dimethyl-4-(pent-2-en-1-yloxy)benzoate as an oil.

Step 2

To a solution of methyl (Z)-2,6-dimethyl-4-(pent-2-en-1-yloxy)benzoate (130 mg, 0.52 mmol) in ethanol (10 ml) was added 10 M NaOH (10 ml) and the reaction mixture stirred at 90° C. for three days. After cooling to room temperature, ethanol was removed and 1 M HCl added. The aqueous phase was extracted with EtOAc (×2), the combined organic phase washed with brine, dried (Na2SO4), filtered and concentrated to afford 113 mg (93% yield) of the title compound as a solid. 1H NMR (400 MHz, CDCl3) δ 6.59 (s, 2H), 5.70-5.58 (m, 2H), 4.56 (d, 2H), 2.41 (s, 6H), 2.22-2.06 (m, 2H), 1.01 (t, 3H). MS (ESI, negative mode) m/z 233.1 [M–H]–.

Example 19: Preparation of 2-methyl-6-(pentyloxy)benzoic acid

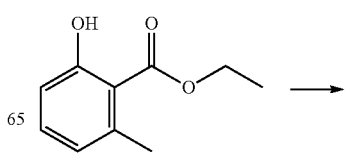

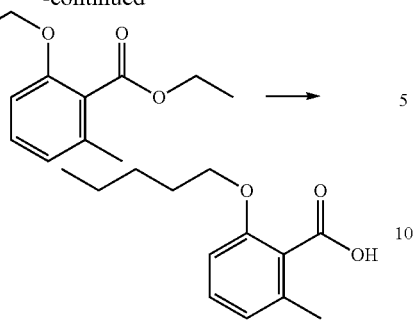

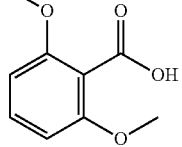

Step 1

To a solution of 6-methylsalicylic acid ethyl ester (0.73 g, 4.05 mmol) in DMF (10 ml) was added potassium carbonate (1.12 g, 8.10 mmol) followed by 1-iodopentane (1.0 ml, 8.10 mmol). The reaction mixture was heated at 90° C. overnight. After cooling to room temperature, the mixture was poured into water and extracted with EtOAc (×3). The combined organic extract was washed with brine, dried (Na2SO4), filtered and concentrated to afford 1.00 gram (99% yield) of ethyl 2-methyl-6-(pentyloxy)benzoate as a yellow oil. 1H NMR (400 MHz, CDCl3) δ 7.18 (t, 1H), 6.73 (dd, 2H), 4.36 (q, 2H), 3.94 (t, 2H), 2.27 (s, 3H), 1.72 (dd, 2H), 1.48-1.23 (m, 8H), 0.89 (t, 3H). MS (ESI, positive mode) m/z 273.1 [M+Na]+.

Step 2

To a solution of ethyl 2-methyl-6-(pentyloxy)benzoate (1.00 g, 3.99 mmol) in THF (10 ml) and water (10 ml) was added LiOH·H2O (0.83 g, 20 mmol) and the reaction mixture stirred at room temperature. TLC showed no conversion. 5 M NaOH (10 ml) and ethanol (10 ml) was added and the reaction mixture heated to reflux overnight. After cooling to room temperature, the ethanol and THF was removed on the rotary evaporator, 1 M HCl added and the aqueous phase extracted with EtOAc (×3). The combined organic layer was washed with brine, dried (Na2SO4), filtered and concentrated. Dry column vacuum chromatography (heptane:EtOAc 95: 5-90:10-80: 20-70:30) gave 0.154 g (17% yield) of the title compound as a solid. 1H NMR (400 MHz, CDCl3) δ 7.29 (t, 1H), 6.85 (dd, 2H), 4.09 (t, 2H), 2.52 (s, 3H), 1.91-1.77 (m, 2H), 1.51-1.27 (m, 4H), 0.91 (t, 3H). MS (ESI, negative mode) m/z 221.1 [M–H]–.

Example 20: Preparation of 2-methoxy-6-(pentyloxy)benzoic acid

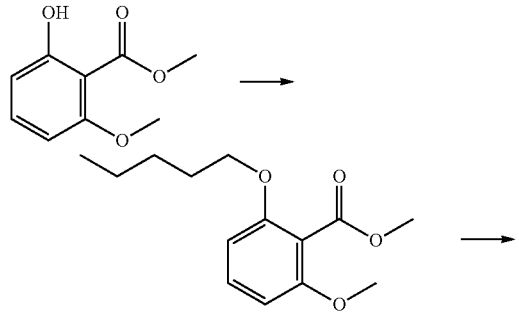

Step 1

To a solution of methyl 2-hydroxy-6-methoxybenzoate (0.74 g, 4.05 mmol) in DMF (10 ml) was added potassium carbonate (1.12 g, 8.10 mmol) followed by 1-iodopentane (1.0 ml, 8.10 mmol). The reaction mixture was heated at 90° C. overnight. After cooling to room temperature, the mixture was poured into water and extracted with EtOAc (×3). The combined organic extract was washed with brine, dried (Na2SO4), filtered and concentrated to afford 1.00 gram (98%) of methyl 2-methoxy-6-(pentyloxy)benzoate as an oil. 1H NMR (400 MHz, CDCl3) δ 7.24 (m, 1H), 6.52 (dd, 2H), 3.96 (t, 2H), 3.88 (s, 3H), 3.80 (s, 3H), 1.82-1.67 (m, 2H), 1.45-1.25 (m, 4H), 0.90 (t, 3H). MS (ESI, positive mode) m/z 275.1 [M+Na]+.

Step 2

To a solution of methyl 2-methoxy-6-(pentyloxy)benzoate (1.00 g, 3.96 mmol) in THF (10 ml) and water (10 ml) was added LiOH·H2O (0.83 g, 20 mmol) and the reaction mixture stirred at room temperature. TLC showed no conversion. 5 M NaOH (10 ml) and ethanol (10 ml) was added and the reaction mixture was heated to reflux overnight. After cooling to room temperature, the ethanol and THF was removed on the rotary evaporator, 1 M HCl was added and the aqueous phase extracted with EtOAc (×3). The combined organic layer was washed with brine, dried (Na2SO4), filtered and concentrated. Dry column vacuum chromatography (heptane:EtOAc 95: 5-90:10-80: 20-70:30) gave 0.22 g (23% yield) of the title compound as a solid. 1H NMR (400 MHz, CDCl3) δ 7.23 (dd, 1H), 6.51 (d, 2H), 3.97 (t, 2H), 3.81 (s, 3H), 1.92-1.59 (m, 2H), 1.54-1.13 (m, 4H), 0.85 (t, 3H). MS (ESI, negative mode) m/z 237.1 [M–H]–.

Example 21: Preparation of 2-methyl-3-(methyl(pentyl)amino)benzoic acid

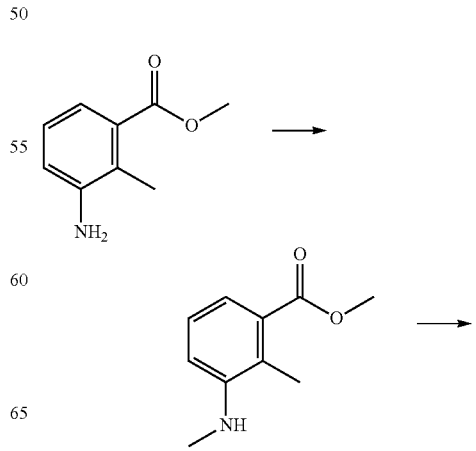

-continued

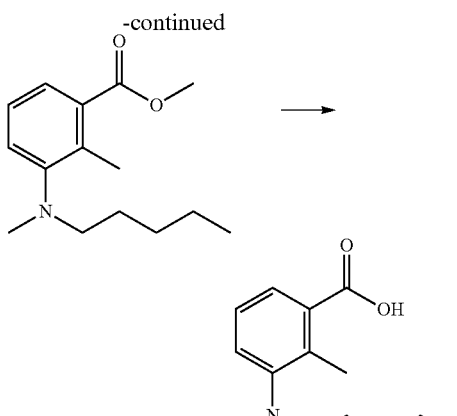

Step 1

To a solution of methyl 3-amino-2-methyl benzoate (1.00 g, 6.02 mmol) in DMF (16 ml) was added DIPEA (2.3 ml, 13.2 mmol) and iodomethane (0.83 ml, 13.3 mmol). The reaction mixture was heated in a sealed vessel at 70° C. for 6.5 hrs and cooled to room temperature. NaOH (50 ml, 1M) was added and the aqueous phase extracted with EtOAc (×2). The organic layer was dried (Na2SO4), filtered and concentrated. Flash chromatography (heptane:EtOAc 85:15) afforded 0.52 g (49% yield) of methyl 2-methyl-3-(methylamino)benzoate as a solid. 1H NMR (400 MHz, CDCl3) δ 7.22-7.05 (m, 2H), 6.72 (dd, 1H), 3.86 (s, 3H), 2.88 (s, 3H), 2.28 (s, 3H). MS (ESI, positive mode) m/z 180.1 [M+H]+.

Step 2

To a solution of methyl 2-methyl-3-(methylamino)benzoate (0.51 g, 2.85 mmol) in DMF (5 ml) was added potassium carbonate (0.47 g, 3.41 mmol) followed by 1-iodopentane (0.74 ml, 5.7 mmol). The reaction mixture was heated at 100° C. overnight. The reaction is slow; therefor new portions (0.7 ml and 1 ml) of 1-iodopentane were added within two hours and heating continued for two hours. After cooling to room temperature, the mixture was poured into water and extracted with EtOAc (×3). The combined organic extract was washed with brine, dried (Na2SO4), filtered and concentrated. The crude product after alkylation was hydrolyzed directly by heating at 100° C. in ethanol (10 ml) and 5 M NaOH (10 ml) for one hour. After removal of ethanol, 1 M HCl was added and the aqueous phase extracted with EtOAc (×3). The combined organic extract was washed with brine, dried (Na2SO4), filtered and concentrated. Dry column vacuum chromatography (heptane:EtOAc 80: 20-70: 30) afforded 0.29 g (43% yield) of the title compound as a solid. 1H NMR (400 MHz, CDCl3) δ 7.68 (dd, 1H), 7.38-7.09 (m, 2H), 2.96-2.74 (m, 2H), 2.64 (s, 3H), 2.56 (s, 2H), 1.49 (dd, 2H), 1.35-1.19 (m, 3H), 0.86 (t, 3H). MS (ESI, negative mode) m/z 234.1 [M−H]−.

Example 22: Preparation of potassium 2-methyl-3-(pentyloxy)benzoate

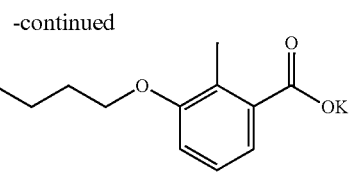

-continued

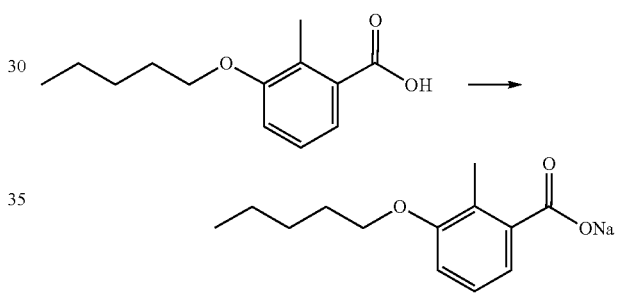

Potassium hydroxide (0.33 g, 5 mmol) was dissolved in ethanol (abs. 30 ml) with sonication. To this solution was added 2-methyl-3-(pentyloxy)benzoic acid (1.11 g, 5 mmol) and the resulting solution was stirred for two hours and then evaporated to dryness. The product potassium salt was re-dissolved in water (10 ml) and freeze dried overnight to afford 1.28 g (98.5% yield) of the title compound as a solid. 1H NMR (400 MHz, DMSO) δ 7.01-6.83 (m, 2H), 6.73-6.63 (m, 1H), 3.89 (t, 2H), 2.19 (s, 3H), 1.70 (dd, 2H), 1.50-1.24 (m, 4H), 0.90 (t, 3H). 13C NMR (101 MHz, DMSO) δ 172.46, 156.46, 146.05, 124.89, 122.28, 119.55, 109.12, 67.54, 28.63, 27.94, 21.92, 14.00, 12.99.

Example 23: Preparation of sodium 2-methyl-3-(pentyloxy)benzoate

Sodium hydroxide (0.20 g, 5 mmol) was dissolved in ethanol (abs. 20 ml) with sonication. To this solution was added 2-methyl-3-(pentyloxy)benzoic acid (1.11 g, 5 mmol) and the resulting solution was stirred for two hours and then evaporated to dryness. The product sodium salt was suspended in water (10 ml) and freeze dried overnight to afford 1.18 g (97% yield) of the title compound as a solid. 1H NMR (400 MHz, DMSO) δ 6.97 (q, 2H), 6.75 (dd, 1H), 3.91 (t, 2H), 2.23 (s, 3H), 1.71 (dd, 2H), 1.56-1.24 (m, 4H), 0.90 (t, 3H). 13C NMR (101 MHz, DMSO) δ 172.92, 156.56, 143.74, 125.11, 123.06, 119.91, 110.03, 67.63, 28.61, 27.93, 21.92, 14.00, 12.95.

Example 24: Preparation of 3-((5-hydroxypentyl)oxy)-2-methylbenzoic acid

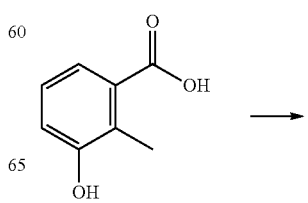

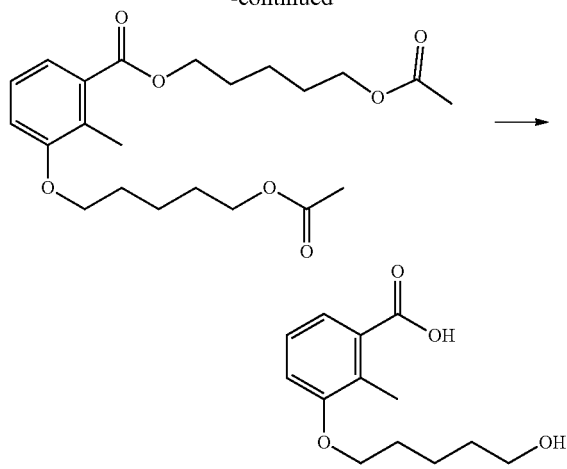

To a solution of 3-hydroxy-2-methylbenzoic acid (1.52 g, 10.0 mmol) in DMF (20 ml) was added potassium carbonate (3.00 g, 22.0 mmol) and potassium iodide (1.6 g, 10 mmol) followed by 5-bromopentylacetate (4.60 g, 22.0 mmol). The reaction mixture was heated at 100° C. overnight. After cooling to room temperature, the mixture was poured into water and extracted with EtOAc (×3). The combined organic extract was washed with brine, dried (Na2SO4), filtered and concentrated. The residue was hydrolyzed directly by heating at 100° C. in ethanol (10 ml) and 5 M NaOH (10 ml) for 1.5 hour.

Flash chromatography (heptane:EtOAc 80: 20-70:30-50: 50—EtOAc) afforded 0.98 g (41% yield) of the title product as a solid. 1H NMR (400 MHz, DMSO) δ 7.28 (d, 1H), 7.20 (t, 1H), 7.09 (d, 1H), 3.97 (t, 2H), 3.41 (t, 2H), 2.32 (s, 3H), 1.85-1.61 (m, 2H), 1.57-1.32 (m, 4H). MS (ESI, negative mode) m/z 237.1 [M−H]−.

Example 25: Preparation of 3-(pentyloxy)-2-(trifluoromethyl)benzoic acid

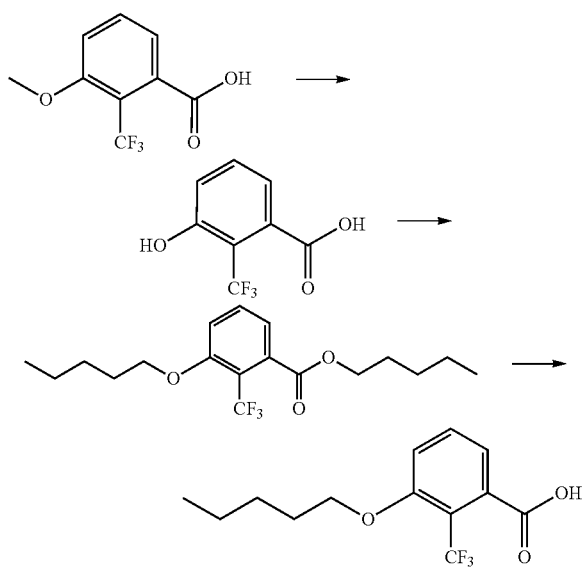

Step 1

To an ice-cold suspension of 3-methoxy-(2-trifluoromethyl)benzoic acid (0.51 g, 2.3 mmol) in 10 mL dichloromethane under nitrogen atmosphere was added neat boron tribromide (2 mL, 21 mmol). After 2 h reaction time, the reaction was quenched carefully by dropwise addition of 5 mL water. The mixture was transferred to a separatory funnel using 50 mL water, and the acid intermediate was extracted twice with 50 mL ethyl acetate. The combined organic phase was subsequently washed with 50 mL sat. NaCl (aq.) and dried over magnesium sulfate. After filtration and removal of solvent under reduced pressure, the crude acid intermediate was dissolved in 10 mL dimethylformamide, and subsequently added potassium carbonate (1.06 g, 7.67 mmol) and 1-iodopentane (0.71 mL, 5.4 mmol). Formation of product was observed by way of TLC at 1 h at room temperature, whereas full conversion could be achieved by gentle heating to 50° C. for additional 1 h. The reaction mixture was transferred to a separatory funnel with 100 mL water and extracted twice with diethyl ether. The combined organic phase was washed twice with 50 mL water, followed by 50 mL sat. NaCl (aq.). After drying over magnesium sulfate, the solvent was removed under reduced pressure. The crude product was purified on a silica column, eluted with 95:5 n-heptane/ethyl acetate, giving, after removal of solvent, 0.40 g of pentyl 3-(pentyloxy)-2-(trifluoromethyl)benzoate (50% over two steps). 1H NMR (400 MHz, chloroform-d) δ 7.46 (t, 1H), 7.03 (d, 1H), 6.97 (d, 1H), 4.26 (t, 2H), 4.02 (t, 2H), 1.80 (m, 2H), 1.70 (m, 2H), 1.48-1.30 (m, 8H), 0.93-0.87 (m, 6H). 13C NMR (100 MHz, chloroform-d) δ 168.74, 157.87 (q, JC-F=2 Hz), 134.77 (q, JC-F=3 Hz), 133.08, 123.48 (q, JC-F=274 Hz), 119.47, 115.92 (q, JC-F=31 Hz), 114.59, 69.49, 66.46, 28.88, 28.25, 28.16, 28.14, 22.50, 22.48, 14.17, 14.14. MS (ESI, positive mode) m/z 369.1 [M+Na]+, 111.1 ("base peak").

Step 2

To a solution of pentyl 3-(pentyloxy)-2-(trifluoromethyl)benzoate (0.20 g, 0.58 mmol) in 10 mL abs. ethanol was added 10 mL 10 M potassium hydroxide (aq.). After 2.5 h reflux, the reaction mixture was put on an ice-bath and quenched with 110 mL 1.0 M HCl (aq.). The crude product was extracted using 2×100 mL ethyl acetate. The combined organic phase was washed with sat. NaCl (aq.), and subsequently dried over magnesium sulfate. After filtration, the solvent was removed under reduced pressure in order to afford the crude product as a solid. Purification on a silica column, eluted isocratically with 40:60 n-heptane/ethyl acetate, gave 0.06 g of the title product as a solid (37% yield). 1H NMR (400 MHz, chloroform-d) δ 9.89 (br s, 1H), 7.50 (t, 1H), 7.11-7.08 (m, 2H), 4.05 (t, 2H), 1.82 (m, 2H), 1.48-1.32 (m, 4H), 0.92 (t, 3H). 13C NMR (100 MHz, chloroform-d) δ 173.74, 158.00 (q, JC-F=1 Hz), 133.29 (q, JC-F=3 Hz), 133.19, 123.32 (q, JC-F=274 Hz), 119.56, 116.04 (q, JC-F=31 Hz), 115.32, 69.59, 28.87, 28.16, 22.50, 14.18. MS (ESI, negative mode) m/z 275.0 [M−H]−.

Example 26: Preparation of magnesium 2-methyl-3-(pentyloxy)benzoate

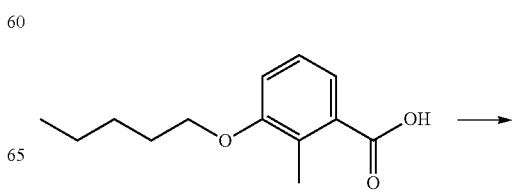

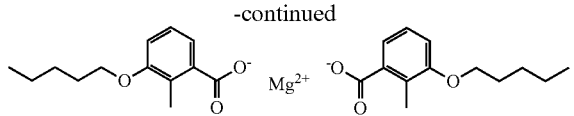

To a solution of 2-methyl-3-(pentyloxy)benzoic (111 mg, 0.50 mmol) in ethanol (abs. 50 ml) and water (50 ml) was added magnesium hydroxide (15 mg, 0.25 mmol). The reaction was stirred for one hour at 50° C. and then evaporated to dryness (116 mg, ~quant. yield). 1H NMR (400 MHz, DMSO) δ 7.19 (d, 1H), 7.06 (t, 1H), 6.89 (d, 1H), 3.93 (t, 2H), 2.30 (s, 3H), 1.82-1.63 (m, 2H), 1.51-1.25 (m, 4H), 0.89 (t, 3H). 13C NMR (101 MHz, DMSO) δ 174.78, 156.67, 139.43, 125.30, 124.88, 120.87, 111.77, 67.77, 28.53, 27.89, 21.89, 13.96, 12.81.

Example 27: Preparation of 2-methyl-3-pentanamidobenzoic acid

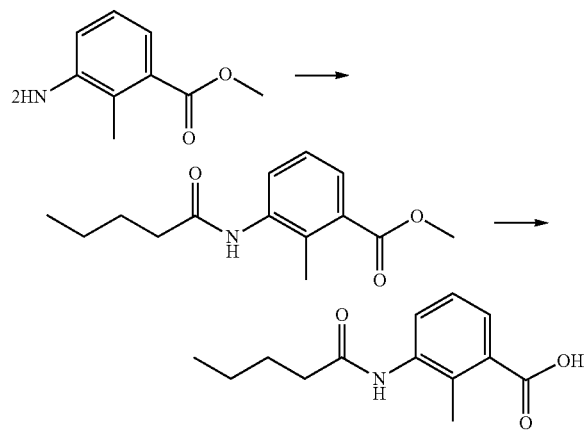

Step 1

To a stirring solution of methyl 3-amino-2-methyl benzoate (0.5 g, 3.0 mmol) in EtOAc (10 ml) at 0° C., was added Et3N (0.44 ml, 3.15 mmol) followed by valeryl chloride (0.37 ml, 3.15 mmol). The reaction mixture was then left stirring at room temperature overnight, poured into brine and the aqueous phase was extracted with EtOAc (×3). The combined organic extract was washed with brine, dried (Na2SO4), filtered and concentrated to give 0.4 g (58% yields) of methyl 2-methyl-3-pentanamidobenzoate as a solid. 1H NMR (400 MHz, CDCl3) δ 7.88 (d, 1H), 7.63 (d, 1H), 7.26-7.19 (m, 1H), 7.03 (s, 1H), 3.87 (s, 3H), 2.50-2.33 (m, 5H), 1.71 (m, 2H), 1.41 (m, 2H), 0.92 (t, 3H). MS (ESI, positive mode) m/z 272.1 [M+Na]+.

Step 2

To a solution of methyl 2-methyl-3-pentanamidobenzoate (0.41 g, 1.64 mmol) in ethanol (20 ml) was added 2.5 M NaOH (20 ml) and the reaction mixture stirred at 95° C. for 30 minutes. After cooling to room temperature, the ethanol was removed on the rotary evaporator, 1 M HCl was added and the aqueous phase extracted with EtOAc (×3). The combined organic layer was washed with brine, dried (Na2SO4), filtered and concentrated to afford 0.30 g (78% yield) of the title compound as a solid. 1H NMR (400 MHz, DMSO) δ 12.92 (s, 1H), 9.42 (s, 1H), 7.56 (d, 1H), 7.44 (d, 1H), 7.23 (t, 1H), 2.43-2.23 (m, 5H), 1.58 (tt, 2H), 1.35 (tq, 2H), 0.91 (t, 3H). MS (ESI, negative mode) m/z 234.1 [M−H]−.

Example 28: Preparation of 3-(2-ethoxyethoxy)-2-methylbenzoic acid

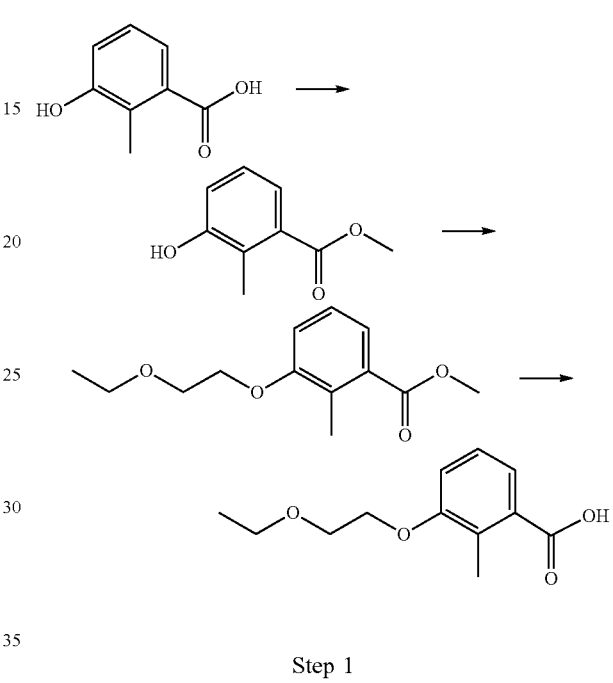

Step 1

3-Hydroxy-2-methylbenzoic acid (3.0 g, 19.7 mmol) was heated in methanol (30 ml) at 90° C. overnight in the presence of 0.5 ml H2SO4. After cooling to room temperature, methanol was removed on the rotary evaporator and 1 M HCl was added (100 ml). The aqueous phase was extracted with EtOAc (×3) and the combined organic phase was washed with brine, dried (Na2SO4), filtered and concentrated to afford 3.2 g (98% yield) of methyl 3-hydroxy-2-methylbenzoate as a solid. 1H NMR (400 MHz, CDCl3) δ 7.39 (dd, 1H), 7.08 (t, 1H), 6.93 (d, 1H), 5.43 (s, 1H), 3.88 (s, 3H), 2.43 (s, 3H).

Step 2

To a solution of methyl 3-hydroxy-2-methylbenzoate (0.83 g, 5.00 mmol) in DMF (10 ml) was added potassium carbonate (1.38 g, 10.0 mmol) and potassium iodide (0.83 g, 5.00 mmol) followed by 2-bromoethyl ethyl ether (0.7 ml, 6.00 mmol). The reaction mixture was heated at 100° C. with stirring. After 30 minutes, more 2-bromoethyl ethyl ether (0.5 ml, 4.3 mmol) was added and the heating continued for another 45 minutes. After cooling to room temperature, the mixture was poured into water and extracted with EtOAc (×3). The combined organic extract was washed with brine, dried (Na2SO4), filtered and concentrated. Dry column vacuum chromatography (heptane:EtOAc 95: 5-90:10-80:20) afforded 0.85 g (71% yield) of methyl 3-(2-ethoxyethoxy)-2-methylbenzoate as a solid. 1H NMR (400 MHz, CDCl3) δ 7.38 (d, 1H), 7.14 (t, 1H), 6.96 (d, 1H), 4.09 (m, 2H), 3.85 (s, 3H), 3.78 (m, 2H), 3.59 (q, 2H), 2.42 (s, 3H), 1.21 (t, 3H). MS (ESI, positive mode) m/z 261.1 [M+Na]+.

Step 3

To a solution of methyl 3-(2-ethoxyethoxy)-2-methylbenzoate (0.85 g, 3.57 mmol) in ethanol (25 ml) was added 2.5 M NaOH (25 ml) and the reaction mixture stirred at 95° C. for 15 minutes. After cooling to room temperature, the ethanol was removed on the rotary evaporator, 1 M HCl was added and the aqueous phase was extracted with EtOAc (×3). The combined organic layer was washed with brine, dried (Na2SO4), filtered and concentrated to afford 0.73 g (91%) of the title compound as a solid. 1H NMR (400 MHz, CDCl3) δ 12.25 (s, 1H), 7.72-7.55 (m, 1H), 7.24 (t, 1H), 7.09 (d, 1H), 4.13 (m, 2H), 3.82 (m, 2H), 3.67 (q, 2H), 2.57 (s, 3H), 1.29 (t, 3H). MS (ESI, negative mode) m/z 223.1 [M−H]−.

Example 29: Preparation of 2-methyl-3-((5,5,5-trifluoropentyl)oxy)benzoic acid

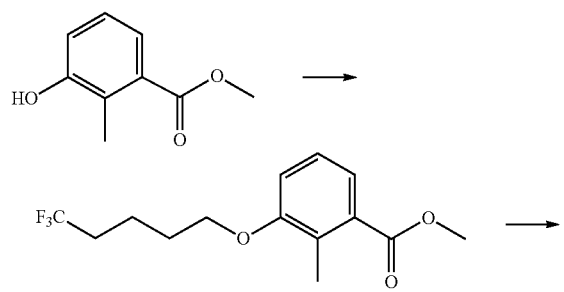

-continued

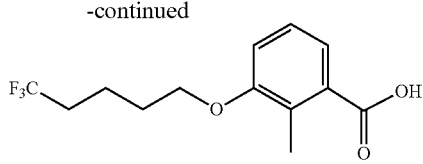

Step 1

To a solution of methyl 3-hydroxy-2-methylbenzoate (0.50 g, 3.00 mmol) in DMF (10 ml) was added potassium carbonate (0.83 g, 6.00 mmol) and potassium iodide (0.50 g, 3.00 mmol) followed by 5-bromo-1,1,1-trifluoropentane (1.00 g, 4.80 mmol). The reaction mixture was heated at 100° C. with stirring for 1.5 hours. After cooling to room temperature, the mixture was poured into water and extracted with EtOAc (×3). The combined organic extract was washed with brine, dried (Na2SO4), filtered and concentrated. Dry column vacuum chromatography (heptane: EtOAc 95: 5-90:10) afforded 0.67 g (77% yield) of methyl 2-methyl-3-((5,5,5-trifluoropentyl)oxy)benzoate as a solid. 1H NMR (400 MHz, CDCl3) δ 7.38 (d, 1H), 7.16 (t, 1H), 6.93 (d, 1H), 3.97 (t, 2H), 3.87 (s, 3H), 2.41 (s, 3H), 2.27-2.08 (m, 2H), 1.97-1.85 (m, 2H), 1.85-1.69 (m, 2H). MS (ESI, positive mode) m/z 313.1 [M+Na]+.

Step 2

To a solution of methyl 2-methyl-3-((5,5,5-trifluoropentyl)oxy)benzoate (0.66 g, 2.27 mmol) in ethanol (25 ml) was added 2.5 M NaOH (25 ml) and the reaction mixture stirred at 95° C. for 30 minutes. After cooling to room temperature, the ethanol was removed on the rotary evaporator, 1 M HCl was added and the aqueous phase was extracted with EtOAc (×3). The combined organic layer was washed with brine, dried (Na2SO4), filtered and concentrated to afford 0.57 g (90% yield) of the title compound as a solid. 1H NMR (400 MHz, CDCl3) δ 12.04 (br s, 1H), 7.58 (d, 1H), 7.20 (t, 1H), 7.00 (d, 1H), 3.99 (t, 2H), 2.50 (s, 3H), 2.26-2.09 (m, 2H), 1.98-1.75 (m, 4H). MS (ESI, negative mode) m/z 275.1 [M−H]−.

Example 30: Preparation of magnesium (Z)-2-methyl-3-(pent-2-en-1-yloxy)benzoate

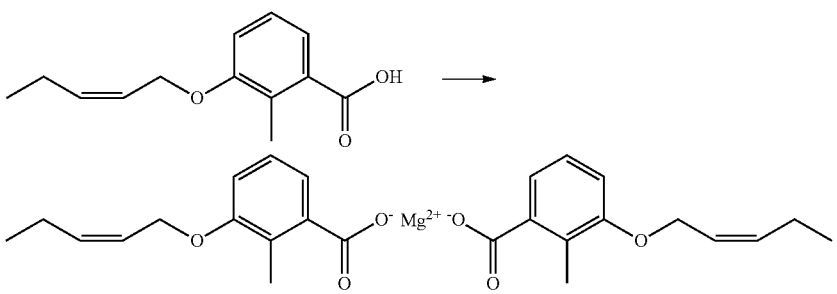

Magnesium hydroxide (15 mg, 0.25 mmol) was added to a solution (Z)-2-methyl-3-(pent-2-en-1-yloxy)benzoic acid (110 mg, 0.50 mmol) in ethanol (abs. 50 ml) and water (50 ml). The reaction was stirred for one hour at 50° C. and then evaporated to dryness to afford a quantitative yield of the title compound as a solid. 1H NMR (400 MHz, DMSO) δ 7.19 (d, 1H), 7.06 (t, 1H), 6.91 (d, 1H), 5.73-5.50 (m, 2H), 4.57 (d, 2H), 2.30 (s, 3H), 2.22-1.99 (m, 2H), 0.95 (t, 3H).

Example 31: Preparation of magnesium (Z)-2-methyl-3-(pent-2-en-1-yloxy)benzyl acetate

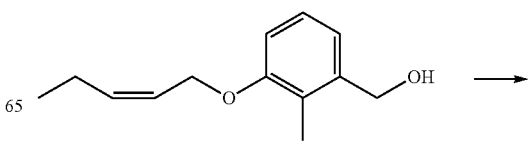

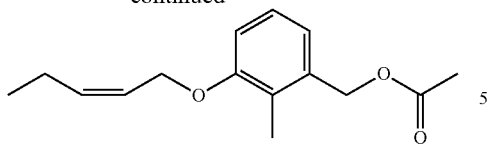

To a solution of (Z)-(2-methyl-3-(pent-2-en-1-yloxy)phenyl)methanol (206 mg, 1.00 mmol) in DCM (20 ml) at 0° C. was added Et3N (0.16 ml, 1.2 mmol) followed by acetyl chloride (85 µl, 1.2 mmol). The ice-bath was removed, and the reaction mixture was stirred for one hour. The reaction mixture was poured into water and the aqueous phase extracted with EtOAc (×3). The combined organic phase was washed with brine, dried (Na2SO4), filtered and concentrated. The residue was purified by dry column vacuum chromatography (heptane:EtOAc gradient) to afford 235 mg (95% yield) of the title compound as a liquid. 1H NMR (400 MHz, CDCl3) δ 7.14 (t, 1H), 6.94 (d, 1H), 6.85 (d, 1H), 5.76-5.54 (m, 2H), 5.11 (s, 2H), 4.58 (m, 2H), 2.21 (s, 3H), 2.15 (m, 2H), 2.08 (s, 3H), 1.02 (t, 3H). MS (ESI, positive mode) m/z 271.1 [M+Na]+.

Example 32: Preparation of calcium (Z)-2-methyl-3-(pent-2-en-1-yloxy)benzoate

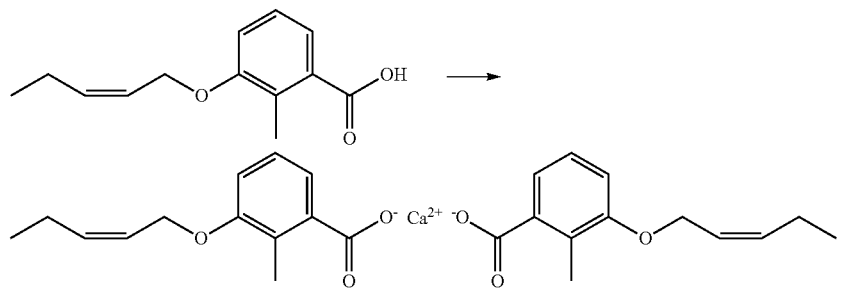

Calcium hydroxide (19 mg, 0.25 mmol) was added to a solution of (Z)-2-methyl-3-(pent-2-en-1-yloxy)benzoic acid (110 mg, 0.50 mmol) in ethanol (abs. 50 ml) and water (50 ml). The reaction was stirred for one hour at 50° C. and then evaporated to dryness to afford a quantitative yield of the title compound as a solid. 1H NMR (400 MHz, DMSO) δ 7.16 (d, 1H), 7.04 (t, 1H), 6.88 (d, 1H), 5.70-5.54 (m, 2H), 4.57 (m, 2H), 2.31 (s, 3H), 2.12 (m, 2H), 0.96 (t, 3H). 13C NMR (101 MHz, DMSO) δ 174.92, 156.30, 135.20, 125.11, 124.84, 124.43, 120.89, 111.51, 63.92, 20.63, 14.01, 13.02.

Example 33: Preparation of potassium (Z)-2-methyl-3-(pent-2-en-1-yloxy)benzoate

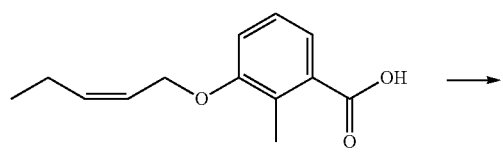

Potassium hydroxide (0.33 g, 5 mmol) was dissolved in ethanol (abs. 30 ml) with sonication. To this solution was added (Z)-2-methyl-3-(pent-2-en-1-yloxy)benzoic acid (1.10 g, 5 mmol) and the mixture was sonicated until complete dissolution. The reaction mixture was stirred for two hours and then evaporated to dryness. The product potassium salt was re-dissolved in water (10 ml) and freeze dried overnight to afford 1.28 g (99% yield) of the title compound as a solid. 1H NMR (400 MHz, DMSO) δ 7.10-6.88 (m, 2H), 6.75 (d, 1H), 5.73-5.50 (m, 2H), 4.55 (m, 2H), 2.26 (s, 3H), 2.21-2.05 (m, 2H), 0.98 (t, 3H). 13C NMR (101 MHz, DMSO) δ 173.10, 156.22, 145.50, 134.99, 125.08, 124.90, 122.85, 120.07, 109.85, 63.85, 20.70, 14.05, 13.18.

Example 34: Preparation of sodium (Z)-2-methyl-3-(pent-2-en-1-yloxy)benzoate

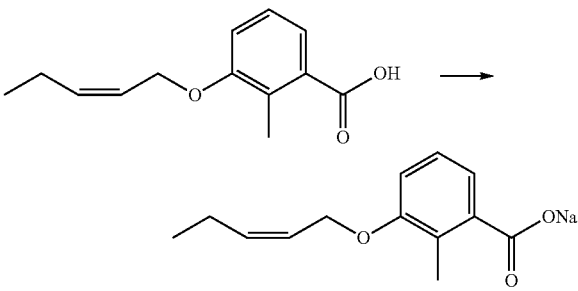

Sodium hydroxide (0.20 g, 5 mmol) was dissolved in ethanol (abs. 20 ml) with sonication. To this solution was added (Z)-2-methyl-3-(pent-2-en-1-yloxy)benzoic acid (1.10 g, 5 mmol) and the mixture was sonicated until complete dissolution. The reaction mixture was stirred for two hours and then evaporated to dryness. The product sodium salt was re-dissolved in water (10 ml) and freeze dried overnight to afford 1.20 g (99% yield) of the title compound as a solid. 1H NMR (400 MHz, DMSO) δ

7.00-6.94 (m, 2H), 6.76 (m, 1H), 5.65-5.57 (m, 2H), 4.55 (m, 2H), 2.23 (s, 3H), 2.20-2.04 (m, 2H), 0.96 (t, 3H). 13C NMR (101 MHz, DMSO) δ 173.29, 156.19, 144.80, 135.03, 125.02, 124.92, 122.95, 120.06, 110.06, 63.81, 20.64, 14.02, 13.07.

Example 35: Preparation of 2-methyl-3-(pentylthio)benzoic acid

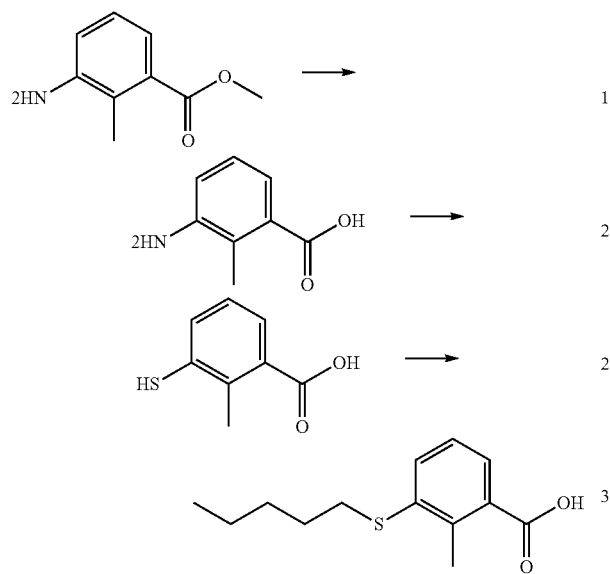

Step 1

To a solution of methyl 3-amino-2-methylbenzoate (2.30 g, 13.9 mmol) in THF (50 ml) was added a solution of lithium hydroxide (6.24 g, 150 mmol) in water (50 ml). The reaction mixture was heated to 95° C. with stirring for 2.5 hours. After cooling to room temperature, the reaction mixture was acidified with 3 M HCl and the aqueous phase extracted with EtOAc (×3). The combined organic phase was washed with brine, dried (Na2SO4), filtered and concentrated to afford 1.00 g (48% yield) of 3-amino-2-methylbenzoic acid as a solid. 1H NMR (400 MHz, DMSO) δ 7.10-6.86 (m, 2H), 6.76 (dd, 1H), 5.02 (s, 2H), 2.18 (s, 3H). MS (ESI, negative mode) m/z 150.1 [M–H]–.

Step 2

3-Amino-2-methylbenzoic acid (0.60 g, 3.96 mmol) was placed in a reaction flask with ice (1.62 g) and concentrated hydrochloric acid (0.80 g) and cooled to 0° C. A solution of sodium nitrite (0.27 g, 3.91 mmol) in water (1.62 g) was added dropwise. In a separate flask sodium carbonate (0.50 g, 4.72 mmol) and potassium ethylxanthogenat (0.63 g, 3.96 mmol) were dissolved in water (2.7 g) and the was suspension heated to 70° C. The preformed diazonium solution was then added carefully and heating continued for one hour, before addition of sodium hydroxide (0.63 g, 15.8 mmol) in water (1.62 g). The reaction mixture was heated for two hours, cooled and acidified with hydrochloric acid. The precipitated product was filtered off and dried to afford 0.55 g (83% yield) of 3-mercapto-2-methylbenzoic acid as a solid. MS (ESI, negative mode) m/z 167.1 [M–H]–.

Step 3

To a solution of 3-mercapto-2-methylbenzoic acid (168 mg, 1.00 mmol) in DMF (2 ml) was added potassium carbonate (0.69 g, 5.00 mmol), followed by iodopentane (0.50 ml, 4.00 mmol) at 0° C. The ice-bath was removed, and the reaction mixture stirred for one hour. The reaction mixture was diluted with EtOAc, washed with brine, dried (Na2SO4), filtered and concentrated. Flash chromatography (heptane:EtOAc gradient) afforded 80 mg (34% yield) of the title compound as a solid. 1H NMR (400 MHz, CDCl3) δ 7.76 (d, 1H), 7.46 (d, 1H), 7.32-7.13 (m, 2H), 2.88 (m, 2H), 2.66 (s, 3H), 1.65 (m, 2H), 1.46-1.22 (m, 4H), 0.89 (t, 3H). MS (ESI, negative mode) m/z 237.1 [M–H]–.

Example 36: Preparation of 2-methyl-3-(pentylsulfinyl)benzoic acid

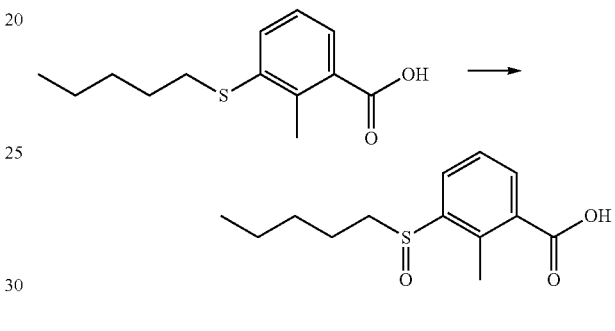

2-Methyl-3-(pentylthio)benzoic acid (119.1 mg, 0.500 mmol) was dissolved in 10 mL methanol and cooled down on an ice-bath. A solution of sodium metaperiodate (124.6 mg, 0.583 mmol) in 2 mL water was added dropwise over a period of 5 min, after which the ice-bath was removed, and the mixture allowed to stir at room temperature for 1 d. The reaction mixture was transferred to a separatory funnel using a 1:1 mixture between 1 M HCl (aq.) and sat. NaCl (aq.), and the product extracted using 2×100 mL ethyl acetate. After washing the combined organic phase with 50 mL sat. NaCl (aq.) and subsequent drying over MgSO4, the crude product was obtained after filtration and removal of solvent under reduced pressure. Pure product was achieved after purification on a silica column, using a gradient elution of 75%-100% ethyl acetate in n-heptane. Following removal of solvent from the pure fractions, the title compound was obtained as an oil, which solidified upon standing (40.2 mg, 32% yield). 1H NMR (400 MHz, chloroform-d) δ 8.98 (br s, 1H), 8.14 (d, 1H), 8.11 (d, 1H), 7.52 (t, 1H), 2.84 (m, 1H), 2.71 (m, 1H), 2.61 (s, 3H), 1.84 (m, 1H), 1.66 (m, 1H), 1.49-1.26 (m, 4H), 0.87 (s, 3H). 13C NMR (100 MHz, chloroform-d) δ 171.19, 144.23, 136.92, 133.76, 130.61, 128.48, 127.26, 55.49, 30.92, 22.48, 22.27, 16.77, 14.02. MS (ESI, negative mode) m/z 253.1 [M–H]–.

Example 37: Preparation of 2-methyl-3-(pentylsulfonyl)benzoic acid

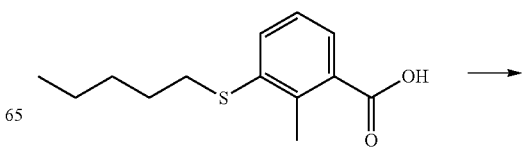

-continued

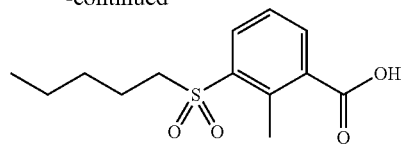

2-Methyl-3-(pentylthio)benzoic acid (125.5 mg, 0.527 mmol) and potassium permanganate (332 mg, 2.10 mmol) was suspended and dissolved, respectively, in 10 mL water, followed by the addition of 5 drops of 10% NaOH (aq.). The mixture was heated to reflux for 1 h. After cooling down on an ice-bath, diluted H2SO4 (aq.) was added to pH ~2, and solid NaHSO3 added for quenching the permanganate. The mixture was transferred to a separatory funnel using additional 50 mL water, and extracted with 3×50 mL ethyl acetate, with acidification with dilute H2SO4 (aq.) between each extraction. The combined organic phase was washed with 50 mL sat. NaCl (aq.), dried over MgSO4, filtered and solvent removed under reduced pressure. Purification of the crude product was performed using a silica column, eluting with a gradient of ethyl acetate in n-heptane, 50%-100%. Removal of solvent from fractions of interest gave the title compound as a solid (15.6 mg, 11% yield). 1H NMR (400 MHz, chloroform-d) δ 8.26 (d, 1H), 8.18 (d, 1H), 7.47 (t, 1H), 3.18 (m, 2H), 2.95 (s, 3H), 1.70 (m, 2H), 1.40-1.20 (m, 4H), 0.85 (s, 3H). 13C NMR (100 MHz, chloroform-d) δ 172.11, 140.32, 139.75, 136.16, 134.56, 132.48, 126.56, 55.76, 30.56, 22.30 (probably 2 resonances), 17.66, 13.88. MS (ESI, negative mode) m/z 269.0 [M−H]−.

Example 38: Preparation of calcium 2-methyl-3-(pentyloxy)benzoate

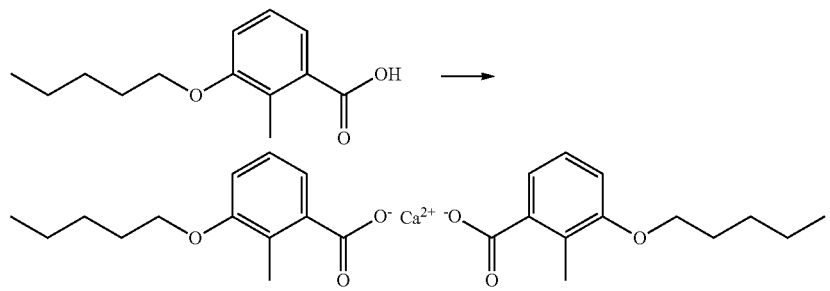

Calcium hydroxide (19 mg, 0.25 mmol) was added to a solution 2-methyl-3-(pentyloxy)benzoic acid (111 mg, 0.50 mmol) in ethanol (abs. 50 ml) and water (50 ml). The reaction was stirred for one hour at 50° C. and then evaporated to dryness (quant. yield). 1H NMR (400 MHz, DMSO) δ 7.12 (d, 1H), 7.02 (t, 1H), 6.82 (d, 1H), 3.92 (t, 2H), 2.30 (s, 3H), 1.72 (m, 2H), 1.59-1.21 (m, 4H), 0.90 (t, 3H). 13C NMR (101 MHz, DMSO) δ 156.61, 125.10, 124.15, 120.63, 110.90, 67.67, 28.56, 27.89, 21.89, 13.96, 12.90 (Two resonances were not identified due to excessive signal broadening).

Example 39: Preparation of (Z)-2-methyl-5-(pent-2-en-1-yloxy)benzoic acid

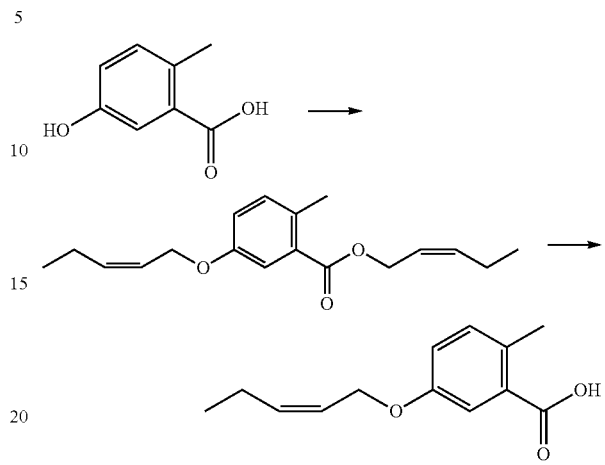

Step 1

To a solution of 5-hydroxy-2-methylbenzoic acid (278 mg, 1.82 mmol) in DMF (10 ml) was added potassium carbonate (1.80 g, 13.0 mmol) followed by (Z)-1-bromopent-2-ene (1.93 g, 13.0 mmol). The reaction mixture was heated at 90° C. overnight. After cooling to room temperature, the mixture was poured into water and extracted with EtOAc (×3). The combined organic extract was washed with brine, dried (Na2SO4), filtered and concentrated to afford 500 mg (95% yield) of (Z)-pent-2-en-1-yl 2-methyl-5-(((Z)-pent-2-en-1-yl)oxy)benzoate as an oil. MS (ESI, positive mode) m/z 311.1 [M+Na]+.

Step 2

To a solution of (Z)-pent-2-en-1-yl 2-methyl-5-(((Z)-pent-2-en-1-yl)oxy)benzoate (500 mg, 1.73 mmol) in ethanol (25 ml) was added 2.5 M NaOH (10 ml) and the reaction mixture stirred at 95° C. for 40 minutes. After cooling to room temperature, ethanol was removed and 1 M HCl added. The aqueous phase was extracted with EtOAc (×2), the combined organic phase washed with brine, dried (Na2SO4), filtered and concentrated. Flash chromatography (heptane:EtOAc 70:30) afforded 350 mg (92% yield) of the title compound as a solid. 1H NMR (400 MHz, chloroform-d) δ 12.35 (br s, 1H), 7.60 (d, 1H), 7.16 (d, 1H), 7.02 (dd, 1H), 5.93-5.86 (m, 0.30H), 5.71-5.59 (m, 1.7H), 4.59 (d, 1.4H), 4.49 (d, 0.60H), 2.57 (s, 3H), 2.21-2.07 (m, 2H), 1.02 (t, 3H). (1H NMR showed that some of the product was in the (E)-configuration). MS (ESI, negative mode) m/z 219.1 [M–H]–.

Example 40: Preparation of 2-methyl-3,5-bis(pentyloxy)benzoic acid

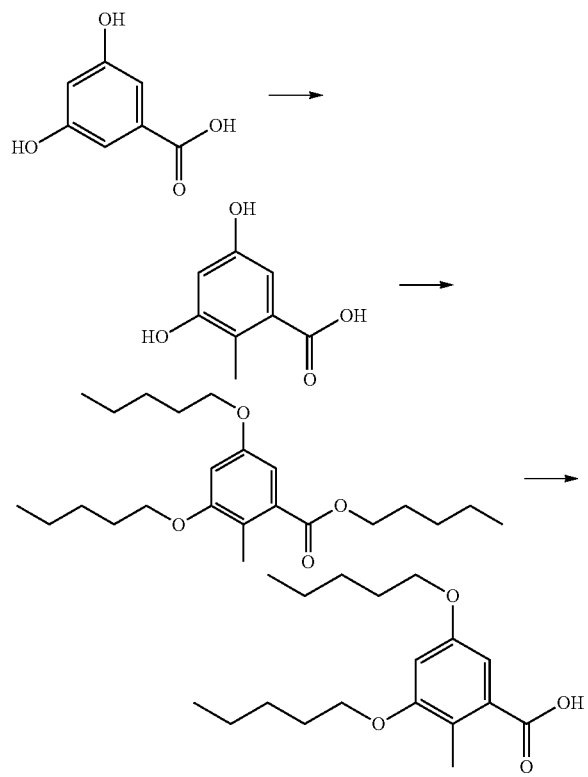

Step 1

Piperidine (7.6 ml, 77 mmol) was added slowly to a stirred solution of CH2O (37%, 5.43 ml, 72.6 mmol) in acetic acid (4.5 ml). The temperature was kept between 18-25° C. by occasional cooling with an ice-bath. Stirring was continued for 30 minutes. In a separate flask a solution of 3,5-dihydroxybenzoic acid (10 g, 65.0 mmol) in 38% aq. EtOH (23 ml) was prepared. To this solution was added ⅓ of the above Mannich-solution at room temperature. After stirring for 30 minutes the rest of the solution was added and stirring continued overnight. The precipitate was collected by filtration, washed with EtOAc and dried to afford 15.59 g (96% yield) of the intermediate, 3,5-dihydroxy-2-(piperidin-1-ylmethyl)benzoic acid. This compound (2 g, 7.96 mmol) in MeOH (20 ml), water (1.5 ml) and piperidine (1 ml) was hydrogenated overnight (balloon) in the presence of Pd/C (0.2 g) to give 360 mg (27% yield) of 3,5-dihydroxy-2-methylbenzoic acid as a solid.

Step 2

To a solution of 3,5-dihydroxy-2-methylbenzoic acid (360 mg, 2.14 mmol) in DMF (10 ml) was added potassium carbonate (1.38 g, 10.0 mmol) followed by 1-iodopentane (1.3 ml, 10.5 mmol). The reaction mixture was heated at 90° C. for 9 hours. After cooling to room temperature, the mixture was poured into water and extracted with EtOAc (×3). The combined organic extract was washed with brine, dried (Na2SO4), filtered and concentrated to afford the intermediate pentyl 2-methyl-3,5-bis(pentyloxy)benzoate as an oil. This compound was dissolved in ethanol (20 ml) and heated with 20 ml 2.5 NaOH for 4 hours. After cooling to room temperature, ethanol was removed and 1 M HCl added. The aqueous phase was extracted with EtOAc (×3), the combined organic phase washed with brine, dried (Na2SO4), filtered and concentrated. Flash chromatography (heptane:EtOAc 70:30) afforded 200 mg (30% yield) of the title compound as a solid. 1H NMR (400 MHz, chloroform-d) δ 7.07 (d, 1H), 6.61 (d, 1H), 3.99-3.91 (m, 4H), 2.42 (s, 3H), 1.84-1.74 (m, 4H), 1.49-1.33 (m, 8H), 0.94-0.91 (m, 6H). MS (ESI, negative mode) m/z 307.2 [M–H]–.

Example 41: Preparation of 5-hexanoyl-2-methylbenzoic acid

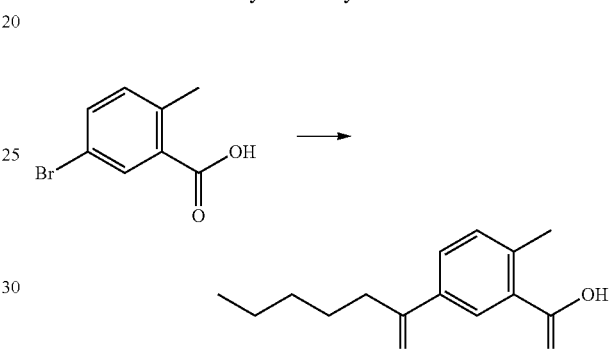

To a solution of 5-bromo-2-methylbenzoic acid (215 mg, 1.00 mmol) in dry THF (10 ml) was added BuLi (2.5 M in hexanes, 0.84 ml, 2.10 mmol) at –78° C. After 5 minutes hexanoylchloride (0.35 ml, 2.45 mmol) in dry THF (2 ml) was added and the resulting mixture was stirred at –78° C. for 45 minutes. The reaction mixture was poured into 1M HCl and extracted with EtOAc (×2). The organic phase was washed with brine, dried (Na2SO4), filtered and concentrated. The residue was purified by flash chromatography (heptane:EtOAc, 0-50% EtoAC) to afford 37 mg (16% yield) of the title compound as a solid. MS (ESI, negative mode) m/z 233.1 [M–H]–.

BIOLOGICAL EXAMPLES

Evaluation of the Effects of Compound B and Compound a on Plasma Lipids in High-Fat Diet Fed APOE*3Leiden. Mice The APOE*3Leiden mouse expresses a variant of the human apolipoprotein E3 (APOE3), the APOE*3Leiden, in addition to the human apolipoprotein C1 (APOC1). APOE*3Leiden mice exhibit elevated plasma cholesterol and triglyceride levels, mainly confined to the VLDL/LDL sized lipoprotein fraction.

Studies were performed in APOE*3Leiden mice (13-15 weeks old) placed on a semi-synthetic high fat diet (24% fat w/w) with 0.25% cholesterol w/w. After a 4-week run-in period, mice were sub-divided into groups of 5 mice each and administration of Compound A, Compound B, or vehicle alone was started. Both Compound B and Compound A were administered at a dose of 0.3 mmol/kg bw/day via diet. Sunflower oil (10 ml v/w) was used as a vehicle to facilitate mixing. After 4 weeks of treatment mice were sacrificed by C02 asphyxiation and plasma cholesterol and triglycerides were measured using commercially available kits (Roche*/Hitachi©).

In a further study, performed as described above, the effects of Compound A, Compound B, and Compound C were compared with the effects of Reference Compound 1 ((Z)-3-(pent-2-en-1-yloxy)benzoic acid) and Reference Compound 2 ((Z)-4-(pent-2-en-1-yloxy)benzoic acid) on triglyceride levels. All compounds were administered at a dose of 0.3 mmol/kg bw/day. The results of this study are described in Example 17.

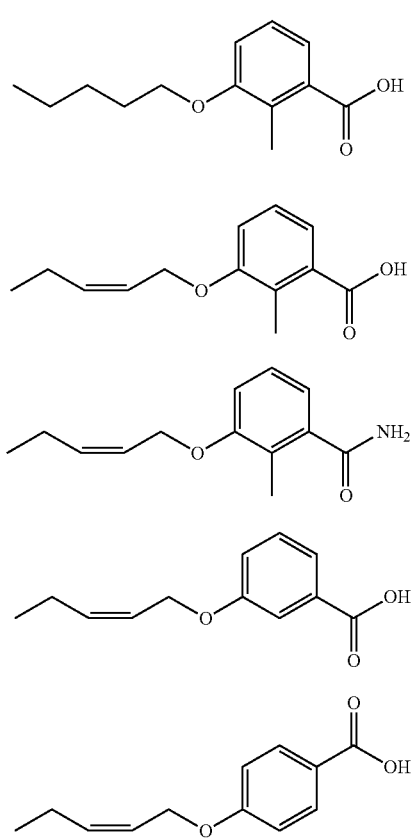

Compound A

Compound B

Compound C

Reference 1

Reference 2

Evaluation of the Effects of Compound B and Compound a on Glycemic Control and Hepatic Target Gene Expression in Ob/Ob AMLN Mice ob/ob mice are consistently fibrosis (liver) prone when cholesterol (2%) and 40% fat (containing 18% trans-fatty acids) and 20% fructose are added to a high-caloric diet (i.e., AMLN diet). ob/ob mice on AMLN diet (termed 'ob/ob AMLN mice') develop steatohepatitis and fibrosis within a shorter timeframe (<12 weeks) compared with wild-type C57BL/6 mice (AMLN mice) fed the same diet. ob/ob AMLN mice provide an obese diet-induced model of NASH that also allows the study of effects on glycemic control.

Thirty male ob/ob mice (5 weeks old) were fed the AMLN diet for 15 weeks then randomised into 3 groups of 10 mice/group to receive Compound B or Compound A (both at 0.3 mmol/kg bw day) or no treatment (vehicle) for a further 4 weeks. Assessment of the hepatic expression of key genes regulating plasma lipid concentrations (LDLr), hepatic fibrosis (collA1), bile acid transport/re-uptake (Slc51b and Slc10a2) and inflammation (CD68) was made via RNA sequencing at 4 weeks. To assess the effects of Compound B and Compound A on glycemic control, an oral glucose tolerance test (OGTT) was also performed at 3 weeks. An additional group of mice (n=5) were also treated with a PPAR-γ agonist (pioglitazone, 30 mg/kg bw day) was also included to compare effects upon bodyweight.

Evaluation of the Effects of Compound a and Compound B on Hepatic Steatosis in Oral Parenteral Nutrition (PN) Diet Fed C57BL/6 Mice Male C57BL/6 mice, 6 to 8 weeks old at initiation of the experiments, were used for all experimental groups. Mice were fed either an ad libitum diet of standard rodent chow (calorie composition: 26% protein, 14% fat, 60% carbohydrates) and water or a parenteral nutrition (PN) solution that mimics the PN diet used in neonatal intensive care units. The PN solution was a fat-free, high-carbohydrate liquid diet (20% dextrose, 2% essential and nonessential amino acids, 0.2% pediatric trace elements, 0.5% pediatric multivitamins, 30 mEq of sodium, 20 mEq of potassium, 15 mEq of calcium (as calcium gluconate), 10 mEq of magnesium, 10 mEq of phosphate, 5 mEq of acetate, and 30 mEq of chloride per liter) administered as a single 50 mL bottle per cage which mice consumed ad libitum. The PN diet fed ad libitum has been demonstrated to result in hepatic steatosis, a precursor to more severe liver damage, in mice, providing a model for PNALD. Prince et al., JPEN J Parenter Enteral Nutr., 2014; 38(5): 608-616.

In the initial experiment, only Compound A was tested. The results of this experiment are described in Example 14.

Male C57BL/6 mice, 6 weeks old at initiation of experiments, were divided into three groups (10 mice per group). One group was fed an ad libitum diet of standard rodent chow and water. The group fed standard rodent chow received no additional treatments during the experimental period and served as a negative control group. The two other groups were fed the above-described PN diet.

Of the two groups that received the PN diet, one group received medium-chain triglyceride oil (MCT) (Nestle™ HealthCare Nutrition, Florham Park, NJ), at a dose of 7.4 g of fat/kg body weight every other day by orogastric gavage. For the other group, MCT served as a vehicle for the delivery of Compound A (0.3 mmol/kg bw day) via orogastric gavage.

After 19 days of treatment, livers were procured, fixed and frozen on dry ice, then stored at −80° C. for Oil Red O analysis.

In a subsequent experiment, both Compound A and Compound B were tested at two dosages. The results of this experiment are described in Example 15.

Male C57BL/6 mice, 6 to 8 weeks old at initiation of the experiments, were used for all experimental groups. One group was fed an ad libitum diet of standard rodent chow and water. The group fed standard rodent chow received no additional treatments during the experimental period and served as a negative control group. Seven other groups (10 mice per group) were fed the PN solution described above ad libitum.

Of the seven groups that received the PN diet, each group received one of the following orogastric protocols administered every other day over 19 days:
  (1) Saline: saline solution administered isovolumetric with the Omegaven® group;
  (2) MCT: medium-chain triglyceride oil (MCT) (Nestle™ HealthCare Nutrition, Florham Park, NJ), at a dose of 7.4 g of fat/kg body weight;

(3) Omegaven®: Omegaven® (commercial fish oil lipid emulsion) at a dose of 2.4 g fat/kg body weight;
(4) Compound A LOW: Compound A at a dose of 0.3 mmol/kg bw day (diluted in MCT to 0.0375 mmol/mL, resulting in administration of 7.4 g of MCT/kg weight);
(5) Compound A HI: Compound A at a dose of 0.6 mmol/kg bw day (diluted in MCT to 0.075 mmol/mL, resulting in administration of 7.4 g of MCT/kg weight);
(6) Compound B LOW: Compound B at a dose of 0.3 mmol/kg bw day (diluted in MCT to 0.0375 mmol/mL, resulting in administration of 7.4 g of MCT/kg weight); and
(7) Compound B HI: Compound B at a dose of 0.6 mmol/kg bw day (diluted in MCT to 0.075 mmol/mL, resulting in administration of 7.4 g of MCT/kg weight).

After 19 days of treatment, organs were harvested, including the liver, kidney, and spleen, which were analyzed for relative weight between each group. Livers were also fixed and frozen on dry ice, then stored at −80° C. for hematoxylin and eosin (H&E) stain analysis and Oil Red O analysis.

Evaluation of the Effects of Compound a on Hepatic Steatosis in C57BL/6 Mice Intravenously Administered Saline, Intralipid®, or Omegaven®

Male C57BL/6 mice, 6 to 8 weeks old at initiation of the experiments, were used for all experiments. One group was fed an ad libitum diet of standard rodent chow and water. Six other groups (10 mice per group) were fed a parenteral nutrition (PN) solution ab libitum as described above.

The PN-fed groups received tail vein injections every other day of saline, Omegaven® dosed at 2.4 g/kg/day, or Intralipid® (commercial soybean oil lipid emulsion) dosed at 2.4 g/kg/day and were treated with orogastric gavage administration (every other day) of either MCT or Compound A dosed at 0.6 mmol/kg bw. Intravenous saline was isovolumetric to Intralipid® groups. MCT orogastric gavage was isovolumetric to Compound A treatment (200 µl). The 6 experimental PN diet groups are listed below:
(1) Saline (intravenous)+PN+MCT (gavage)
(2) Intralipid® (intravenous)+PN+MCT (gavage)
(3) Omegaven® (intravenous)+PN+MCT (gavage)
(4) Saline (intravenous)+PN+Compound A (gavage)
(5) Intralipid® (intravenous)+PN+Compound A (gavage)
(6) Omegaven® (intravenous)+PN+Compound A (gavage)

Intravenous lipids are used in PN diets as a source of nonprotein, noncarbohydrate calories. However, plant-based intravenous lipid emulsions, such as soy-based Interlipid®, have been shown to contribute to parenteral nutrition-associated liver disease (PNALD). Javid et al., *J. Pediatr. Surg.*, 2005; 40: 1446-1453. Intravenous administration of Omegaven® has been shown to ameliorate hepatic steatosis caused by PN diet in mice. Meisel et al., *J. Pediatr. Surg.*, 2011; 46: 666-667.

Example 1

Effects of Compound B and Compound A (both 0.3 mmol/kg bw day) on post-prandial blood glucose (AUC 0-240 mins) in ob/ob AMLN mice: Both Compound B and Compound A significantly reduce total plasma glucose (area-under-the-curve from 0-240 mins) versus vehicle in response to an oral glucose load after 3 weeks treatment (FIG. 1).

Example 2

Figure 2:
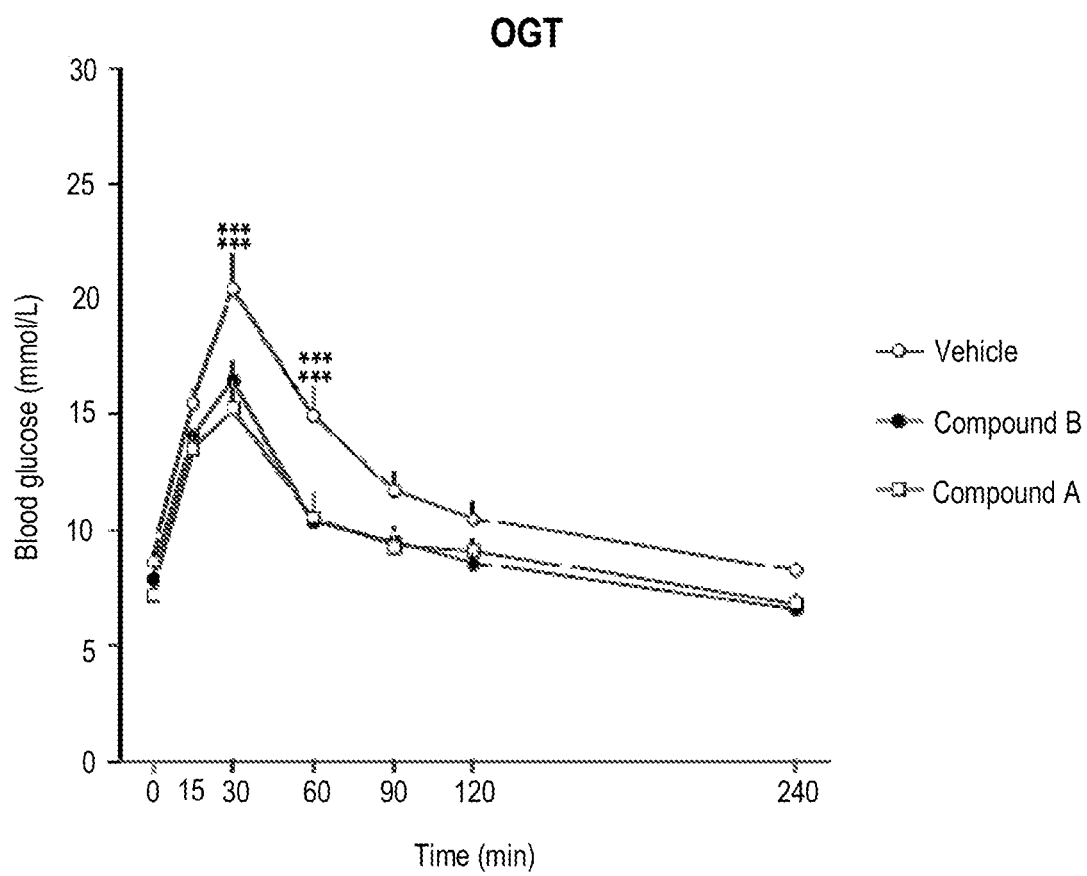

Effects of 4-weeks treatment with Compound B and Compound A (both 0.3 mmol/kg bw day) on post-prandial blood glucose in ob/ob AMLN mice: Both Compound B and Compound A significantly reduce plasma glucose at 30- and 60-mins versus vehicle in response to an oral glucose load after 3 weeks treatment (FIG. 2).

Example 3

Figure 3:
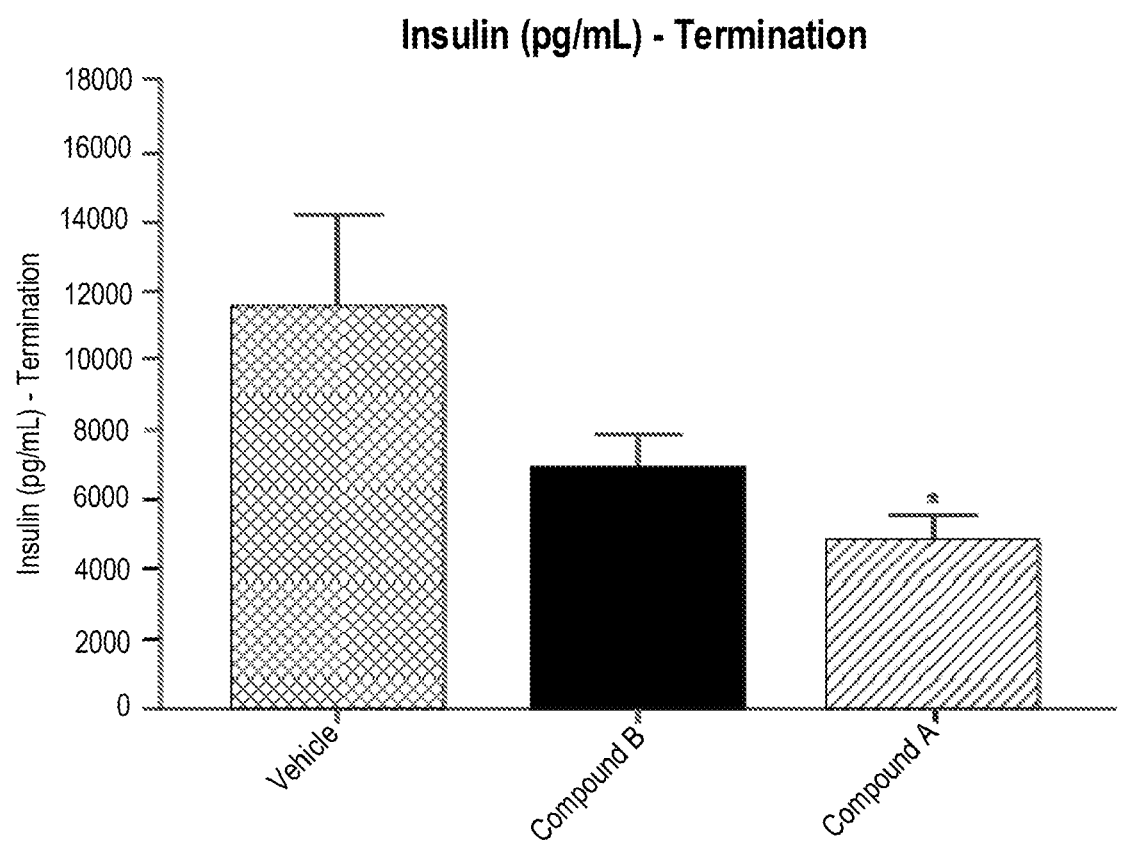

Effects of 4-weeks treatment with Compound B and Compound A (both 0.3 mmol/kg bw day) on fasting insulin in ob/ob AMLN mice: Both Compound B and Compound A ($p<0.05$) reduce fasting plasma insulin (area-under-the-curve from 0-240 mins) versus vehicle after 4 weeks treatment (FIG. 3).

Example 4

Figure 4:
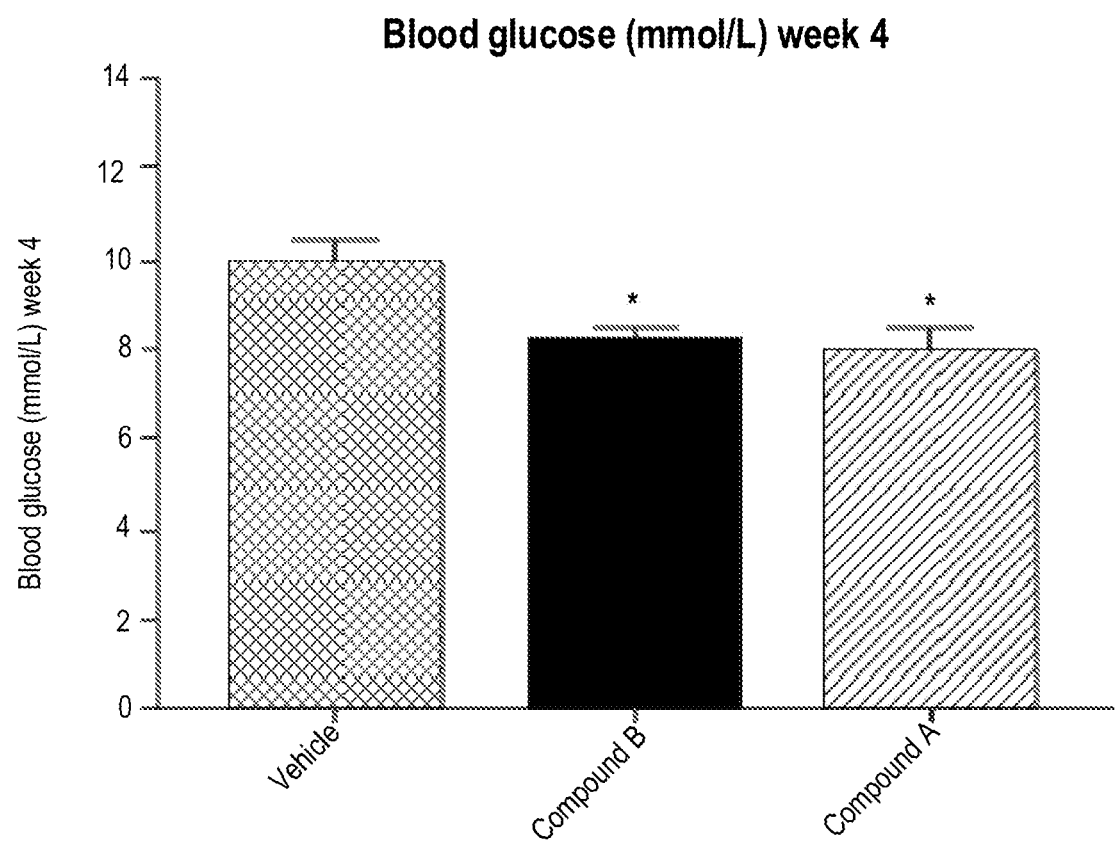

Effects of 4-weeks treatment with Compound B and Compound A (both 0.3 mmol/kg bw day) on fasting blood glucose in ob/ob AMLN mice: Both Compound B and Compound A significantly reduce fasting plasma glucose (area-under-the-curve from 0-240 mins) versus vehicle after 4 weeks treatment (FIG. 4).

Example 5

Figure 5:
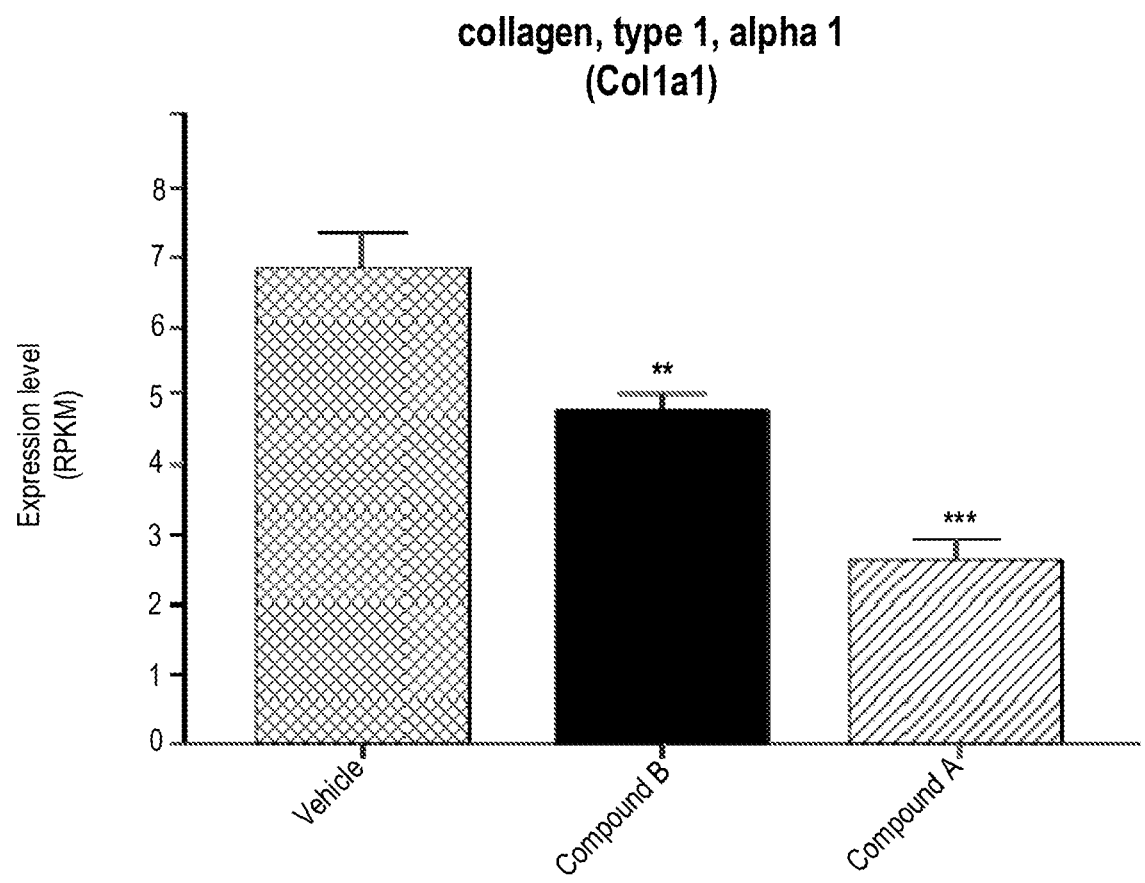

Effects of 4-weeks treatment with Compound B and Compound A (both 0.3 mmol/kg bw day) on hepatic collagenlal gene expression in ob/ob AMLN mice: Both Compound B and Compound A significantly reduce the hepatic expression of Coll al (a key gene involved in hepatic fibrosis) versus vehicle after 4 weeks treatment (FIG. 5).

Example 6

Figure 6:
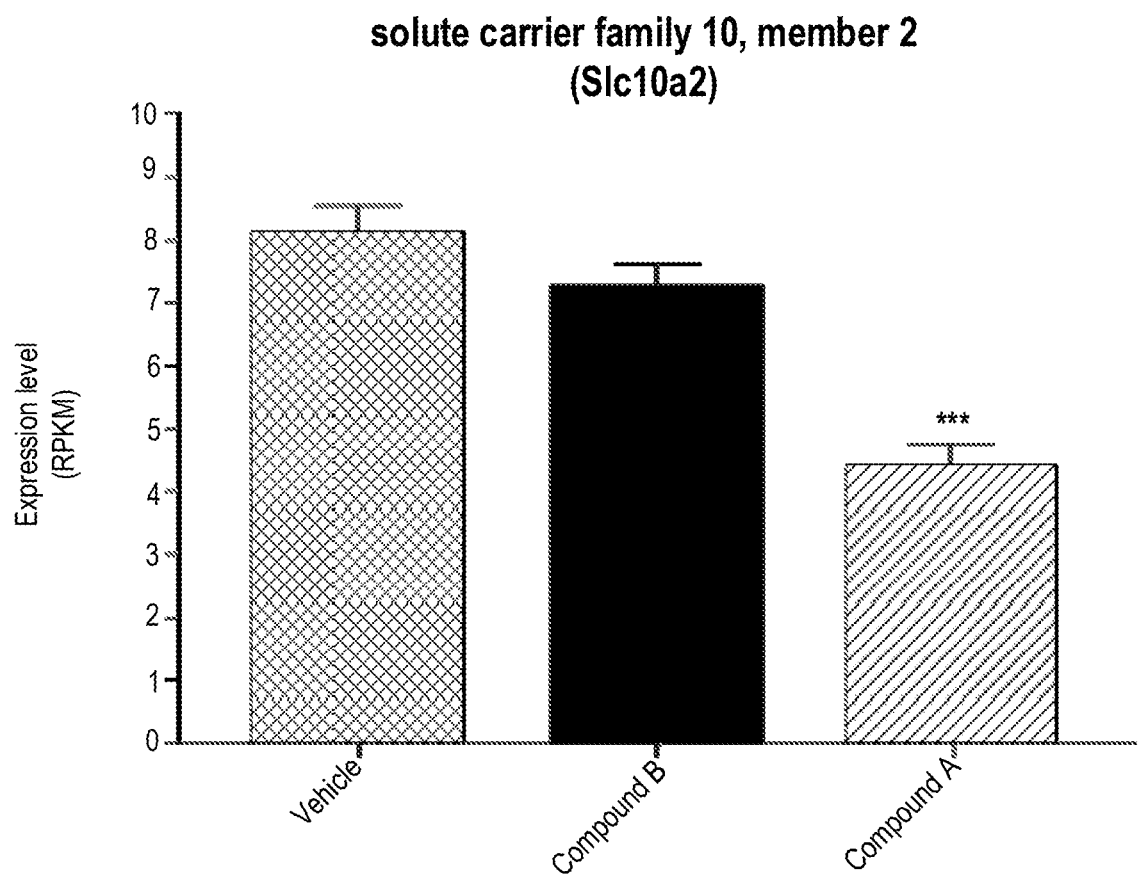

Effects of 4-weeks treatment with Compound B and Compound A (both 0.3 mmol/kg bw day) on hepatic Slc10a2 gene expression in ob/ob AMLN mice: Compound A significantly decreases the hepatic expression of Slc10a2 (codes for apical sodium-dependent bile acid transporter [ASBT] that regulates reabsorption of conjugated bile acids in the ileum) versus vehicle after 4 weeks treatment (FIG. 6)

Example 7

Figure 7:
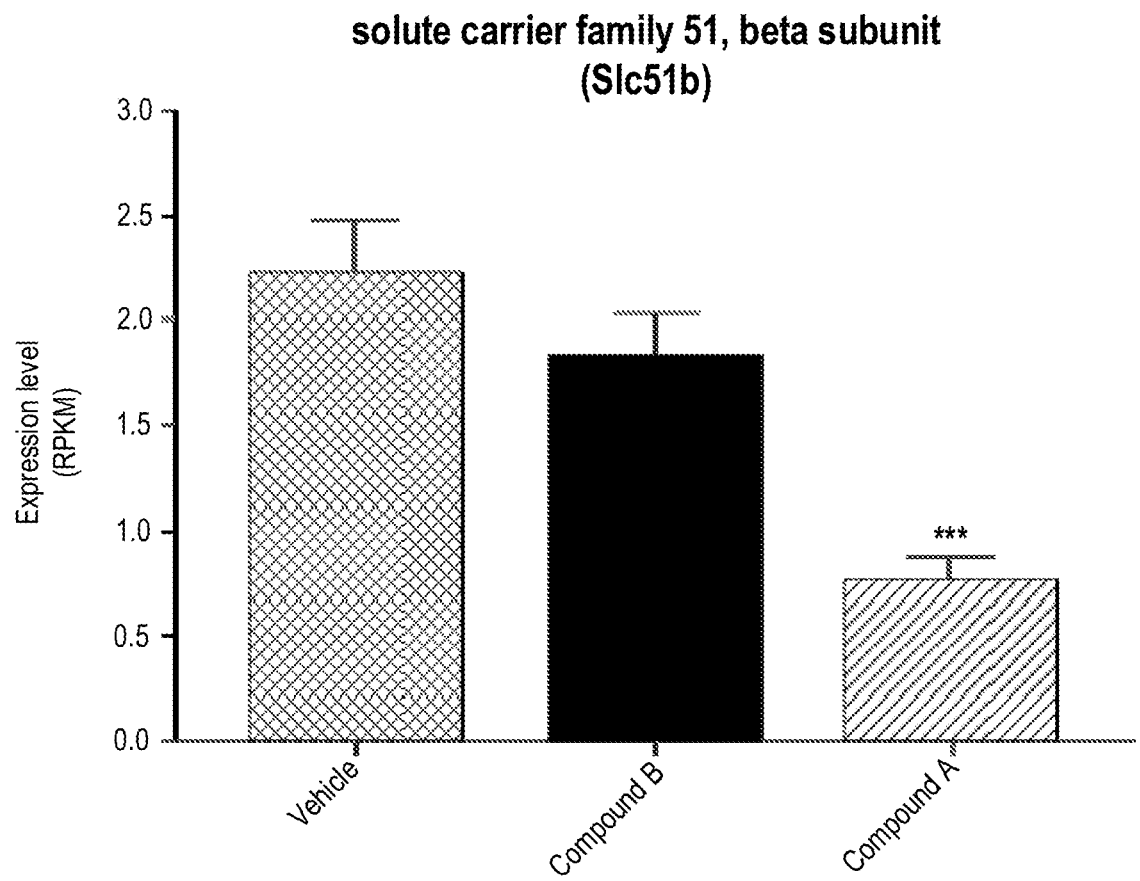

Effects of 4-weeks treatment with Compound B and Compound A (both 0.3 mmol/kg bw day) on hepatic Slc51b gene expression in ob/ob AMLN mice: Compound A significantly decreases the hepatic expression of Slc51b (codes organic solute transporter beta [OSTb] that regulates reabsorption of bile acids) versus vehicle after 4 weeks treatment (FIG. 7).

Example 8

Figure 8:
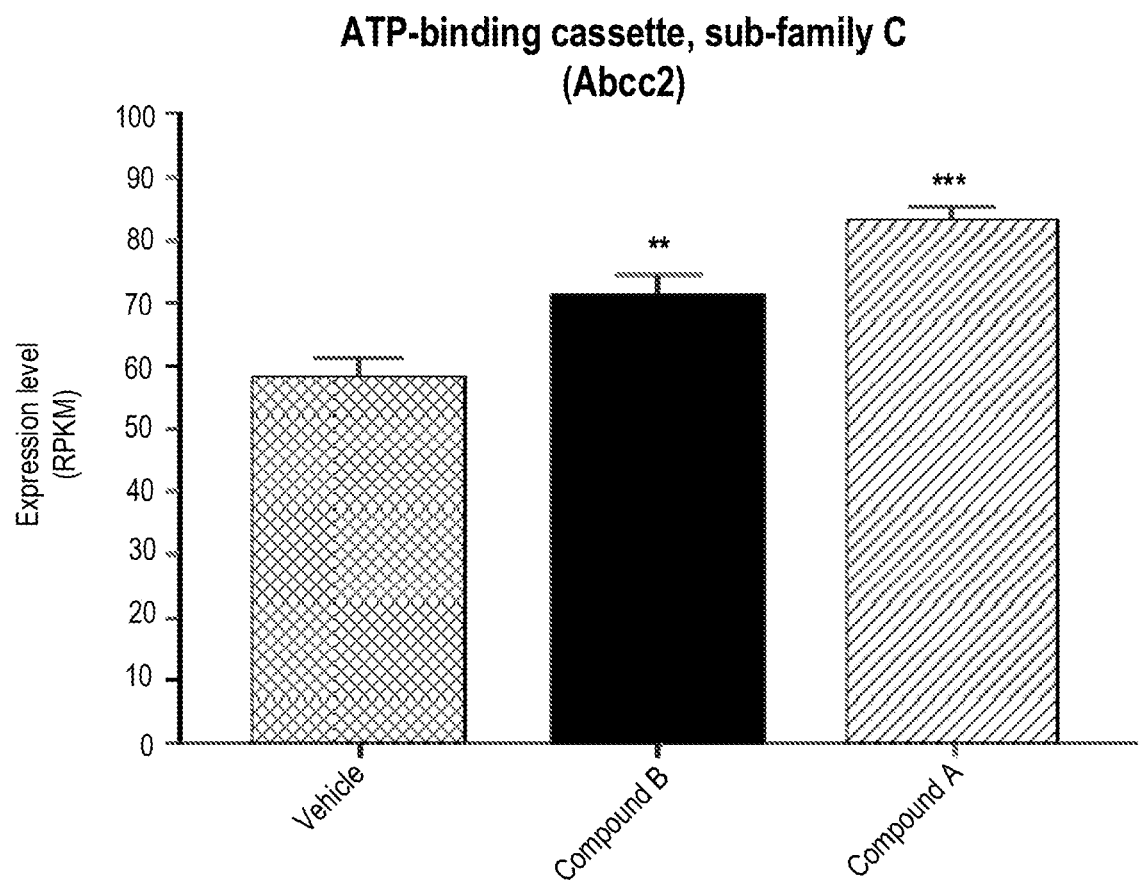

Effects of 4-weeks treatment with Compound B and Compound A (both 0.3 mmol/kg bw day) on hepatic ABCC2 gene expression in ob/ob AMLN mice: Compound A significantly increases the hepatic expression of ABCC2 (codes Mrp2 that regulates canalicular export of bilirubin) versus vehicle after 4 weeks treatment (FIG. 8).

Example 9

Figure 9:
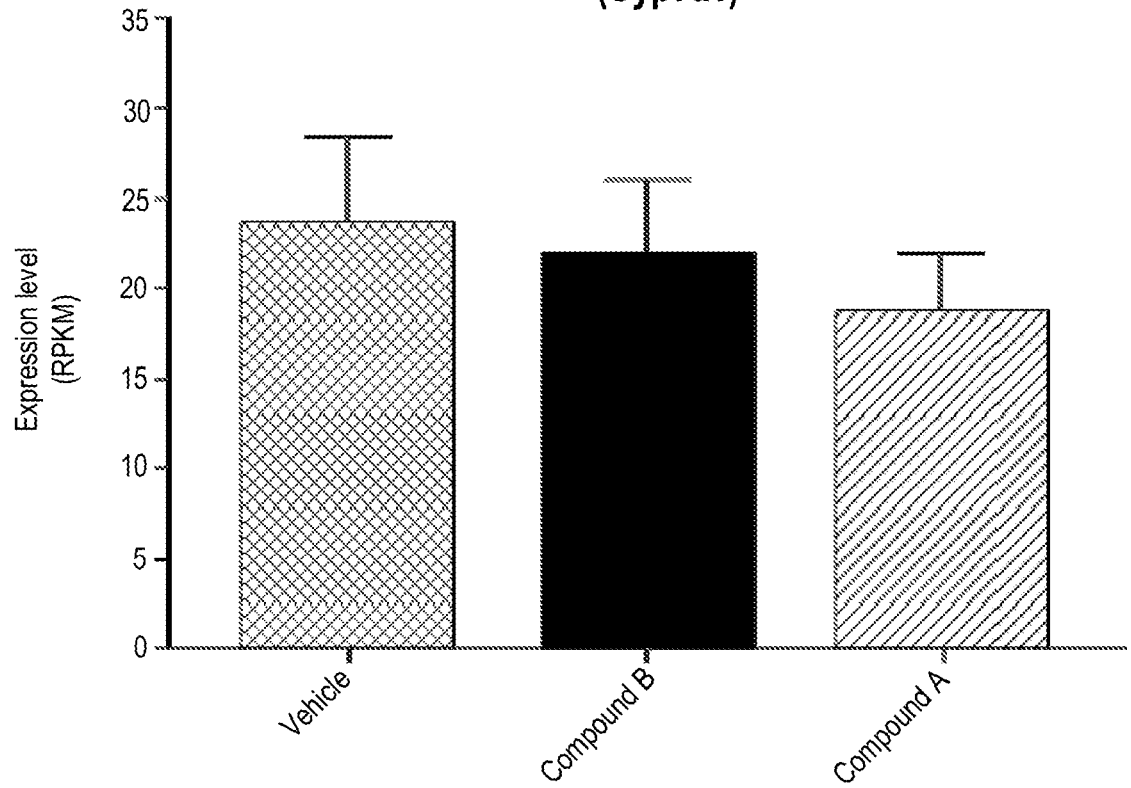

Effects of 4-weeks treatment with Compound B and Compound A (both 0.3 mmol/kg bw day) on hepatic CYP7A1 gene expression in ob/ob AMLN mice: Compound A reduces the hepatic expression of CYP7A1 after 4 weeks treatment. CYP7A1 is the rate limiting enzyme in hepatic bile acid synthesis (FIG. 9).

Example 10

Figure 10:
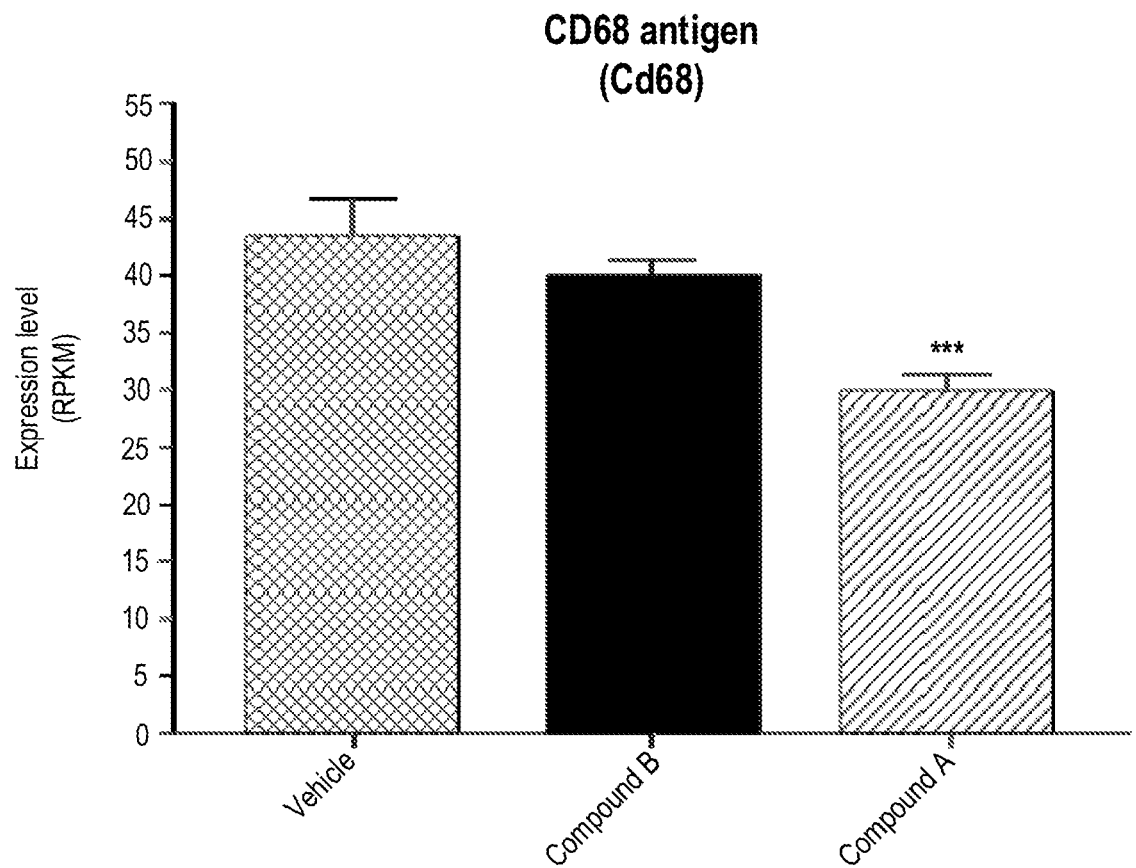

Effects of 4-weeks treatment with Compound B and Compound A (both 0.3 mmol/kg bw day) on hepatic CD68 gene expression in ob/ob AMLN mice: Compound A significantly decreases the hepatic expression of CD68 (a marker of hepatic macrophages) versus vehicle after 4 weeks treatment (FIG. 10).

Example 11

Effects of 4-weeks treatment with Compound B and Compound A on plasma triglycerides (TG) and total cholesterol in APOE*3Leiden mice fed a high-fat, high-cholesterol diet: Both Compound B (at 2 doses) and Compound A significantly reduce total plasma cholesterol and TG versus vehicle in response after 4 weeks treatment (Table 1).

TABLE 1

| Compound | Dose (mmol/kg bw/day) | Reduction in plasma TG vs control (%) | Reduction in plasma cholesterol vs control (%) |
| --- | --- | --- | --- |
| Compound B | 0.1 | 45** | 24** |
| Compound B | 0.3 | 63** | 27** |
| Compound A | 0.1 | 79*** | 30*** |

**$P < 0.01$ vs control,
***$P < 0.005$ vs control

Example 12

Figure 11:
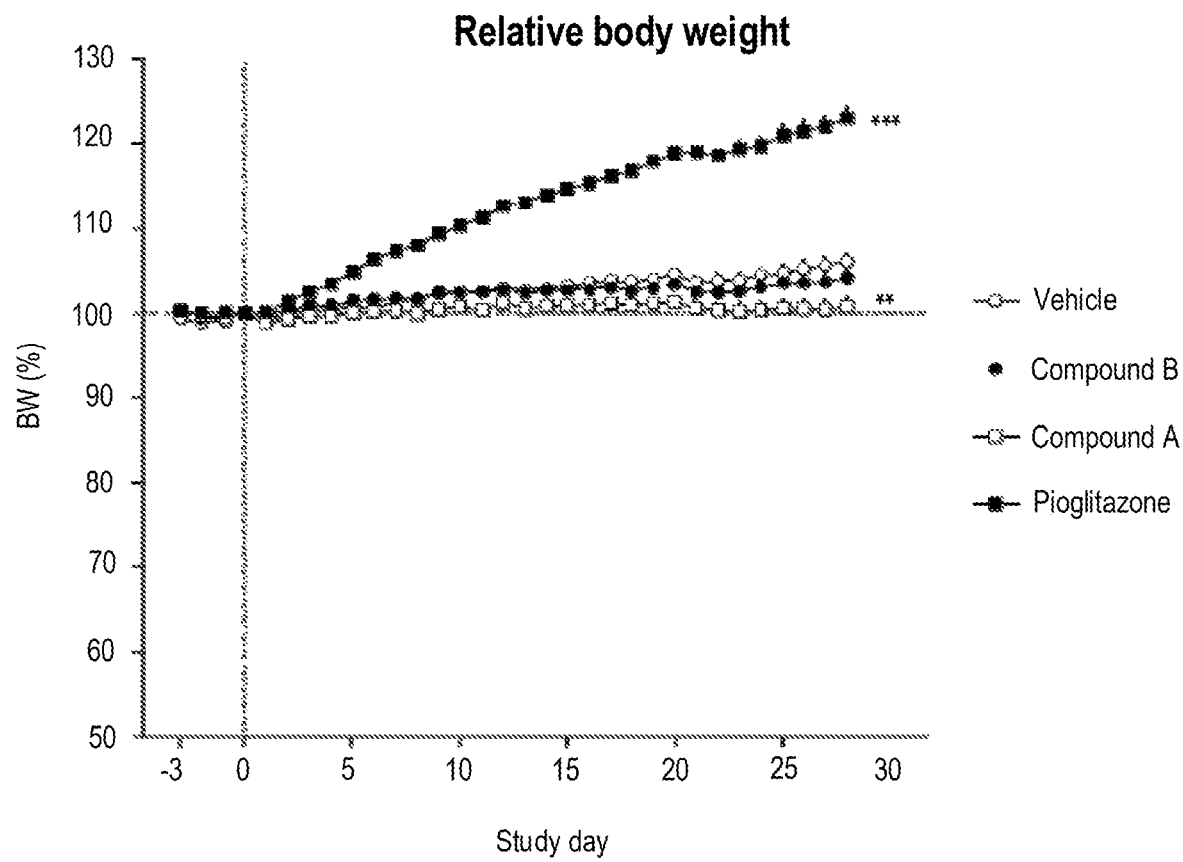

Effects of 4-weeks treatment with Compound B and Compound A (both 0.3 mmol/kg bw day) and pioglitazone on relative bodyweight in ob/ob AMLN mice: Whereas pioglitazone (30 mg/kg bw day) significantly increased bodyweight, Compound B had no effect and Compound A significantly decreased bodyweight versus vehicle after 4 weeks treatment (FIG. 11).

Example 13

Figure 12:
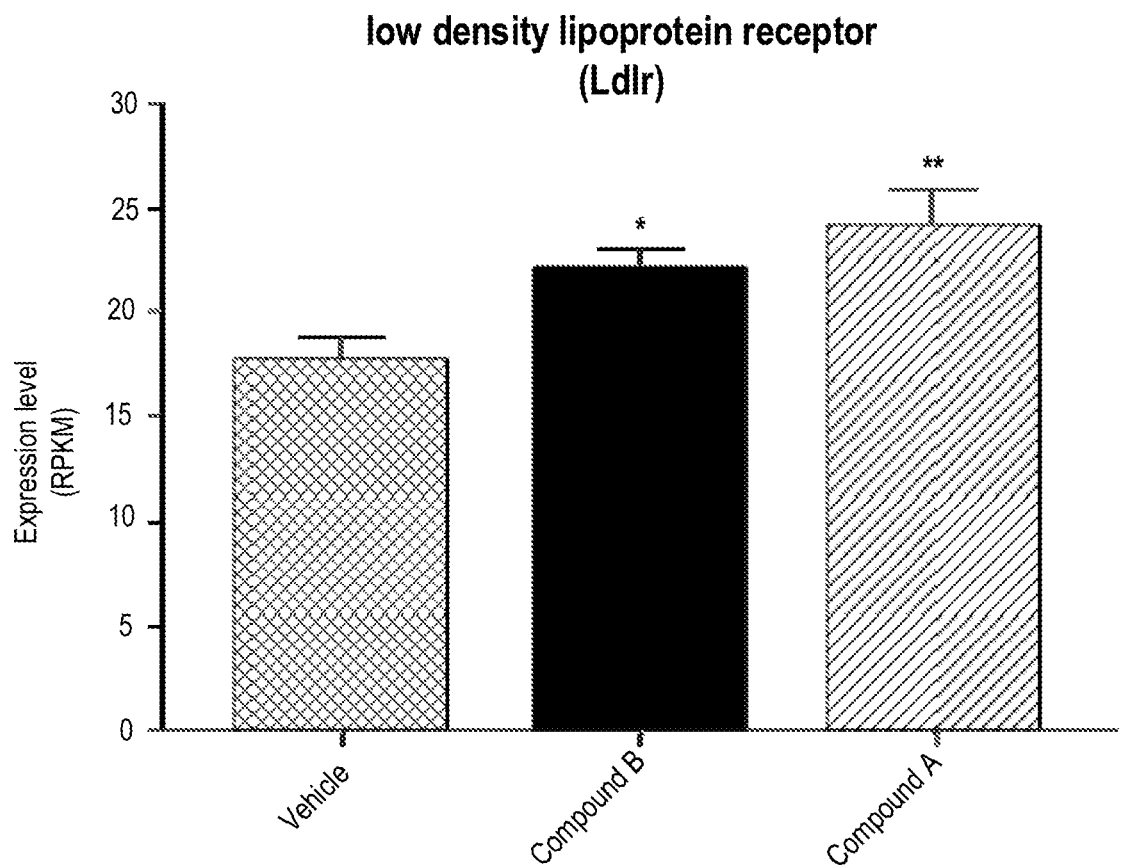

Effects of 4-weeks treatment with Compound B and Compound A (both 0.3 mmol/kg bw day) on hepatic low-density lipoprotein receptor (LDLr) gene expression in ob/ob AMLN mice: Both Compound B and Compound A significantly increase the expression of hepatic LDLr (a key gene regulating hepatic uptake of plasma atherogenic lipoproteins) versus vehicle after 4 weeks treatment (FIG. 12).

Example 14

Figure 13:
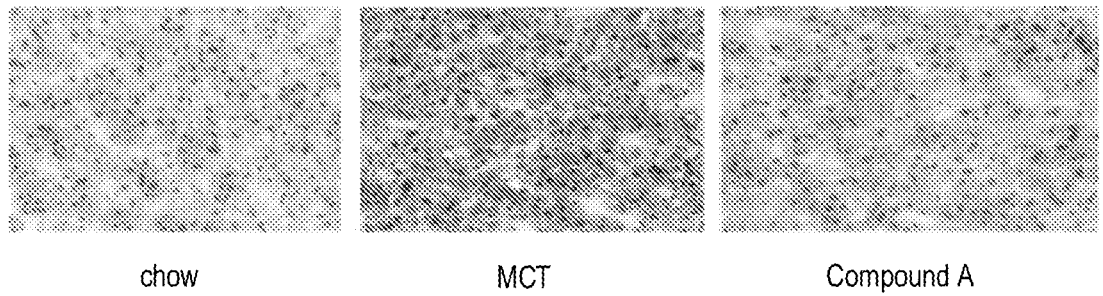
Figure 14:
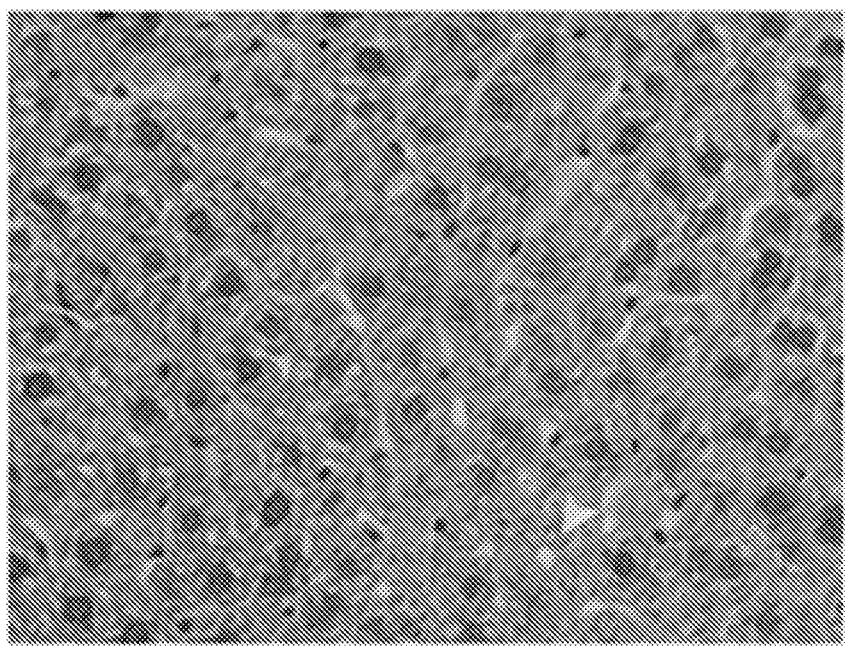
Figure 14:
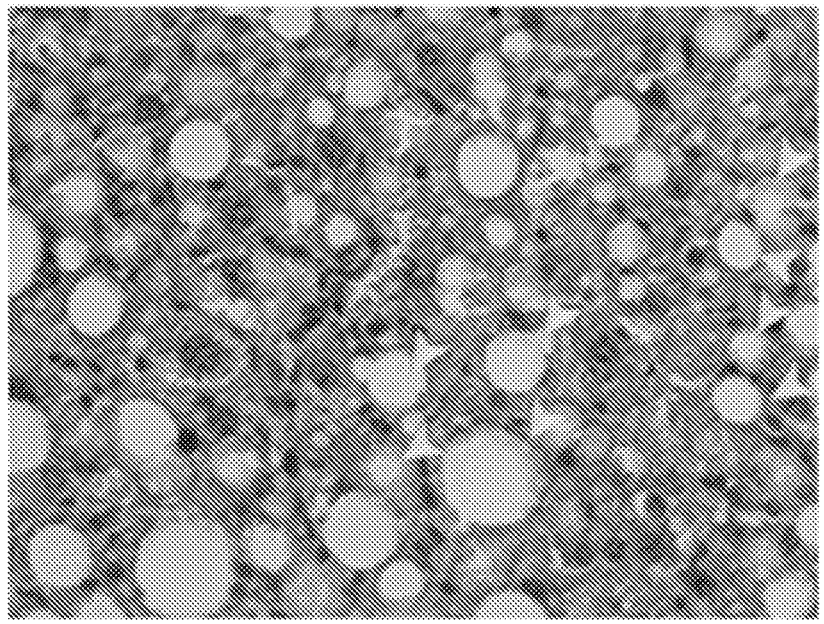
Figure 15:
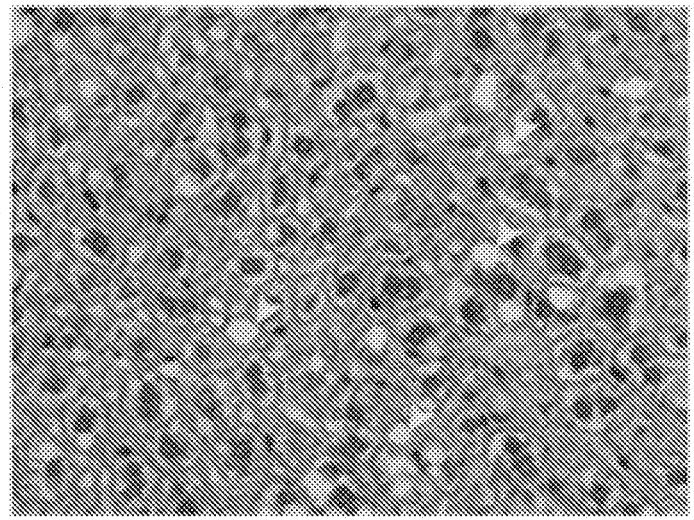
FIG. 15. Effects of 19-days of an oral PN diet combined with MCT, Omegaven®, Compound A, or Compound B, compared with chow diet control, on hepatic steatosis in C57BL/6 mice. Haematoxylin and Eosin (H&E) stained mouse liver cells magnif-ed by 400× for: (A) PN-fed mice administered medium-chain triglycerides (MCT) via orogastric gavage; and (B) PN-fed mice administered Omegaven® via orogastric gavage. Arrows indicate lipid accumulation.
Figure 15:
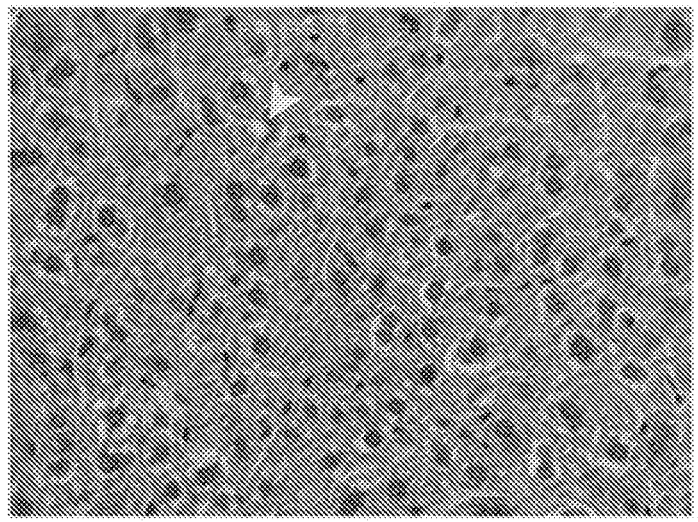
Figure 16:
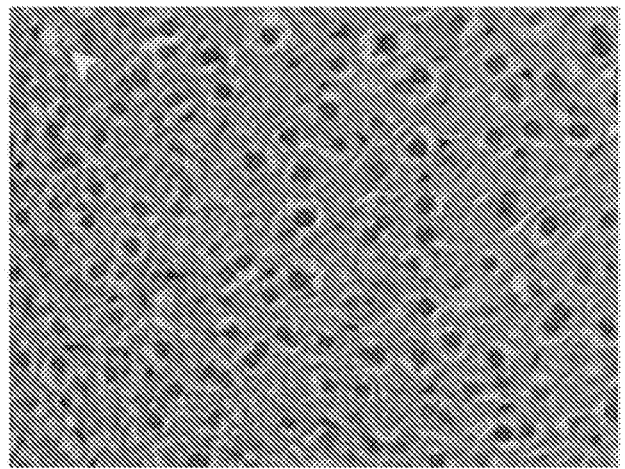
FIG. 16. Effects of 19-days of an oral PN diet combined with MCT, Omegaven®, Compound A, or Compound B, compared with chow diet control, on hepatic steatosis in C57BL/6 mice. Haematoxylin and Eosin (1&E) stained mouse liver sections were magnified by 400× for: (A) PN-fed mice treated with 0.3 mmol Compound A via orogastric gavage; and (B) PN-fed mice treated with 0.6 mmol Compound A via orogastric gavage. Arrows indicate lipid accumulation.
Figure 16:
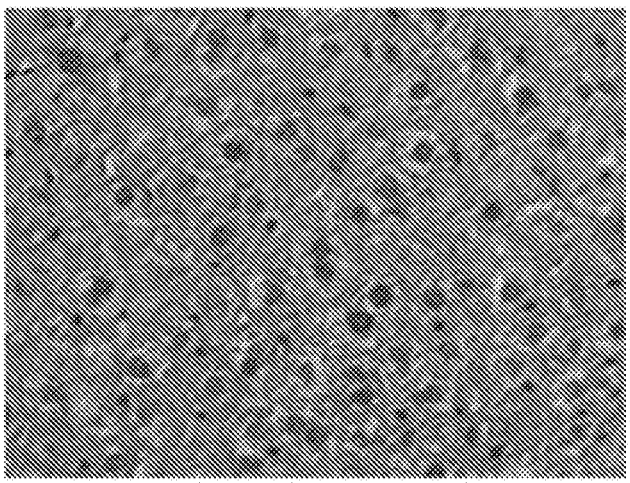
Figure 17:
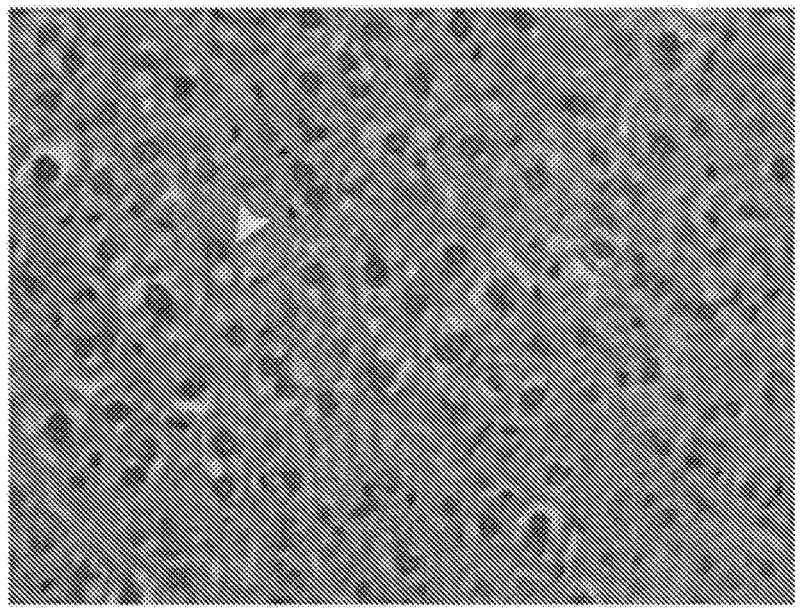
FIG. 17. Effects of 19-days of an oral PN diet combined with MCT, Omegaven®, Compound A, or Compound B, compared with chow diet control, on hepatic steatosis in C57BL/6 mice. Haemotoxylin and Eosin (H&E) stained mouse liver sections were magnified by 400× for: (A) PN-fed mice treated with 0.3 mmol Compound B via orogastric gavage; and (B) PN-fed mice treated with 0.6 mmol Compound B via orogastric gavage. Arrows indicate lipid accumulation.
Figure 17:
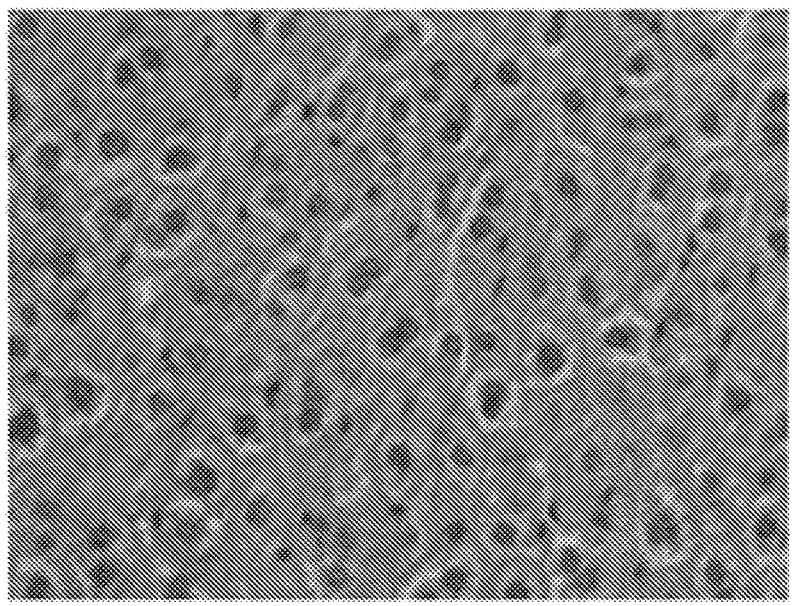

Effects of 19-days of an oral PN diet combined with either medium-chain triglycerides (MCT) or Compound A on hepatic steatosis in C57BL/6 mice: Compound A, but not MCT, prevented the development of steatosis induced by an oral PN diet demonstrated by Red Oil O stain in isolated liver sections (FIG. 13). Normal liver architecture was observed in both chow-fed and Compound A fed mice.

Example 15

Effects of 19-days of an oral PN diet combined with orogastric gavage treatment of either saline, medium-chain triglycerides (MCT), Omegaven®, Compound A, or Compound B on hepatic steatosis in C57BL/6 mice: Compound A and Compound B, but not MCT, prevented the development of steatosis induced by an oral PN diet demonstrated by H&E stain in isolated liver sections (FIGS. 14-17). Normal liver architecture was observed in all mice. Arrows are used to show lipid accumulation.

Figure 18:
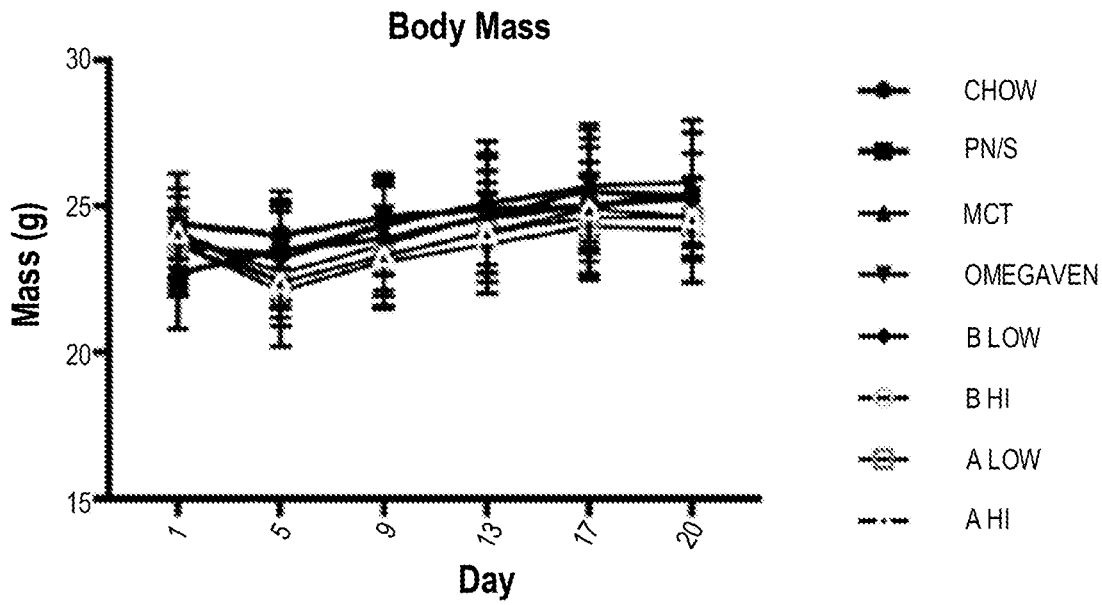
FIG. 18. Effects of 19-days of an oral PN diet combined with MCT, Omegaven®, Compound A, or Compound B, compared with chow diet control, in C57BL/6 mice on: (A) body mass; and (B) liver/body mass; and (C) spleen/body mass.
Figure 18:
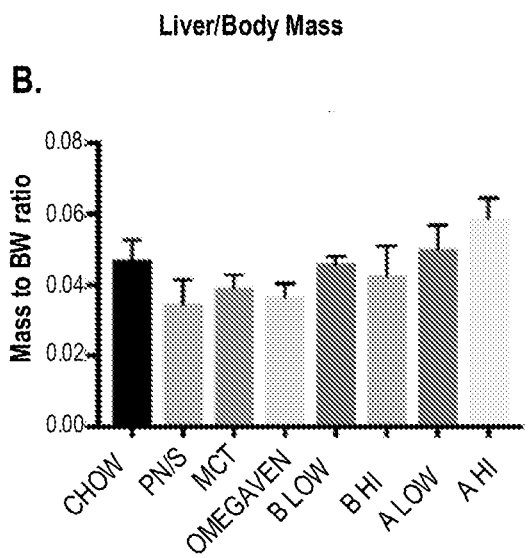
Figure 18:
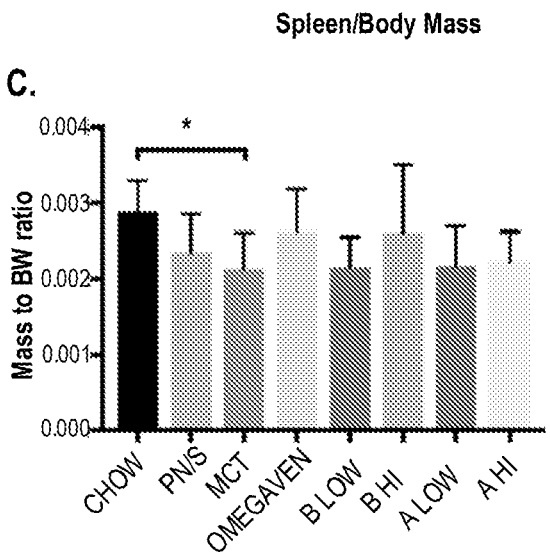

Body mass, liver/body mass, and spleen/body mass were also analyzed for all groups (FIG. 18), which demonstrated that body mass, liver/body mass, and spleen/body mass for mice treated with Compound A and B at high and low dosages were not significantly different from chow-fed or PN-fed saline groups.

Example 16

Effects of treatment with chow versus an oral PN diet with intravenous saline, Intralipid©, or Omegaven® combined with orogastric gavage administration of either MCT or Compound A, on hepatic steatosis in C57BL/6 mice: Treatment with Compound A prevented the development of steatosis induced by an oral PN diet for all of the groups (intravenous saline, Intralipid®, or Omegaven®) as demonstrated by H&E stain in isolated liver sections (FIGS. 22-25). Arrows are used to show lipid accumulation.

Figure 30:
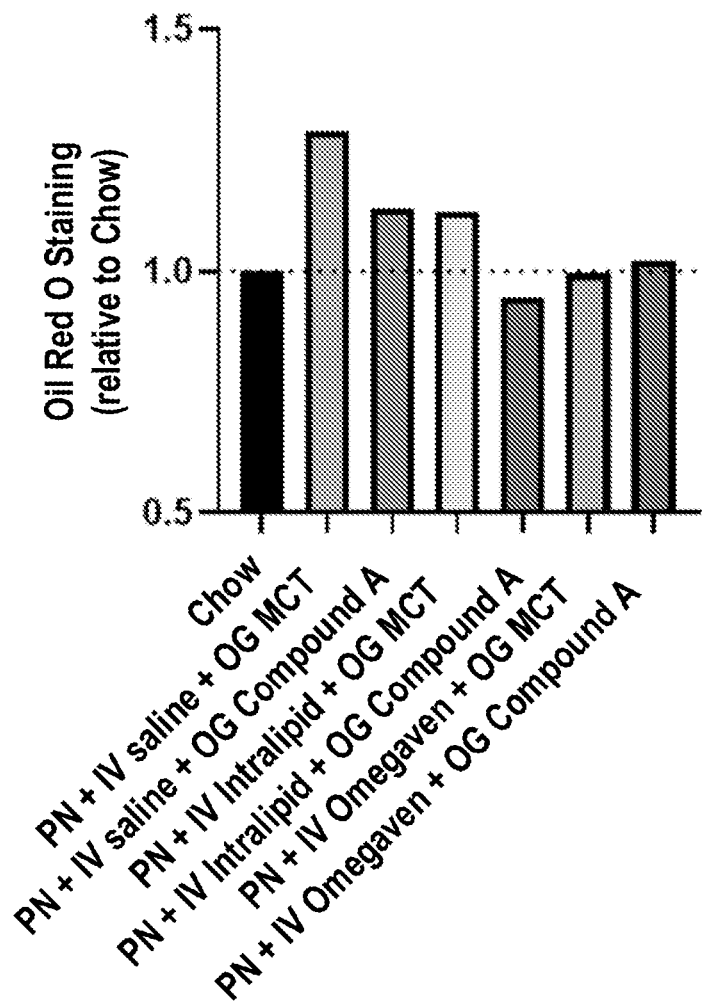
FIG. 30. Oil Red O Histology quantification for oral PN diet with intravenous saline, Intralipid®, or Omegaven®, combined with orogastric gavage administration of either MCT or Compound A, compared with chow diet control, on hepatic steatosis in C57BL/6 mice for: (A) chow diet FIG. 31. Effects of Compound A, Compound C, and Reference Compounds (Reference 1 and Reference 2) on triglyceride levels over 4 weeks in APOE*3Leiden mice.

Oil Red O stain in isolated liver sections also demonstrate that treatment with Compound A prevented the development of steatosis for all groups (intravenous saline, Intralipid®, or Omegaven®) (FIGS. 26-29). Arrows are used to show lipid accumulation. Quantification of lipid accumulation confirmed that Compound A prevented the development of steatosis as compared with the chow-fed control (FIG. 30).

Figure 19:
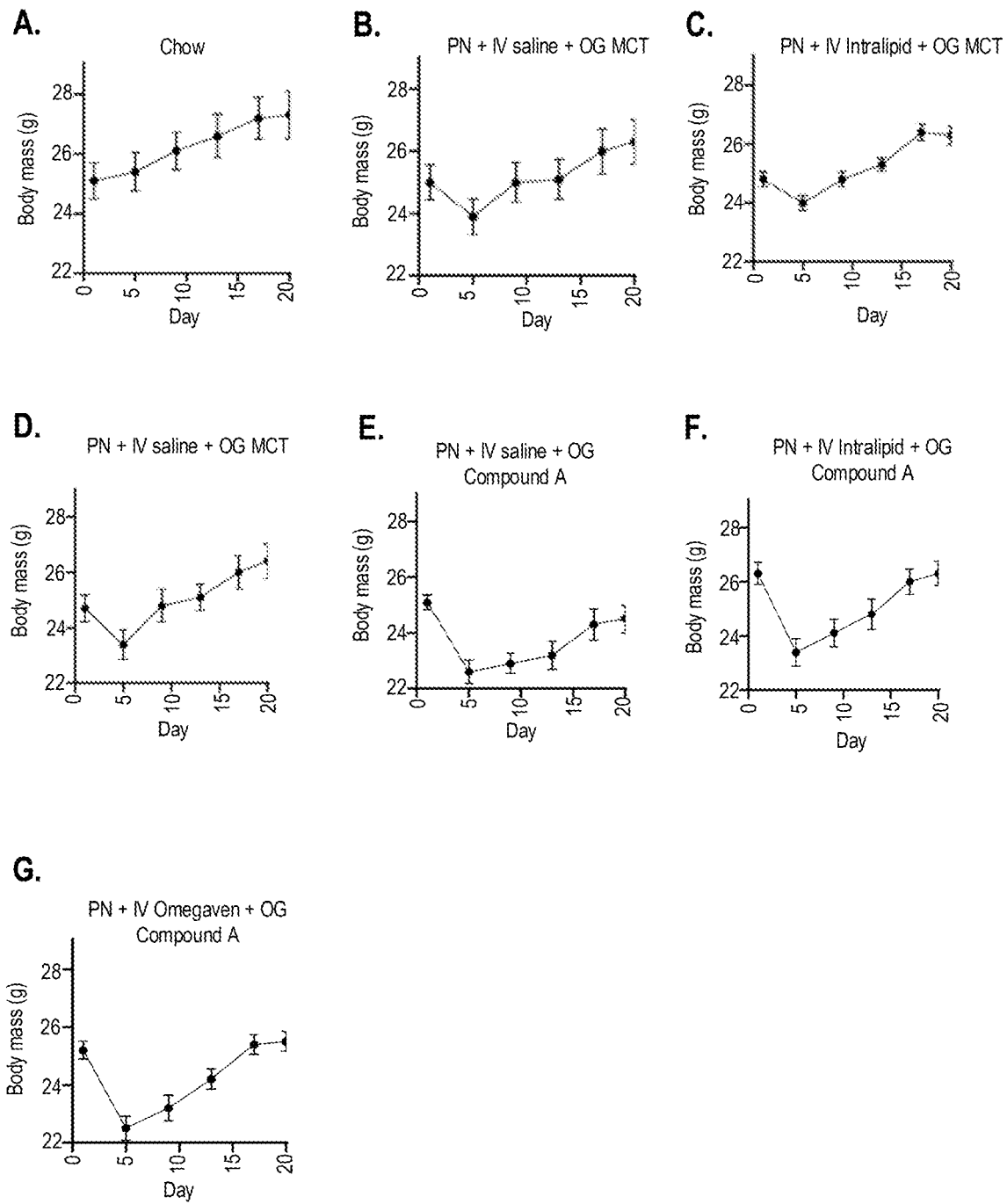
FIG. 19. Body mass of C57BL/6 mice over 19 days for: (A) chow-fed diet; (B) PN diet combined with intravenously administered saline and orogastric gavage of MCT; (C) PN diet combined with intravenously administered Intralipid® and orogastric gavage of MCT; (D) PN diet combined with intravenously administered Omegaven® and orogastric gavage of MCT; (E) PN diet combined with intravenously administered saline and orogastric gavage of 0.6 mmol Compound A; (F) PN diet combined with intravenously administered Intralipid© and orogastric gavage of 0.6 mmol Compound A; and (G) PN diet combined with intravenously administered Omegaven® and orogastric gavage of 0.6 mmol Compound A.
Figure 20:
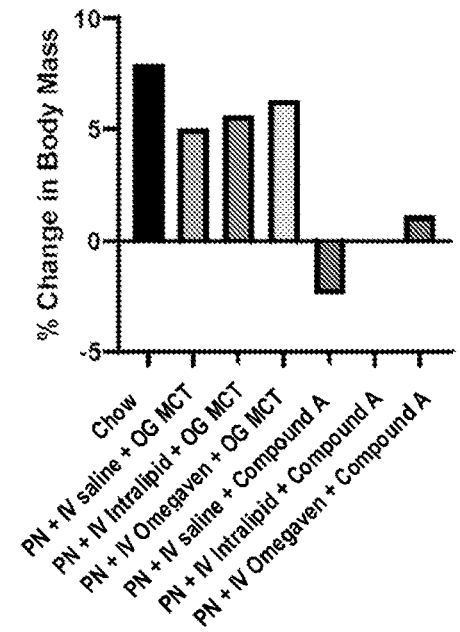
FIG. 20. Effects of PN-fed C57BL/6 mice combined with intravenously administered saline, Intralipid®, or Omegaven® and MCT or Compound A administered by orogastric gavage over 19 days for: (A) percent change in body mass; and (B) normalized liver mass.
Figure 20:
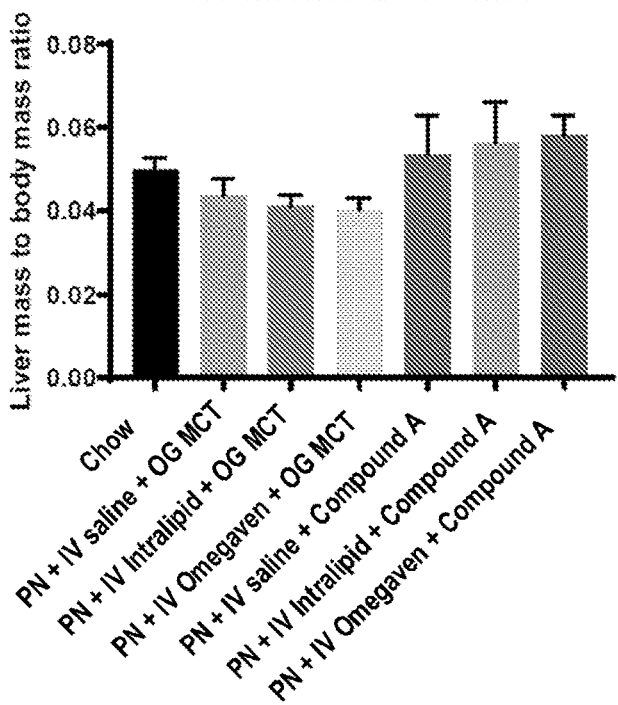
Figure 21:
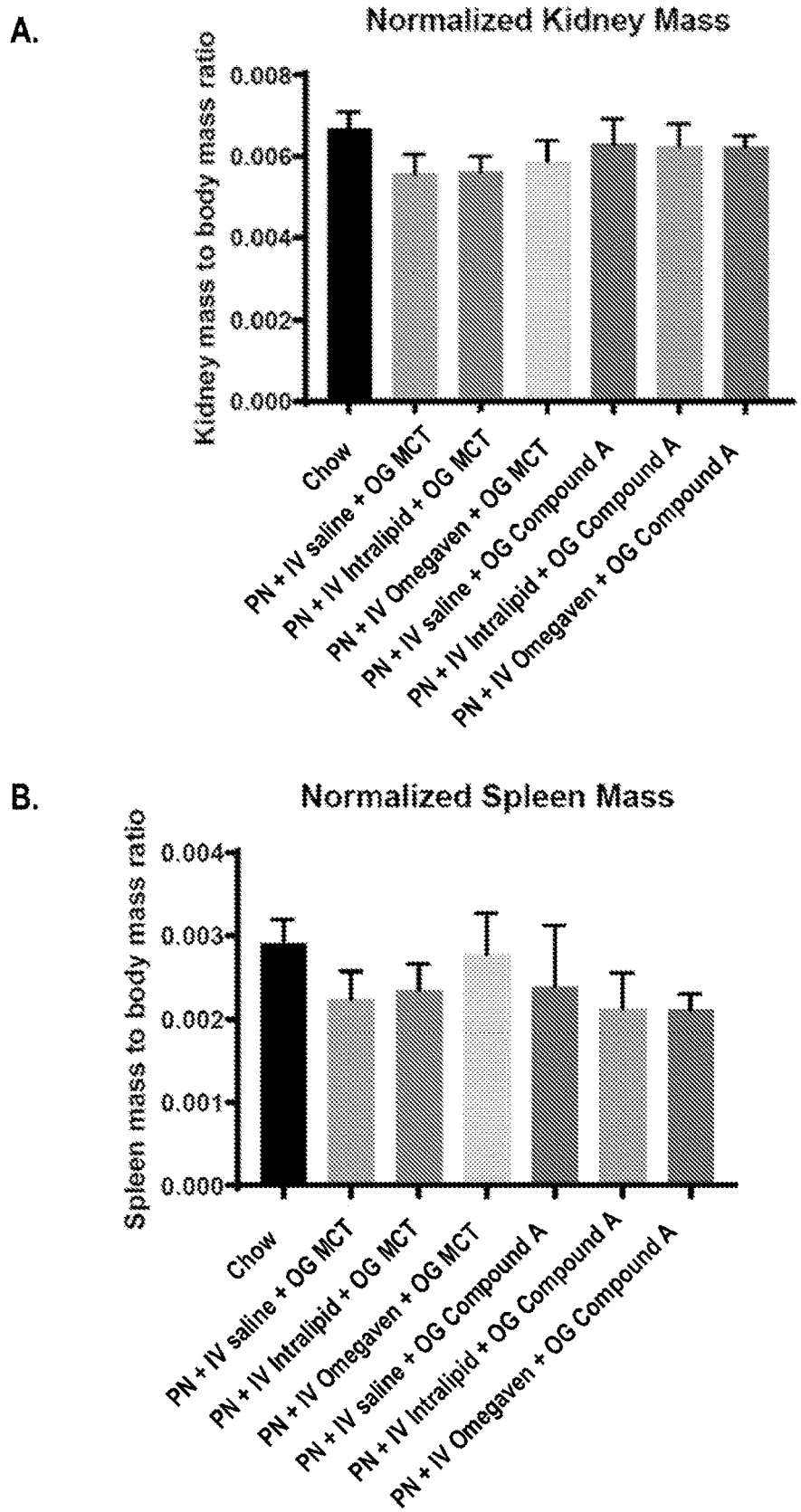
FIG. 21. Effects of PN-fed C57BL/6 mice combined with intravenously administered saline, Intralipid®, or Omegaven® and MCT or Compound A administered by orogastric gavage over 19 days for: (A) normalized kidney mass; and (B) normalized spleen mass.
Figure 22:
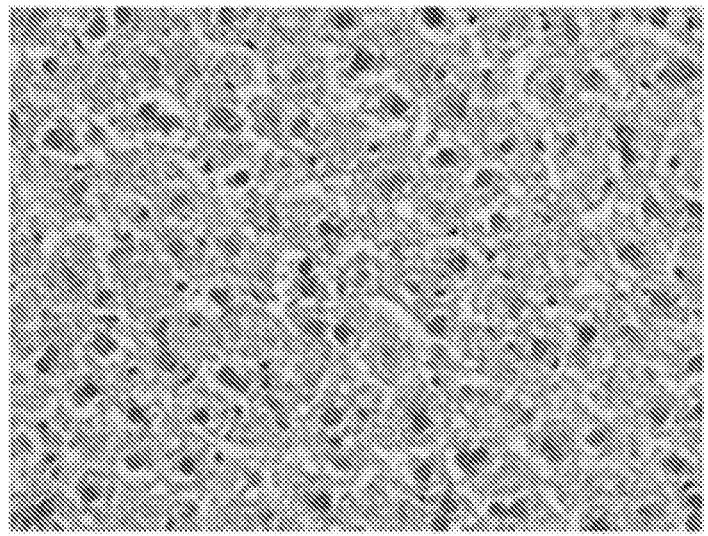
FIG. 22. Effects of an oral PN diet with intravenous saline, Intralipid©, or Omegaven®, combined with orogastric gavage administration of either MCT or Compound A, compared with chow diet control, on hepatic steatosis in C57BL/6 mice. Haemotoxylin and Eosin (H&E) stained mouse liver sections were magnified by 400× for: (A) chow diet control; and (B) PN diet combined with intravenous saline and orogastric gavage of MCT.
Figure 22:
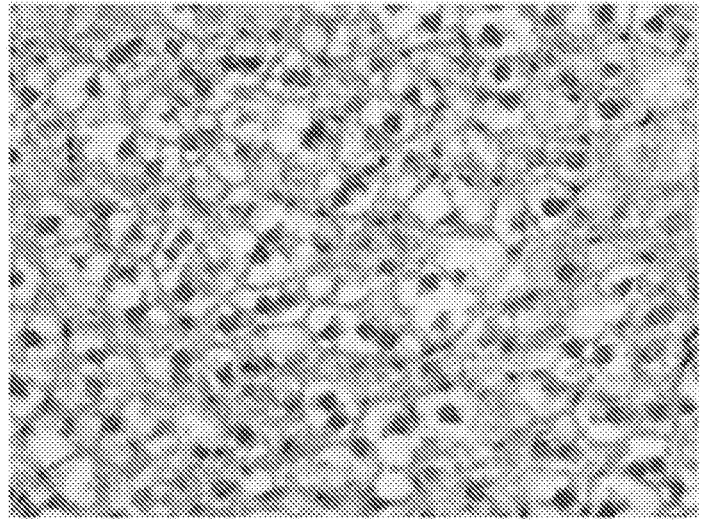
Figure 23:
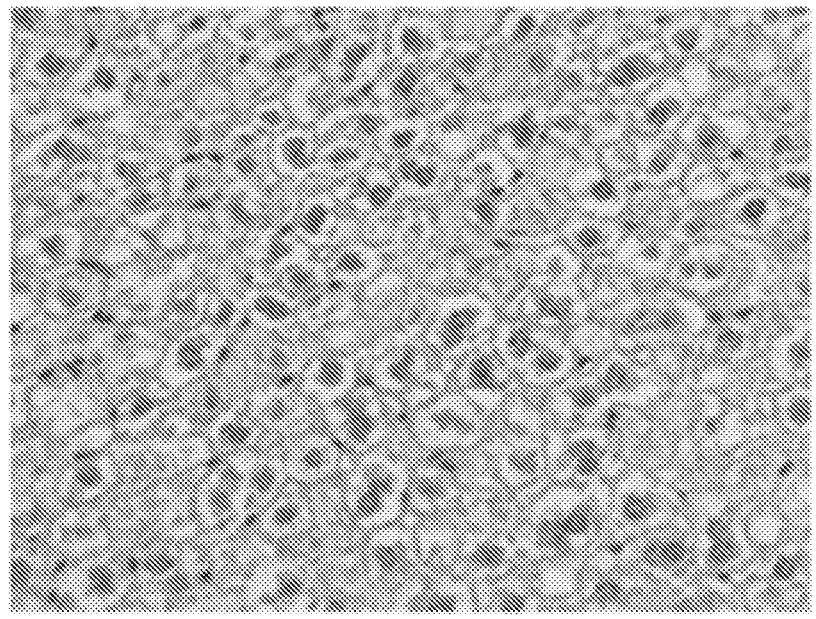
FIG. 23. Effects of an oral PN diet with intravenous saline, Intralipid©, or Omegaven®, combined with orogastric gavage administration of either MCT or Compound A, compared with chow diet control, on hepatic steatosis in C57BL/6 mice. Haematoxylin and Eosin (H&E) stained mouse liver sections were magnified by 400× for: (A) PN diet combined with intravenous Intralipid® and orogastric gavage of MCT; and (B) PN diet combined with intravenous Omegaven© and orogastric gavage of MCT.
Figure 23:
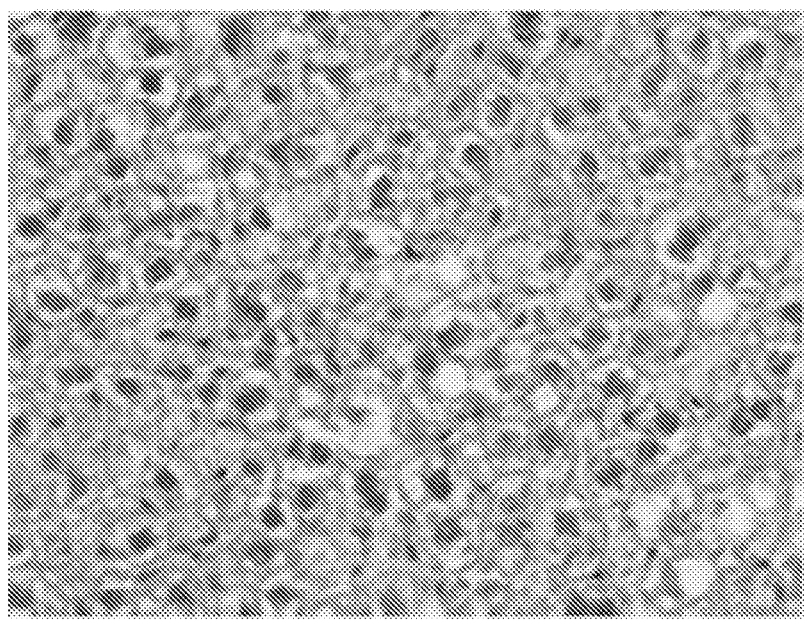
Figure 24:
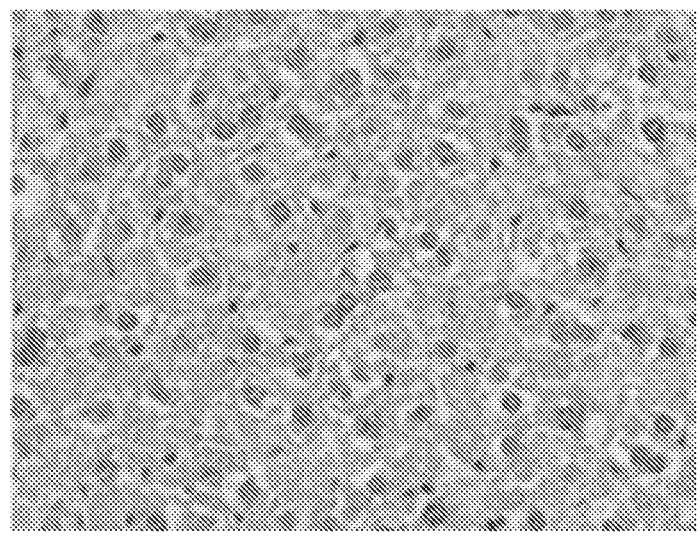
FIG. 24. Effects of an oral PN diet with intravenous saline, Intralipid©, or Omegaven®, combined with orogastric gavage administration of either MCT or Compound A, compared with chow diet control, on hepatic steatosis in C57BL/6 mice. Haemotoxylin and Eosin (H&E) stained mouse liver sections were magnified by 400× for: (A) PN diet combined with intravenous saline and orogastric gavage of 0.6 mmol Compound A; and (B) PN diet combined with intravenous Intralipid® and orogastric gavage of 0.6 mmol Compound A.
Figure 24:
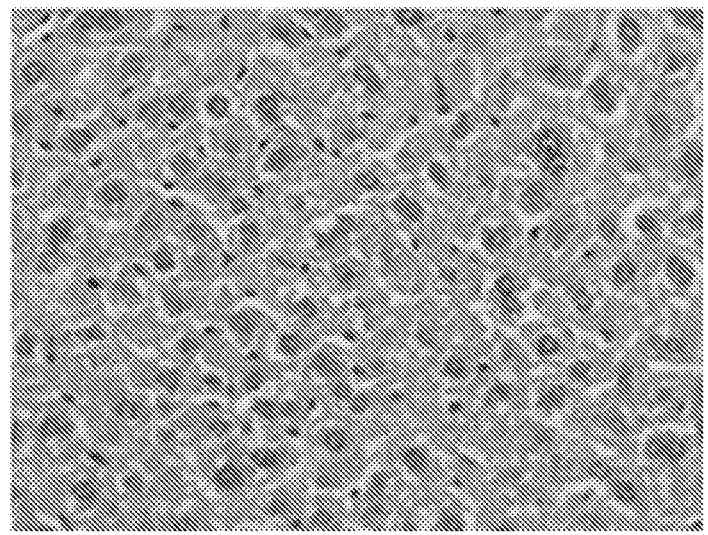
Figure 25:
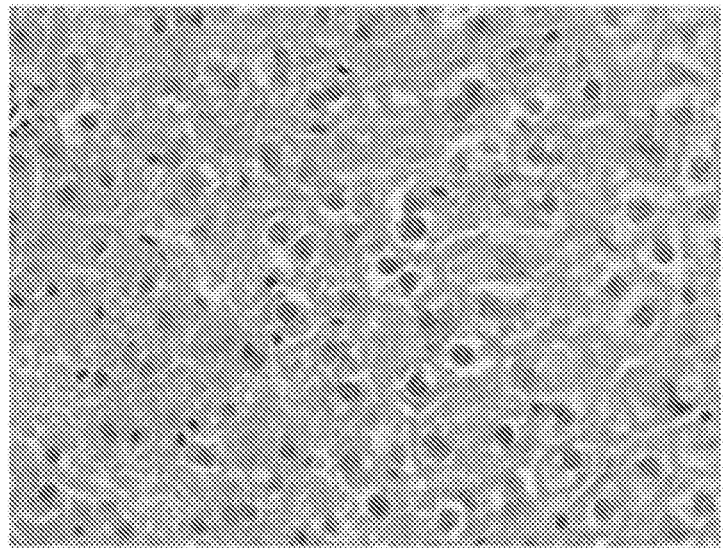
FIG. 25. Effects of an oral PN diet with intravenous saline, Intralipid®, or Omegaven®, combined with orogastric gavage administration of either MCT or Compound A, compared with chow diet control, on hepatic steatosis in C57BL/6 mice. Haemotoxylin and Eosin (H&E) stained mouse liver sections were magnified by 400× for PN diet combined with intravenous Omegaven© and orogastric gavage of 0.6 mmol Compound A.
Figure 26:
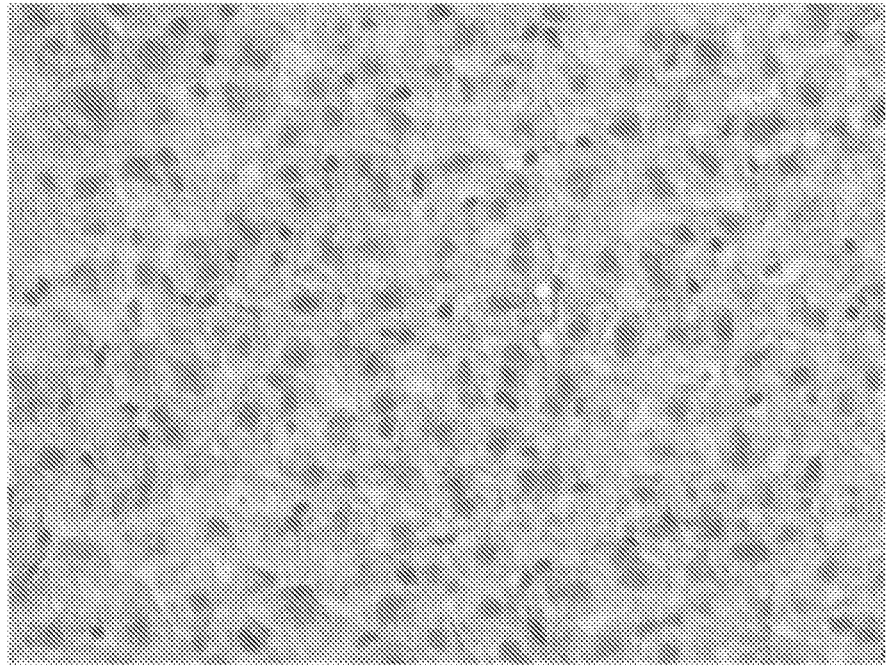
FIG. 26. Effects of an oral PN diet with intravenous saline, Intralipid®, or Omegaven®, combined with orogastric gavage administration of either MCT or Compound A, compared with chow diet control, on hepatic steatosis in C57BL/6 mice. Oil Red O stained mouse liver sections were magnified by 400× for: (A) chow diet control; and (B) PN diet combined with intravenous saline and orogastric gavage of MCT.
Figure 26:
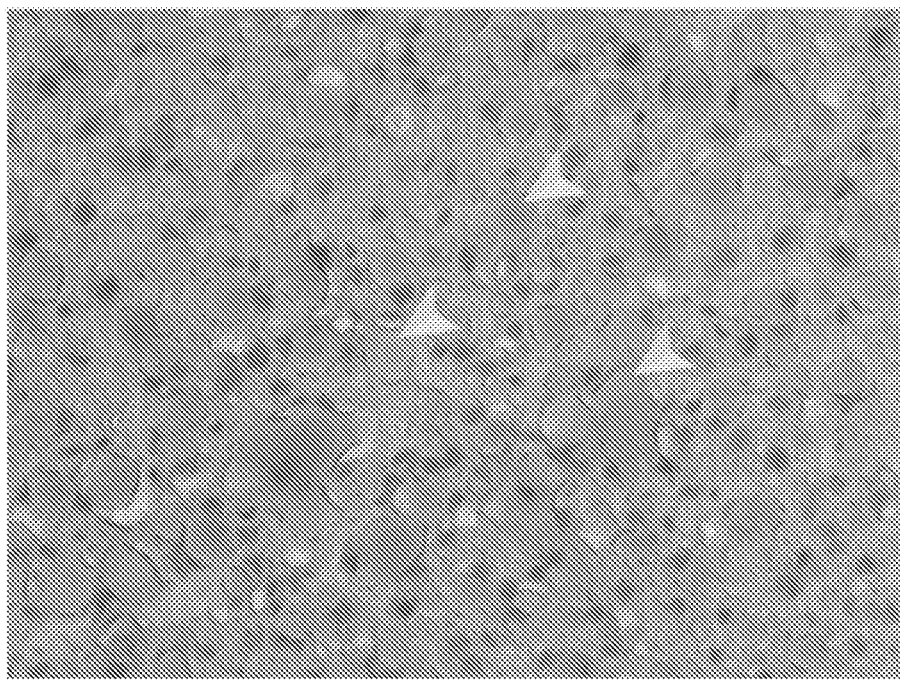
Figure 27:
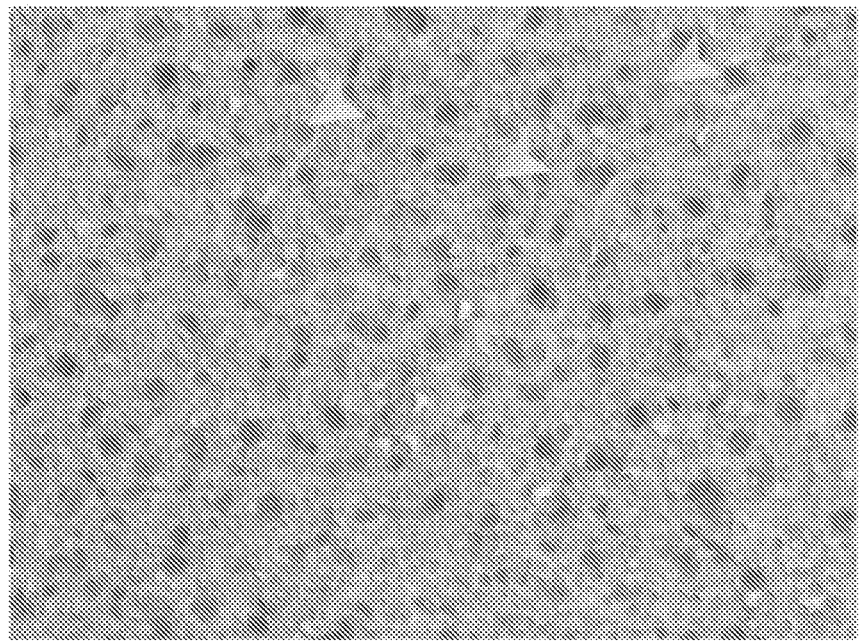
FIG. 27. Effects of an oral PN diet with intravenous saline, Intralipid®, or Omegaven®, combined with orogastric gavage administration of either MCT or Compound A, compared with chow diet control, on hepatic steatosis in C57BL/6 mice. Oil Red O stained mouse liver sections were magnified by 400× for: (A) PN diet combined with intravenous Intralipid® and orogastric gavage of MCT; and (B) PN diet combined with intravenous Omegaven© and orogastric gavage of MCT.
Figure 27:
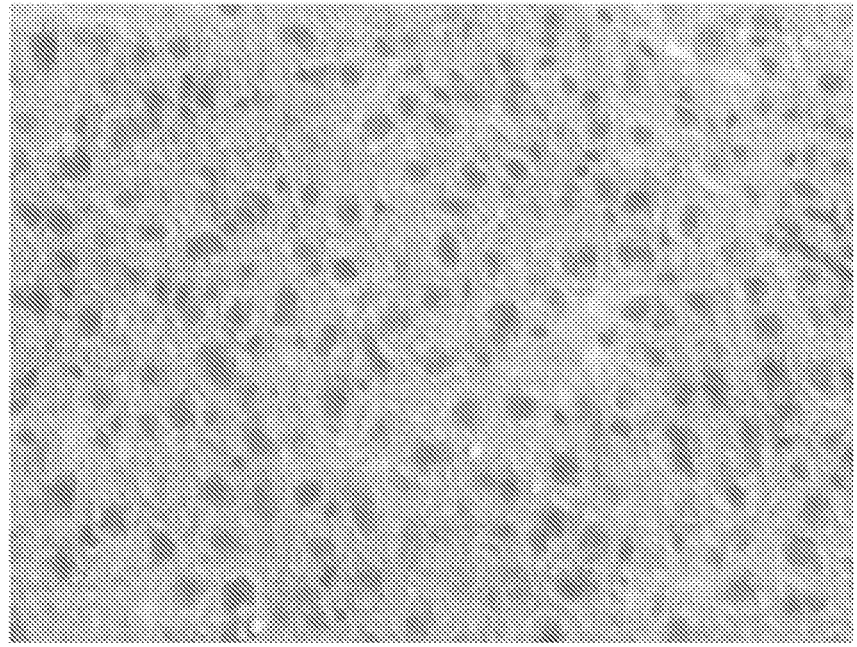
Figure 28:
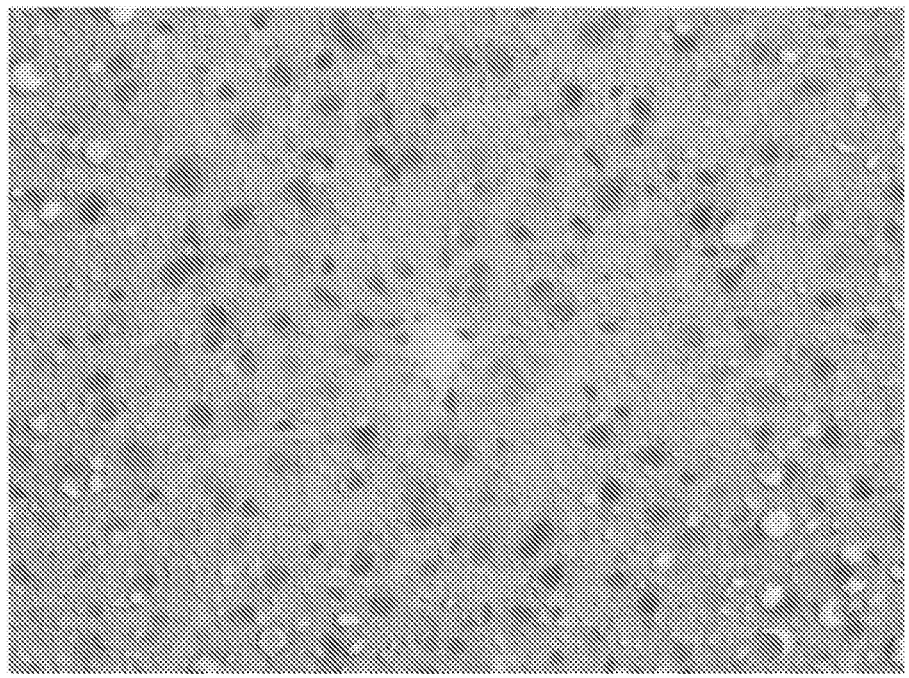
FIG. 28. Effects of an oral PN diet with intravenous saline, Intralipid®, or Omegaven®, combined with orogastric gavage administration of either MCT or Compound A, compared with chow diet control, on hepatic steatosis in C57BL/6 mice. Oil Red O stained mouse liver sections were magnified by 400× for: (A) PIN diet combined with intravenous saline and orogastric gavage of 0.6 mmol Compound A; and (B) PN diet combined with intravenous Intralipid® and orogastric gavage of 0.6 mmol Compound A.
Figure 28:
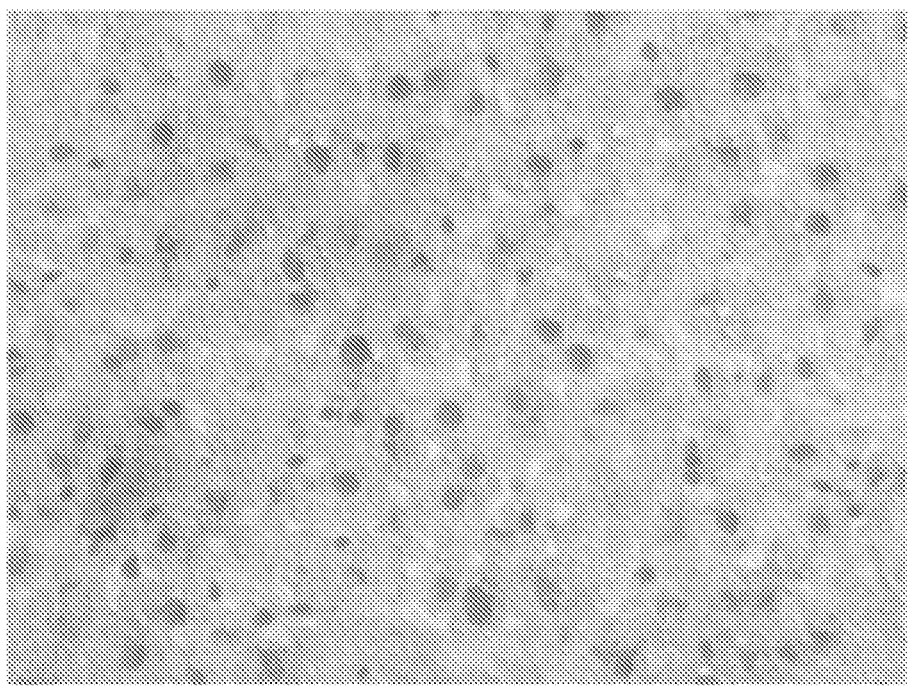
Figure 29:
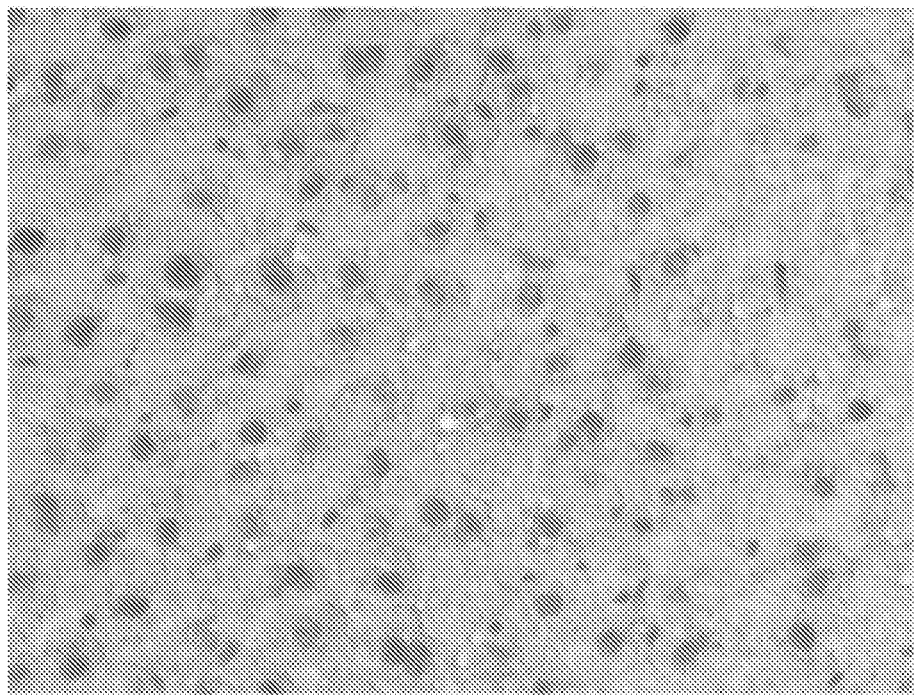
FIG. 29. Effects of an oral PN diet with intravenous saline, Intralipid®, or Omegaven®, combined with orogastric gavage administration of either MCT or Compound A, compared with chow diet control, on hepatic steatosis in C57BL/6 mice. Oil Red O stained mouse liver sections were magnified by 400× for: PN diet combined with intravenous Omegaven© and orogastric gavage of 0.6 mmol Compound A.

Body mass was analyzed over 19 days (FIGS. 19-21). Normalized body, liver, kidney, and spleen mass values were also analyzed, which demonstrated that these values for mice treated with Compound A were not significantly different from any other experimental group (FIGS. 20-21).

Example 17

Figure 31:
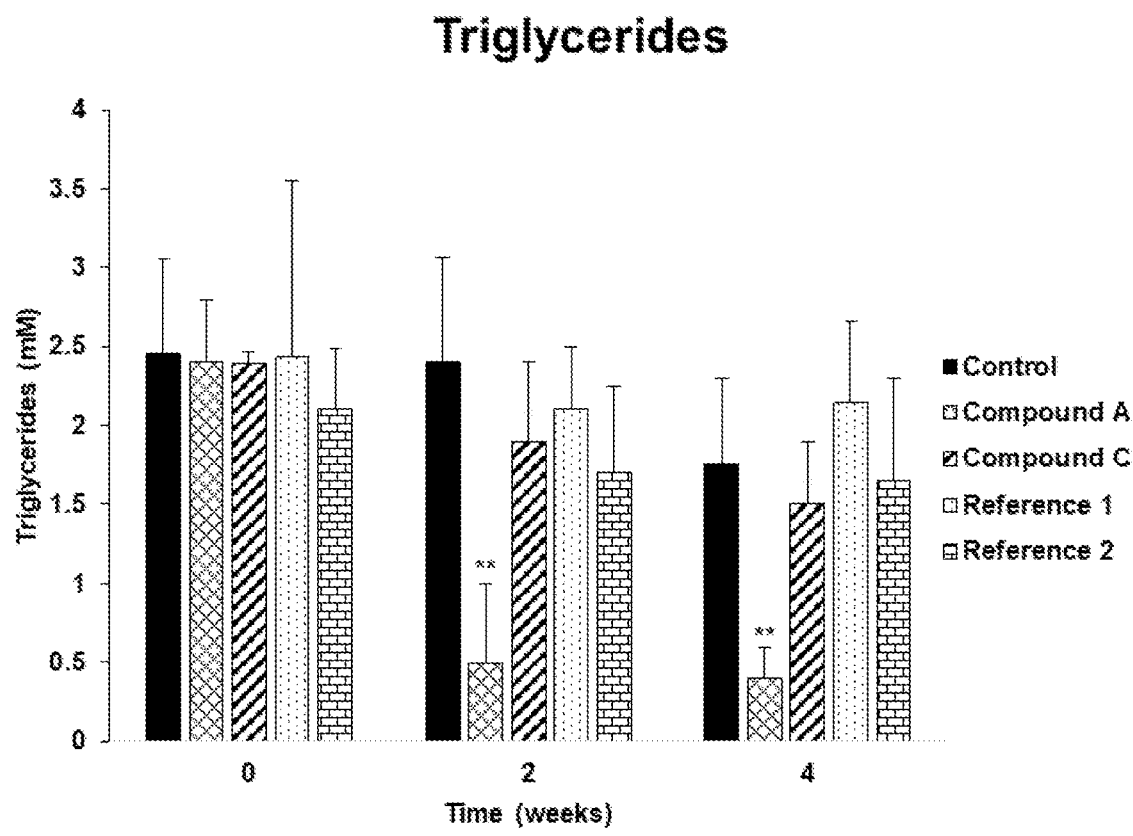

Effects of Compound A on triglyceride levels over 4 weeks of treatment in APOE*3Leiden mice: Compound A significantly reduced triglyceride levels over 4 weeks (FIG. 31). Reference Compounds 1 and 2 did affect triglyceride levels.

The invention claimed is:
1. A pharmaceutical composition comprising a compound of formula (I)

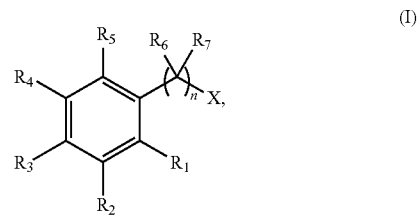

wherein
R1 is a C1-C4 alkyl group, a C1-C4 hydroxyalkyl group, or a C1-C4 haloalkyl group;
R2 is a C6-C9 alkyl group, a C4-C9 hydroxyalkyl group, a C4-C9 haloalkyl group, a heteroalkyl group having 4-9 atoms of which 1-3 atoms are heteroatoms, a C4-C9 alkenyl group having 1-2 double bonds, a heteroalkenyl group having 1-2 double bonds and 5-9 atoms of which 1-2 atoms are heteroatoms, an —O—(C3-C8) alkyl group, an —O—(C3-C8) hydroxyalkyl group, an —O—(C3-C8) haloalkyl group, an —O—(C3-C8) alkenyl group having 1-2 double bonds, an-O—(C3-C8) haloalkyl group, an O-heteroalkenyl group having 5-8 atoms of which 1 is heteroatom and 1 double bond, an —O—(C3-C8) haloalkenyl group having 1-2 double bonds, a C4-C9 alkynyl group having 1-2 triple bonds, an —O—(C3-C8) alkynyl group having 1-2 triple bonds, an amine group having a hydrogen atom and a C3-C8 alkyl group, an amine group having a hydrogen atom and a (C1-C6) ketone group, or an amine group having a C1-C9 alkyl group and a C3-C8 alkyl group;

R3, R4, and R5 are each a hydrogen atom or a halogen atom,

R6 and R7 are the same or different and are independently chosen from a hydrogen atom and an C1-C6 alkyl group, or R6 and R7 together can form a cycloalkyl group;

X is a hydroxymethyl, a carboxylic acid, a carboxylic ester, a glyceride, an anhydride, a carboxamide, or a phospholipid, or a prodrug thereof;

n is 0, 1, or 2;

or a pharmaceutically acceptable salt, solvate, solvate of such salt, or prodrug thereof;

wherein when X is a carboxamide, the carboxamide is chosen from C(O)NH$_2$, N-methyl carboxamide, N,N-dimethyl carboxamide, N-ethyl carboxamide and N,N-diethyl carboxamide;

wherein the composition is formulated for oral administration; and wherein the composition is in the form of a gelatin capsule, a tablet, or a sachet.

2. The pharmaceutical composition according to claim 1, wherein R1 is a methyl group or an ethyl group.

3. The pharmaceutical composition according to claim 1, wherein R1 is a methyl group.

4. The pharmaceutical composition according to claim 1, wherein R2 is a C6-C9 alkyl group, a C4-C9 hydroxyalkyl group, a C4-C9 haloalkyl group, a heteroalkyl group having 4-9 atoms of which 1-3 atoms are heteroatoms, a C5-C9 alkenyl group having 1-2 double bonds, a heteroalkenyl group having 1-2 double bonds and 5-9 atoms of which 1-2 atoms are heteroatoms, an —O—(C3-C8) alkyl group, an —O—(C3-C8) hydroxyalkyl group, an —O—(C3-C8) haloalkyl group, an —O—(C3-C8) alkenyl group having 1-2 double bonds, an —O—(C3-C8) alkynyl group having 1-2 triple bonds, a —S—(C3-C8) alkyl group, an amine group having a hydrogen atom and a C3-C8 alkyl group, an amine group having a hydrogen atom and a (C1-C6) ketone group, or an amine group having a C1-C9 alkyl group and a C3-C8 alkyl group.

5. The pharmaceutical composition according to claim 1, wherein

R1 is a methyl group or an ethyl group;

R2 is a C6-C8 straight chain alkyl group, a C6-C8 alkenyl group having 1 double bond and the double bond is in the ω-3 position, an —O—(C4-C6) straight chain alkyl group, or an —O—(C5-C8) alkenyl group having 1 double bond and the double bond is in the ω-3 position;

R3, R4, and R5 are each a hydrogen atom;

n is 0 or 1;

R6 and R7 are the same or different and independently chosen from a hydrogen atom and a methyl group; and X is chosen from a hydroxymethyl group, a carboxylic acid, a carboxamide, and a —COO—(C1-C4 alkyl) group.

6. The pharmaceutical composition according to claim 1, wherein X is a carboxylic acid, a carboxylic ester, a glyceride, an anhydride, a carboxamide, and a phospholipid.

7. The pharmaceutical composition according to claim 1, wherein X is a carboxylic acid.

8. The pharmaceutical composition according to claim 1, wherein the compound is

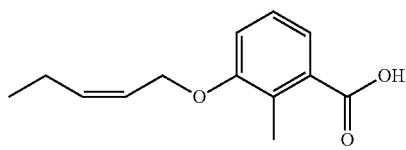 [SMILES: CC/C=C\COc1cccc(C(=O)O)c1C]

(Z)-2-methyl-3-(pent-2-en-1-yloxy)benzoic acid.

9. The pharmaceutical composition according to claim 1, wherein the compound is

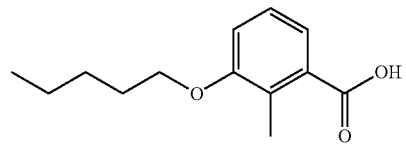 [SMILES: CCCCCOc1cccc(C(=O)O)c1C]

2-methyl-3-(pentyloxy)benzoic acid.

10. The pharmaceutical composition according to claim 1, wherein the compound is a salt chosen from:

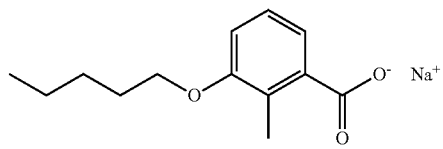 [SMILES: CCCCCOc1cccc(C(=O)[O-])c1C ; [Na+]]

sodium 2-methyl-3-(pentyloxy)benzoate;

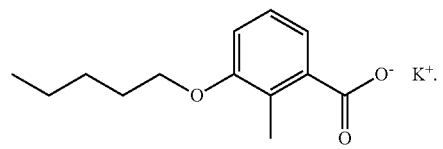

potassium 2-methyl-3-(pentyloxy)benzoate;

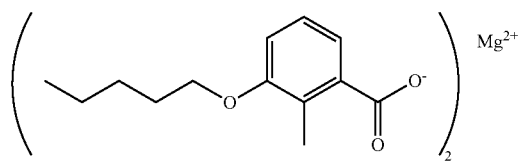

magnesium 2-methyl-3-(pentyloxy)benzoate; and

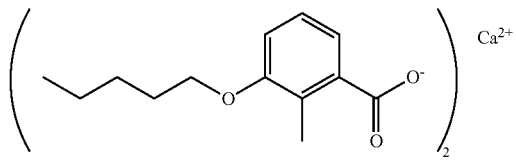

calcium 2-methyl-3-(pentyloxy)benzoate.

11. The pharmaceutical composition according to claim 1, further comprising a pharmaceutically acceptable carrier, excipient or diluent, or any combination thereof.

12. A pharmaceutical composition according to claim 1, wherein the compound is for administration in a daily dose ranging from 5 mg to 2 g.

13. A method comprising administering to a subject in need thereof a pharmaceutically active amount of the pharmaceutical composition according to claim 1 for:
   (i) treating or prophylactically treating a dyslipidemic condition,
   (ii) treating a metabolic condition,
   (iii) reducing plasma insulin levels,
   (iv) reducing fasting plasma insulin levels,
   (v) increasing glucose tolerance,
   (vi) reducing post-prandial glucose levels,
   (vii) reducing fasting blood glucose levels,
   (viii) treating or prophylactically treating a diabetic condition,
   (ix) reducing body weight in an obese or overweight individual,
   (x) treating non-alcoholic fatty liver disease,
   (xi) reducing or prophylactically treating the development of hepatic fibrosis or reducing existing hepatic fibrosis,
   (xii) reducing or prophylactically treating the development of hepatic inflammation or reducing existing hepatic inflammation,
   (xiii) reducing or prophylactically treating the development of hepatic steatosis or reducing existing hepatic steatosis,
   (xiv) treating or prophylactically treating a hepatic biliary disorder,
   (xv) improving bile salt homeostasis, or
   (xvi) reducing or prophylactically treating the development of hepatic inflammation or reducing existing hepatic inflammation in a hepatic biliary disorder.

14. The method according to claim 13, wherein the dyslipidemic condition is hypertriglyceridemia or hypercholesterolemia.

15. The method according to claim 13, wherein the diabetic condition is type 2 diabetes.

16. The method according to claim 13, wherein the non-alcoholic fatty liver disease is non-alcoholic steatohepatitis.

17. The method according to claim 13, wherein the hepatic biliary disorder is sclerosing cholangitis or primary biliary cholangitis.

18. A method of treating parenteral nutrition associated liver disease (PNALD) in a subject in need thereof comprising administering a pharmaceutically active amount of the pharmaceutical composition according to claim 1.

19. A method comprising administering to a subject in need thereof a pharmaceutically active amount of the pharmaceutical composition of claim 1 for:
   (i) improving bile salt homeostasis in PNALD,
   (ii) reducing or prophylactically treating the development of hepatic steatosis in PNALD or reducing existing hepatic steatosis in PNALD,
   (iii) reducing or prophylactically treating the development of hepatic inflammation in PNALD or reducing existing hepatic inflammation in PNALD, or
   (iv) of reducing or prophylactically treating the development of hepatic fibrosis in PNALD or reducing existing hepatic fibrosis in PNALD.

* * * * *